United States Patent
Bemanian et al.

[11] Patent Number: 5,809,258
[45] Date of Patent: Sep. 15, 1998

[54] BUS WITH HIGH GROSS DATA TRANSFER RATE

[75] Inventors: Majid Bemanian, Fremont; John Bailey, Calabassas, both of Calif.

[73] Assignee: Ascom Timeplex Trading AG, Berne, Switzerland

[21] Appl. No.: 778,785

[22] Filed: Jan. 6, 1997

Related U.S. Application Data

[63] Continuation of Ser. No. 295,506, Aug. 23, 1994, abandoned.

[51] Int. Cl.$^6$ .................................................. G06F 13/00
[52] U.S. Cl. ........................................ 395/287; 395/293
[58] Field of Search ................................... 395/286, 287, 395/293

[56] References Cited

U.S. PATENT DOCUMENTS

| | | | |
|---|---|---|---|
| 5,237,567 | 8/1993 | Nay et al. | 370/85.1 |
| 5,287,477 | 2/1994 | Johnson et al. | 395/425 |
| 5,404,463 | 4/1995 | McGarvey | 395/308 |
| 5,416,910 | 5/1995 | Moyer et al. | 395/293 |
| 5,509,125 | 4/1996 | Johnson et al. | 395/300 |

*Primary Examiner*—Jack B. Harvey
*Assistant Examiner*—David A. Wiley
*Attorney, Agent, or Firm*—Steven C. Seveboff; Riva W. Bickell; Sereboff & Buyan

[57] ABSTRACT

A pipelined bus which can support more than one channel between data sources and data destinations at a time. The bus includes an arbitration bus, a command bus and a data bus. In accordance with the bus protocol, different channels may access the various bus components in the same clock cycle. For example, the data source of one channel may issue a command on the command bus to its selected data destination to get ready to receive data while at the same time, a data source of a second channel actually transmits data on the data bus to its selected data destination. During the same clock cycle, a third data source can be selected by the arbitration bus to initiate or resume a channel. In the following clock cycle, the third data source can transmit a command on the command bus to its selected data destination to get ready to receive data, the second data source can transmit data on the data bus to its data destination and a fourth data source can be selected by the arbitration bus to initiate or resume a channel. In this manner, the set up and delivery of data for the different channels overlap in each clock cycle. Because a particular channel is not always ready to send or receive data, it has been found that such an arrangement increases the overall efficiency of the bus.

9 Claims, 30 Drawing Sheets

Figure 3. Simplified Block Diagram

| Slot Number | GEO(0..3) | Geographical address bus |
|---|---|---|
| Redundancy | RED(0..5) | Redundancy bus |
| Control Bus A | Clock distribution bus A | |
| | ARBA(0..3) | Arbitration bus A |
| | CMDA(0..2) | Command bus A |
| | ADDA(0..3) | Address bus A |
| | RSPA(0..2) | Response bus A |
| Control Bus B | Clock distribution bus B | |
| | ARBB(0..3) | Arbitration bus B |
| | CMDB(0..2) | Command bus B |
| | ADDB(0..3) | Address bus B |
| | RSPB(0..2) | Response bus B |
| 96-bit Data Bus | DATAA(0..31) | Data bus A |
| | DATAB(0..31) | Data bus B |
| | DATAC(0..31) | Data bus C |
| P-Bus | | |

FIGURE 6

| COMMANDS | | RESPONSES | |
|---|---|---|---|
| CHREQ | - Channel Request | ACKCH | - Acknowledge CHREQ |
| DAV | - Data Available | ACK | - Acknowledge data |
| LDAV | - Last Data Available | NAK | - Negative acknowledge |
| NOP | - No Operation | DISC | - Disconnect channel |
| BRST | - Board Reset | EMPTY | - Empty slot |

FIGURE 7

|  | t17 | t18 | t19 | t20 | t21 | t22 | t23 | t24 | t25 | t26 |
|---|---|---|---|---|---|---|---|---|---|---|
| ARB | 4 | 5 | 6 | 7 | 1 | 4 | 5 | 6 | 8 | 1 |
| CMD | NOP | CHREQ | DAV | DAV | NOP | DAV | DAV | DAV | LDAV | NOP |
| ADD | 0 | 7 | 3 | 2 | 0 | 8 | 7 | 3 | 2 | 0 |
| DAT | D21 | - | - | D511 | D62 | - | D22 | D0 | D511 | D63 |
| RSP | ACK | EMPTY | ACKCH | NAK | ACK | EMPTY | ACK | ACK | ACK | ACK |

FIGURE 8  P-Bus Activity

|  | t17 | t18 | t19 | t20 | t21 | t22 | t23 | t24 | t25 | t26 |
|---|---|---|---|---|---|---|---|---|---|---|
| ARB | 4 |  |  |  |  | 4 |  |  |  |  |
| CMD |  | CHREQ |  |  |  |  | DAV |  |  |  |
| ADD |  | 7 |  |  |  |  | 7 |  |  |  |
| DAT |  |  | - |  |  |  |  | D0 |  |  |
| RSP |  |  | ACKCH |  |  |  |  | ACK |  |  |

FIGURE 9  Slot 4 Activity

|  | t17 | t18 | t19 | t20 | t21 | t22 | t23 | t24 | t25 | t26 |
|---|---|---|---|---|---|---|---|---|---|---|
| ARB |  | 5 |  |  |  |  | 5 |  |  |  |
| CMD |  |  | DAV |  |  |  |  | DAV |  |  |
| ADD |  |  | 3 |  |  |  |  | 3 |  |  |
| DAT |  |  |  | D511 |  |  |  |  | D511 |  |
| RSP |  |  |  | NAK |  |  |  |  | ACK |  |

FIGURE 10  Slot 5 Activity

|     | t17 | t18 | t19 | t20 | t21 | t22 | t23 | t24 | t25  | t26 |
|-----|-----|-----|-----|-----|-----|-----|-----|-----|------|-----|
| ARB |     |     | 6   |     |     |     |     | 6   |      |     |
| CMD |     |     |     | DAV |     |     |     |     | LDAV |     |
| ADD |     |     |     | 2   |     |     |     |     | 2    |     |
| DAT |     |     |     |     | D62 |     |     |     |      | D63 |
| RSP |     |     |     |     | ACK |     |     |     |      | ACK |

FIGURE 11    Slot 6 Activity

|     | t17 | t18   | t19   | t20  | t21 | t22 | t23  | t24  | t25  | t26 |
|-----|-----|-------|-------|------|-----|-----|------|------|------|-----|
| ARB | 4   | 5     | 6     |      |     | 4   | 5    | 6    |      |     |
| CMD |     | CHREQ | DAV   | DAV  |     |     | DAV  | DAV  | LDAV |     |
| ADD |     | 7     | 3     | 2    |     |     | 7    | 3    | 2    |     |
| DAT |     |       | -     | D511 | D62 |     |      | D0   | D511 | D63 |
| RSP |     |       | ACKCH | NAK  | ACK |     |      | ACK  | ACK  | ACK |

FIGURE 12    Slot 4-6 Activity

|     | t17 | t18 | t19 | t20 | t21 | t22   | t23 | t24 | t25 | t26 |
|-----|-----|-----|-----|-----|-----|-------|-----|-----|-----|-----|
| ARB | 4   | 5   | 6   | 7   | 1   | 4     | 5   | 6   | 8   | 1   |
| CMD |     |     |     |     | NOP | DAV   |     |     |     | NOP |
| ADD |     |     |     |     | 0   | 8     |     |     |     | 0   |
| DAT |     |     |     |     |     | -     | D22 |     |     |     |
| RSP |     |     |     |     |     | EMPTY | ACK |     |     |     |

FIGURE 13    Other P-Bus Activity

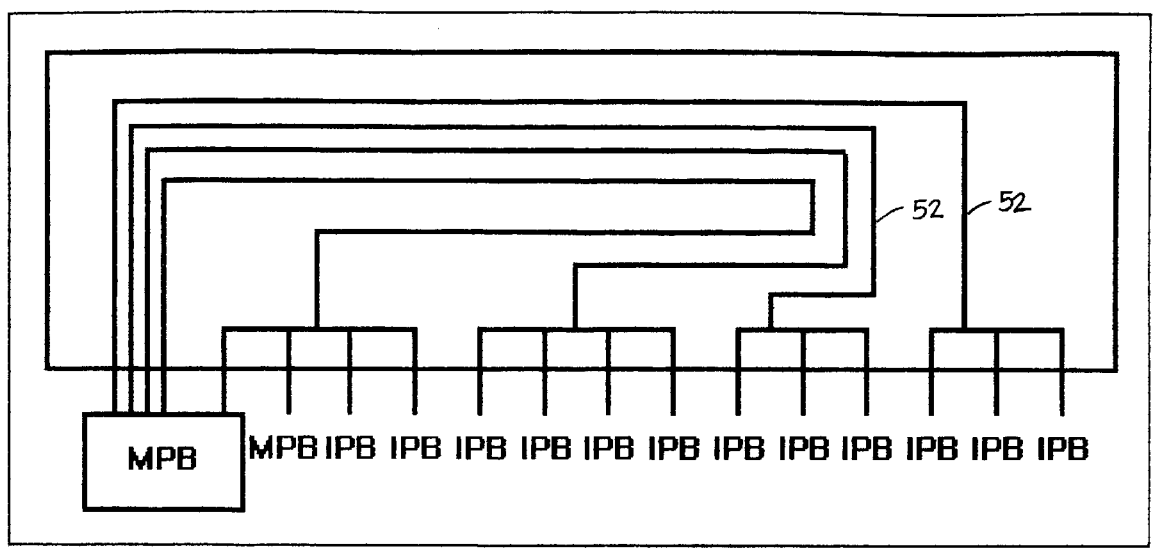
Figure 14. Clock Distribution

|     | t17 | t18   | t19  | t20  | t21 | t22   | t23 | t24 | t25  | t26 |
| --- | --- | ----- | ---- | ---- | --- | ----- | --- | --- | ---- | --- |
| ARB | 4   | 5     | 6    | 7    | 1   | 4     | 5   | 6   | 8    | 1   |
| CMD | NOP | CHREQ | DAV  | DAV  | NOP | DAV   | DAV | DAV | LDAV | NOP |
| ADD | 0   | 7     | 3    | 2    | 0   | 8     | 7   | 3   | 2    | 0   |
| DAT | D21 | -     | -    | D511 | D62 | -     | D22 | D0  | D511 | D63 |
| RSP | ACK | EMPTY | AKCH | NAK  | ACK | EMPTY | ACK | ACK | ACK  | ACK |

Figure 29

| Signal Name | Setup time | Hold time |
| --- | --- | --- |
| ARB Buses | 19 ns | 9 ns |
| CMD Buses | 12 ns | 11 ns |
| ADD Buses | 12 ns | 11 ns |
| RSP Buses | 12 ns | 11 ns |
| DAT Buses | 9 ns  | 14 ns |

Figure 30

| Interrupt | Function |
|---|---|
| NMI (non-maskable) | Protection violation<br>Watchdog timeout<br>Parity error<br>NMI jumper |
| XINT0 | DMA request |
| XINT1 | Network port 1 |
| XINT2 | Network port 3 |
| XINT3 | Network port 2 |
| XINT4 | Network port 4 |
| XINT5 | UART interrupt |
| XINT6 | System timer |
| XINT7 | PIPE request |

Interrupt Table
FIGURE 31

| Signal Name | Direction | Description |
|---|---|---|
| ADDR[2..31] | CPU --> P-Bus | Address bus (unbuffered) |
| DATA[0..31] | CPU <--> P-Bus | Data bus (unbuffered) |
| BE[0..3]- | CPU --> P-Bus | Byte enables (unbuffered) |
| CWRITE- | CPU --> P-Bus | H = Read / L = Write (buffered) |
| BBLAST | CPU --> P-Bus | Burst last (buffered) |
| DREQ[0..3]- | P-Bus --> CPU | DMA requests (4 channels) |
| DACK[0..3]- | CPU --> P-Bus | DMA acknowledge (4 channels) |
| TC[0..1]- | CPU --> P-Bus | DMA transmit terminal count |
| EOP[2..3]- | P-Bus --> CPU | DMA receive termination |
| DRQINT- | P-Bus --> CPU | DMA request interrupt |
| PBINT- | P-Bus --> CPU | PIPE interrupt (TXDONE) |
| PRST- | CPU --> P-Bus | PIPE reset |
| PCLKP | CPU --> P-Bus | 33 MHz CPU clock |

P-Bus Interface Signals
FIGURE 33

| Signal Name | Description | Direction |
|---|---|---|
| CLK[0..3] | 20 MHz P-Bus clock out | MNP --> CPU |
| ARBO[0..3] | 4-bit slot selection | MNP <--> CPU |
| CMD[0..2] | 3-bit Command bus | CPU --> MNP |
| RSP[0..2] | 3-bit Response bus | CPU --> MNP |
| BOARDP | L = Arbitration board present | MNP --> CPU |
| CLKARB | P-Bus clock in | CPU --> MNP |

Arbitration Board Signals
FIGURE 34

BUS WITH HIGH GROSS DATA TRANSFER RATE

This is a continuation of application Ser. No. 08/295,506 filed on Aug. 23, 1994, now abandonded.

NOTICE OF COPYRIGHTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present invention relates generally to busses for use in electronic devices.

2. Description of Related Art

The use of a bus to communicate between many devices is well known. Several standard busses include the AT-bus (or ISA-bus) in the IBM Corporation (Armonk, N.Y.) PC-AT, the VME bus in the Digital Equipment Corporation (Maynard, Mass.) VAX line of computers, and the S-bus in workstations from Sun Microsystems Corporation (Fremont, Calif.). These busses were developed with certain design goals dictated by their use in microcomputer systems. Microprocessor computers typically only require high data transfers to and from a RAM. In general, except for these data-intensive communications with the RAM, the other devices on the bus generally communicate only with the system processor. Since the system processor often needs to communicate with several devices seemingly simultaneously, communication by the system processor is often performed in time division multiplex (TDM). In these types of busses, typically only one apparatus can use the bus at any given time. This is not a problem because quantities of information are generally small enough that the bus is not a bottleneck. Communication of large amounts of data to and from the RAM is generally accomplished through demand memory access (DMA), which allows bursts of data between certain devices and the RAM.

Busses such as these have been adopted for use in apparatuses other than computers. One application has been in network routers. Network routers exemplify the apparatuses which include a number of devices, each having substantially equal priority on the bus, each transferring similar quantities and qualities of data, and each needing to transfer data to any of the other devices. Network routers have been developed which include busses based upon the VME-bus and the S-bus. However, these routers and other data-transferintensive applications differ from computers because of the quantity of data to be transferred on the bus, the quality of that data, and the data's destination. As a consequence, these prior busses have often been inadequate to provide sufficient data throughput for many router applications.

One attempt to overcome this problem has been to provide multiple busses to increase the amount of data which can be transferred through the router. However, this approach can significantly increase the cost and complexity of the router.

Another approach has been to increase the clock frequency of the bus so that the data rate is increased. However, at high clock frequencies, harmful electromagnetic radiation can occur. As a result, increasing the clock frequency can often require substantially increased shielding to prevent undesirable electromagnetic interference (EMI).

Therefore, it is an object of the invention to provide a bus for use in high data transfer apparatuses.

SUMMARY OF THE INVENTION

The present invention is directed to a bus which, in accordance with one aspect of the present invention permits access to the bus by more than one channel between a data source and a data destination at a time. Such an arrangement has been found to substantially increase the effective data throughput of the bus without necessitating increases in the clock speed of the bus.

In the illustrated embodiment, the bus includes various components including an arbitration bus, a command bus, and a data bus. In accordance with the bus protocol, different channels may access the various bus components in the same clock cycle. For example, the data source of one channel may issue a command on the command bus to its selected data destination to get ready to receive data while at the same time, a data source of a second channel actually transmits data on the data bus to its selected data destination. During the same clock cycle, a third data source can be selected by the arbitration bus to initiate or resume a channel. In the following clock cycle, the third data source can transmit a command on the command bus to its selected data destination to get ready to receive data, the second data source can transmit data on the data bus to its data destination and a fourth data source can be selected by the arbitration bus to initiate or resume a channel. In this manner, the set up and delivery of data for the different channels overlap in each clock cycle. Because a particular channel is not always ready to send or receive data, it has been found that such an arrangement increases the overall efficiency of the bus.

DESCRIPTION OF THE DRAWINGS

These and other advantages of the present invention are best understood with reference to the drawings, in which:

FIG. 6 is a table defining the component busses of the bus of FIG. 1;

FIG. 7 is a table defining the commands and responses of the command/response protocol of the bus of FIG. 1;

FIG. 8 is a snap shot of bus activity;

FIG. 9 is a snap shot of bus activity for slot 4 of FIG. 8;

FIG. 10 is a snap shot of bus activity for slot 5 of FIG. 8;

FIG. 11 is a snap shot of bus activity for slot 6 of FIG. 8;

FIG. 12 is a snap shot of bus activity for slots 4–6 of FIG. 8;

FIG. 13 is a snap shot of bus activity for other slots of FIG. 8;

FIG. 14 illustrates the distribution of clock signals for the router of FIG. 2;

FIG. 29 is a snap shot of bus activity of FIG. 8 with highlights to indicate overlapping access to the bus.

FIG. 30 is a table indicating timing factors for the signals of the bus of FIG. 2;

FIG. 31 is a table of the interrupt functions of the interrupt controller of the CPU module of the processor board of FIG. 3;

FIG. 33 is a table of the signals of the bus interface to the CPU module of the processor board of FIG. 3;

FIG. 34 is a table of the signals of the arbitration board to the bus and CPU module of the processor board of FIG. 3.

DESCRIPTION OF THE APPENDICES

An understanding of the present invention may also be aided by reference to the appendices, in which:

Appendix A are listings of programming instructions for PALs for use in the illustrated embodiment; and Appendix B are listings of programs for a CPU for use in the illustrated embodiment.

DETAILED DESCRIPTION OF THE DRAWINGS

Throughout this description, the preferred embodiment and examples shown should be considered as exemplars, rather than limitations on the apparatus and methods of the present invention. The embodiment of the invention described herein is substantially that of the Enterprise Router, a product of ascom Timeplex, Inc. (Woodcliff Lake, N.J.). The Enterprise Router is available in five-slot (ER-5) and fifteen-slot (ER-15) forms. The user, technical and marketing documentation of the Enterprise Router are incorporated herein by reference.

Introduction

Figure 1:
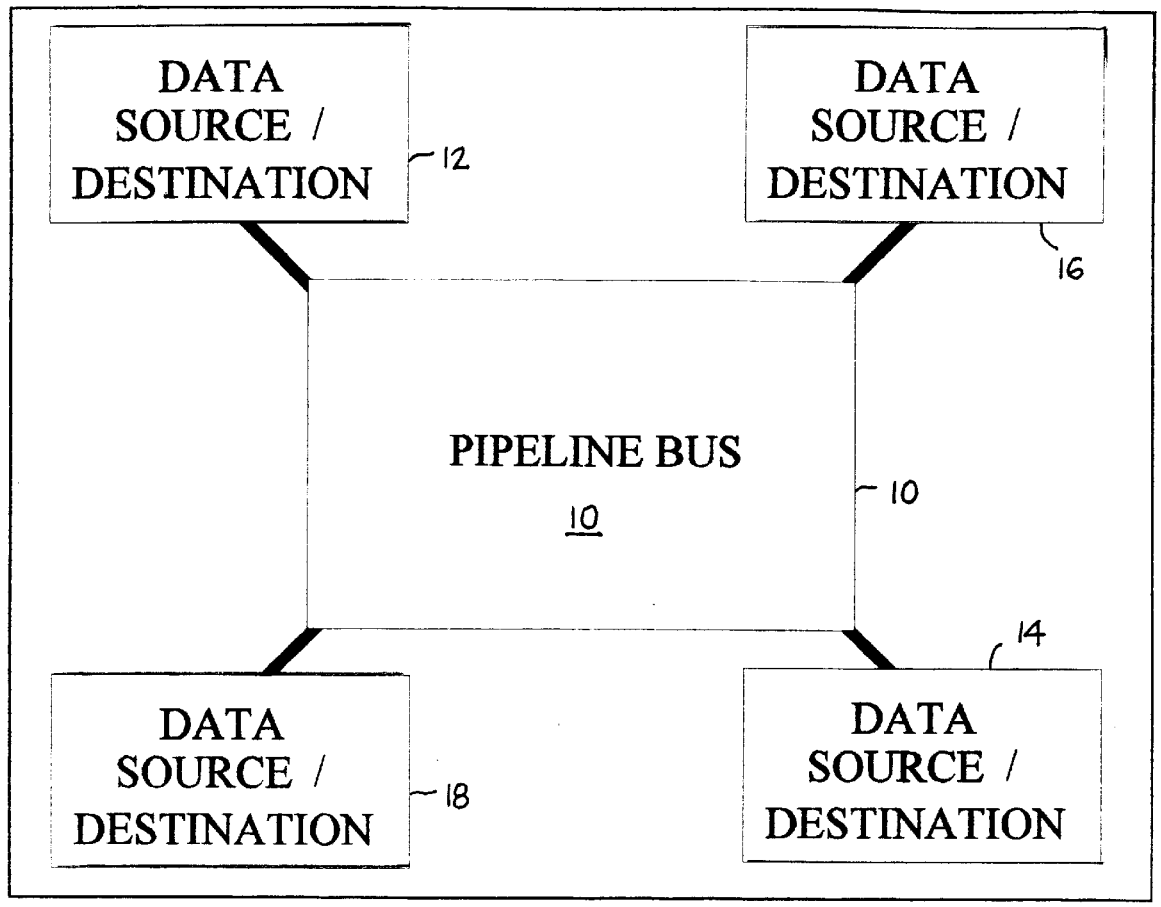
FIG. 1 illustrates a general application of a bus in accordance with the present invention.

A bus structure in accordance with a preferred embodiment of the present invention is indicated generally at 10 in FIG. 1. The bus 10 effectively emulates the functions of a multipoint-crossbar-switch. In other words, the bus 10 permits a data source 12 to be coupled to a data destination 14 at the same time that a data source 16 is coupled to a data destination 18. Data traffic may flow in either direction so that the data destination 14 might also provide a source of data to the data destination 12. The data source/destination elements 12–18 are intended to represent any device or devices that may provide a source of data or a destination for data including but not limited to networks, radio links, transmission lines, routers, bridges, data storage devices, processors and the like. Although the bus 10 is shown being coupled to four source/destination elements, it should also be appreciated that the bus 10 may be coupled to widely varying numbers of devices.

As will be explained in greater detail below, the bus 10, as a result of its unique design, permits multiple channels between different data sources and destinations to coexist on the bus 10 in a virtually simultaneous fashion. Still further, the bus 10 has a very large bandwidth at a relatively low clock frequency. As a result, large amounts of data can be transferred between data sources and destinations over the bus 10 at significantly reduced electromagnetic emanation levels. Thus, the shielding requirements of the bus 10 are substantially simplified. In addition, the unnecessary redundancy of many prior designs has been reduced or eliminated. As a consequence, the cost of construction of the bus 10 is significantly reduced as compared to many prior designs.

One application of the bus 10 is to interconnect processor boards in a multi-processor environment such as a router for data networks such as local area networks (LAN's) and wide area networks (WAN's). Routers typically interconnect a network to one or more other networks to permit data to be transferred between networks. The router may also perform a bridging function so that different types of networks such as Ethernet, Token Ring, FDDI, ISDN etc. having different protocols and interface requirements can be interconnected together through the router. Other multi-processor applications include computers, hubs, communication switches and data storage arrays.

Figure 2:
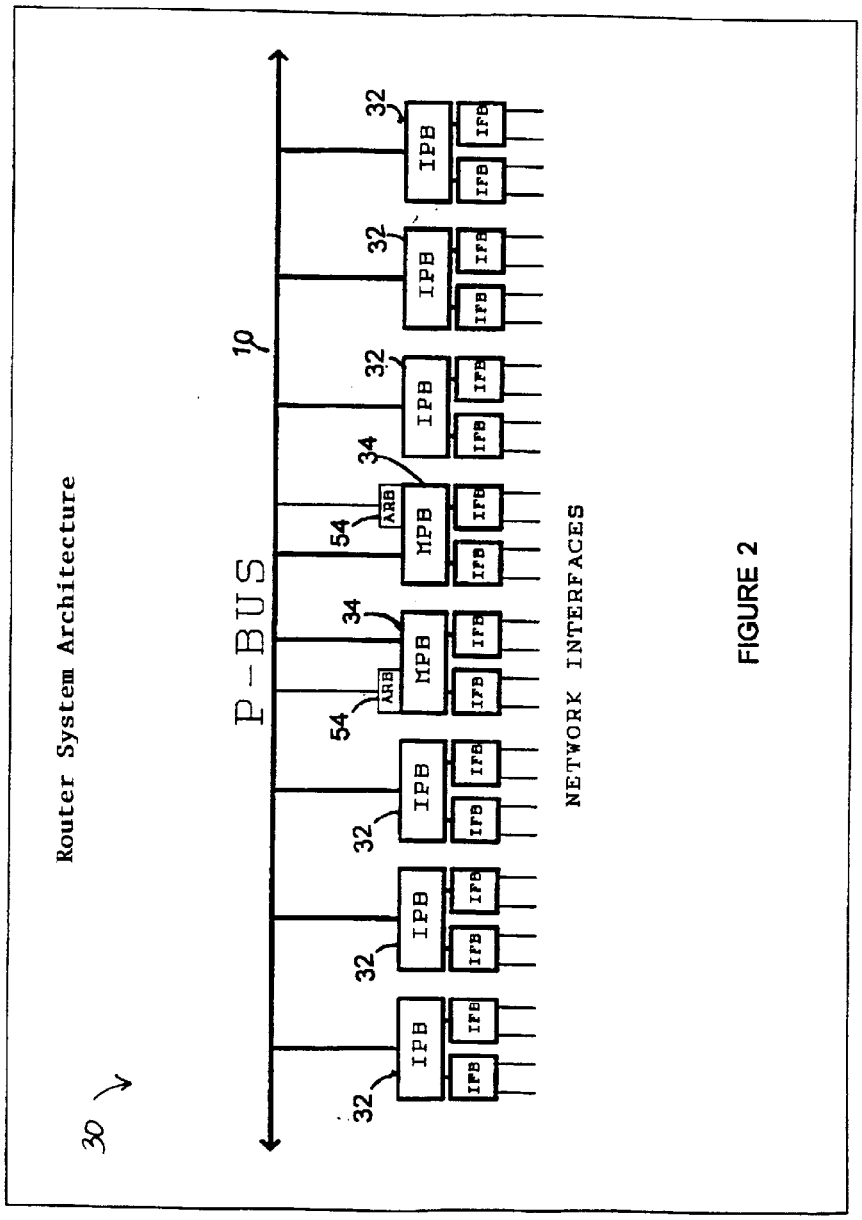
FIG. 2 illustrates a router application of the bus of FIG. 1.

FIG. 2 shows a block diagram of the system architecture of such a router which is indicated generally at 30 in FIG. 2. The router 30 includes a plurality of processor or controller boards 32, 34 which are interconnected by an interprocessor bus (P-bus), the bus 10 of the illustrated embodiment. There are two general types of processors boards, 32 and 34. The processor boards 34 each include a Master Processor Board (MPB) and two network interface boards (IFB). The processor boards 32 each include an Interface Processor Board (IPB) and two network interface boards (IFB). Although the network interface boards (IFB) and their associated MPB or IPB processor boards are depicted functionally as separate, in the preferred embodiment, each pair of network interface boards (IFB) and their associated processor board (MPB) or (IPB) are preferably formed as a single unitary plug-in controller or processor board 32 or 34.

Figure 3:
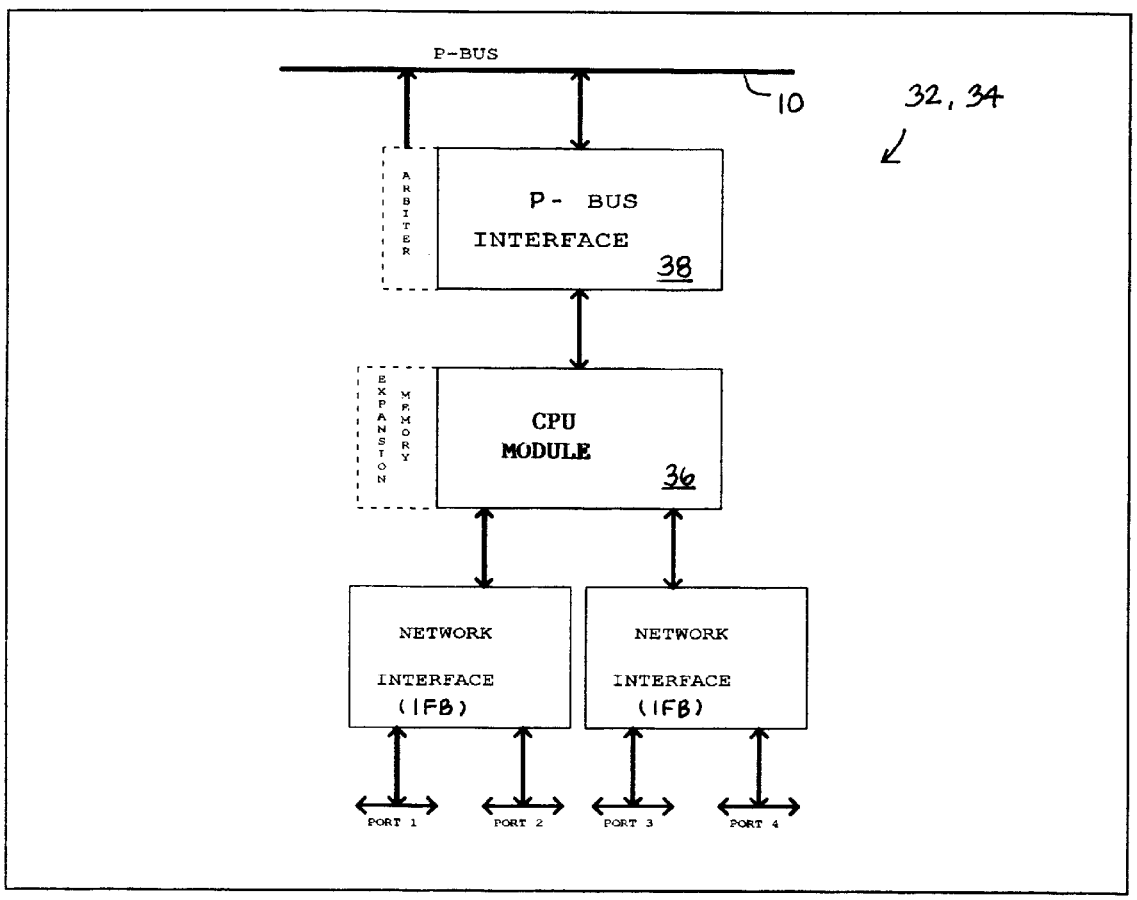
FIG. 3 is a block diagram of a processor board coupled to the bus of the router of FIG. 2.
Figure 4:
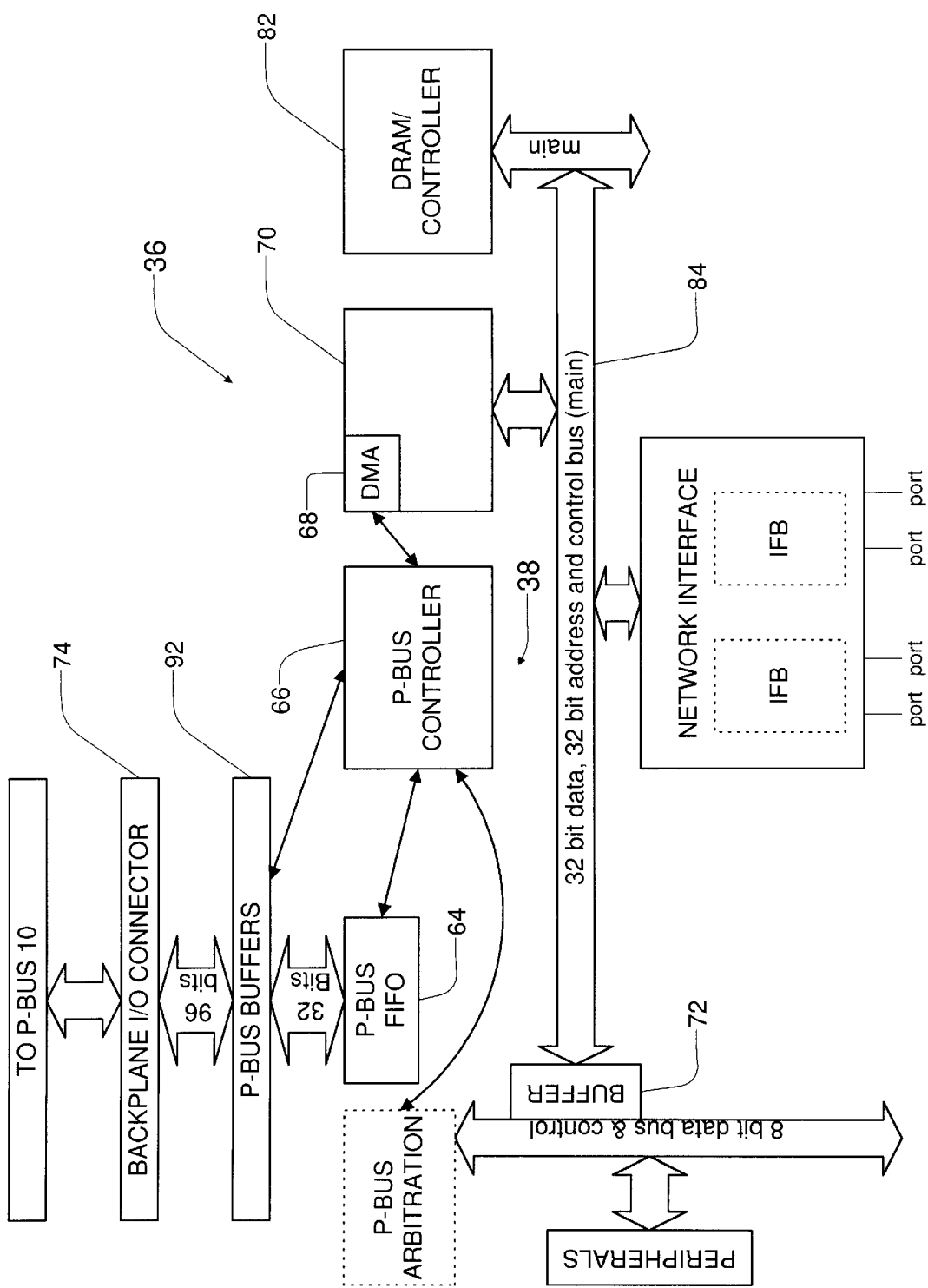
FIG. 4 is a more detailed schematic diagram of the processor board of FIG. 3.

Referring now to FIG. 3, each processor board 32, 34 can be thought of as logically comprising four modules, a CPU processing module 36, an interface module (also referred to as the P-bus interface module) 38 and the two network interface boards or modules (IFB). FIG. 4 is a more detailed schematic diagram of a typical processor board 32, 34.

The plurality of processor boards 32, 34 operate in parallel, communicating with each other across a backplane 35 (FIG. 32) of the P-Bus 10, using a P-Bus command/response protocol. The P-Bus interface module 38 implements the P-Bus command/response protocol to efficiently transmit and receive packets between a buffer memory of the processor board and other processor boards 32, 34.

The CPU module 36 transfers the data between the P-Bus interface module 36 and the network interfaces (IFB). The CPU module 36 contains sufficient program memory to hold all required protocols as well as basic diagnostics. It also contains arbitration circuitry for access to the buffer memory that is shared with the network interface modules (IFB).

The network interface modules (IFB) of each processor board are different for each type of network interface such as—Ethernet, Token Ring, FDDI, ISDN, Serial V.11, Serial V.35, Serial G.703 or HSSI. As noted above, there are two network interface modules (IFB) per processor board 32, 34. Both interface modules (IFB) for a particular processor board are preferably the same type, but this is not a requirement. Each network interface (IFB) contains network controllers to interface with up to two network ports.

Figure 5:
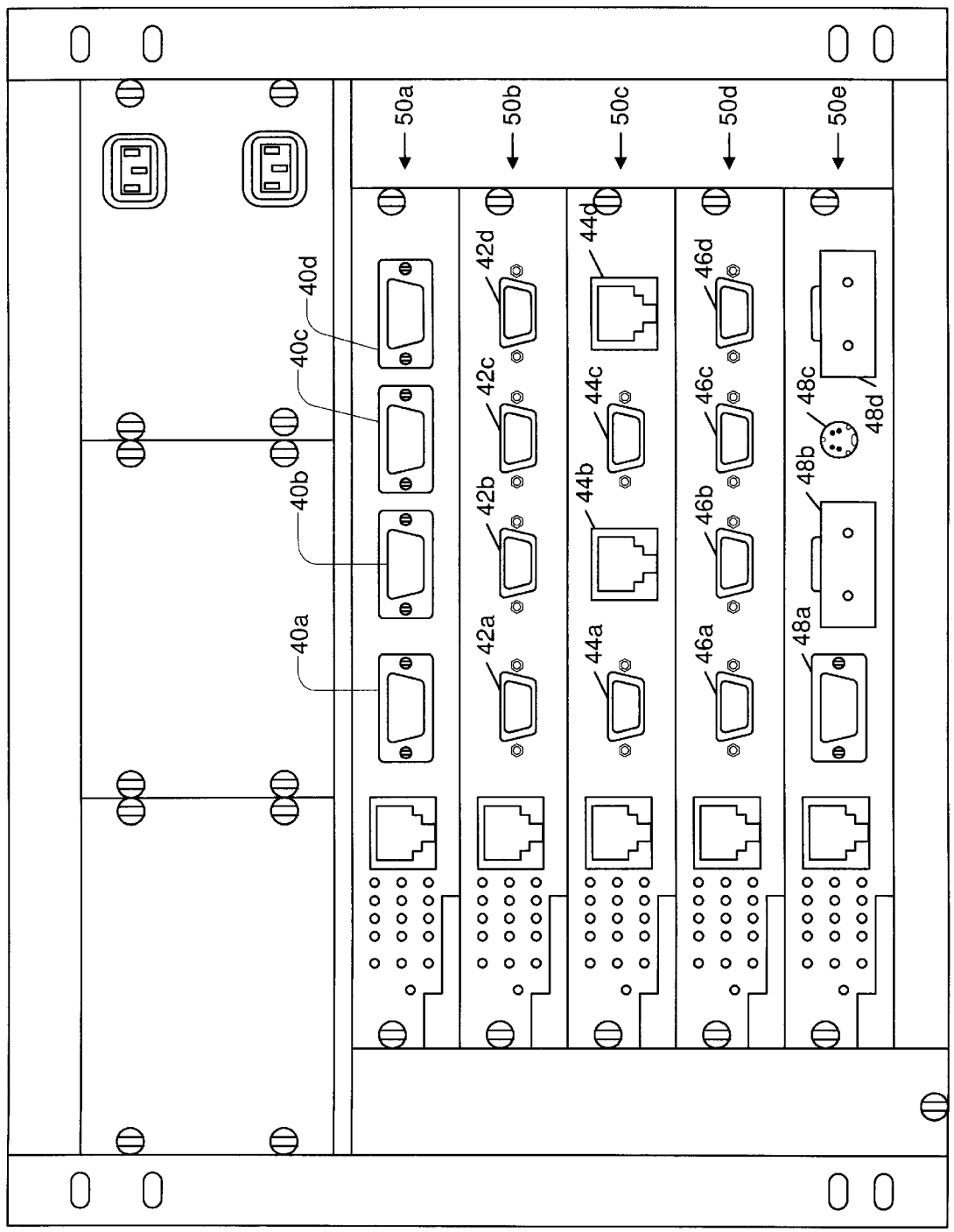
FIG. 5 is a rear view of the chassis of the router of FIG. 2 illustrating network connectors.

FIG. 5 shows the external connectors for the ports of the network interface modules (IFB) of each of the processor boards 32, 34. In the illustrated embodiment, the router 30 has five processor boards 32, 34 each of which has one to four ports. It should be appreciated that the P-bus 10 of the illustrated embodiment may readily accommodate many more processor boards. As shown in FIG. 5, one processor board has four ethernet connectors 40a–40d for the four ports of that processor board. Similarly, the router 30 also has four V.35 connectors 42a–42d, four Token Ring connectors 44a–44d, four Serial V.11 connectors 46a–46d and four FDDI connectors 48a–48d for the remaining ports of the router 30. Of course, interface modules and connectors can be provided for other protocols and other types of data source and data destination devices.

P-Bus 10 Description

The P-Bus 10 is a very high bandwidth bus having improved packet, frame, or cell transfers between peer processor boards. The P-Bus 10 effectively emulates the functions of a multipoint-crossbar-switch. The P-Bus 10 accomplishes this by performing efficient set up and disconnect of high bandwidth transmit-receive channel pairs between boards. The P-Bus 10 is optimized for efficient low latency channel connect and disconnect. As explained further below, in the illustrated embodiment, the P-Bus 10 provides a scalable bandwidth in increments of 384 Mbits/sec. In the illustrated embodiment, the P-Bus 10 has a total bandwidth of 1.92 Gbits/sec with a fallback capability to ⅔ bandwidth in the event of a bus failure. Of course, other bandwidths will depend upon the particular application.

Each processor board 32, 34 has a high bandwidth transmit channel dynamically allocated to it based on previous bus usage. Actively transmitting processor boards are allocated a greater percentage of the bus bandwidth than inactive boards. Receive channels are negotiated with the command-response protocol between the transmitter and the receiver. The TX/RX channel pair remains in place until the transmission of a single packet, frame or cell is complete.

P-Bus Signals

The signal groups used in the P-Bus 10 are identified in FIG. 6 and explained below.

Figure 32:
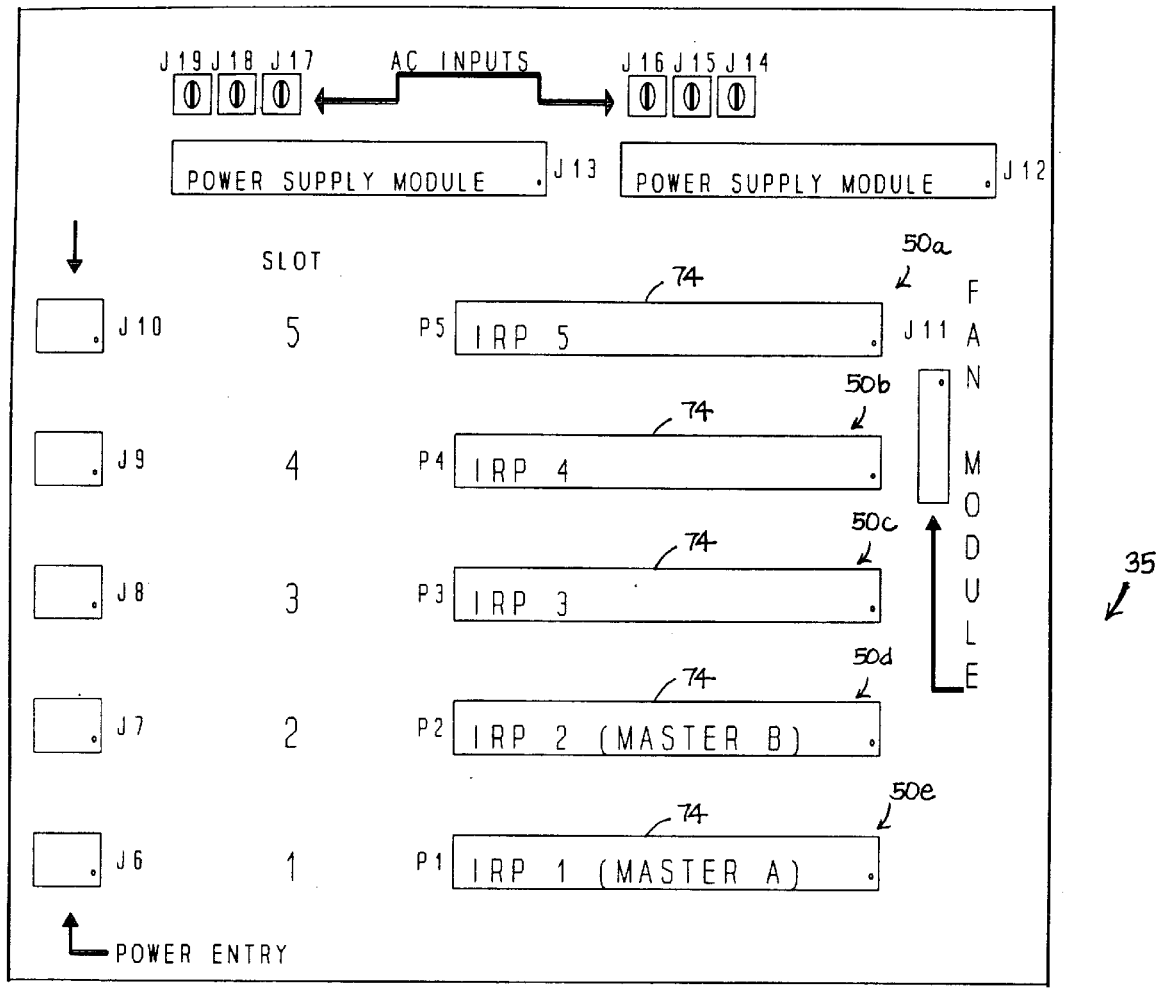
FIG. 32 illustrates a 5 slot backplane of the bus 10 of FIG. 2.

Each processor 32, 34 of the router 30 is physically received in a slot 50a–50e (FIGS. 5, 32). Each slot in turn is hardwired on the backplane 35 (FIG. 32) with a slot identification number from 1 to 5 (up to 15) (GEO[0 . . . 3]). There is no slot 0 in the illustrated embodiment.

To provide redundancy, there are two complete control buses in the P-Bus, Control Bus A and Control Bus B. Each set of Control bus signals includes: a 20 MHz clock from the MPB, a 4-bit ARB bus, a 3-bit CMD bus, a 4-bit ADD bus and a 3-bit RSP bus described below. In addition, the data paths are reconfigurable. A 6-bit Redundancy control bus (P-Bus signal RED[0 . . . 5]) provides the signals for switching between Control buses A and B and for reconfiguring the data paths.

The Master Processor Board (MPB) (FIG. 2) generates the 20 MHz clock output signal used by all of the boards in the router chassis. To minimize loading, four copies of this clock output are generated (P-Bus signal OCK[0 . . . 3]), so that each clock drives a maximum of 4 slots. As shown in FIG. 14, the trace lengths of the four clock lines 52 are the same to minimize timing skews. One MPB of the router 30 generates the four clock signals for Control bus A; the other MPB generates the four clocks for Control bus B.

There are three 32-bit data buses: DATMAA[0 . . . 31], DATBB[0 . . . 31], and DATAC[0 . . . 31]. Normally all three buses are used together as a 96-bit data bus. If one 32-bit section should fail, the data bus is reconfigured so that the remaining two buses are used together as a 64-bit data bus.

P-Bus Paths

Each P-Bus access requires three clocks cycles to complete in the illustrated embodiment. However, the accesses are pipelined, so that the three clock cycles are overlapped with accesses by other processor boards for effective single clock access. During the first clock cycle a board is selected. During the second clock, the selected board outputs a command and a destination slot number of the destination processor. On the third clock, the transmitting (data source) board sends its data (if any), and the receiving (data destination) board issues its response to the command.

The P-Bus is subdivided into smaller paths so that different processors can access different parts of the P-Bus at the same time. These paths carried on the backplane 35 are listed below.

| | |
|---|---|
| ARB Bus | Arbitration bus - This is a four bit bus that contains the slot number of the board that is allowed to output a command on the next clock. Slot numbers range from 1 to 15. An arbitration controller 54 (FIG. 2) on the MPB generates a selection sequence based on previous bus usage. Active boards get selected more often than idle boards. |
| CMD Bus | Command bus - The command is driven onto this three bit bus by the board that was selected in the previous clock cycle. Details of the allowed commands are given in the section on the Command/Response protocol below. |
| ADD Bus | Address bus - This four bit bus contains the slot number of the board that is the target of the current command. |
| DAT Bus | Data Bus - This 96-bit bus is used only for data transfers. It contains 12 bytes of transmit data being sent to the receiving board. |
| RSP Bus | Response Bus - This three bit bus is driven by the receiving board on the clock following the command. It indicates the receiving board's response to the command. The allowed responses are listed in the section on the Command/Response protocol below. |
| RED Bus | Redundancy Bus - This bus is actually a grouping of signals used to implement bus switching for redundancy. It consists of two signals (RED1, RED0) used to select among redundant data paths, and three signals (RED4,RED3,RED2) used to switch between two sets of control paths. A sixth redundancy bit (RED5) is reserved for future enhancements. |

Command/Response Protocol

The P-Bus uses a Command/Response protocol (CRP) to manage data transfers between processor boards. The CRP allows processors to set up transmit/receive channel pairs, signal that new data is available, acknowledge receipt of data, and break down transmit/receive channel pairs. In addition, the active MPB can command any other processor board to reset itself.

In the illustrated embodiment, each P-Bus access requires 3 clock cycles to complete, plus a minimum of two more clock cycles to set up for the next transfer. However, these clock cycles overlap with accesses by other boards, so that each access effectively requires only one clock. It is apparent, of course, that a protocol may be selected having greater or fewer clock cycles per access. For example, if a greater number of clock cycles per access is selected, a greater number of processor slots may be in communication during an access.

When a processor board must transmit to another processor board, it negotiates with the receiving board to set up a transmit/receive channel. Once this channel is set up, it is maintained until the entire data frame or cell has been transmitted. The channel is then immediately broken. The following list describes the commands and responses used by the CRP. The 3-bit code for each command and response is shown, but note that this code is inverted for transmission along the P-Bus backplane.

Commands

All commands are driven onto the CMD bus in the clock cycle following an address match with the ARB bus. (An address match occurs when the transmitting board's own slot number and the current sequence number on the ARB bus are the same at the rising edge of the clock.) The slot number of the target of the command is driven onto the ADD bus while the command is on the CMD bus. During the next clock cycle after the command is issued, the transmitted data is sent on the DAT bus and the response to the command is expected on the RSP bus.

| BITCODE | NAME | DESCRIPTION |
|---|---|---|
| 011 | CHREQ | Request Channel - Generated when a board wants to open a transmit/receive channel with another board. Valid responses: ACKCH The receiving board accepts the connection and a transmit/receive channel is considered to be set up between the two boards. NAK The receiving board is unable to setup a channel at this time. EMPTY There is no board in the targeted slot. |
| 110 | DAV | Data Available - Issued by the transmitting board to indicate that valid data will be placed on the DAT bus at the next clock cycle. Valid responses: ACK The transmitted data will be accepted. NAK The transmitted data will not be accepted because of receiver congestion. EMPTY The target board has been unplugged. |
| 101 | LDAV | Last Data Available - Issued by the transmitting board to indicate that valid data will be placed on the DAT bus at the next clock cycle, and it will be the last of the data for this channel connection. Valid responses: ACK The transmitted data will be accepted and the TX/RX channel between the two boards will be disconnected. NAK The transmitted data will not be accepted because of receiver congestion. The TX/RX channel remains in place. EMPTY The target board has been unplugged. |
| 000 | NOP | No Operation - Generated by the transmitting board when it has set up a Transmit/Receive channel, but new data is not yet ready. The data on the DAT bus after the next clock is indeterminate. Valid responses; ACK The receiver recognizes that the transmitter is busy and awaits further data. DISC The receiver NOP counter has timed out. The receiver has severed the TX/RX channel between the two boards. EMPTY The target board has been unplugged. Note that the bit code for a NOP command is inverted to 111 on the CMD bus, which is the same as if the bus were floating. This means that if an empty slot is selected, it will generate a NOP command with a target address (floating) of 1111 on the ADD bus, corresponding to non-existent slot 0. |
| 111 | BRST | Board Reset - Generated only by the active MPB to force an apparently non-functional board to reset itself. Valid responses: ACK The Reset command has been recognized by the target processor board and a reset is in progress. EMPTY The target board has been unplugged or the target's P-BUS controller is not functioning. |

Responses

When the target of a command recognizes its slot number on the ADD bus, it drives its response to the command onto the RSP bus on the next clock.

| BITCODE | NAME | DESCRIPTION |
|---|---|---|
| 111 | ACKCH | Acknowledge CHREQ - Indicates that the CHREQ command is accepted and a TX/RX channel pair has been set up. The responder is now ready to receive data. |
| 011 | ACK | Acknowledge - Indicates that the command was accepted. This is a valid response for the following commands: DAV The data on the DAT bus is accepted. LDAV The data on the DAT bus is accepted and the TX/RX channel between the two boards no longer exists. NOP The receiver recognizes that the transmitter is busy. The receiver will continue to wait for more data. BRST The P-Bus controller is alive and recognizes the Reset command. Reset is in progress. |
| 110 | NAK | Negative Acknowledge - Issued in response to a command when the receiver is experiencing congestion or is otherwise unable to handle the command. This response is valid for the following commands: CHREQ The receiver cannot set up a channel at this time, most likely because it has already set up a channel with another board. DAV The receiver cannot accept the transmitted data because it has not finished storing the previous data. LDAV The receiver cannot accept the transmitted data because it has not finished storing the previous data. The channel connection remains in effect. |
| 101 | DISC | Disconnect - Issued only in response to a series of NOP commands. It indicates that the last NOP command exceeded the maximum allowed, so the receiver is severing the TX/RX channel connection. |
| 000 | EMPTY | Empty Slot - This response corresponds to a floating RSP bus and indicates an empty slot. |

Dynamic Bandwidth Allocation

The Arbitration daughter board 54 (FIG. 2) on the MPB is responsible for continuously generating the sequence numbers for the ARB bus. The sequences are configured dynamically based on monitoring the CMD and RSP buses. The Arbitration board 54 keeps track of the boards that actively transmitted a command (as opposed to the default NOP) when their slot was last selected on the ARB bus. These are considered to be the active boards for the next selection cycle.

Error Recovery

The Command/Response protocol includes procedures for recovering from error conditions. Errors could occur because of a board being unplugged, glitches in the power or a hardware failure on one of the boards.

After a transmit/receive channel is set up, the receiver expects to receive data from the transmitter. If the transmit data is not ready, a NOP command is received instead of DAV. The receiver keeps count of consecutive NOPs from the transmitter. If the NOP count reaches 32, the receiver returns a disconnect (DISC) response to the transmitter and breaks the connection between the two boards.

To protect against a completely dead transmitter, the receiver also contains a watchdog timer which monitors the times between consecutive received commands. After a channel is established, if a new command is not received within 25 μs, the receiver disconnects from the channel.

When the transmitter sends data to another board, it expects an ACK or NAK response. However, if the transmitter receives 32 consecutive NAK responses, it assumes the receiver is no longer operating and disconnects from it. (An EMPTY response is treated the same as a NAK response.) If the receiver was just extremely busy, it will also disconnect from the link when its watchdog timer times out.

EXAMPLES

During each clock cycle one processor board is driving the CMD/ADD buses, another board may be driving data on the DAT bus and a third board may be responding on the RSP bus to an earlier command, while a fourth board is being selected by the ARB bus to transmit on the next clock. An example of this pipelined use of the P-Bus is shown in FIG. 8 and explained below.

FIG. 8 is a snapshot of P-Bus activity from clock 17 to clock 26. Not shown is the activity before t17 and after t26. Selected parts of the table are explained in the following paragraphs.

Slot 4 Activity

FIG. 9 highlights the portion of Table 2 that involves activity by the processor board in slot 4 only.

At clock t17, the Arbiter board 54 selects slot 4 on the ARB (arbitration) bus. At the next clock (t18), slot 4, that is, the processor board in slot 4, issues a CHREQ (channel request) command to slot 7. At clock t19, the processor board in slot 7 responds with ACKCH to acknowledge the channel connection request and confirm that a TX/RX channel has been set up between slot 4 and slot 7. There is no accompanying data for a CHREQ.

Slot 4 is selected again at clock t22. At the following clock (t23), the processor of slot 4 issues a DAV (data available) command to slot 7. At clock t24, the processor board of slot 4 sends the first packet of data (D0) and the processor board of slot 7 issues ACK (acknowledge) to indicate that it will accept the data.

Slot 5 Activity

FIG. 10 highlights the portion of FIG. 8 that involves activity by slot 5 only.

At clock t18, slot 5 is selected by the ARB bus. At clock t19 it sends a DAV (data available) command to slot 3, and at t20 it places its data packet number 511 on the DAT (data) bus. However, slot 3 sends a NAK response at t20, indicating that it is not ready to accept the data on the DAT bus. Therefore, when slot 5 is selected again at clock t23, it repeats data packet D511 at clock t25. This time an ACK (acknowledge) response is received from slot 3.

Slot 6 Activity

FIG. 11 highlights the portion of FIG. 9 that involves activity by slot 6 only.

Slot 6 is selected on the ARB bus at clock t19. At clock t20, it issues a DAV (data available) to slot 2. At t21 it sends its data packet (D62 in this example), while slot 2 acknowledges the data by issuing the ACK response.

Slot 6 is next selected at clock t24. At clock t25, it issues an LDAV command to slot 2, indicating that it is sending its last data packet. At clock t26, slot 6 sends that last data packet while slot 2 acknowledges (ACK) the command, and the connection between slot 6 and slot 2 is broken.

P-Bus Activity for Slots 4 to 6

FIG. 12 shows how the activity for slots 4, 5, and 6 are pipelined so that they are all using different parts of the P-Bus 10 at the same time. By overlapping P-Bus activity, each slot has an effective access time of 1 clock (50 ns).

Other Slot Activity

FIG. 13 shows the remaining activity on the P-Bus during the time period shown in FIG. 8.

At clock t20 the ARB bus selects slot 7, which is already busy listening to slot 4. Therefore, slot 7 puts out no command at clock t21, which is pulled up on the backplane 35 to become a NOP command to non-existent slot 0. On the following clock (t22), no one drives the RSP bus, producing the default EMPTY response of a floating bus.

In this particular sequence, slot 7 is normally selected after slot 6. However, since slot 7 issued a NOP when it was selected at clock t20, it is no longer considered active by the Arbitration board 54. Therefore, the dynamic bandwidth allocation algorithm substitutes a new slot (slot 8) to be selected after slot 6 at clock t25. Since slot 8 is busy listening to slot 1, the command from slot 8 at t26 is also a NOP, so another slot number will be substituted after slot 6 on the next cycle.

When all the pipelined activity is superimposed on the same table, the result is the constant bus activity shown in FIG. 8 which is repeated in FIG. 29 with shading to show the overlapping P-Bus accesses. It should be appreciated that the particular sequence of the components of the access by each channel can be modified as appropriate. For example, although an acknowledgement is shown taking place in the same cycle as the data transmission of the channel, it is recognized that the acknowledgment can occur in another cycle of the access.

P-Bus Interface

All Processor Boards 32, 34 have a P-Bus Interface 38 (FIG. 4) to interface with the P-Bus 10 (FIG. 2) to communicate with other boards in the system. Interface Processor Boards (IPB) and Master Processor Boards (MPB) use virtually the same P-Bus interface 38. However, only the MPB has an Arbiter daughter board 54 which generates the slot sequence numbers on the ARB bus.

Memory Control

The P-Bus data buses interface with the main memory 82 on the Processor board through a bi-directional FIFO 64, using Direct Memory Access (DMA) control. A DMA state machine provided by a P-Bus Controller 66 generates the requests to the DMA controller 68 inside the i960 processor for transfers to and from the FIFO 64. Two megabytes of RAM are available for P-Bus Buffers 82.

The FIFO 64 can also be written and read directly by the CPU 70. In addition, all handshake control and status bits for the FIFO are accessible by the CPU. Therefore, all DMA transfers to and from the P-Bus can be simulated by equivalent transfers under direct CPU control.

P-Bus Control

Two state machines of the P-Bus Controller 66 provide for the control of the interface between the bidirectional FIFO 64 and the P-Bus 10. A Transmit State Machine processes commands and data being sent to the P-Bus. A Receive State Machine processes commands and data being received from the P-Bus, and returns appropriate responses.

Transmit State Machine

The transmit state machine of the P-Bus Controller 66 controls the transmission of packets onto the P-Bus. This hardware controls the transmit-receive channel pair negotiation, data transmission and retransmission, and error handling. When a frame transmission is started, the Transmit State Machine first sets up a channel by issuing a CHREQ command to the target processor. Commands are issued only when the address on the ARB bus matches the sender's slot number GE00-3. If the target slot is empty, the transmission is immediately aborted. Otherwise, the state machine will continue to send CHREQ commands until an ACKCH response is received or a timeout occurs because of the number of NAKs (no acknowledgements) has exceeded a predetermined limit.

Once the channel has been set up, the data is transferred to the target (destination processor) in 96-bit bursts (assuming all data paths are working) using DAV commands and waiting for ACK responses. If data from the FIFO 64 is not yet ready when the sender's slot is selected by the Arbiter, a NOP command is substituted for the DAV command. When the last byte of data is sent along with an LDAV command, the ACK response causes the Transmit State Machine to return to its IDLE state.

Receive State Machine

The Receive State Machine of the P-Bus Controller 66 controls the reception of packets from the P-Bus. This hardware controls the transmit-receive channel pair negotiation, data reception and acknowledgement, and error handling.

After the receiver processor board 32, 34 is started, the state machine monitors the P-Bus, waiting for a CHREQ command for this board's address. When the channel request is received, the state machine responds with an ACKCH to acknowledge the channel setup. When a channel has been set up, data transfer commands (DAV,LDAV) received for this address are acknowledged (ACK) if space is available in the FIFO 64 for storing the received data. If a NOP command is received for this address and the maximum NOP count is not exceeded, the state machine also responds with an ACK and increments the NOP counter. Otherwise the state machine responds with a NAK. After the Receive State Machine responds with an ACK to an LDAV command, it returns to the IDLE state.

Data Flows

In the following discussion, data flow within a data source device is first described, followed by data flow within a data destination device. However, where a data source device and data destination device are combined, the corresponding state machines, connection lines, and similar elements are preferably combined correspondingly.

Tx Data Flow

Figure 16:
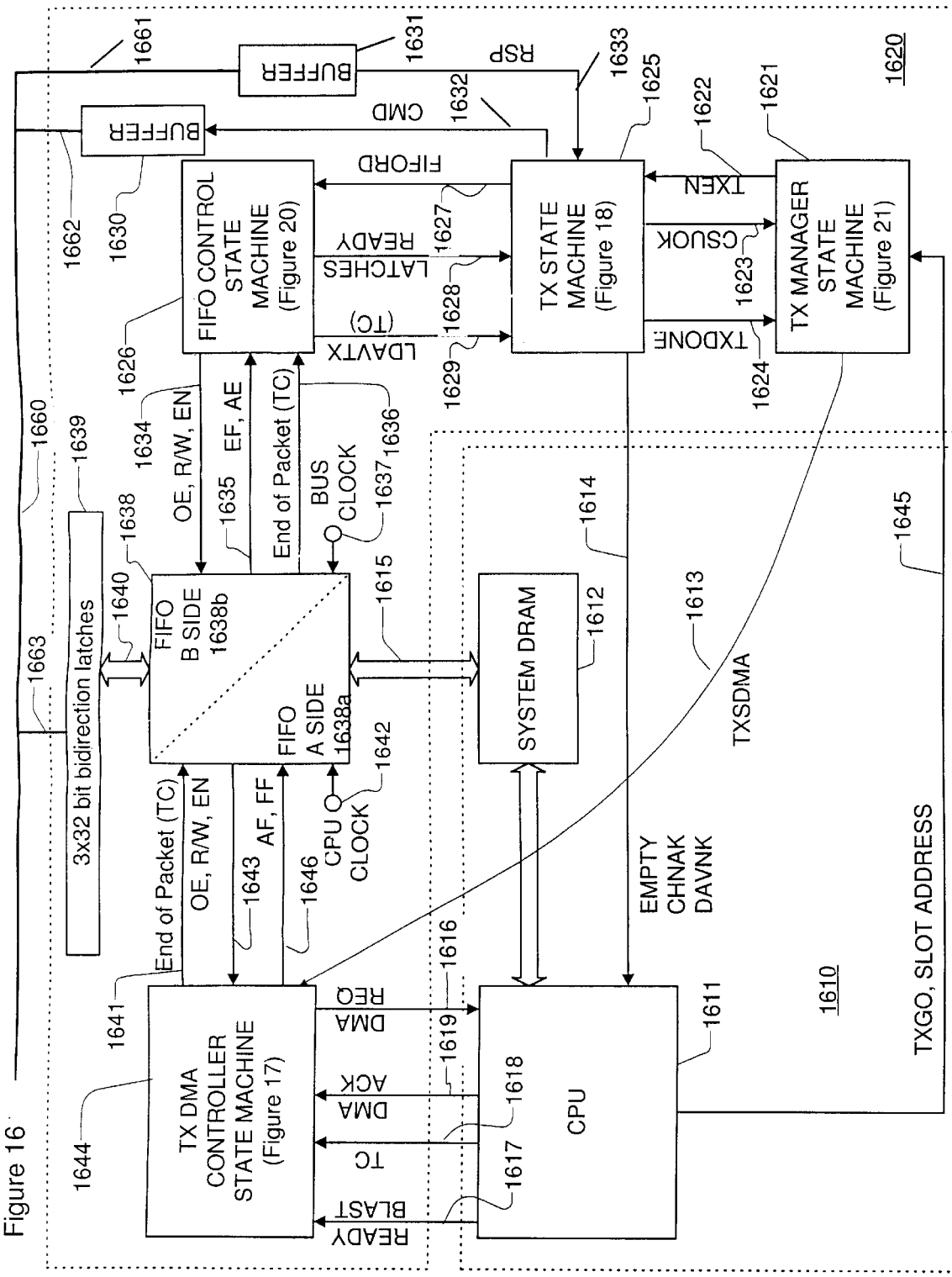
FIG. 16 is a data flow diagram of data transmission from a data source device to a bus in accordance with the present invention.

Referring now to FIG. 16, there is shown a data flow diagram for data transmission from a data source device to a backplane 1660. The data source device includes an interface circuit 1620 and a processor circuit 1610. The interface circuit 1620 and the processor circuit 1610 are a portion of the P-Bus interface 38 and the CPU module 36, respectively, of FIG. 4. The interface circuit 1620 and the processing circuit are connected by and communicate through several lines 1613–1619. In FIG. 16, the bus (the P-Bus 10 of FIG. 2) is considered to comprise the backplane 1660, the interface circuit 1620 and several connecting lines 1661–1663.

The processor circuit 1610 comprises a CPU 1611 and a memory 1612. The CPU 1611 and memory 1612 are preferably coupled via a bus for high speed transfers. The CPU 1611 is preferably an Intel Corporation (San Jose, Calif.) i960 microprocessor (the CPU 20 of FIG. 4) having an on-chip DMA controller (not shown). Data transfers to the interface circuit 1620 come from the CPU 1611. Preferably, these data transfers are made in a number of packets, and the CPU maintains a count of the number of the number of packets to transfer. In the disclosed embodiment, where the data source device comprises a processor board, the processor circuit includes system DRAM (see DRAM 82 of FIG. 4), and the memory 1612 comprises the system DRAM. The processor circuit 1610 further comprises a CPU clock 1642 which provides timing signals to the various components of the processor circuit 1610.

The backplane 1660 of the P-Bus 10 includes a data bus portion (DAT) 1663, a command bus portion (CMD) 1662 and a response bus portion (RSP) 1661. The data bus portion 1663 is coupled to the interface circuit 1620 for moving data from the interface circuit 1620 to the data destination devices. The command bus portion 1662 is coupled to the interface circuit 1620 for moving command messages from the interface circuit 1620 to the data destination devices and the arbitration circuit. The response bus portion 1661 is coupled to the interface circuit 1620 for moving response messages from the data destination devices to the interface circuit 1620.

The interface circuit 1620 comprises 8 elements: a DMA transmit controller state machine (DMASM) 1644, a FIFO 1638, a FIFO Control state machine (FIFOSM) 1626, a Transmit state machine (TxSM) 1625, a Transmit Manager state machine (TxMSM) 1621, a command bus buffer 1630, a response bus buffer 1631, and a latch 1639. Each of these state machines is implemented by the P-Bus controller 66 (FIG. 4). The interface circuit 1620 includes the interconnections of these elements 1640, 1634–1636, 1627–1629, 1622–1624, 1632–1633, 1641, 1643, 1646, and a clock line 1637 which is received from the backplane 1660. The state machines 1644, 1626, 1625 and 1621 preferably are embodied as one or more programmable logic devices (e.g., PLAs or PLDs), and this may be accomplished using the PLA programs set forth in Appendix A.

The FIFO 1638 (FIFO 64 in FIG. 4) has an A-side 1638a and a B-side 1638b. In data source devices, the FIFO need only be able to move data from the A-side 1638a to the B-side 1638b. However, if a data source device is also a data destination device, the FIFO is preferably bi-directional. Preferably, the size of the FIFO's A-side 1638a is large enough to accommodate high speed data transfers from the processor circuit 1610. Thus, in the disclosed embodiment, the FIFO 1638 is 32-bits wide to accommodate the 128-bit (4×32 bits) burst transfer mode of the i960.

The latch 1639 preferably is adapted to the width of the data bus and the FIFO 1638. In the disclosed embodiment, wherein the data bus is 96 bits wide, the latch comprises three 32-bit latches, referred to herein as A, B and C. The FIFO's B-side 1638b includes a switching circuit to switch the output of the FIFO 1638 to each of the three latches 1639.

The interface circuit 1620 can be divided into two logical sections: a processor side and a backplane side. The processor side comprises the DMASM 1644, the FIFO's A-side 1638a and the interconnecting lines 1641, 1643, 1646. The backplane side comprises the FIFO's B-side 1638b, the FIFOSM 1626, the TxSM 1625, the TxMSM 1621, the latches 1639, the buffers 1630, 1631, and their interconnections 1640, 1634–1636, 1627–1629, 1622–1624, 1632–1633, and operates according to a clock 1642 generated by the processor circuit 1610. The processor side sets up memory transfers between the interface circuit 1620 and the processor circuit 1610. The backplane side is more complex, fulfills the bus protocol as used on the backplane 1660, and manages data transfers from the interface circuit 1620 to the backplane 1660. Accordingly, after the backplane side sets up a data channel, the processor side and backplane side alternate between the processor side filling the FIFO 1638 and the backplane side emptying the FIFO 1638. Because the backplane 1660 and the processor circuit 1610 have independent clocks 1637, 1642, the interface circuit 1620 also synchronizes handshaking signals between the processor side and the backplane side.

As explained above, the primary function of the bus is to move data of various sizes between data source devices and data destination devices. In the disclosed embodiment, this function is accomplished by moving data (1) from the data source device's memory 1612 (e.g., system DRAM) into the data source device's FIFO 1638, (2) from the data source's FIFO 1638 over the data portion 1663 of the backplane 1660 into the data destination device's FIFO, and (3) finally from the data destination device's FIFO to the data destination device's memory (e.g., system DRAM).

The Backplane Side of the Interface Circuit
TxMSM

The processor circuit 1610 indicates when there is data to be transferred to a desired data destination device by asserting a Transmit Go line (TXGO) 1645 to the TxMSM 1621. Based upon TXGO, the TxMSM 1621 signals other elements in the interface circuit 1620.

The CPU 1611 asserts TXGO 1645 if the CPU 1611 has initialized its DMA channel for packet transfer over the P-Bus. In the disclosed embodiment, this initialization is performed by the program included in Appendix B. Each channel is preferably initialized (by the device driver) with a pointer to a buffer located in the memory 1612, a byte count (which is used to generate TC) and a variable indicating the type of transfer (quad fly-by in the disclosed embodiment). The CPU 1611 also determines the destination slot address, and in the disclosed embodiment stores the destination slot address in a command register. TXGO 1645 also indicates that the command register contains the destination slot address.

The TxMSM 1621 is coupled to the TxSM 1625 via a Transmit Enable line (TXEN) 1622, a Channel Setup OK line (CSUOK) 1623 and a Transmit Done line (TXDONE) 1624. The TxMSM asserts TXEN 1622 to signal that transmitting may begin. The TxSM 1625 asserts CSUOK 1623 to signal that a channel to the data destination device has been established. The TxSM 1625 asserts TXDONE 2124 to signal that transmission of data to the data destination device is complete.

The TxMSM 1621 is also coupled to the DMASM 1644 via a Transmit Start DMA line (TxSDMA) 1613. TxSDMA 1613 signals that the DMASM should move data from the processor circuit 1610 into the FIFO 1638.

Figure 21:
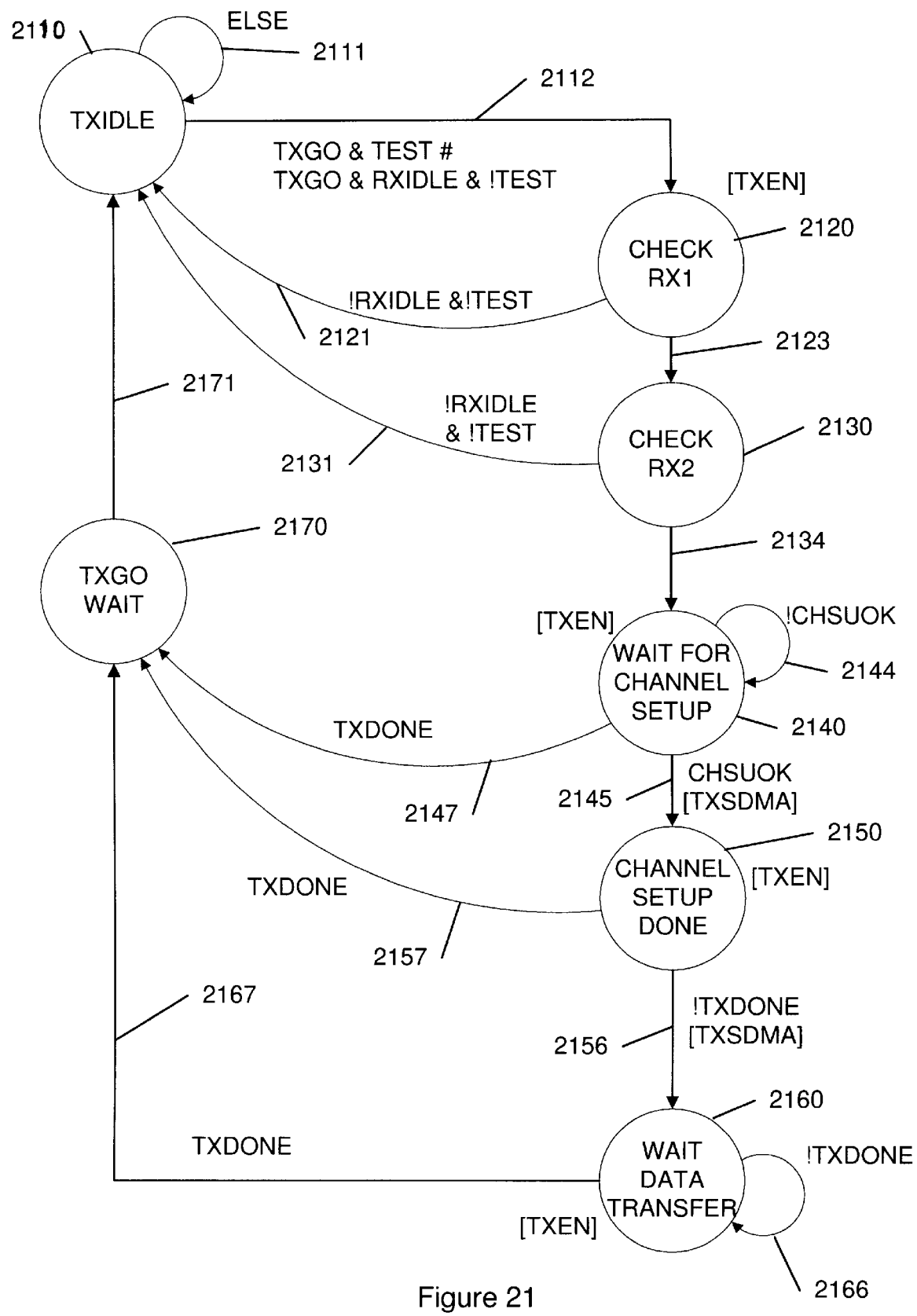
FIG. 21 is a state diagram of a bus manager state machine in the data source device of FIG. 16.

Referring now to FIG. 21, there is shown a state diagram of the TxMSM 1621. FIG. 21 also includes information respecting the incorporation of testing features in the TxMSM 1621. For clarity, this discussion does not address the testing in depth.

The TxMSM 1621 initializes into an Idle state (TXIDLE) 2110. When the processor circuit 1610 asserts TXGO 1645 (2112), the TxMSM 1621 transitions to the Check Receive Once state (CHECK RX 1) 2120. If the data source device is also capable of receiving data (i.e., it is also a data communications device), and packets are being received (!RXIDLE), then the TxMSM transitions back to TXIDLE 2110 (2121). Otherwise, the TxMSM 1621 asserts TXEN 1622. If a packet reception is in progress by such a data communication device, then TXGO 1645 remains pending and packet transmission starts as soon as the packet reception is done (RXIDLE). Preferably, the TxMSM 1621 checks RXIDLE a second time in a CHECK RX2 state 2130, and forces TXIDLE 2110 if packet reception is in progress.

If packet reception is not in progress (2134), then the TxMSM enters a Wait for Channel Setup state 2140. In this state 2140, and until transmission is complete, TXEN remains asserted. TXEN 1622 allows the TxSM 1625 to start a channel setup process to the destination slot number. In Wait for Channel Setup 2140, the TxMSM 2121 waits for the CHSUOK signal (2144). Channel setup and the operation of the TxSM is described below. However, if there is an error during channel setup, the TxSm asserts TXDONE 1624 (2147), and the TxMSM 1621 enters a Transmission Go Wait state (TXGO WAIT) 2170. From TXGO WAIT 2170, the TxMSM 1621 transitions 2171 to TXIDLE 2110.

When CHSUOK is asserted (by the TxSM 1625) 2145, the TxMSM 1621 asserts TxSDMA 1613, and enters a Channel Setup Done state 2150. At this time the TxMSM 1621 asserts TXSDMA 1613 to start the transfer of data from the memory 1612 to the FIFO 1638. This primes the FIFO 1638 with data, to increase speed.

If the transfer of data is complete, the TxSM 1625 asserts TXDONE and the TXMSM transition to the TXGO WAIT state 2170. Otherwise, the TxMSM 1621 transitions to the Wait Data Transfer state 2160. In this state, the TxMSM 1621 awaits TXDONE 1624 (2166). When the data transmission over the bus is complete, the TxSM 1625 asserts TXDONE 1624 (2167), and the TxMSM 1621 transitions to TXGO WAIT 2170 to await another data transfer initiated by the software devices (TXGO active).

TxSM

As shown in FIG. 16, the TxSM 1625 interfaces between the FIFO 1638 and the backplane 1660. The TxSM 1625 processes commands and controls data being sent to the backplane 1660. To coordinate activity on the backplane side with that on the processor side, the TxSM 1625 is coupled to the DMASM 1644 via a Transmit Status line (TXSTATUS) 1614. As described below, TXSTATUS 1614 provides a number of different status messages. The TxSM 1625 is coupled to the FIFOSM 1626 via a Last Data Available to Transmit line (LDAVTX) 1629, a Transmit Latches Ready line (TXLRDY) 1628 and a FIFO Read line (FIFORD) 1627. The TxSM 1625 asserts FIFORD to signal that the FIFO 1638 should be read, pushing data from the FIFO 1638 to the latch 1639. The FIFOSM 1626 asserts TXLRDY 1628 to indicate that the latch 1639 is available to receive data from the FIFO 1638. The FIFOSM 1626 asserts LDAVTX 1629 when the last data available to transmit has been stored in the FIFO 1628a. LDAVTX 1629 is also referred to as "TC".

In addition, the TxSM 1625 is coupled to the command buffer 1630 via line 1632 and the response buffer 1631 via line 1633. From these couplings, the TxSM 1625 can send command messages on the command portion (CMD) of the backplane and read response messages on the response portion (RSP) of the backplane.

Figure 18:
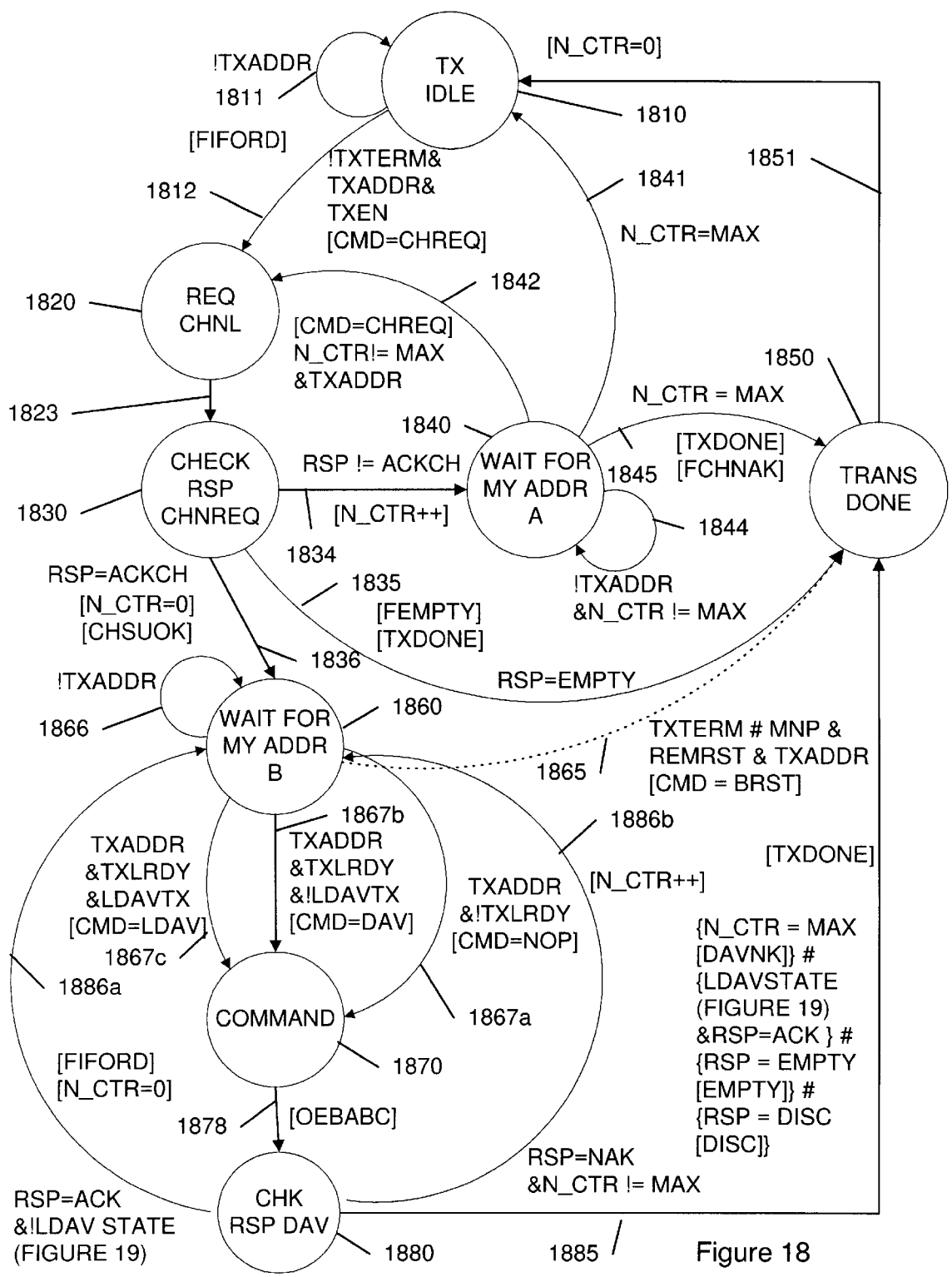
FIG. 18 is a state diagram of a transmit state machine in the data source device of FIG. 16.

Referring now to FIG. 18, there is shown a state diagram of the TxSM 1625. The TxSM 1625 is initially in an idle state (TX IDLE) 1810. In TX IDLE 1810, the TxSM 1625 waits for its own slot address (to identify it as the data source device selected by the arbitration board) to appear on the arbitration bus (TXADDR) 1811, and resets an error counter N_CTR. As will be seen, when N_CTR reaches a predefined maximum (MAX), the TxSM recognizes this as an error condition. Upon TXEN 1622 (1812) asserted by the TxMSM 1621, the TxSM 1625 transitions to a Channel Request state (REQ CHNL) 1820 and sets up and stores a channel request message (CHREQ—011b) in the command buffer 1630. The slot address of the desired data destination device is also set up and sent. Next, the TxSM 1625 transitions to a Check Response to the Channel Request state (Check RSP CHNREQ) 1830. In this state 1830, the TxSM 1625 reads the response message from the response buffer 1631 which was sent by the addressed data destination device.

A data destination device may either accept (ACKCH) or reject (NAK) a channel request. In case of a NAK response (1834), the TxSM 1625 retries (preferably up to 32 more times) to establish a connection. This is accomplished by incrementing N-CTR and transition to the Wait for my Address A state 1840. In this state 1840, the TxSM 1625 waits for TXADDR (1844). If the slot address is present, and the maximum number of retries has not been reached (N_CTR !=MAX) 1842, then the TxSM 1625 retries the CHREQ command and transitions back to REQ CHNL 1820. However, if a connection cannot be established (i.e., N_CTR=MAX), the TxSM 1625 asserts TXDONE 1624 (1845), and transitions to a Transmission Done state (TRANS DONE) 1850. The TxSM 1625 also sets TXSTATUS 1614 to Channel-not-available (CHNAK). From TRANS DONE 1850, the TxSM 1625 transitions (1851) to TX IDLE 1810.

If the response to the channel request is Channel Acknowledged (ACKCH), the TxSM 1625 asserts CSUOK 1623 and resets N_CTR (1836), and transitions to a Wait for My Address B state (1860). In this state 1860, the TxSM 1625 waits for TXADDR (1866). Any of three transitions may occur to a Command state 1870, or the TxSM 1625 may transition to TRANS DONE 1850.

If the FIFO has asserted TXLRDY 1628 (1867b and 1867c), the TxSM 1625 begins a Data Available (DAV) cycle on its next time slot. The DAV cycle comprises storing the DAV message into the command buffer 1630 for transfer onto the command portion of the backplane 1660. Otherwise, the TxSM 1625 sends a NOP command message (1867a) and transitions to the Command 1870. If the FIFO 1638a has not yet been loaded with the last data to transmit to the data destination device (!LDAVTX), then the TxSM 1625 sends a Data Available command message (DAV) 1867b and transitions to Command 1870. If the FIFO 1638a has been loaded with the last data to transmit to the data destination device (LDAVTX), then the TxSM 1625 sends the Last Data Available command message (LDAV) 1867c and transitions to Command 1870.

From Command 1870, the TxSM 1625 asserts OEBABC (1878) and transitions to a Check Response to DAV state (CHK RSP DAV) 1880. The destination slot will respond with either an Acknowledge (ACK) or a Negative-Acknowledge (NAK). An ACK indicates that the destination slot is ready to receive data, with an assumption that the first packet has been received by the destination slot because the destination slot is ready. A data destination device will normally be in the addressed slot, and as described below, a latch in the data destination device receives and holds the transferred data. A NAK indicates that the destination slot, although filled, is not available to receive a data transfer. This may be because the destination slot has not yet clocked in previously received data.

If RSP=NAK and N_CTR has not reached MAX, the TxSM 1625 increments N_CTR 1886b and transitions back to Wait for My Address B 1860. Also, if the TxSM 1625 receives an ACK and there is more data to send (!LDAVTX), then the TxSM 1625 resets N_CTR, asserts FIFO read (FIFORD) 1886a and transitions to Wait for My Address B 1860.

From CHK RSP DAV 1880, if N_CTR=MAX (too many transmission failures have occurred), RSP=EMPTY (the addressed slot is empty or the processor board in the slot is not responding), or RSP=DISC (the data destination device is disconnecting), then the TxSM 1625 transitions 1885 to TRANS DONE 1850. For each of these conditions, the TxSM 1625 sends the appropriate status message (DAVNK, EMPTY and DISC, respectively) on TXSTATUS 1614, and asserts TXDONE 1624 (1885).

Figure 19:
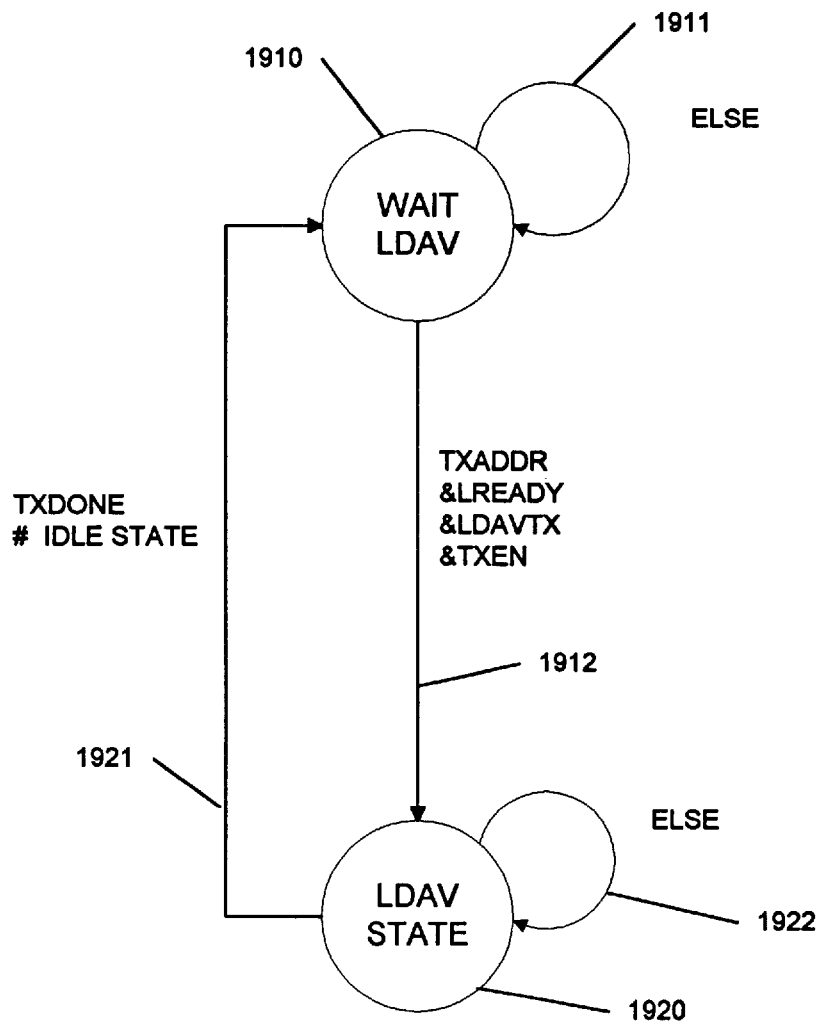
FIG. 19 is a state diagram of a detail of part of the decision making in the state diagram of FIG. 18.

Also, if LDAV is asserted and RSP=ACK (the data transmission is complete), then the TxSM 1625 transitions to TRANS DONE 1850. CHK RSP DAV 1880 preferably waits for LDAV in a state machine as shown in FIG. 19. Referring now to FIG. 19, there is shown a state diagram for this wait process. In a wait for LDAV state 1910, the TxSM 1625 waits for LDAVTX to be asserted by the FIFOSM 1626 (1911). When LDAVTX is asserted (1912) indicating the TxSM 1625 transitions into a LDAV state 1920. In the LDAV state 1920, the TxSM 1625 waits until TRANS DONE (TX DONE) 1850 or TX IDLE 1810 is reached before returning (1921) to Wait for LDAV 1910.

From Wait for My Address B 1860, transmission may be aborted and a board reset command message (BRST) is sent 1865 if TXTERM is asserted or if TXADDR, MNP and REMRST are asserted.

FIFOSM

The FIFOSM 1626 pops data from the FIFO 1638 into the latches 1639. The FIFOSM 1626 is coupled to the FIFO 1638 via a FIFO control line 1634, a FIFO status line 1635 and an End of Packet (TC) line 1636. The FIFO control line 1634 includes latch enable flags (ALATCH, BLATCH, CLATCH) and an Enable Buffer flag (ENB). The FIFO status line 1635 can have values of Almost Empty (AE) and Empty (EF). ENB signals when data is to be popped from the FIFO 1638 to the latch 1639.

As mentioned, TC 1636 is asserted once the packet byte count reaches zero. TC 1636 is used to terminate the packet transfer at the processor side of the interface circuit 1620 when transmitting. This signal is propagated to and from the FIFO 1638 via lines 1641, 1636 and is used to terminate the channel on the backplane side of the interface channel 1620. This signal, once detected by the FIFOSM 1626, asserts LDAVTX 1629 which instructs the TxSM 1625 to issue an LDAV message on the data source device's next time slot.

Figure 20:
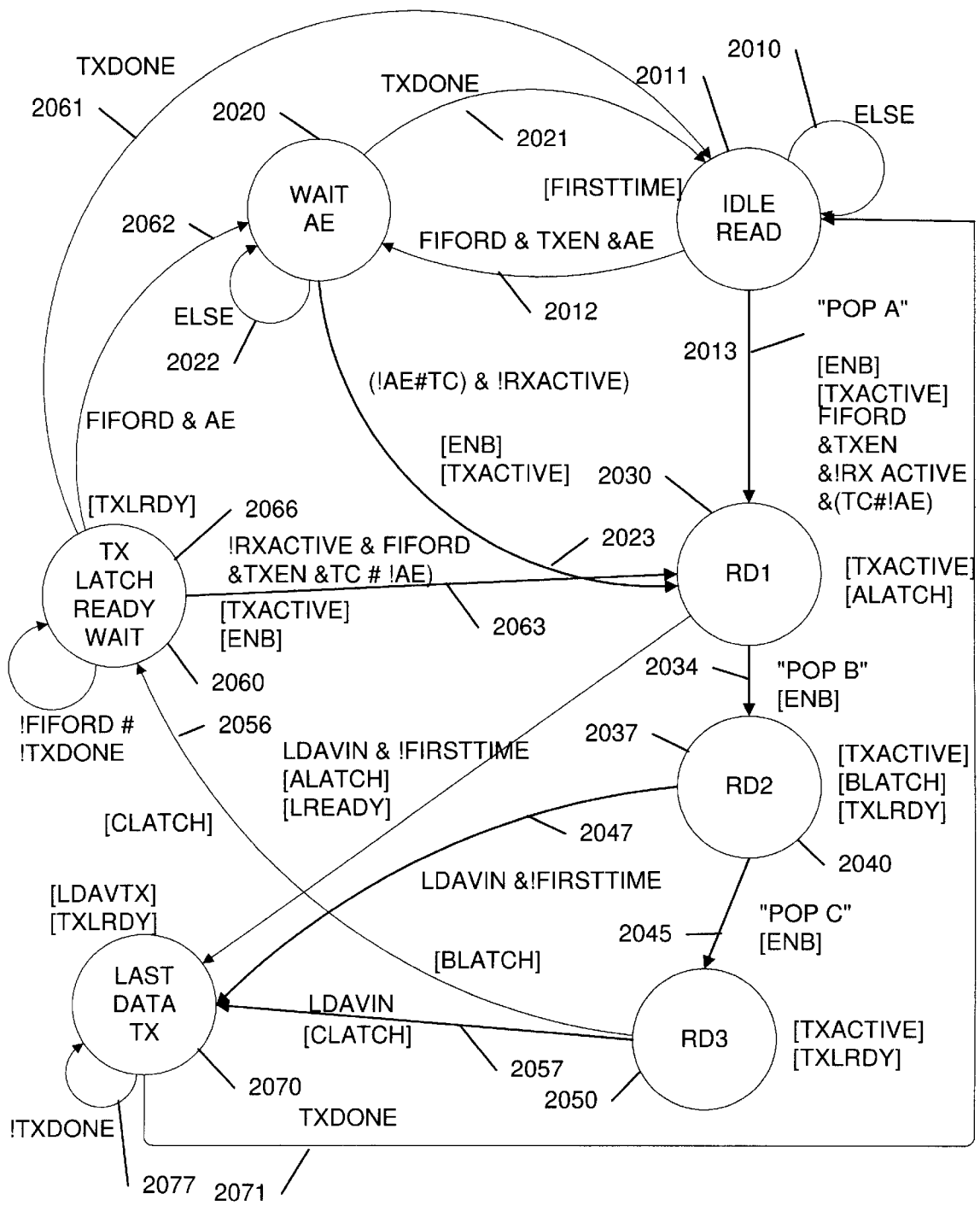
FIG. 20 is a state diagram of a FIFO controller state machine in the data source device of FIG. 16.

Referring now to FIG. 20, there is shown a state diagram of the FIFOSM 1626. The FIFOSM 2010 is initialized to an IDLE READ state 2010. Preferably, the FIFOSM 1626 should prevent data from being transferred from the FIFO 1638 to the latch until the data to be sent has reached the output stage of the FIFO 1639.

When the FIFO 1638 negates AE 1635 and FIFORD 1627 is asserted, the FIFOSM 1626 commands the FIFO 1638 to send the next packet to the latch 1639. Also, if the data source device is a data communication device, collisions in the FIFO 1628 may be avoided by making the FIFOSM 1626 wait for receive cycles to finish (!RXACTIVE). The FIFOSM 1638 includes a Transmit Active line (TXACTIVE) which is used in a complementary way to RXACIVE when a data communication device (a data destination device having data source capabilities) has data to receive. Because, in the disclosed embodiment, the FIFO 1638 is only 32-bits wide, three pop operations are needed to fill the latch.

If FIFORD 1627 is asserted but AE is also asserted 2012, then the FIFOSM 1626 transitions to a Wait AE state 2020. From Wait AE 2020, the FIFO 1638 waits for AE to be deasserted or for TC 1636 to be asserted 2023, then transitions to RD1 2030 to send the next word (if !AE) or the last packet (if TC). However, if TXDONE 1624 is asserted while the FIFOSM 1626 is in Wait AE 2022, then the FIFOSM 1626 transitions back to IDLE READ 2010.

As mentioned, three pop operations are necessary to move a 96-bit packet from the FIFO 1638 into the latch 1639. The first pop is to the A latch ("POP A") 2013. In this transition, the FIFOSM 1638 asserts ENB to enable the pop. If the data source device is a data communication device, the FIFOSM 1638 also asserts TXACTIVE. Next, the FIFOSM 1626 transitions to a Read 1 state (RD1) 2030. In RD1 2030, the FIFOSM 1626 asserts ALATCH, to latch the data from the FIFO 1638 in the A portion of the latch 1639. Similar transitions and actions are made to pop the next two 32-bit words to the latch in states 2040 and 2050. Beginning after the first word is popped (2013), the FIFO 1638 can accommodate a word of new data. The FIFOSM 1626 asserts TXLRDY 1628 whenever data (three 32-bit words) has been transferred to the latches 1639. This is done in states 2040, 2050 and 2070.

In the event that a word being moved into the latch 1639 is the last word of data to be sent, the flow from RD1 2030 to RD2 2040 to RD3 2050 must be bypassed. This is accomplished when LDAVIN is asserted. To empty the FIFO 1638 in such circumstance, the appropriate latch enable flag is set (ALATCH, BLATCH or CLATCH), and the FIFOSM 1626 transitions to a Last Data Transmit state (LAST DATA TX) 2070. In LAST DATA TX 2070, the FIFOSM 1626 asserts TXLRDY 1628 and LDAVTX and waits for TXDONE 2077, then transitions back to IDLE READ 2010.

If LDAVIN is not asserted after POP C, then from RD3 2050 the FIFOSM 1626 transitions to a Transmit Latch Ready Wait state (TX LATCH READY WAIT) 2060. In this state 2060, the FIFOSM 1626 asserts TXLRDY and waits for assertion of FIFORD 1627 or TXDONE (2066). If TXDONE 1624 is asserted 2061, then the FIFOSM 1626 transitions to IDLE READ 2010. Otherwise, there is more data to send. If FIFORD is asserted and the FIFO 1638 is not AE (2063), then the FIFOSM 1638 transitions back to RD1 2030 to move another three words from the FIFO 1638 to the latch 1639. If FIFORD 1627 is asserted but the FIFO is AE, then the FIFOSM 1626 transitions to the Wait AE state 2020.

Preferably, the Tx software driver performed by the CPU 1611 is tightly coupled to the Tx hardware. Once the driver decides to send a packet over the bus and issues the TXGO bit, it will have to wait until TXDONE is asserted. In other words, no other packet transmission by the data source device can occur until the transmission in progress is finished. TXDONE is used as an interrupt to the processor to indicate the end of a transmission. Preferably, the software driver examines the Tx Status register (0x30000400) to determine the status of the last Tx. In case of a CHNAK message, for example, the software driver has the option of retrying the same packet transfer.

Preferably, the data source device is prepared to terminate packet transmission in the event of any of the following four error cases, as represented by the corresponding response messages:

EMPTY: indicates that the software driver is trying to send a packet to a slot that does not have a data destination device present.

CHNNAK: indicates that the receiver is busy receiving from another data source device or sending data to a data destination device.

DAVNAK: indicates that a maximum number of NAKs (preferably 32) were received since the last data ACK. As explained below, data destination devices assert a Receive Wait line (RXWAIT) to prevent packet reception before clearance of its last packet by its software driver (writing to location ERROR_RST, 0x30000200). Note that no activity can start unless the FIFO in the data source device and ERROR_RST are reset.

DISC: This is a response from the receiver when the transmitter is too slow in commanding DAVs. After a NOPOV error condition in the receive, the DISC response is given to the transmitter.

In the above error cases, TXDONE 1624 is asserted and all the state machines 1621, 1625, 1626, 1644 transition to IDLE state. The error condition is captured in the Transmit Status Register (TXSTATUS, 0x30000400). It is the responsibility of the software driver to read this register before starting a new packet transmission.

The Processor Side of the Interface Circuit—
DMASM

The processor side of the interface circuit 1610 controls the FIFO's A-side 1638a. The DMASM 1644 controls data traffic between the memory 1612 and the FIFO's A-side 1638a.

The DMASM 1644 is coupled to the processor circuit 1610 (and preferably the DMA controller in the CPU 1611) via a DMA Request line (DREQ or DMA REQ) 1616, a DMA Acknowledge line (DMA ACK) 1619, a terminal count line (TC) 1618 and a Ready Blast line (READY BLAST) 1617. These lines are used by the DMSM 1644 to control the processor circuit 1610 and to receive status information from the processor circuit 1610. DMA REQ 1616 is used to signal to the processor circuit 1610 that a DMA transfer is needed by the interface circuit 1620. The processor circuit 1610 indicates that the DMA transfer may proceed by asserting DMA ACK 1619.

The processor circuit monitors the number of packets remaining to be transferred from the memory 1612 to the FIFO 1638, and asserts TC 1618 when the last packet is being sent. TC 1641 is the same indication of the end of packet in transmit. However, TC 1641 is used to tag the last word that is pushed into the FIFO 1638. The tagged word is used later at the backplane side of the interface circuit 1620 to terminate the packet transfer.

The DMASM 1644 is coupled to the FIFO 1638 via an End of Packet line (TC) 1641, a FIFO control line 1643 and a FIFO status line 1646. TC 1641 has the same function as the other TC lines, described above. The FIFO control line 1643 includes latch enable flags (ALATCH, BLATCH, CLATCH) and an Enable Burst flag (ENB). The FIFO status line 1646 can have values of Almost Empty (AF) and Full (FF). An Enable FIFO flag (ENFIFO) signals that the FIFO 1638 can accept data. A BLAST flag signals that data should be transferee into the FIFO 1638.

Figure 17:
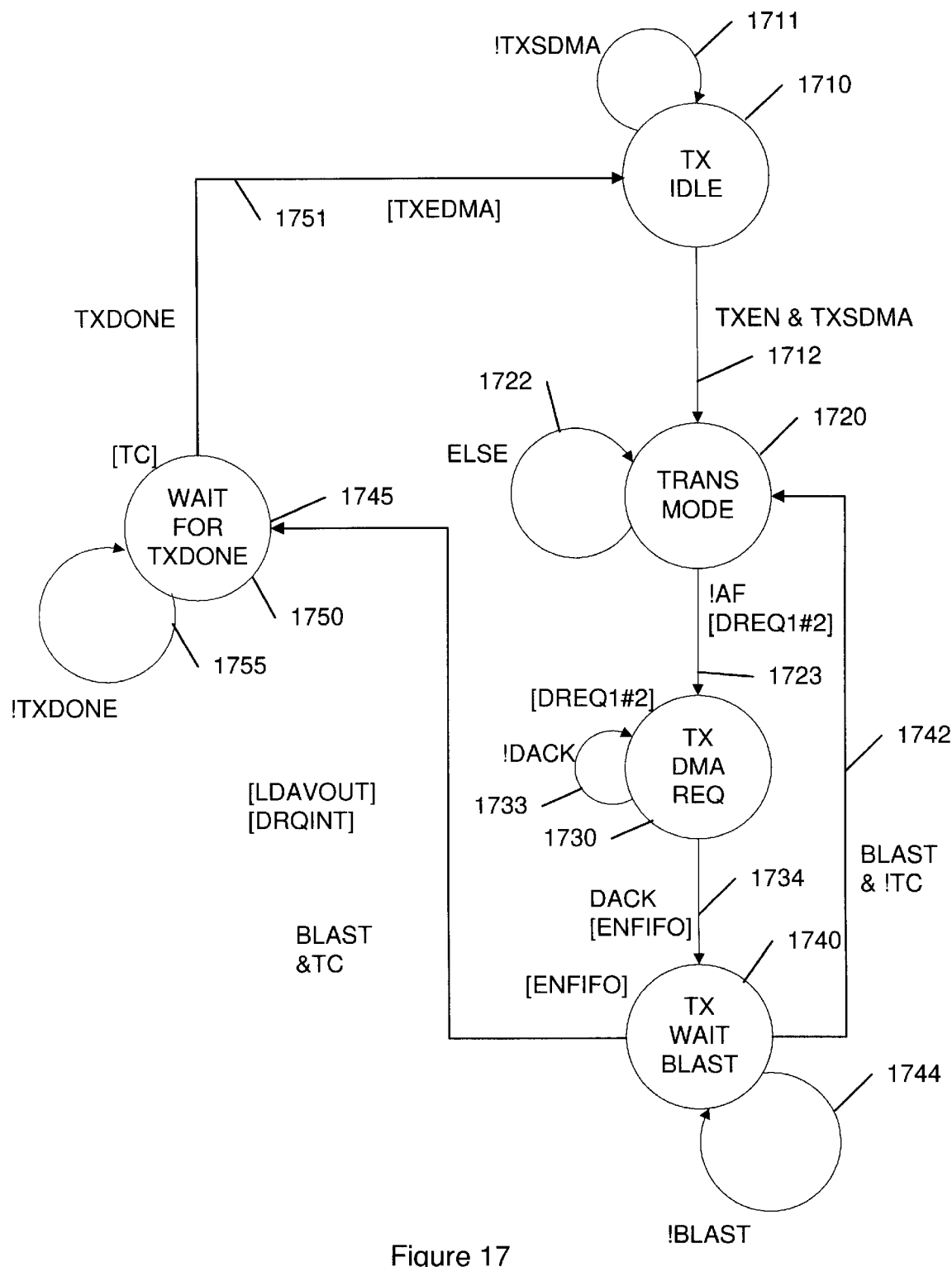
FIG. 17 is a state diagram of a DMA controller state machine in the data source device of FIG. 16.

After the backplane side has set up a channel to transmit data to a desired data destination device, the TxMSM 1621 asserts TxSDMA 1613 to start the DMASM 1644 transferring data from the memory 1612 to the FIFO 1638. Referring now to FIG. 17, there is shown a state diagram for the DMASM 1644.

The DMASM 1644 initially is in a Transmit Idle state (TX IDLE) 1710. So long as TxSDMA 1613 is not asserted (1711), the DMASM 1644 remains in the idle state 1710.

If TxSDMA is asserted (1712), then the DMASM 1644 begins a DMA cycle by transitioning to a Transmit Mode state 1720. If the FIFO 1638 is almost full 1722, then the DMASM 1644 remains in Transmit Mode 1720. If the FIFO 1638 is not full (!AF), then the DMASM 1644 asserts DREQ 1616 to indicate that DMA access is needed, and transitions to a Transmit DMA Receive state 1730. Until DACK is asserted, the DMASM 1644 waits 1733. If the processor circuit 1610 is ready to transfer data, the processor circuit 1610 asserts DACK 1619, and the DMASM 1644 asserts ENFIFO (1734) and transitions to a Transmit Wait for Blast state 1740. The DMASM 1644 keeps ENFIFO asserted while in this state 1740.

The DMASM 1644 waits for a BLAST signal 1617 from the FIFO 1638 (1744), then either cycles back to TRANS MODE 1720 (if TC is not asserted), or transitions to a Wait for Transmit Done state 1750 (if TC is asserted). In both cases the memory 1612 transfers 128-bits of data (a burst cycle for the i960) into the FIFO's A-side 1638a. BLAST 1617, coming from the CPU, indicates the end of a DMA cycle. Assertion of DREQ 1616 then DACK 1619 then BLAST comprises a complete DMA cycle. The DMA transfers continue as long as the packet byte count (maintained by the CPU 1611) is a non zero value. Since TC 1641 is always asserted before the end of a packet transfer, the DMASM 1644 waits until TXDONE 1624 is asserted to go back to TX IDLE 1710.

When a packet transfer is incomplete, the TxSM 1625 asserts TXDONE 1624 before the CPU 1611 asserts TC 1618. Preferably, the TxSM 1625 also notifies the CPU 1611 on TXSTATUS 1614.

Rx Data Flow

Figure 22:
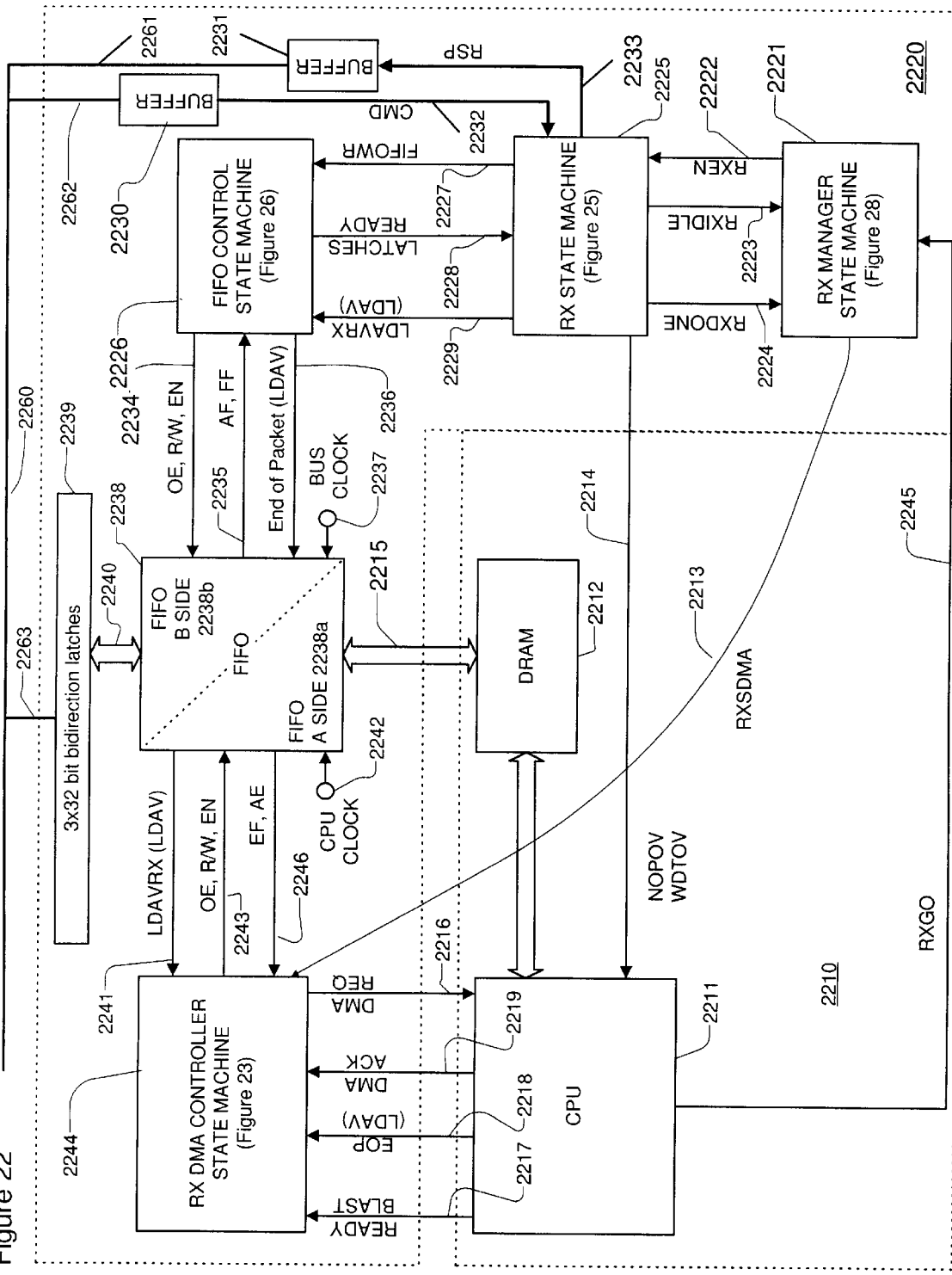
FIG. 22 is a data flow diagram of data receipt by a data destination device from a bus in accordance with the present invention.

Referring now to FIG. 22, there is shown a data flow diagram for data reception by a data destination device from a backplane 2230. The data flow within the data destination device is quite similar to but corresponding to the data flow within the preferred data source device described above. Accordingly, reference numbers in the figures relating to the data destination device correspond closely to those figures relating to the data source device. Thus, the backplane 1630 in FIG. 16 is shown as the backplane 2230 in FIG. 22.

The data destination device includes an interface circuit 2220 and a processor circuit 2210. The interface circuit 2220 and the processing circuit 2210 are connected by and communicate through several lines 1613–1619. The interface circuit 2220 and the processing circuit 2210 are connected by and communicate through several lines 2213–2219. Similar to FIG. 16, in FIG. 22, the bus (the P-Bus 10 of FIG. 2) is considered to comprise the backplane 2260, the interface 2220 and several connecting lines 2261–2263.

The processor circuit 2210 comprises a CPU 2211 and a memory 2212. The CPU 2211 and memory 2212 are preferably coupled via a bus for high speed transfers. The CPU 2211 is preferably an Intel Corporation (San Jose, Calif.) i960 microprocessor having an on-chip DMA controller (not shown). Data transfers to the interface circuit 2220 come from the CPU 2211. Preferably, these data transfers are made in a number of packets. Data transfers to the CPU 2211 come from the interface circuit 2220. In the disclosed embodiment, where the data destination device comprises a processor board, the processor circuit includes system DRAM (see DRAM 82 of FIG. 4), and the memory 2212 comprises the system DRAM. The processor circuit 2210 further comprises a CPU clock 2242, which provides timing signals to the various components of the processor circuit 2220.

The backplane 2260 of the P-Bus 10 includes a data bus portion (DAT) 2263, a command bus portion (CMD) 2262 and a response bus portion (RSP) 2261. The data bus portion 2263 is coupled to the interface circuit 2220 for moving data from the backplane 2260 to the interface circuit 2220. The command bus portion 2262 is coupled to the interface circuit 2220 for moving command messages from the backplane 2260 to the interface circuit 2220. The response bus portion 2261 is coupled to the interface circuit 2220 for moving response messages from the interface circuit 2220 to the backplane 2260.

The interface circuit 2220 comprises 8 elements: a DMA receive controller state machine (DMASM) 2244, a FIFO 2238, a FIFO control state machine (FIFOSM) 2226, a Receive state machine (RxSM) 2225, a Receive Manager state machine (RxMSM) 2221, a command bus buffer 2230, a response bus buffer 2231, and a latch 2239. Each of these state machines is implemented by the P-Bus controller 66 (FIG. 4). The interface circuit 2220 includes the interconnections of these elements, 2240, 2234–2236, 2227–2229, 2222–2224, 2232–2233, 2241, 2243, 2246, and a clock line 2237 which is received from the backplane 2260. The state machines 2244, 2226, 2225 and 2221 preferably are embodied as one or more programmable logic devices (e.g., PLAs or PLDs), and this may be accomplished using the PLA programs set forth in Appendix A.

The FIFO 2238 (FIFO 64 in FIG. 4) has an A-side 2238a and a B-side 2238b. In data destination devices, the FIFO need only be able to move data from the B-side 2238b to the A-side 2238a. Preferably, the size of the FIFO's A-side 2238a is large enough to accommodate high speed data transfers to the processor circuit 2210. Thus, in disclosed embodiment, the FIFO 2238 is 32-bits wide to accommodate the 128-bit (4×32 bits) burst transfer mode of the i960.

The latch 2239 preferably is adapted to the width of the data bus and the FIFO 2238. In the disclosed embodiment, wherein the data bus is 96 bits wide, the latch comprises three 32-bit latches, referred to herein as A, B and C. The FIFO's B-side 2238b includes a switching circuit to switch the input of the FIFO 2238 to each of the three latches 2239.

The interface circuit 2220 can be divided into two logical sections: a processor side and a backplane side. The processor side comprises the DMASM 2244, the FIFO's A-side 2238a and the interconnecting lines 2241, 2243, 2246. The backplane side comprises the FIFO's B-side 2238b, the FIFOSM 2226, the TxSM 2225, the TxMSM 2221, the latches 2239, the buffers 2230, 2231, and their interconnections 2240, 2234–2236, 2227–2229, 2222–2224, 2232–2233, and operates according to a clock 2242 generated by the processor circuit 2210. The processor side sets up memory transfers from the interface circuit 2220 to the processor circuit 2210. The backplane side is more complex, fulfills the bus protocol as used on the backplane 2260, and manages data transfers to the interface circuit 2220 from the backplane 2260. Accordingly, after the backplane side sets up a data channel, the processor side and backplane side alternate between the backplane side filling the FIFO 2238 and the processor side emptying the FIFO 2238. Because the backplane 2260 and the processor circuit 2210 have independent clocks 2237, 2242, the interface circuit 2220 also synchronizes handshaking signals between the processor side and the backplane side.

The Backplane Side of the Interface Circuit

The processor circuit 2210 indicates when data can be received by asserting a Receive Go line (RXGO) 2245 to the RxMSM 2221. Based upon RXGO, the RxMSM 2221 signals other elements in the interface circuit 2220.

The CPU 2211 asserts RXGO 2245 if the CPU 2211 has initialized its DMA channel for packet transfer from the P-Bus. In the disclosed embodiment, this initialization is performed by the program included in Appendix B.

RxSM

The RxSM 2225 interfaces between the FIFO 2238 and the RxMSM 2221 and the backplane 2260. The RxSM 2225 processes commands and controls data being received from the backplane 2260. To coordinate activity on the backplane side with that on the processor side, the RxSM 2225 is coupled to the DMASM 2244 via a Receive Status line (RXSTATUS) 2214. The RxSM 2225 is coupled to the FIFOSM 2226 via a Last Data Available to Receive line (LDAVRX) 2229, a Receive Latches Ready line (RXLRDY) 2228 and a FIFO Write line (FIFOWR) 2227. The RxSM 2225 asserts FIFOWR to signal that the FIFO 2238 should be written, pushing data from the latch 2239 to the FIFO 2238. The FIFOSM 2226 asserts RXLRDY 2228 to indicate that the latch 2239 has data to transfer to the FIFO 2238. The FIFOSM 2226 asserts LDAVRX 2229 when the last data to receive has been stored in the FIFO 2228b. LDAVRX 2229 corresponds to LDAV 2236, 2241 and 2218.

The RxSM 2225 is coupled to the RxMSM 2221 via a Receive Enable line (RXEN) 2222, a Receive Idle line (RXIDLE) 2223 and a Receive Done line (RXDONE) 2224. The RxMSM asserts RXEN 2222 to signal that receiving may begin. The RxSM 2225 asserts RXIDLE 2223 to signal that a channel from the data source device has not been established. The RxSM 2225 asserts RXDONE 2124 to signal that transmission of data from the data source device is complete.

In addition, the RxSM 2225 is coupled to the command buffer 2230 via line 2232 and the response buffer 2231 via line 2233. From these couplings, the RxSM 2225 can read command messages from the command portion (CMD) of the backplane and send response messages on the response portion (RSP) of the backplane. Also, although not shown the RxSM 2225 monitors the address bus portion (ADD) of the backplane and asserts RXADDR when the data destination device's slot address appears on the address bus.

If the data destination device is a data communication device, then the RxSM 2225 is enabled as long as no packet transmission is in progress. Like with the data source device, sharing of resources is managed by the assertion and detection of signals such as RXIDLE, TXIDLE, RXACTIVE and TXACTIVE.

Figure 25:
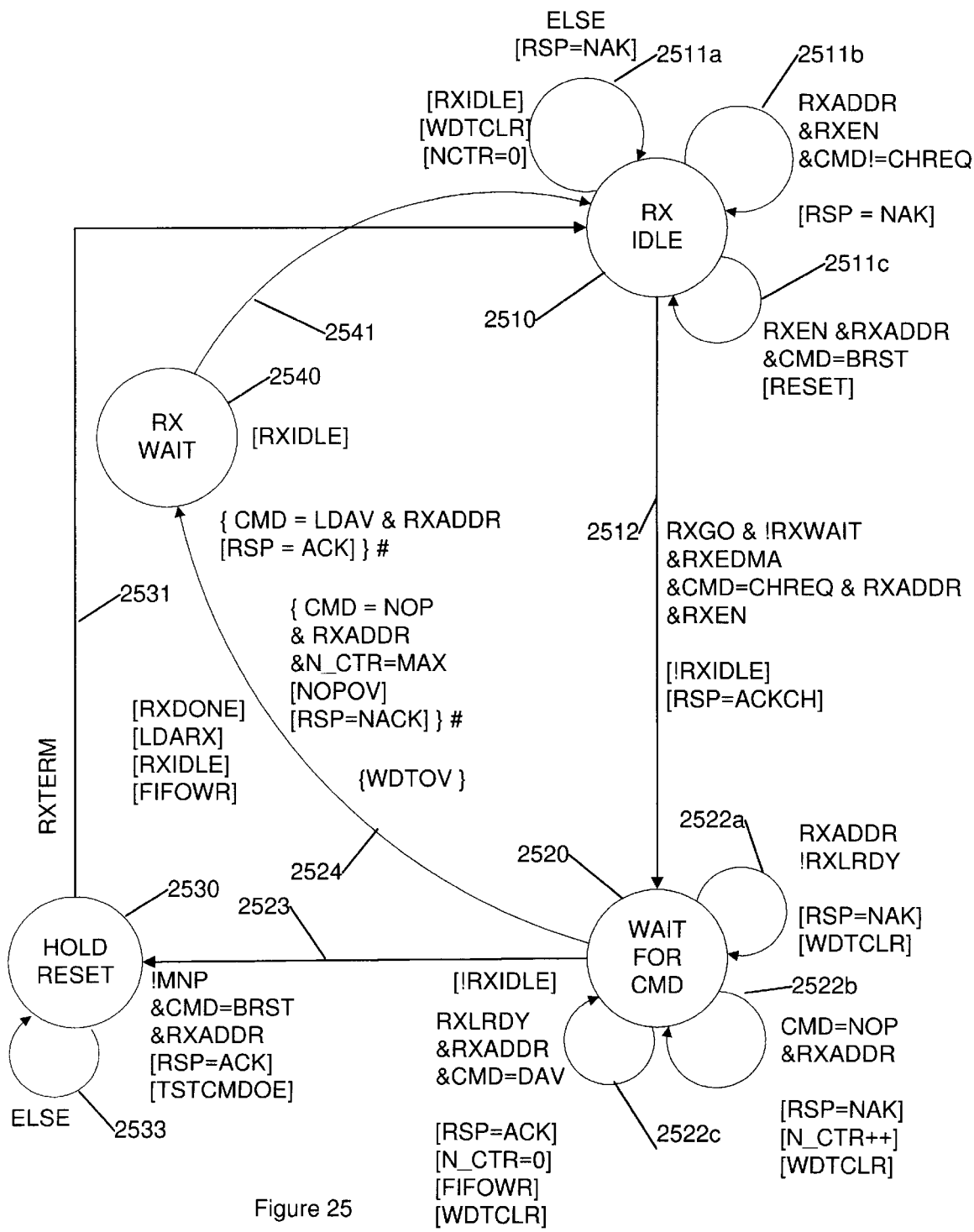
FIG. 25 is a state diagram of a receive state machine in the data destination device of FIG. 22.

Referring now to FIG. 25, there is shown a state diagram of the RxSM 2225. The RxSM 2225 is initially in a Receive Idle state (RX IDLE) 2510. In RX IDLE 2510, the RxSM 2225 asserts RXIDLE, WDTCLR (to clear the watch dog timer) and resets an error counter N_CTR. The RxSM 2225 may leave RX IDLE 2510 if RXADDR and RXEN are asserted. However, if the command from the command bus is BRST, the RxSM 2225 resets the interface circuit 2220 (2511c) and remains in RX IDLE 2510.

The RxSM 2225 monitors the command bus (CMD) 2262 via line 2232 and buffer 2230, and the address bus (ADDR) (not shown). If (a) a data source device is seeking a channel (i.e., a CHREQ message is received), (b) the address on the ADDR is the slot address of the data destination device (GEO_ADDR) (so RXADDR is asserted), (c) any prior DMA has ended (RXEDMA is asserted), and (d) no transmission is in progress (RXWAIT is not asserted), then the RxSM 2225 sends an ACKCH response message (2512), asserts RXIDLE 2223 (to prevent a channel being opened to a second data source device), and transitions to a Wait for Command state (WAIT FOR CMD) 2520. This action starts a packet reception cycle and RXIDLE 2223 is de-asserted. The RxMSM 2225 then asserts RxSDMA to start the DMA cycles from the FIFO 2238 to the local memory 2212.

If the command message is other than CHREQ, or RXA-DDR or RXEN are not asserted, then the RxSM 2225 sends a NAK response message 2511a, 2511b.

From WAIT FOR CMD 2520, the RxSM 2225 monitors the CMD bus 2262 for a DAV command destined for its slot (i.e. RXADDR is asserted), holding RXIDLE negated, and transitions under any of three conditions.

However, the RxSM 2225 remains in WAIT FOR CMD 2520 under any of three other conditions. First, the data source device has sent data (CMD=DAV), and the latch 1639 is ready (RXLRDY 2228 is asserted), and RXADDR is asserted, then the RxSM 2225 sends an ACK response message, clears N_CTR, asserts FIFOWR 2227, and signals WDTCLR on RXSTATUS 2214 to clear the watch dog timer (2522c). FIFOWR 2227 indicates to the FIFOSM 2226 that data is available in the latches 2239 which is to be pushed into the FIFO 2238. For every such DAV command an ACK response is generated unless the FIFO 2238 is Almost Full 2235 (as indicated by RXLRDY being negated), where a NAK response is generated. Second, if while RXADDR is asserted, the latch 2239 is not ready to receive (RXLRDY 2228 is negated), the RxSM 2225 sends a NAK response message and signals WDTCLR on RXSTATUS 2214 to reset the watch dog timer (2522a), and remains in WAIT FOR CMD 2520. Third, if the command message is NOP and RXADDR is asserted, then the RxSM 2225 sends a NAK response message, signals WDTCLR and increments the error counter (N_CTR) (2522b).

As mentioned, three conditions can cause the RxSM 2225 to transition from WAIT FOR CMD 2520 to a Receive Wait state (RX WAIT) 2540. The second and third conditions are error conditions, so the RxSM 2225 terminates packet reception. In all three conditions, the RxSM 2225 asserts RXDONE 2224, LDAVRX 2229, RXIDLE 2223 and FIFOWR 2227. This will guarantee that the end of packet reception will be detected on the processor side of the interface circuit 2220. There is no need to initialize the interface circuit 2220 after detection of the above receive error conditions.

First, if the command message is LDAV and RXADDR is asserted, packet reception terminates. The RxSM 2225 sends an ACK response message. This command message causes RXLDAV 2229 to be asserted. RXLDAV 2229 is used to tag the end of packet. The last word that is being pushed into the FIFO 2238 will have the end of packet bit set (B_LDAVIN.) This logic line is monitored by the DMASM 2244 on the processor side of the interface circuit 2220.

Second, if the command message is NOP, RXADDR is asserted and the error counter N_CTR has reached its maximum (MAX), then the RxSM 2225 signals NOPOV on RXSTATUS 2214 and sends a NAK response message. An error condition is assumed if there are too many NOPs between DAVs (preferably set to 32 consecutive NOPs). NOPOV is asserted when maximum NOPs are received after a DAV.

Third, the watch dog timer may overrun so that WDTOV is signalled on RXSTATUS 2214. An error condition also results if the transmitter stops sending command messages (DAV or NOP). This could happen if the data source device is forced to reset, screeched or was removed during a transfer cycle. The RxSM 2225 includes a watch dog timer, which preferably asserts a Watch Dog Timer Overflow line (WDTOV) 2214 approximately 125 µsec after the last DAV command.

After transition to RX WAIT 2540, the RxSM 2225 asserts RXIDLE and then transitions back to RX IDLE 2510. LDAV 2229 is used to terminate the packet transfer at the processor side of the interface circuit 2220 when transmitting. This signal is propagated to and from the FIFO 2238 via lines 2241, 2236 and is used to terminate the channel on the backplane side of the interface channel 2220.

While in WAIT FOR CMD 2520, if MNP is negated and the command message is BRST (board reset) and RXADDR is asserted, then the RxSM 2225 sends an ACK response message (2523), and transitions to a Hold Reset state (2530). The RxSM 2225 remains in Hold Reset 2530 until RXTERM is asserted (2531), when the RxSM 2225 transitions to RX IDLE 2510.

RxMSM

The RxMSM 2221 is coupled to the DMASM 2244 via a Receive Start DMA line (RxSDMA) 2213. RxSDMA 2213 signals that the DMASM should move data from the FIFO 2238 into the processor circuit 2210.

Figure 28:
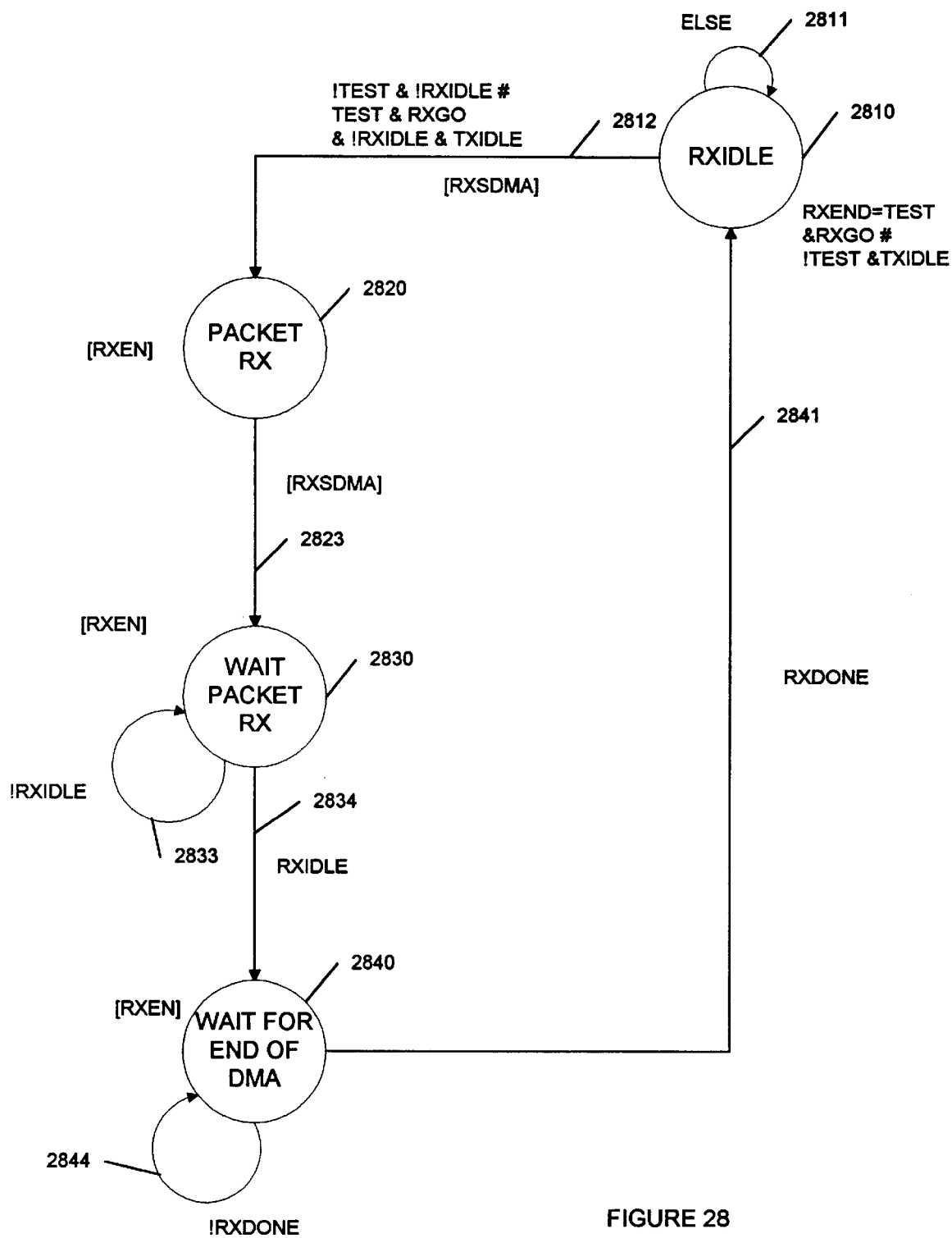
FIG. 28 is a state diagram of a bus manager state machine in the data destination device of FIG. 22.

Referring now to FIG. 28, there is shown a state diagram of the RxMSM 2221. FIG. 28 also includes information respecting the incorporation of testing features in the RxMSM 2221. For clarity, this discussion does not address the testing in depth.

The RxMSM 2221 initializes into an Idle state (RXIDLE) 2810. When the RxSM 2225 negates RXIDLE 2223 (indicating that data is to be received), the RxMSM 2221 asserts RxSDMA 2213 (2812) to initiate data transfers from the P-Bus latches 2234 to the FIFO 2238, and transitions to a Packet Receive state 2820. In the Packet Receive state 2820, the RxMSM 2221 asserts RXEN and continues to assert RxSDMA (2823) and transitions to a Wait for Packet state 2830. In Wait for Packet 2830, the RxMSM 2221 waits for the RxSM 2225 to assert RXIDLE 2223 (2833), indicating imminent completion of the data transfer. When RXIDLE 2223 is asserted (2834), the RxMSM 2221 transitions to a Wait for End of DMA state 2840. In this state 2840, the RxMSM asserts RXEN 2222 and waits for the RxSM 2225 to assert RXDONE 2224 (2844) indicating completion of its data transfer. When this is done (2841), the RxMSM 2221 transitions back to RX IDLE 2810.

FIFOSM

The FIFOSM 2226 monitors the FIFO 2238 for AF (FIFO Almost Full) or FF (FIFO Full) conditions. In either case (AF or FF), the FIFOSM 2226 de-asserts RXLRDY 2228 which causes the RxSM 2225 to send the NAK response to DAV commands. As soon as the FIFO 2238 is not AF, RXLRDY 2228 will be asserted which allows more data reception.

The FIFOSM 2226 pushes data from the latch 1639 into the FIFO 2238. The FIFOSM 2226 is coupled to the FIFO 2238 via a FIFO control line 2234, a FIFO status line 2235 and an End of Packet line (LDAV) 2236. The FIFO control line 2234 includes latch enable flags (ALATCH, BLATCH, CLATCH) and an Enable Burst flag (ENB). The FIFO status line 2235 can have values of Almost Full (AF) and Full (FF). ENB signals when data is to be popped from the FIFO 1638 to the latch 2239.

Figure 26:
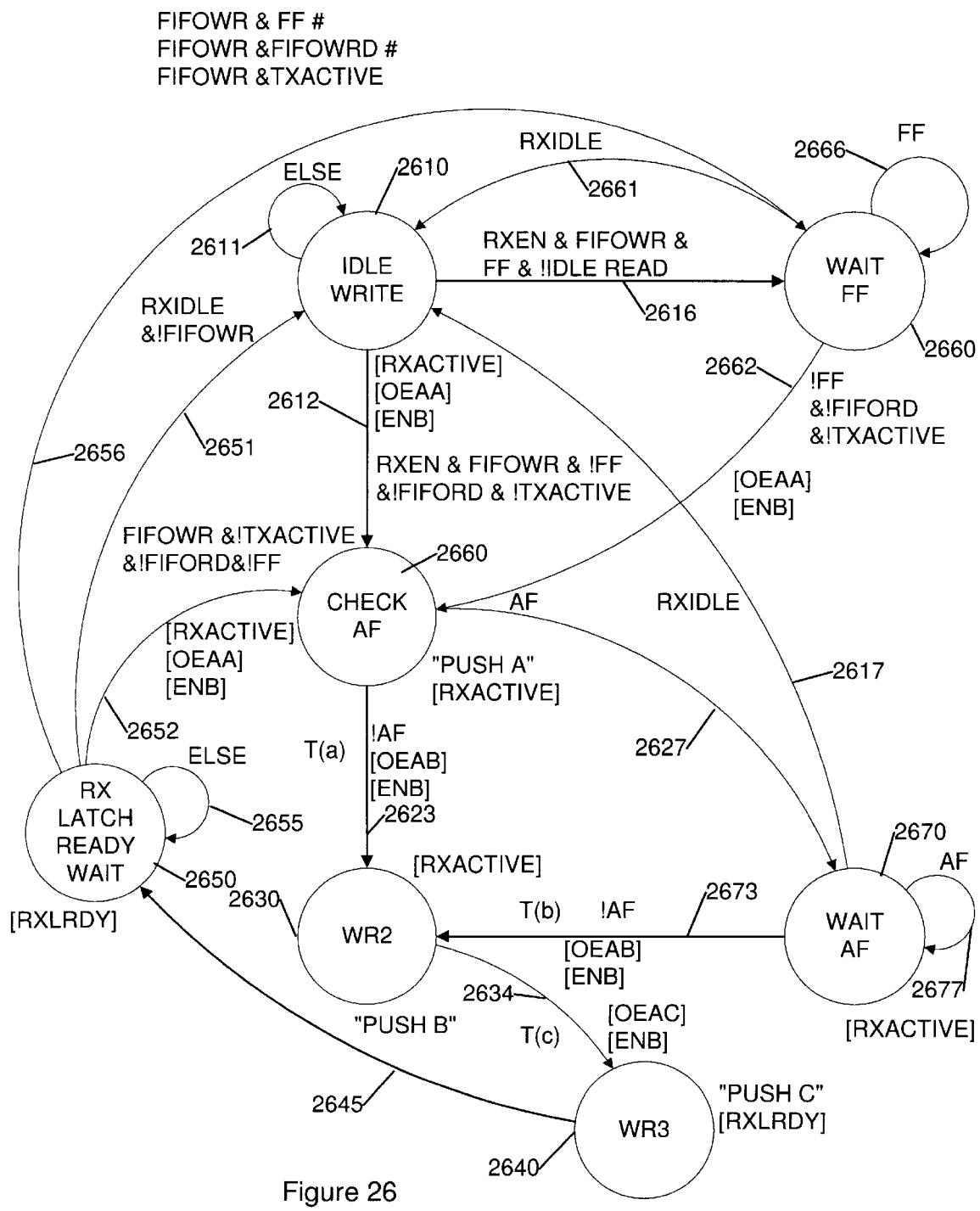
FIG. 26 is a state diagram of a FIFO controller state machine in the data destination device of FIG. 22.

Referring now to FIG. 26, there is shown a state diagram of the FIFOSM 2226. The DMASM 2244 simultaneously functions as the state machine in FIG. 27. The FIFOSM 2226 initially is in an Idle state 2610. If the receiving is enabled (RXEN is asserted) and there is data to write (FIFOWR is asserted by the FIFO 2238 on line 2246) and the FIFO 2238 is not full (FF is not asserted) (2612), then the FIFOSM 2226 will transition to a Check AF state 2620. Also, if the data destination device is capable of transmitting, then this transition 2612 may only occur if FIFORD and TXACTIVE are not asserted. In this transition 2612, the FIFOSM 2226 asserts RXACTIVE, OEAA and ENB to transfer the data from the A portion of the latch 2239 to the FIFO 2238. However, if the FIFO 2238 is full, then the FIFOSM 2226 must wait for the FIFO 2238 to empty (2616). This entails a transition to a Wait While FIFO Full state (WAIT FF) 2660. If RXIDLE 2223 is asserted while waiting (2661), then the FIFOSM 2226 transitions back to Idle 2610. Otherwise, when the FIFO 2238 is no longer full, the FIFOSM 2226 asserts OEAA and ENB to transfer the data from the A latch (2662) and the FIFOSM 22264 transitions to Check AF 2620.

Figure 27:
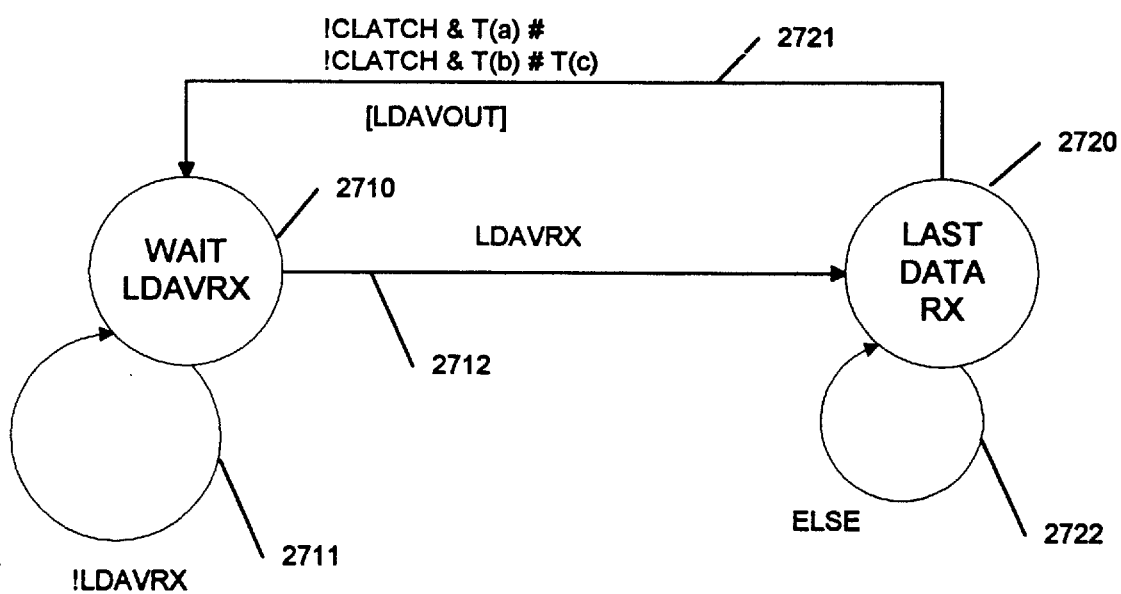
FIG. 27 is a state diagram of a detail of part of the decision making in the state diagram of FIG. 26.

Referring now to FIG. 27, there are two states—Wait for LDAV 2710 and Last Data Received 2720. The FIFOSM 2226 remains in Wait for LDAV 2710 (2711) until LDAV 2241 is asserted. The FIFOSM 2226 remains in Last Data Received 2720 (2722) until CLATCH & T(a) are asserted or CLATCH and T(b) are asserted or T(c) is asserted.

Referring again to FIG. 26, beginning with Check AF 2620, the FIFOSM 2226 transfers the data from the FIFO 2238 to the memory 2212. In Check AF 2620, the FIFOSM 2226 signals the FIFO 2238 to push the A portion of the latch 2239 and asserts RXACTIVE. If the FIFO is almost full because of the Push A, the FIFOSM 2226 transitions to a Wait Almost Full (WAIT AF) state 2670. Then, the FIFOSM 2226 waits (2677) until AF is negated, and transitions to a WR2 state 2630 to continue pushing data into the FIFO 2238. However, if RXIDLE is asserted while the FIFOSM 2226 is in WAIT AF 2677 (2617), then the FIFOSM 2226 transitions back to Idle 2610.

From Check AF 2620, if the FIFO 2238 is not almost full, then the FIFOSM 2226 asserts OEAB and ENB (2627) and transitions to WR2 2630. In WR2, the FIFOSM 2226 pushes the contents of the B latch into the FIFO 2238, asserts RXACTIVE, and then asserts OEAC and ENB (2634). After transitioning to a WR3 state 2640, the FIFOSM 2226 asserts RXLRDY and pushes the contents of the C portion of the latch 2239 into the FIFO 2238.

After the C latch is pushed, the FIFOSM 2226 transitions from WR3 2640 to a Receive Latch Ready Wait state 2650. In this state 2650, the FIFOSM 2226 asserts RXLRDY 2228. The FIFOSM 2226 will transition from RX LATCH READY WAIT 2650 in any of three conditions. First, if FIFOWR is asserted and the FIFO 2238 is not full, then the FIFOSM 2226 asserts RXACTIVE, OEM and ENB (2652) and transitions back to Check AF 2620 to push and transfer another packet of data. Second, if RXIDLE 2223 is asserted and FIFOWR 2243 is negated (2651), then the FIFOSM 2226 transitions to Idle 2610. Third, if FIFOWR is asserted and the FIFO is full, or FIFOWR and FIFOWRD are asserted (2656), then the FIFOSM 2226 transitions to WAIT FF 2660.

The Processor Side of the Interface Circuit—DMASM

The processor side of the interface circuit 2210 controls the FIFO's A-side 2238a. The DMASM 2244 controls data traffic between the memory 2212 and the FIFO's A-side 2238a.

The DMASM 2244 is coupled to the processor circuit 2210 (and preferably the DMA controller in the CPU 2211) via a DMA Request line (DREQ or DMA REQ) 2222, a DMA Acknowledge line (DMA ACK) 2219, an End of Packet line (EOP or LDAV) 2218 and a Blast line (BLAST) 2217. These lines are used by the DMASM 2244 to control the processor circuit 2210 and to receive status information from the processor circuit 2210. DREQ 2222 is used to signal to the processor circuit 2210 that a DMA transfer is needed by the interface circuit 2220. The processor circuit 2210 indicates that the DMA transfer may proceed by asserted DMA ACK 2219.

The DMASM 2244 is coupled to the FIFO 2238 via a Last Data Available line (LDAV) 2241, a FIFO control line 2243 and a FIFO status line 2246. LDAV 2241 has the same function as the other LDAV lines, described above. The FIFO control line 2243 includes latch enable flags (ALATCH, BLATCH, CLATCH) and an Enable Burst flag (ENB). The FIFO status line 2246 can have values of Almost Empty (AF) and Full (FF). An Enable FIFO flag (ENFIFO) signals that the FIFO 2238 can accept data. A BLAST flag signals that data has been transfered into the FIFO 2238.

Figure 23:
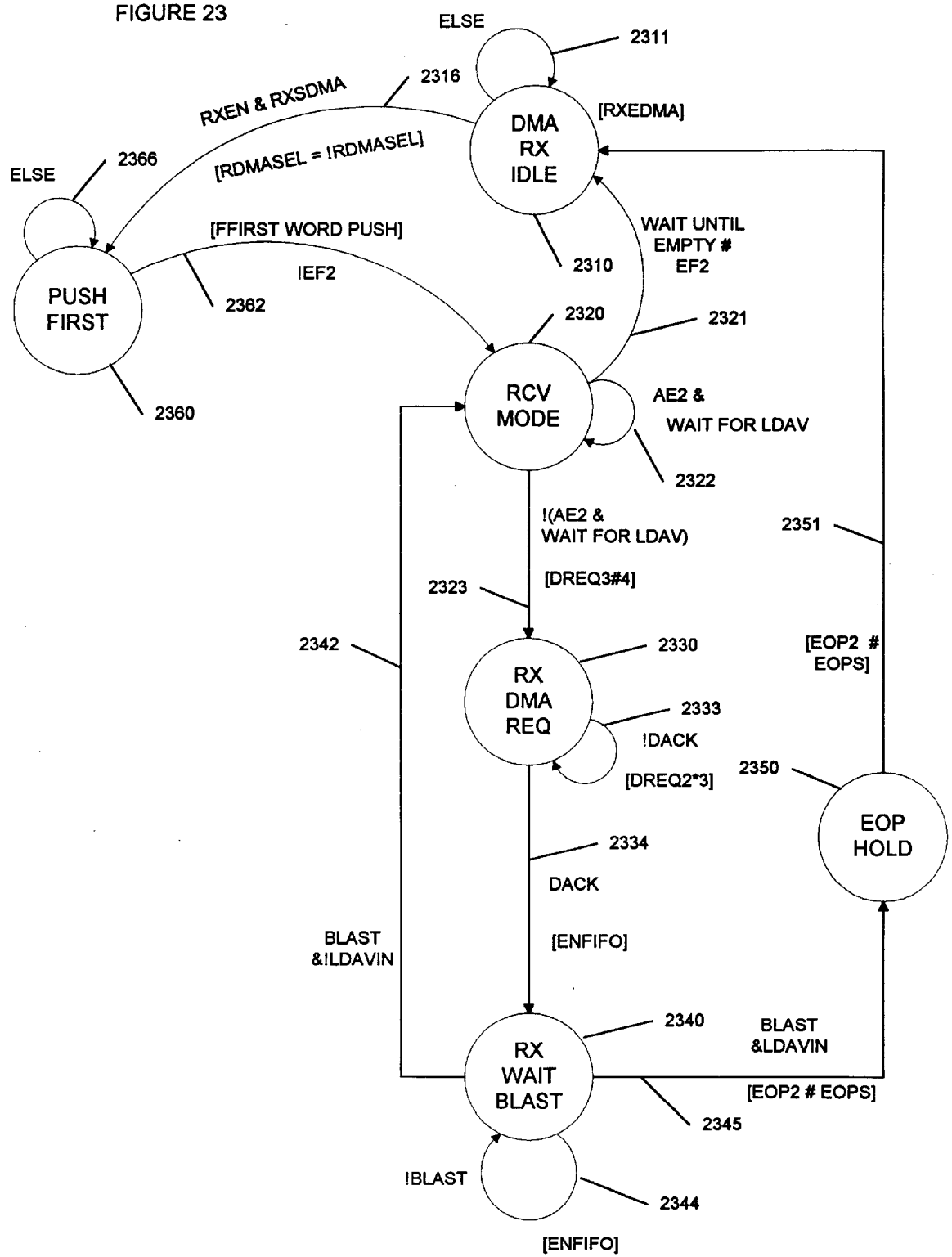
FIG. 23 is a state diagram of a DMA controller state machine in the data destination device of FIG. 22.

After the backplane side has set up a channel to receive data from a data source device, the RxMSM 2221 asserts RxSDMA 2213 to start the DMASM 2244 transferring data from the FIFO 2238 to the memory 2212. The RxMSM 2221 asserts RxSDMA 2245 as soon as the RxSM 2221 identifies a packet reception. RxSDMA 2245 invokes the DMASM 2244 where data transfer starts from the FIFO 2238 to the memory 2212. Referring now to FIG. 23, there is shown a state diagram for the DMASM 2244.

The DMASM 2244 initializes into an Idle state (2310). The DMASM 2244 remains Idle 2310 (2311) until data has been received and transfered into the FIFO 2238 (RxMSM 2221 asserts RxSDMA 2213), then transitions to a Push First state (2360). In Push First 2360, the DMA commands the latch 2239 to push its word of data into the FIFO's B side 2238b. Since the FIFO 2238 may already have data from a prior receive cycle, the DMASM 2244 waits for the FIFO 2238 to have room for the data (negation of EF on the FIFO status 2235 line) (2366), then transitions to a Receive Mode state 2320.

Figure 24:
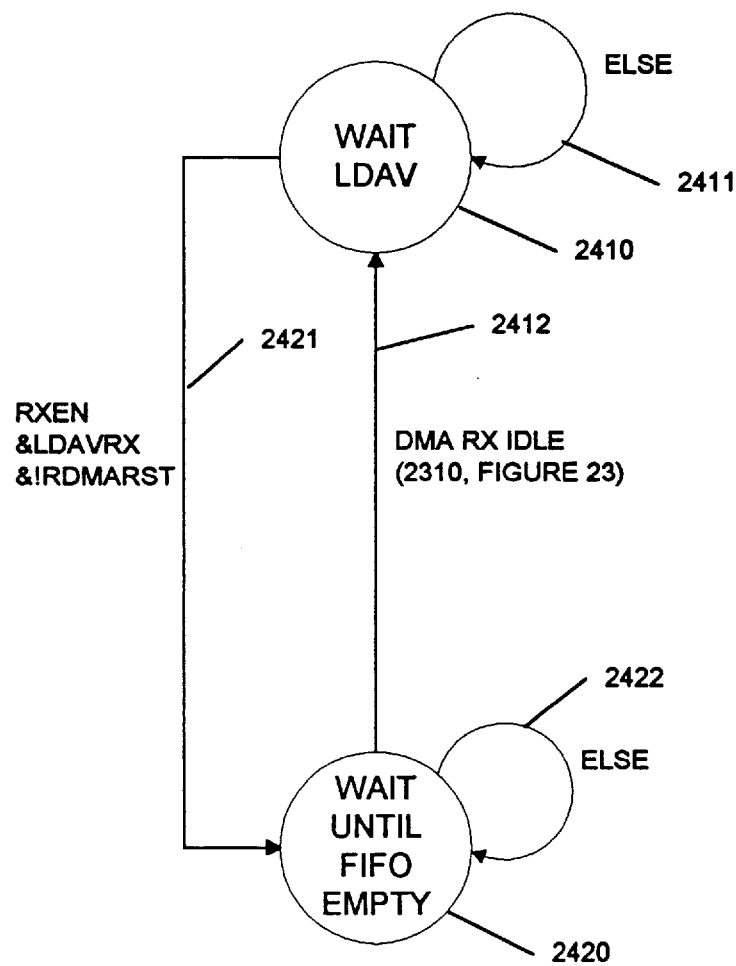
FIG. 24 is a state diagram of a detail of part of the decision making in the state diagram of FIG. 23.

From the Receive Mode 2320, the DMASM 2244 enters a cycle wherein the DMASM 2244 keeps emptying the FIFO 2238 until the FIFO 2238 is empty and no more data is to be received. Once the cycle is initiated, the DMASM 2244 simultaneously functions as the state machine in FIG. 24. In FIG. 24, there are two states—Wait for LDAV 2410 and Wait Until FIFO Empty 2420. The DMASM 2244 begins and remains in Wait for LDAV 2410, but transitions to Wait Until FIFO Empty 2420 if RDMARST (Receive DMA Reset) is negated while RXEN 2222 and LDAVRX 2241 are asserted. The DMASM 2244 remains in Wait Until FIFO Empty 2420 (2411) until the the FIFO 2238 is empty (EF is asserted). If, while the FIFO 2238 is empty (EF is asserted), the DMASM 2244 transitions to Idle 2310, then it also transitions (2422) to Wait for LDAV 2410.

Referring again to FIG. 23, the DMASM remains in Receive Mode 2320 so long as the FIFO 2238 is almost empty (AE is asserted) and the DMASM 2244 is in the Wait for LDAV state 2410. However, if EF is asserted or the DMASM 2244 enters Wait For LDAV 2410, then the DMASM 2244 transitions (2321) to Idle 2310. If AE is asserted while the DMASM 2244 is in Wait for LDAV 2410, then the DMASM 2244 transitions to a DMA Request state 2330. In this transition, the DMASM 2244 request DMA access by asserting DREQ 2216 (2323). In the disclosed embodiment, the i960 maintains four DMA buffers, and DMA requests identify the desired buffer. The DMASM 2244 waits in Receive DMA Request 2330 (2333) until the DMA request is acknowledged (DACK 2219 is asserted), then enables the FIFO 2238 by asserting ENFIFO 2243 (2334) and transitions to a Wait Blast state 2340.

The DMASM 2244 waits in Wait Blast 2340, asserting ENFIFO (2344) until BLAST is asserted. When BLAST is asserted (on line 2217), the DMA receives data from the FIFO 2238. If there is more data in the FIFO 2238 or more data coming (!LDAVIN), then the DMASM 2244 returns to Receive Mode 2320 to cycle through another data transfer. If there is no more data to be received, then the DMASM 2244 signals an appropriate EOP on the FIFO control line 2234 and transitions to an EOP Hold state 2350. EOP Hold 2350 is provided to permit proper interrupt timing. The i960 requires a minimum of three clock cycles for edge triggered interrupts. From EOP Hold 2350, the DMASM 2244 transitions back to Idle 2310.

RXWAIT is asserted as soon as both receive DMA channels are used. Also no more packet reception can start unless at least one Receive Status Register is read by the software driver.

A total of two packets can be captured, one per each receive DMA channel, before packet reception is disabled. Packet reception is disabled until the software driver responds to either of the EOP interrupts pending. Note that EOPs are generated on the processor side of the interface circuit 2220.

In the preferred embodiment, using the i960, a Receive DMA channel select line (RSDMASEL from the DMASM 2244) is toggled at the beginning of every packet reception. This signal is used to alternate between DMA channel 3 or 4 and their related logic. The DMASM 2244 asserts DREQn 2216 (n is either 3 or 4). In response to DREQn 2216, DACKn 2219 is asserted and 128-bits (4×32-bit) of data is transferred from the FIFO 2238 to the memory 2212. Receive DMA cycles (DREQn and DACKn) will continue as long as the end of packet is not detected.

DMASM 2244 transitions to an IDLE state as soon as Last Data In (LDAVIN) 2241 from the FIFO 2238 is asserted. LDAVIN 2241 is one of the four extra data bits of the FIFO 2238 (D32:35) used to indicate the end of a transfer. This bit is propagated through the FIFO 2238 from the backplane side when end of packet transfer is detected (LDAV command, NOPOV or WDTOV).

At the end of the DMA transfer, an End of Packet line (EOPn) 2218 is asserted. This signal causes a CPU interrupt to indicate to the system software (driver) reception of a packet. The EOPn 2218 interrupt invokes the receive software driver. At this time the status of the packet is examined by the driver for processing.

In either case of transmit or receive interrupt, the corresponding DMA channel must be initialized by the software driver for the next packet transfer.

Redundancy

Preferably, complete system redundancy is provided on the P-Bus. As noted above, in the disclosed embodiment, there are two completely redundant control buses A and B, two redundant MPBs, and three redundant 32-bit P-Bus data paths. During normal operation of the disclosed embodiment, the three data paths are concatenated to form a single 96-bit data bus. Redundancy for network connections is handled by configuring multiple connections to the network.

In the event of a failure in one of the 32-bit data paths, the failed data path is disconnected and the P-Bus 10 continues with the remaining two data paths concatenated as a 64-bit data bus. Operation will continue at ⅔ of the original bandwidth.

In the event of a failure in the primary control bus, it is switched out of service and the secondary control bus is switched into service. The system redundancy is controlled by the P-Bus master. In the event of a failure in the active MPB, the inactive MPB will take control of the P-Bus and switch the active MPB out of service.

MPB Redundancy

There are two fixed slots available for Master Processor Boards (MPBs) in the chassis of the router 30. MPBs are distinguished from Interface Processor Boards (IPBs) mainly because they have an Arbitration controller daughter card 54 (FIG. 2) installed. When power is applied, one of the Arbiters 54 takes control of the P-Bus 10 and its corresponding MPB becomes the active MPB. The other MPB, though inactive as a master, continues to monitor the P-BUS, and is available to handle network traffic.

Both the active and standby MPBs monitor P-BUS operation and IPB functionality by sending message packets to every processor board 32, 34. By analyzing the return messages (if any), the MPBs can determine if there is a problem with the P-Bus. The active MPB can reset any processor board, reconfigure data paths and completely switch control paths in an effort to recover from a P-Bus problem. The inactive MPB can reconfigure data and control paths, but cannot reset IPBs unless it usurps active mastership of the P-Bus. The IPBs cannot force any bus reconfiguration, but can recommend it via an appropriate response to message packets from the master MPB.

Data Path Redundancy

Two bits of the redundancy bus [RED1,RED0] of the P-Bus 10 are used to select which of the three 32-bit segments DATA, DATAB, DATAC are used for transmitting data.

The two data path select bits are driven by open collector drivers (not shown) so that if the lines are not driven, the default condition on the bus is [RED1,RED0]=[1,1]. If both MPBs agree that all data paths are working properly, they both drive 0's onto these redundancy bits. If an MPB detects a bad data path, it drives a 1 on the appropriate RED bit(s) to force a data path reconfiguration, even if the other MPB thinks all paths are good.

Control Bus Redundancy

As noted above, there are two complete sets of control paths, Control Bus A and Control Bus B, on the P-Bus. This includes duplicate P-Bus clock, ARB bus, CMD bus, ADD bus and RSP bus of the P-Bus 10. In addition, there are two Arbitration controllers 54 (FIG. 2) that generate the P-Bus access sequences. When an MPB commands a control path switch, all of these buses and the Arbitration controller 54 are switched together. Either MPB can command a switch to the alternate control paths as long as that Arbitration controller 54 is installed.

Three bits of the redundancy register (ASELECT, BSELECT,APRSNT) are used to implement the control path selection.

ASELECT (RED3) Ignored unless set from MPB A.
   1=Grant Control to Bus A 0=Grant Control to Bus B
BSELECT (RED4) Ignored unless set from MPB B.
   1=Grant Control to Bus A 0=Grant Control to Bus B
ARBSEL (RED2) is 1 if Arbitration board 54 for Control
   Bus B has been granted control; it is negated otherwise.

Initialization

When power is first applied, both the APRSNT and BPRSNT signals are negated. Whichever MPB comes out of reset first will enable its own Arbitration controller and corresponding control paths, which then locks out the other Arbiter 54. If both Arbiters 54 come on-line at exactly the same time, Arbiter 54 for Control Bus B will be given control. The system will default to using all three 32-bit data paths concatenated into a 96-bit data path.

The system is now initialized and operational. Further action may be taken by either the active MPB or the inactive MPB to control the system redundancy in response to error events.

P-Bus Electrical Specifications

In the illustrated embodiment, the P-Bus 10 uses IEEE896 Futurebus+ BTL transceivers (not shown). All active signals are terminated with a 33 Ohm resistor pulled up to 2.1 Volts and a 0.01 µF decoupling capacitor. The redundancy (RED) bus uses open-collector TTL drivers pulled up on the backplane (not shown).

P-Bus Timing Specifications

The P-Bus signals are all synchronized to the 20 MHz system clock. FIG. 30 shows the required setup and hold times to the rising edge of the system clock for each signal. The setup and hold times are measured at the transmitting board.

P-Bus Physical Specifications

The physical specifications of the illustrated embodiment of the P-Bus backplane 35 and circuit boards 32, 34 plugging into the P-Bus are described below.

Backplane Characteristics

The P-Bus backplane 35 of the illustrated embodiment of FIG. 32 is preferably composed of an eight layer printed circuit board. There is one ground plane and one 2.1 VDC voltage plane. The backplane circuit board is designed such that all active signals have a controlled impedance of 65 Ohms (+/−10%). There are no active components on the backplane, and all connectors 74 are pressed in.

There are, in the illustrated embodiment of FIG. 32, 5 slots with an interslot spacing of 25 mm.

There are 134 BTL, 10 TTL, and 5 DC level signals that are connected to the logic interface section of the connector totalling to 149 lines. 42 ATM signals are not included on the backplane 35. All BTL signals are terminated at 2.1 V at each end of their respective traces using 33 Ohm termination resister networks. Each termination resistor network is decoupled using a 0.1 µF capacitor between 2.1 V and the GROUND plane. All 10 TTL signals (clock lines) are kept equal in length to minimize clock skew on each board. 4 of the DC signals are used to identify slot ID and are pulled up on each board. The 5th DC signal is used to identify backplane type, either 15 slot or 5 slot and is pulled up on each board with a 4.7K Ohm resistor.

In a preferred embodiment, for the Bus Transceiver Logic (BTL) drivers, the Signetics FB2031 is preferred because of its excellent performance under all types of loading conditions. Furthermore, the stub length between the transceiver and the backplane is preferably no greater than 2 inches.

System Clock Distribution

In a preferred embodiment, the P-Bus system clock distributor bus is driven by 74P2525 drivers and distributed in a way which minimizes the skew and maximizes the signal integrity. As shown in FIG. 14, the P-Bus accomplishes this by distributing four clock signals from four drivers in the same chip to groups of boards. The length and impedance of each clock backplane trace is controlled during layout to be equal, and the signal is inserted at the center point of the four boards.

In the illustrated embodiment, for each processor board, the MC88915 is preferred because it ensures synchronization with the P-Bus system clock with minimal phase shift.

The following is a discussion of the router 30 which is intended to provide an example of one environment in which the bus of the present invention may be applied.

Circuit Board

The processor boards of the router 30 of the illustrated embodiment utilize circuit boards that are 300 mm×260 mm in size. The 300 mm width allows up to 138 positions for the four row metric connectors 74 described below. The P-Bus interface uses the first 56 positions for signals and the last 12 positions for power. The remaining connector positions are reserved for other purposes.

Circuit boards are preferably designed so that the P-Bus drivers are as close to the connector as possible so as to minimize the stub length of the traces to the connector.

The Arbitration daughter board 54 is installed on an MPB above the P-Bus drivers in the illustrated embodiment. It interfaces with the MPB through a connector (not shown) which is preferably placed as close to the P-Bus connector 74 as possible.

Connector

Each connector 74 (FIG. 32) used to connect a processor board 32, 34 to the P-Bus backplane 35 is a metric connector with four rows and 2.0 mm between pins. Two connectors 74 are used for connecting to the P-Bus. A 56-position connector (with 4 pins per position) is used for the P-Bus signal connections. It occupies positions 1–56 of the available 138 connector positions on the circuit board. A separate 12-position connector interfaces with the power supply.

CPU Module

As set forth above, the CPU 70 of each processor board 32, 34 is an Intel i960CF RISC processor in the illustrated embodiment. Each processor board includes up to 3 megabytes of Flash memory 50 and 16 megabytes of DRAM 52, which is enough to allow each board to act as a stand alone multiprotocol router.

The interface for the DRAM memory 82 has been optimized for use with the i960 CPU. For instruction fetches using burst memory accesses from the DRAM 52, the memory access bandwidth is about 70 megabytes per second. When executing from the internal instruction cache of the i960CF, the access time is even faster. The DRAM access bandwidth is allocated entirely to the main CPU 70.

RISC CPU Processor

The i960CF processor 70 has a 32-bit address bus and a 32-bit data bus 84, plus four byte enable lines which select one or more bytes from the 32-bit data word. A single line is used for Read/Write control. The i960CF processor 70 also has an internal 4K instruction cache, 1K of internal data RAM, a 1K data cache configured to serve as additional internal RAM, an integrated interrupt controller and a 4-channel DMA controller 68.

The top four address bits (A31–A28) divide the address space into 16 regions. Each region can be programmed for different access requirements, such as bus size, wait states and normal/burst access. For example, region 0 (00000000–0FFFFFFF), which addresses the data RAM inside the i960 processor 70, is programmed for a 32-bit bus, zero wait states and burst access.

A normal bus access for the i960 CPU 70 takes two clocks. During the first clock cycle, the address and address strobe are asserted, During the second clock, the corresponding data is read or written. A built-in wait state generator can extend a cycle for peripherals that need more access time, or a memory region can be configured so that the CPU 70 will wait for a Ready response before completing the cycle. Both methods are used on the IRP board. For example, the peripherals on the 8-bit bus use programmed wait states, while DRAM accesses wait for a Ready response.

Interrupt Controller

The Interrupt Controller in the i960 CPU 70 is configured to handle 9 dedicated external interrupts, plus the internal interrupts from the DMA controller. There are eight maskable interrupt pins and one non-maskable interrupt (NMI) on the i960CF. These pins have been assigned to the functions as shown in FIG. 31. The priority of these interrupts is set by the application program, except for the NMI, which is always the highest priority.

As FIG. 31 shows, there are four possible reasons for an NMI interrupt. When an NMI occurs, the software must read the status bits from the Control/Status register (not shown) to determine the source of the interrupt.

DMA Controller

The i960CF CPU 70 has an integrated 4-channel DMA controller 68. For each channel, there are pins available for DMA requests (DREQ), DMA acknowledge (DACK), transmit terminal count (TC) and receive End-of-Process (EOP). All four DMA channels are used for transferring data between buffer memory 62 and the P-Bus 10.

FIFO

A bi-directional synchronous First In First Out (FIFO) memory 64 is preferably used as a communication buffer to handle packet transfers to and from the P-Bus. The FIFO 64 used has 2 KByte of RAM organized as two 256×36-bit memory arrays. The FIFO 64 is divided into 2 sections, an A port and a B port. The A port is connected to the processor side which is under control of the DMA controller 66 and the i960 processor's DMA-controller 68. Under normal conditions, the CPU DMA-controller is configured for the quad word fly-by transfer mode of operation to maximize the data transfer rate between the FIFO 64 and system memory 82. The width of the FIFO 64 should be sufficient for transfer of data to and from the memory 82 as well as to and from the backplane 74. In the disclosed embodiment, the depth of the FIFO 64 allows for 64 packets of data on the processor side (128 bits each) and 82 packets of data on the backplane side (96 bits each). The 32-bit word length provides a simple conversion between the 128-bit packets on the processor side and the 96-bit packets on the backplane side. To simplify transfers, the backplane side and the processor side could use equal-size packets.

Port B is connected to transceivers 92 and is controlled with the P-Bus controller 66. The A port is clocked using the buffered processor clock, and the B port is clocked with the bus clock. Only 34 out of 36 data bits of the FIFO are used, 32 bits for processor data and 1 bit for a packet termination flag in each direction. Of course, other sizes of FIFO and other types of memory can also be used.

Interface to Other Modules

The CPU module 36 interfaces with the P-Bus and the Network Interfaces (IFB). These interfaces are discussed in the following sections.

P-Bus Interface Signals

The P-Bus interface module 38 consists of the bidirectional FIFO 64 for sending and receiving data; the P-Bus controller, which implements the P-Bus command/response protocol; and the bank of BTL transceivers 92 for sending and receiving data on the P-Bus.

The P-Bus interface 38 to the CPU module 36 uses the signals as set forth in FIG. 33.

Network Interface Signals

There are several different types of network interface modules (IFB) including Ethernet, Token Ring, Serial (V.35 and V.11), FDDI and ISDN. Each processor board 32, 34 contains up to two network interfaces (IFB). The most common boards have two identical interfaces, but different interfaces on the same board are allowed.

For each network interface (IFB), the number of physical network connections varies from one (e.g., for FDDI) to four (e.g., for Ethernet) or more.

Arbiter Expansion Card

A processor board is converted into a Master Network Processor (MNP) 34 by plugging in an Arbiter expansion card 54. The expansion card contains additional P-Bus interface circuitry to allow the MNP 34 to control the Packet Bus.

The Arbiter expansion card 54 contains the 20 MHz master oscillator clock for the P-Bus. The oscillator drives a buffer to create four copies of the master clock that are divided among all the slots on the backplane 35 (FIG. 32), as shown in FIG. 14.

Figure 15A:
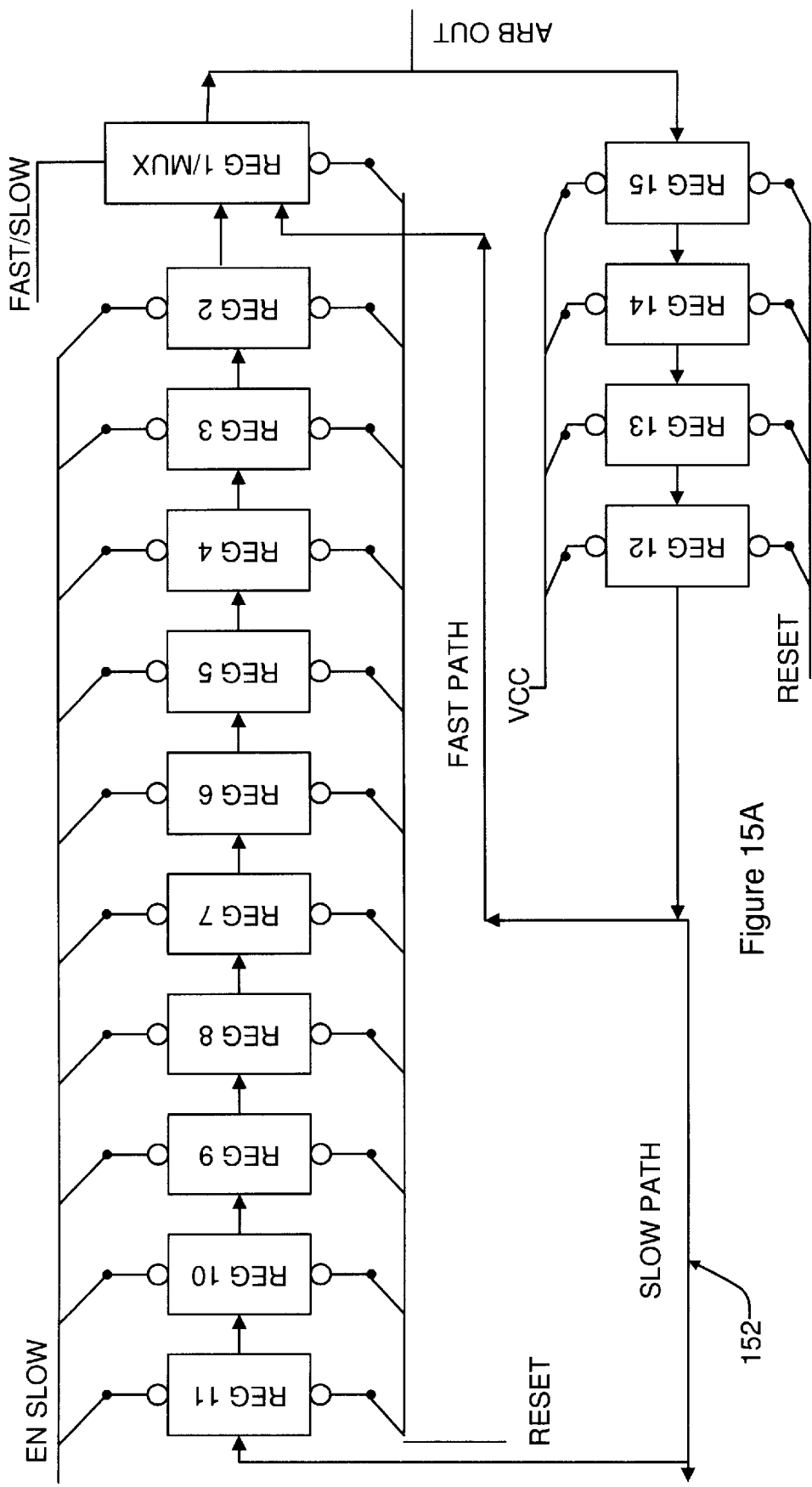
FIG. 15 is a schematic block diagram of the arbitration board of the router of FIG. 2.
Figure 15B:
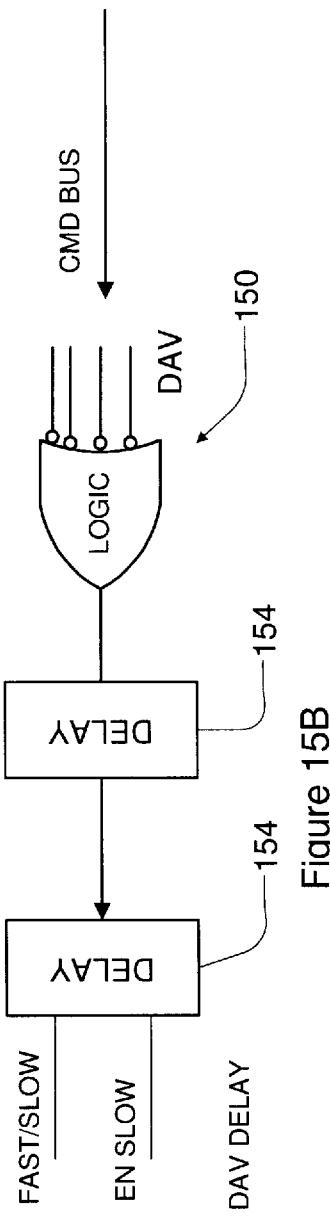

As shown in FIGS. 15A and 15B, the Arbiter expansion card 54 contains logic 150 (FIG. 15B) that monitors the CMD bus. Based on the traffic on that bus, logic 152 (FIG. 15A) generates a selection sequence on the ARB bus that chooses which slot has control of the P-Bus on each clock. More specifically, the arbitration board 54 keeps track of the boards that actively transmitted a command (as opposed to the default NOP) when their slot was last selected on the ARB bus. These are considered to be the active boards for the next selection cycle.

The logic 152 comprises 15 registers 1–15 which are coupled into a circular parallel output shift register. That is, the parallel output of each register is coupled to the input of the next register of the circle. The output of register 1, in addition to being coupled to the input of register 15, is coupled to the ARB bus of the P-bus 10. Upon initiation, a unique slot number is written into each register such that slot number 1 is written into register 1, slot number 2 is written into register 2, etc. Thereafter, once each clock cycle, the contents of each register is shifted into the next register of the circle. In this manner, the output of register 1 and thus the slot number outputted onto the Arbitration bus ARB changes each clock cycle.

As shown in FIG. 15A, the register 1 is also a multiplexer having one input coupled to the output of the register 2 and the other input coupled to the output of register 12. Whether the register 1 selects the output of the register 2 or the output of the register 12 is determined by the multiplexer selection input FAST/SLOW which is generated by the logic 150 of FIG. 15B. The logic 150 monitors the Command bus CMD of the P-Bus. If the CMD bus carries a DAV command indicating that the processor which issued that command is active, the logic 150 after a predetermined delay provided by delay elements 154 will cause the FAST/SLOW multiplexer select signal to go to a logic state designated "FAST". In response, the register 1 will input the output of the register 12 via the "Fast Path" rather than the output of the register 12. The delay provided by the logic circuit 150 is selected so that by the time that the FAST/SLOW multiplexer select signal changes to the "FAST" state, the slot number of the processor which issued the DAV command which was detected by the logic circuit 150 reaches the register 12 and be output by the register 12. As a consequence, the slot number of the DAV issuing processor jumps to the head of the line (via the Fast Path) and is output by the register 1 onto the ARB bus to select the active processor slot again.

Alternatively, if the CMD bus carries a command other than DAV, indicating that the processor which issued that command is (or will be) inactive, the logic 150 after the predetermined delay provided by delay elements 154 causes the FAST/SLOW multiplexer select signal to go to the other logic state designated "SLOW." At that time, the slot number currently outputted by the register 12 corresponds to the inactive processor board which issued the non-DAV command. In response to the multiplexer select signal, "SLOW," the register 1 loads the output of the register 2 rather than the output of the register 12. In addition, an EN SLOW (enable slow) output of the logic circuit 150 is also active which causes the output of each register of the registers 11 to 1 to shift to the next register in the circle. As a consequence, the output of the register 12 is shifted (via the "slow path") to the register 11 rather than the register 1. Each time the logic circuit 150 detects an inactive processor, the slot number of that processor is shifted from the register 12 to the register 11 and the slot numbers in the registers 11 to register 1 are similarly shifted to the next register in the line.

The slot numbers of the active processors circulate in the circle of five registers 1 and 12–15 so that the active processor has its slot number output on the ARB bus once every five clock cycles as long as the processor stays active. Once the processor becomes inactive, the slot number of the inactive processor is shifted to the register 11. Each time the logic circuit 150 detects another inactive processor, the slot numbers of the inactive processors carried by registers 11 to 2 are shifted one at a time to the register 1 and onto the ARB bus.

Thus, it is seen that during a selection cycle, the ARB bus selects each active board slot on consecutive clocks, followed by one inactive board slot. If there are fewer than 4 active boards, additional inactive boards are selected to create a minimum cycle of 5 clocks. On each following selection cycle, the active boards from the previous cycle are selected, followed by a new inactive board slot. In this way, all board slots are repeatedly selected, but processor boards that use the CMD bus when their slot is selected on the ARB bus are granted P-Bus access more often than those boards that issue NOP commands when their slot is selected. In the illustrated embodiment, the minimum time between consecutive selections for an active processor board is 5 clocks (250 ns). For an inactive processor board, the maximum delay until its next selection is 2700 ns assuming a maximum of 4 active processor boards.

Preferably, the data paths carry an extra bit for a parity check. If a parity check indicates that a slot number has been corrupted, then the registers are preferably reloaded with correct slot numbers.

The logic circuits 150 and 152 are implemented by PALs in the illustrated embodiment. Examplar equations for the Arbitration board PALs are provided in Appendix A.

The Arbiter expansion card has control over the 6-bit redundancy bus RED. Based on analysis of test packets, the MNP can force a reconfiguration of the 96-bit DATA bus into a 64-bit bus, or it can force a switchover of the control buses to the alternate set.

The Arbitration connector contains two rows of 20 pins each. Along with power and ground, it carries the signals as set forth in FIG. 34.

Enhancements and Improvements

One way to improve bus throughput is to allow for multiple connections between data devices. Three improvements to the above-described data communication system are presented. First, each data device could be designed to set up multiple connections (for example up to 4) to other data devices. Second, the data devices could be enabled to perform simultaneous transmit/receive (bi-directionality). This would eliminate some collisions. Third, a broadcasting feature can be implemented, wherein a data source device transmits data to all of the data destination devices at once.

In implementing the multiple-connection feature, a high speed memory is preferred, such as a SRAM. The multiple-connection improvement may be implemented by allowing reception of packets during transmit. This method reduces the number of channel NAKs for cases when a data device has established connection to another data device (slot n to slot m), since another board can set up a channel to the transmitter (slot p to slot n). This implementation is preferably achieved by using two or three bi-directional FIFOs, an external DMA and appropriate changes to the transmit and receive logic of the interface circuit.

In the illustrated embodiment, it takes about 10 μsec to receive a packet over the bus. If, in a data destination device, dependencies between the backplane side and the processor side are eliminated, more packets can be pushed into the data destination device's FIFO. Assuming that the processor circuit can at least match the rate, this results in less packet rejection and higher throughput.

Another way to increase bus speed is to separate the device driver from data and use two different banks to store code and data. Using EDRAM technology and an external row comparator, code access within the code bank will have a higher chance of cache hits as well as the data buffers located in data bank.

One more way to increase speed is to use hardware memory allocation. By using a sequential access memory on the backplane side, random access memory on the processor side and a FIFO to keep track of the end-of-packet pointers, software can easily pop the location of the next packet in the memory from the pointer FIFO. The packet can be analyzed and the buffer pointer can be used on the transmitter side for packet transmit.

It is seen from the above that the present invention permits access to the bus by more than one channel between a data source and a data destination at a time. Such an arrangement has been found to substantially increase the effective data throughput of the bus without necessitating increases in the clock speed of the bus.

While the description above refers to particular embodiments of the present invention, it will be understood that many modifications may be made without departing from the spirit thereof. The accompanying claims are intended to cover such modifications as would fall within the true scope and spirit of the present invention.

For example, although the CPU of the illustrated embodiment has been described as a particular type of microprocessor, other types of processors and mircoprocessors having on-board and separate DMA circuitry may be used. Similarly, although controllers have been implemented in the illustrated embodiment by programmed PAL circuits, other types of logic circuits including microprocessors, ASIC circuits, discrete logic and the like may be used. Furthermore, although memory circuits of the illustrated embodiment have been described as DRAM other types of memory devices such as SRAM, ROM EDRAM, FRAM, EEROM etc. may be used. Also, the sizes, numbers, and specifications of the various components have been provided for illustration purposes and it should be appreciated that other sizes, numbers and specifications may also be used, depending upon the particular application.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

GLOSSARY

| | |
|---|---|
| Access | ascom Timeplex multiprotocol |
| AE1 | P-Bus FIFO Almost Empty flag for Transmit buffer. |
| AE2 | P-Bus FIFO Almost Empty flag for Receive buffer. |
| BBRAM | Battery backed-up RAM |
| BITE | Built-in monitor and test program |
| BOARDP | This bit distinguishes between MRNPs and RNPs. Logic zero indicates that an arbitration controller board is installed with this board (MRNP). This logic also allows the software to modify the Redundancy Control Register. |
| DACK | DMA Acknowledge |
| DCE | Data Communications Equipment |
| DMA | Direct Memory Access |
| DREQ3:0 | DMA request to processor. DMA channel 0 and 1 are dedicated to transmit and DMA channel 2 and 3 reserved for receive. |
| DTE | Data Terminal Equipment |
| EOP | End Of Process |
| EPROM | Erasable Programmable Read-Only Memory |
| FDDI | Fiberoptic Distributed Data Interface |
| FIFO | First In First Out memory |
| Flash | Electrically erasable non-volatile memory |
| GEO0:3 | Geographical address. CPU can identify which slot it is seated. |
| HSSI | High Speed Serial Interface |
| ID PROM | Programmable Read-only memory containing the serial number, part number and revision information for the board. |
| IFB | InterFace Board |
| IPB | Interface Processor Board |
| IRP | Independent Routing Processor |
| ISDN | Integrated Service Digital Network |
| MPB | Master Processor Board |
| MRXIDLE | PBus Manager receive state machine idle. |
| MTXIDLE | PBus Manager transmit state machine idle. |
| NINDY | Intel-developed debugger/monitor |
| NMI | Non-maskable interrupt |
| P-Bus | Packet Bus |
| PLD | Programmable logic device |
| PRXIDLE | PBus control receive state machine idle. |
| PTXIDLE | PBus control receive state machine idle. |
| RAM | Random access (read/write) memory |
| RDMASEL | Receive DMA channel number. Channel 2 corresponds to RDMASEL equal to logic 0 and channel 3 co-respond to RDMASEL equal to logic 1. |
| RISC | Reduced instruction set computer |
| Router | Routing Network processor |
| RTC | Real time clock |
| RXEDMA | Logic one indicates that receive DMA state machine is in IDLE. |
| RXEN | RX Enable indicates P-Bus is ready in receive mode. |
| RXIDLE | Receive state machine is in IDLE. |
| SIMM | Single in-line memory module |
| TC | Terminal Count |
| TXEDMA | Logic one indicates that the transmit DMA state machine is in IDLE. |
| TXEN | TX Enable indicating P-Bus is in transmit mode. |
| UART | Serial interface IC |
| V.11 | A wide Area Network Interface protocol |
| V.35 | Another wide Area Network Interface protocol. |
| WAN | Wide area network |

APPENDIX A

```
module ADDCOM                                           " PAGE 1
ADDCOM DEVICE      'P22V10';

"*************************************************************************
"
"              PBUS ADDRESS COMPARATOR   PAGE 14
"
"
" PBus ADDresss and GEOgraphical is compared for equality. If mactched,
"
" RXADDR is asserted.  TXADDR is asserted if SEQ (ARB) is equal to GEO.
"
"  © 1993, 1994, ascom Timeplex Trading AG. All rights reserved.
"
"*************************************************************************
"              PBUS ADDRESS COMPARATOR
"
" INPUTS ATE_OE              pin  22;       "Automatic Test Equipment OE GEO3, GEO2, GEO1, GEO0  pin 4, 3, 2, 23;    " PBUS GEOgraphical address ADD3, ADD2, ADD1, ADD0  pin 8, 7, 6, 5;     " PBUS ADDress bus SEQ3, SEQ2, SEQ1, SEQ0  pin 13, 11, 10, 9;  " PBUS SEQuence Bus (ARB. bus)

RX                  pin 14;        " PBUS is in receive mode.

LREADY              pin 15;        " Data latches are ready for
                                   " new data.

CMDDAV              pin 17;        " if PBus command is DAV or
                                   " LDAV on the last cycle.

clock   pin 1;
"*************************************************************************
" OUTPUTS RXADDR              pin 19;        " GEO==ADD then LOGIC 1

TXADDR              pin 18;        " GEO==SEQ then LOGIC 1

LRXADDR             pin 21;        " LATCHED RX ADDRESS

LTXADDR             pin 20;        " LATCHED TX ADDRESS

" made active low (LBABC) 12-28-92

!LBABC              pin 16;        " Latch Bside A-B-C port
```

A1

```
"******************************************************************
"                PBUS ADDRESS COMPARATOR              PAGE 2
"
" VARIABLE ASSIGNMENTS  for

VCC = 1;

GEO = [GEO3, GEO2, GEO1, GEO0];

ADD = [ADD3, ADD2, ADD1, ADD0];

SEQ = [SEQ3, SEQ2, SEQ1, SEQ0];

"******************************************************************
"

equations

"
 RXADDR.OE    = ATE_OE;
 TXADDR.OE    = ATE_OE;
 LTXADDR.OE   = ATE_OE;
 LRXADDR.OE   = ATE_OE;
  LBABC.OE    = ATE_OE;

RXADDR  = (ADD == GEO);  " & !RXADDR_LATCH;

TXADDR  = (SEQ == GEO);

LTXADDR := TXADDR.FB;

LRXADDR := RXADDR.FB;

LRXADDR.CLK = clock;

LTXADDR.CLK = clock;

"
" If PBUS is in receive mode, data latches are empty (loaded into FIFOs) and
"
" PBUS ADDress matches the GEOgraphical address, LBABC will be asserted to
"
" latch data on PBUS backplane into B side of the A, B and C data ports.
"
" This logic is independant of PBUS command-bus status.
"
"
" 10-7-93
"     Also if the command is DAV or LDAV then latch B side of T/R

LBABC := RX & LREADY & (ADD == GEO) & CMDDAV;
```

LBABC.CLK = clock;

end

```
module CMD                              " PAGE 1

CMD DEVICE      'MACH220A';

"
" 08-26-93
"--------
"      Unrecoverable error (UNREC_ERR) has been changed.  No need to blcok
"   Rx machine in case of Rx errors (NOPOV OR WDTOV) since the PBus FIFO
"   will be flushed in case of these conditions.  RX DMA controller also
"   returns to its IDLE state. The only time receive should be blocked is
"   when an incomplete transfer (Tx) has happened (C+DAVNAK).
"
"09-16-93
"--------
"     BOARDP shall not effect VOTEREG since non-master boards need to
"   read this register.
"
"    © 1993, 1994  ascom Timeplex Trading AG. All right reserved.
"**************************************************************************
"
"            PBUS command register
"
"
" INPUTS ATE_OE                pin 62; " Automatic Test Equipmet Output Disable TXDONE                pin 51; " clears command register. and allows
                              " for next packet transmission
!PRST                 pin 65;

!BLAST      pin   59;        " Buffered Last

!ADS        pin   13;

CWRITE      pin   28;

A8, A9, A10, A28, A29, A30, A31    pin 26, 9, 10, 11, 49,50, 17  ; " CPU address lines !BOARDP     pin   60 ;   " Arbitration board present.

"!ADDRE      pin 20;  PBus address enable every time command Packet Bus .

"
" The following transmit flags are valid only for one PBus clock cycle
" during TXDONE asserted and HOLD_STAT not asserted.
"

RDMASEL               pin 3; " Which DMA channel used on receive.
                             " (Receive DMA SELect)

FDISC                 pin 58; "Flag DISConect
```

A4

| | |
|---|---|
| FEMPTY | pin 43; "Flag EMPTY |
| FDAVNAK | pin 44; "Flag incomplete packet Tx |
| FCHNNAK | pin 57; "Flag Busy |
| HOLD_STAT | pin 54; "Since TXDONE is 2 cycles long and "Flags are only one cycle long, " HOLDSTAT controls the latch. |
| FNOPOV | pin 45; "Flag receive time out on PKT recept. |
| WDTOV | pin 41; "Flag watch Dog Timer on Rx |
| FRXSPR1 | pin 64; |
| RXDONE | pin 40; " Rx done. (Not the DMA!) |
| PBUS_CLK | pin 15; " PBUS CLOCK |
| CPU_CLK | pin 16; " CPU CLOCK |

A5

```
"***********************************************************************
" OUTPUTS

CPUC3, CPUC4, CPUC5, CPUC6      pin 38, 37, 36, 14 ; " transmit slot No.

GO_OUT      pin  56       istype 'reg';  " state packet transmit
" GO        pin  56       istype 'reg';  state packet transmit GO          node          istype 'reg';

TXDMANO     PIN  55       istype 'reg'; " TX DMA channel No.

REMRST      PIN  12       istype 'reg'; " Remote reset command

D7, D6, D5, D4, D3, D2, D1, D0  pin  29, 47, 46, 48, 33, 32, 31, 30 istype 'COM'; "CPU data bus !PBCMD_WR       pin 7   istype 'reg,invert';

!PBCMD_RD       pin 5   istype 'REG,invert';

!VOTEREG        pin  4  istype 'reg,invert';   " PBus vote register. Only accessed on Master
                " Processor Boards, MPBs. 3000001XX !GSTAT          pin  23 istype 'REG,invert';   " PBus status register.  3000002XX !PBCNTL1        pin  22 istype 'reg,invert';   " PBus control register. 30000030X-30000037X !PBCNTL2        pin  25 istype 'reg,invert';   " PBus control register. 30000030X-30000037X !TXSTAT         NODE    istype 'REG,invert';   " PBus transmit status reg. 3000004XX !RXSTATA        NODE    istype 'REG,invert';   " PBus receive status reg. 3000005XX
!RXSTATB        NODE    istype 'REG,invert';   " PBus receive status reg. 3000005XX PKT_RCV_STAT    NODE    istype 'reg,invert';

ERROR_RST       NODE    istype 'reg,buffer';

!FIFO           pin  63 istype 'reg,invert';

CHIP_OE         pin   6 istype 'com,buffer';

!PBUSDE         pin   2 istype 'reg,INVERT';       " PBus bufffered 8bit Data Enable dummy           node    istype 'com,buffer'; " to force BOARDP to be an input 9/16/93

TXD0, TXD1, TXD2, TXD3, TXD4  node istype 'reg,buffer';

"       STATUS A RX Dn

SA_RXD0, SA_RXD1, SA_RXD2      node istype 'reg,buffer';
SB_RXD0, SB_RXD1, SB_RXD2      node istype 'reg,buffer';
```

```
"RXSTAT_RST      pin 66 istype 'reg';

PKT_RCVED1      PIN 67 istype 'REG,BUFFER';
PKT_RCVED2      PIN 39 istype 'REG,BUFFER';

BOTH_PKT_RCVED   pin 21   istype 'com, buffer'; " both Rx DMAs used up. (RXWAIT)

UNREC_ERR       pin     istype 'reg_T,buffer'; " in case of unrecoverable errors
                               " this bit will be set for RX dis
```

```
"****************************************************************
"              PBUS ADDRESS COMPARATOR          PAGE 2
"
" VARIABLE ASSIGNMENTS for

VCC = 1;

Z = .Z.;
X = .X.;
c = .c.;
cp = [CPU_CLK];

PBUS_ADDR    = [CPUC6, CPUC5, CPUC4, CPUC3];

CPUDATA      = [D7, D6, D5, D4, D3, D2, D1, D0];

CPUADDR      = [A10, A9, A8];

REGIONADDR   = [A31, A30, A29, A28];

PBUS_REGION  = [ 0, 0, 1, 1];   " 960-PBUS REGION ASSIGNMENT

FIFO_REGION  = [ 0, 1, 1, 1];   " 960-PBUS REGION ASSIGNMENT

"****************************************************************
"
equations
"
"            OUPUT ENABLE TERMS GO_OUT.OE     = ATE_OE;
TXDMANO.OE    = ATE_OE;
REMRST.OE     = ATE_OE;
CHIP_OE.OE    = ATE_OE;
PKT_RCVED1.OE = ATE_OE;
PKT_RCVED2.OE = ATE_OE;
PBCMD_WR.OE   = ATE_OE;
PBCMD_RD.OE   = ATE_OE;
VOTEREG.OE    = ATE_OE;
GSTAT.OE      = ATE_OE;
PBCNTL1.OE    = ATE_OE;
PBCNTL2.OE    = ATE_OE;
FIFO.OE       = ATE_OE;
PBUSDE.OE     = ATE_OE;

CPUC6.OE      = ATE_OE;
CPUC5.OE      = ATE_OE;
CPUC4.OE      = ATE_OE;
CPUC3.OE      = ATE_OE;

PBUS_ADDR.C   = CPU_CLK;
```

```
GO_OUT.C      = PBUS_CLK;
GO.C          = CPU_CLK;
REMRST.C      = CPU_CLK;

PBCMD_WR.C    = CPU_CLK;
PBCMD_RD.C    = CPU_CLK;
VOTEREG.C     = CPU_CLK;
GSTAT.C       = CPU_CLK;
PBCNTL1.C     = CPU_CLK;
PBCNTL2.C     = CPU_CLK;
TXSTAT.C      = CPU_CLK;
RXSTATA.C     = CPU_CLK;
RXSTATB.C     = CPU_CLK;
PKT_RCV_STAT.C = CPU_CLK;
ERROR_RST.C   = CPU_CLK;
FIFO.C        = CPU_CLK;
PBUSDE.C      = CPU_CLK;

TXD0.C = PBUS_CLK;
TXD1.C = PBUS_CLK;
TXD2.C = PBUS_CLK;
TXD3.C = PBUS_CLK;
TXD4.C = PBUS_CLK;

SA_RXD0.C = PBUS_CLK;
SA_RXD1.C = PBUS_CLK;
SA_RXD2.C = PBUS_CLK;

SB_RXD0.C = PBUS_CLK;
SB_RXD1.C = PBUS_CLK;
SB_RXD2.C = PBUS_CLK;

PKT_RCVED1.C  = PBUS_CLK;
PKT_RCVED2.C  = PBUS_CLK;

UNREC_ERR.C   = PBUS_CLK;
```

```
CPUC3 := D0.PIN      & PBCMD_WR.FB
      # CPUC3.FB     & !PBCMD_WR.FB;

CPUC4 := D1.PIN      & PBCMD_WR.FB
      # CPUC4.FB     & !PBCMD_WR.FB;

CPUC5 := D2.PIN      & PBCMD_WR.FB
      # CPUC5.FB     & !PBCMD_WR.FB;

CPUC6 := D3.PIN      & PBCMD_WR.FB
      # CPUC6.FB     & !PBCMD_WR.FB;

GO    := D4.PIN      & PBCMD_WR.FB & !TXDONE & !PRST
      # GO           & !PBCMD_WR.FB & !TXDONE & !PRST;

GO_OUT := GO & !TXDONE;

TXDMANO := D5.PIN    & PBCMD_WR.FB
        # TXDMANO.FB & !PBCMD_WR.FB;

REMRST := D6.PIN     & PBCMD_WR.FB & !PRST
       # REMRST.FB   & !PBCMD_WR.FB & !PRST;
"
" ADDRESS        READ    WRITE      ABSOLUTE
" 10 9 8                            ADDRESS
"==========================================================================
" 0 0 0          PBCMD_WR PBCMD_RD   3XXXX000-0FF
" 0 0 1          VOTEREG  VOTEREG    3XXXX100-1FF
" 0 1 0          GSTAT    ERROR_RST  3XXXX200-2FF
" 0 1 1          RXSTATA  PBCNTL1    3XXXX300-3FF
" 1 0 0          TXSTAT              3XXXX400-4FF
" 1 0 1                              3XXXX500-5FF
" 1 1 0          RXSTATB  PBCNTL2    3XXXX600-6FF
" 1 1 1          PKT_RCV_STAT        3XXXX700-7FF
"
"
" NOTE : FIFO IS AT ADDRESS 70000000 hex
"
PBUSDE := (REGIONADDR == PBUS_REGION) & ADS
       # PBUSDE.FB & !ADS & !BLAST;

PBCMD_WR := CWRITE & (PBUS_REGION == REGIONADDR) & (CPUADDR == 0) & ADS
         # PBCMD_WR.FB & !ADS & !BLAST;

PBCMD_RD := !CWRITE & (PBUS_REGION == REGIONADDR) & (CPUADDR == 0) & ADS
         # PBCMD_RD.FB & !ADS & !BLAST;

VOTEREG := (PBUS_REGION == REGIONADDR) & (CPUADDR == 1) "& BOARDP" & ADS
        # VOTEREG.FB & !ADS & !BLAST;

GSTAT   := !CWRITE & (PBUS_REGION == REGIONADDR) & (CPUADDR == 2) & ADS
        # GSTAT.FB & !ADS & !BLAST;
```

A10

```
GSTAT     := !CWRITE & (PBUS_REGION == REGIONADDR) & (CPUADDR == 2) & ADS
           # GSTAT.FB & !ADS & !BLAST;

ERROR_RST:= CWRITE & (PBUS_REGION == REGIONADDR) & (CPUADDR == 2) & ADS
          # ERROR_RST.FB & !ADS & !BLAST;

PBCNTL1  := CWRITE & (PBUS_REGION == REGIONADDR) & (CPUADDR == 3) & ADS
          # PBCNTL1 & !ADS & !BLAST;

PBCNTL2  := CWRITE & (PBUS_REGION == REGIONADDR) & (CPUADDR == 6) & ADS
          # PBCNTL2 & !ADS & !BLAST;

TXSTAT   := !CWRITE & (PBUS_REGION == REGIONADDR) & (CPUADDR == 4) & ADS
          # TXSTAT.FB & !ADS & !BLAST;

RXSTATA  := !CWRITE & (PBUS_REGION == REGIONADDR) & (CPUADDR == 3) & ADS
          # RXSTATA.FB & !ADS & !BLAST;

RXSTATB  := !CWRITE & (PBUS_REGION == REGIONADDR) & (CPUADDR == 6) & ADS
          # RXSTATB.FB & !ADS & !BLAST;

PKT_RCV_STAT := !CWRITE & (PBUS_REGION == REGIONADDR) & (CPUADDR == 7) & ADS
             # PKT_RCV_STAT.FB & !ADS & !BLAST;

FIFO     := (FIFO_REGION == REGIONADDR) & (CPUADDR == 3) & ADS
          # FIFO & !ADS & !BLAST;

CHIP_OE = !CWRITE & (PBUS_REGION == REGIONADDR) & (CPUADDR == 4) " TXSTAT
        # !CWRITE & (PBUS_REGION == REGIONADDR) & (CPUADDR == 6) "
        # !CWRITE & (PBUS_REGION == REGIONADDR) & (CPUADDR == 0) "
        # !CWRITE & (PBUS_REGION == REGIONADDR) & (CPUADDR == 3) "
"       # !CWRITE & (PBUS_REGION == REGIONADDR) & (CPUADDR == 2)  GSTAT
        # !CWRITE & (PBUS_REGION == REGIONADDR) & (CPUADDR == 7); " PKT RCVED

CPUDATA.OE   = CHIP_OE & ATE_OE;

TXD0 := FDISC  & TXDONE & !HOLD_STAT
        # TXD0.FB & !TXDONE
        # TXD0.FB & HOLD_STAT;

TXD1 := FEMPTY & TXDONE & !HOLD_STAT
        # TXD1.FB & !TXDONE
        # TXD1.FB & HOLD_STAT;

TXD2 := FDAVNAK & TXDONE & !HOLD_STAT
        # TXD2.FB & !TXDONE
        # TXD2.FB & HOLD_STAT;

TXD3 := FCHNNAK & TXDONE & !HOLD_STAT
        # TXD3.FB & !TXDONE
        # TXD3.FB & HOLD_STAT;

TXD4 := TXDMANO & TXDONE & !HOLD_STAT
        # TXD4.FB & !TXDONE
```

A 11

```
            # TXD4.FB & HOLD_STAT;

"
" PKT_RCVED1 : indicates that a packet has been received on DMA2
" PKT_RCVED2 : indicates that a packet has been received on DMA3
"
" These bits need to be cleard when software reads the status register.
" Until than, RX machine will be blocked.  This prevents lockups at the RX side.
"
"
"

PKT_RCVED1 :=  RXDONE & !RDMASEL             & !RXSTATA.FB
            #  RXDONE &  RDMASEL & PKT_RCVED1.FB & !RXSTATA.FB
            # !RXDONE & PKT_RCVED1.FB           & !RXSTATA.FB;

PKT_RCVED2 :=  RXDONE &  RDMASEL             & !RXSTATB.FB
            #  RXDONE & !RDMASEL & PKT_RCVED2.FB & !RXSTATB.FB
            # !RXDONE & PKT_RCVED2.FB           & !RXSTATB.FB;

BOTH_PKT_RCVED = PKT_RCVED1.FB & PKT_RCVED2.FB
            # UNREC_ERR.FB          ; " DISABLING RECEIVE STATE MACHINE

UNREC_ERR.T = TXDONE & FDAVNAK & !UNREC_ERR.FB & !HOLD_STAT "TX ERR SET TERM

# ERROR_RST.FB    & UNREC_ERR.FB        "SOFTWARE RST TRM
            # PRST           & UNREC_ERR.FB;

"     STATUS 'A' RECEIVE

SA_RXD0 := !RDMASEL & FNOPOV    & RXDONE
         #         SA_RXD0.FB & !RXDONE
         # RDMASEL & SA_RXD0.FB & RXDONE;

SA_RXD1 := !RDMASEL & WDTOV     & RXDONE
         #         SA_RXD1.FB & !RXDONE
         # RDMASEL & SA_RXD1.FB & RXDONE;

SA_RXD2 := FRXSPR1;  " THIS LINE IS RXIDLE

"     STATUS 'B' RECEIVE

SB_RXD0 := RDMASEL & FNOPOV    & RXDONE
         #         SB_RXD0.FB & !RXDONE
```

```
      # !RDMASEL & SB_RXD0.FB & RXDONE;

SB_RXD1 := RDMASEL & WDTOV    & RXDONE
       #          SB_RXD1.FB & !RXDONE
       # !RDMASEL & SB_RXD1.FB & RXDONE;

SB_RXD2 := FRXSPR1;   " THIS LINE IS RXIDLE

"
"

D0 = TXD0.FB        & TXSTAT.FB
     # SA_RXD0.FB     & RXSTATA.FB
     # SB_RXD0.FB     & RXSTATB.FB
     # CPUC3.FB       & PBCMD_RD.FB
     # PKT_RCVED1.FB  & PKT_RCV_STAT.FB;

D1 = TXD1.FB        & TXSTAT.FB
     # SA_RXD1.FB     & RXSTATA.FB
     # SB_RXD1.FB     & RXSTATB.FB
     # CPUC4.FB       & PBCMD_RD.FB
     # PKT_RCVED2.FB  & PKT_RCV_STAT.FB;

D2 = TXD2.FB        & TXSTAT.FB
     # SA_RXD2.FB     & RXSTATA.FB
     # SB_RXD2.FB     & RXSTATB.FB
     # CPUC5.FB       & PBCMD_RD.FB
     # BOTH_PKT_RCVED.FB & PKT_RCV_STAT.FB;

D3 = TXD3.FB        & TXSTAT.FB
     # CPUC6.FB       & PBCMD_RD.FB
     # UNREC_ERR.FB   & PKT_RCV_STAT.FB;

D4 = TXD4.FB        & TXSTAT.FB
     # GO             & PBCMD_RD.FB;

D5 = TXDMANO.FB & PBCMD_RD.FB;

D6 = REMRST.FB  & PBCMD_RD.FB;

D7 =            PBCMD_RD.FB;  " READS LOGIC 1 FOR NOW test_vectors  (

[cp,!PRST,CWRITE,REGIONADDR,CPUADDR,!ADS, !BLAST,ATE_OE]->[!PBCNTL1,
!PBCNTL2,!FIFO])
[c ,  0,  X ,  0   ,  0 , X,  X,  1 ]->[ 1  ,   1  ,  1 ]; "1
[c ,  0,  X ,  0   ,  0 , X,  X,  1 ]->[ 1  ,   1  ,  1 ]; "1
[c ,  1,  1 ,  7   ,  3 , 0,  1,  1 ]->[ 1  ,   1  ,  0 ]; "1
```

A-13

```
[c , 1 , 1 , 7  , 3 , 1 , 1 , 1 ]->[ 1  ,  1 ,  0 ]; "1
[c , 1 , 1 , 7  , 3 , 1 , 1 , 1 ]->[ 1  ,  1 ,  0 ]; "1
[c , 1 , 1 , 7  , 3 , 1 , 0 , 1 ]->[ 1  ,  1 ,  1 ]; "1
[c , 1 , 1 , 7  , 3 , 1 , 1 , 1 ]->[ 1  ,  1 ,  1 ]; "1
``` end

```
module DMA                               " PAGE 1

DMA DEVICE      'MACH220A';

"
" 07-26-93
" -------
"
"    WDTOV test.
"

"08-20-93
"-------
"
"    There is no need for WDTOV to generate an interrupt since WDTOV
"  forces the RX SM to assert LDAVRX and this must assert the end of packet
"  which should flush the FIFO by the DMA controller and assert EOPn.
"
"    There is a problem with FNOPOV when channel setup is done and no data
"  is transfered.  This way the DMA Rx state machine locksup since SM state
"  machine will jump to WAIT_FOR_LDAV because of FIFO being empty.
"
"
" 02-10-94
" -------
"    There may be a asynchronose problem with the TXDONE signal?
"  Additional term is added to eliminate this posiiblity.
"
"
"03-04-94
"-------
"    Strange prblem with Rx DMA machine locking upe and SM machine is
"  in WAIT UNTIL EMPTY.  To avoid lock up for now, EF is used to get out
"  of this case.
"
"    © 1993, 1994 ascom Timeplex Trading AG. All rights reserved.
"*************************************************************************
"
"              PBUS-FIFO-CPU-DMA  STATE MACHINE
"
" PBus FIFO-DMA interface state machine controls the operation of PBus data
"
" exchange between the local processor and PBUS bi-dir FIFo.  When in
"
" receive mode and FIFO not empty, DMA is requested form processor (DMA
"
" controller).  Every time a receive channel is setup, RDMASEL, Rx DMA SELect
"
" number, is toggled.  This bit corresponds to DMA channel 3 and 4.  In
"
" transmit mode, CPU selects which DMA channel to be used, TXDMANO.  TXDMANO
"
" selects DMA channel 1 and 2.  At the end of transmit an interrupt is
```

```
"
" generated to flag the processor for end of DMA cycle.  LDAVIN is used
"
" to determine end of packet reception in receive and LDAVOUT is set to
"
" indicate end of packet in packet transmit.
"
"
```

```
"*************************************************************
"                               PAGE 2
"              PBUS-FIFO-CPU STATE MACHINE  U152, PAGE 15
" INPUTS

ATE_OE            pin 55;

WDTOV_ASYNCH      pin 63;    " Force EOP when asserted.

RXEN              pin 20;    " receive mode
TXEN              pin 16;    " receive mode RXSDMA_AS         pin 47;    " start DMA operation. ASYNCHRO. SIG.
TXSDMA_AS         pin 56;    " start DMA operation.

TXDMANO           pin 49 ;   " Tx DMA channel number.

!TC0              pin 50;    " DMA terminal count channel 1
!TC1              pin 17;    " DMA terminal count channel 2

!DACK0            pin 14;    " DMA acknowledge channel 1
!DACK1            pin 13;    " DMA acknowledge channel 2
!DACK2            pin 11;    " DMA acknowledge channel 3
!DACK3            pin 10;    " DMA acknowledge channel 4

LDAVIN            pin 21;    " last data in form FIFO D32

LASTDATA          pin 25;    " software control of FIFOs last data (LDAV)

!RDMARST          pin 12;    " Receive DMA reset
!TDMARST          pin 29;    " Transmit DMA reset TXDONE_ASYNCH     pin 57;    " Transmit done. End of packet transfer LDAVRX            pin 22;

!AF1     pin     58;   " almost full flag fifo # 1
LAF1             node     istype 'reg,buffer';
!EF2     pin     23;   " empty flag fifo # 2
LEF2             node     istype 'reg,buffer';
!AE2     pin     24;   " almost empty flag fifo # 2
LAE2             node     istype 'reg,buffer';

!FIFO    pin     59;   " CPU direct access decodced strobe

!BLAST   pin     51;   " CPU BLAST

!READY   pin     54;   " CPU READY

CWRITE   pin     26;   " CPU CWRITE

PBUS_CYCLE   pin   28;   " CPU/PBUS ACCESS
```

ADDR7, ADDR6, ADDR5 pin 60, 62, 48;

clk1 pin 15; "CPU CLOCK
"

```
"**********************************************************************
" OUTPUTS

FADDR2, FADDR1, FADDR0   pin 30, 31, 32 istype 'com,buffer';

ENFIFO              pin 33  istype   'reg,buffer';  " FIFO read / write enable

EODMA               pin 46  istype   'reg,buffer';  " FIFO end of DMA cycle

!DRQINT             pin 5   istype   'reg,invert';  " CPU DMA interrupt

RDMASEL             pin 44  istype   'reg,buffer';  " RX DMA channel number

!EOP2               pin 39  istype   'reg,invert';  " DMA End Of Process channel 3
!EOP3               pin 40  istype   'reg,invert';  " DMA End Of Process channel 4

!DREQ0              pin 7   istype   'reg,invert';  " DMA REQUEST  channel 1
!DREQ1              pin 6   istype   'reg,invert' ; " DMA REQUEST  channel 2
!DREQ2              pin 43  istype   'reg,invert';  " DMA REQUEST  channel 3
!DREQ3              pin 41  istype   'reg,invert';  " DMA REQUEST  channel 4

LDAVOUT             pin 66  istype   'com,buffer';  " last data out FIFO D32

DATAOUT_OE          NODE    istype   'com';  " LDAV out OE. 2 SOPs requires this M.C.

!TCOUNT             pin 9   istype   'reg,invert';  " TC0 or TC1

!FIFO_WRA    pin 65 istype  'com,invert' ; "FIFO read write

ENA         pin 67 istype   'com,buffer' ; "FIFO clock enable
!OEA        pin 64 istype   'com,invert' ; "FIFO output enable FIRST_WORD_POP  node   istype 'reg,buffer'; " The first word in FIFO should
                                " be read at the begining of
                                " each receive process. THis word
                                " contains the data from last
                                " transfer.

WDTOV_dummy         node    istype 'reg, buffer';" syncho WDTOV

TXDONE              node    istype 'reg, buffer'; " synchro TXDONE

RXSDMA              node istype 'reg';  " start DMA operation.
TXSDMA              node istype 'reg';  " start DMA operation.

" STATE MACHINE ASSIGNMENTS

TXSM0, TXSM1, TXSM2    pin 2, 4, 3   istype       'reg,buffer';
RXSM0, RXSM1, RXSM2    pin 37 ,36 ,38 istype      'reg,buffer';
SM0                    pin 45 istype          'reg,buffer';
```

```
"*****************************************************************
"                              PAGE 4
"              PBUS-FIFO-CPU STATE MACHINE
"
" VARIABLE ASSIGNMENTS for

" ATE_OE = 1;  FOR NOW 6-3-93

WDTOV = 0;

VCC = 1;

Z = .Z.;
X = .X.;
c = .c.;
cp = [clk1];

"*****************************************************************
" STATE VALUES

TXSM       = [ TXSM2, TXSM1, TXSM0];  "

TXIDLE     = [ 0 , 0 , 0 ];
TRANSMODE  = [ 0 , 0 , 1 ];   " DMA cycle in transmit mode.
TXDMAREQ   = [ 0 , 1 , 0 ];   " DMA request in transmit mode.
TXWAIT     = [ 0 , 1 , 1 ];   " DMA transmit mode. wait for BLAST*READY
WAIT_TXDONE = [ 1 , 0 , 0 ];  " WAIING FOR TX DONE.

RXSM       = [ RXSM2, RXSM1, RXSM0];  "

RXIDLE     = [ 0 , 0 , 0 ];
EOP_HOLD   = [ 0 , 0 , 1 ];   " min. 2 clocks for EOP to be valid
RCVMODE    = [ 0 , 1 , 0 ];   " DMA cycle in receive mode
RXDMAREQ   = [ 0 , 1 , 1 ];   " DMA request in receive mode
RXWAIT     = [ 1 , 0 , 0 ];   " DMA receive mode. wait for BLAST*READY
POP_FIRST  = [ 1 , 0 , 1 ];   " Pop the unwanted word out of FIFO.

SM         = [SM0];   " last data-fifo-in detection

WAITFORLDAV = [ 0 ];   " wait for last data
UNTILEMPTY  = [ 1 ];   " wait until fifo is empty

FIFO_ADDR = [FADDR2, FADDR1, FADDR0];

CPU_ADDR  = [ADDR7, ADDR6, ADDR5];
```

A-20

```
"***********************************************************************
"                                    PAGE 5
"                PBUS-FIFO-CPU STATE MACHINE  U152, PAGE 15
"
equations LAF1.C         = clk1;
LAE2.C         = clk1;
LEF2.C         = clk1;

TXDONE.C       = clk1;

TXSM.clk       = clk1;
RXSM.clk       = clk1;

EODMA.clk      = clk1;
DRQINT.clk     = clk1;
RDMASEL.clk    = clk1;
EOP2.clk       = clk1;
EOP3.clk       = clk1;
DREQ0.clk      = clk1;
DREQ1.clk      = clk1;
DREQ2.clk      = clk1;
DREQ3.clk      = clk1;
TCOUNT.clk     = clk1;
SM.clk         = clk1;
ENFIFO.clk     = clk1;
FIRST_WORD_POP.clk=clk1;
WDTOV_dummy.clk    = clk1;

RXSDMA.clk     = clk1;
TXSDMA.clk     = clk1;

SM.OE          = ATE_OE;
RXSM.OE        = [1, 1, 1]; " ATE_OE;
TXSM.OE        = [1 ,1, 1]; " ATE_OE;
EODMA.OE       = ATE_OE;
DRQINT.OE      = ATE_OE;
RDMASEL.OE     = ATE_OE;
EOP2.OE        = ATE_OE;
EOP3.OE        = ATE_OE;
DREQ0.OE       = ATE_OE;
DREQ1.OE       = ATE_OE;
DREQ2.OE       = ATE_OE;
DREQ3.OE       = ATE_OE;
TCOUNT.OE      = ATE_OE;

"----------------------------------------------------------
" Asynchro. signals being synchronized to CPU clock.

LAF1    := AF1;
LEF2    := EF2;
```

```
LAE2    := AE2;

WDTOV_dummy   := WDTOV_ASYNCH;  " ABLE will make use of WDOV pin and this not
recommended.

"-----------------------------------------------------------------

RXSDMA  :=  RXSDMA_AS;
TXSDMA  :=  TXSDMA_AS;

TXDONE  :=  TXDONE_ASYNCH;

FIFO_ADDR = CPU_ADDR # !FIFO;

LDAVOUT.OE = DATAOUT_OE & ATE_OE;

DATAOUT_OE = TXEN & (DACK0 # DACK1)    " PBUS ACCESS
           # LASTDATA & FIFO;          " CPU ACCESS

LDAVOUT = TXEN & !TXDMANO & TC0 & BLAST
        # TXEN &  TXDMANO & TC1 & BLAST
        # LASTDATA;

DREQ0 := !TXDMANO & TXEN & !LAF1 & (TXSM.FB == TRANSMODE)
       # !TXDMANO & TXEN &         (TXSM.FB == TXDMAREQ);

DREQ1 :=  TXDMANO & TXEN & !LAF1 & (TXSM.FB == TRANSMODE)
       #  TXDMANO & TXEN &         (TXSM.FB == TXDMAREQ);

DREQ2 := !RDMASEL & RXEN & (RXSM.FB == RCVMODE) & (!LAE2 # (SM.FB==UNTILEMPTY))
       # !RDMASEL & RXEN & (RXSM.FB == RXDMAREQ);

DREQ3 :=  RDMASEL & RXEN & (RXSM.FB == RCVMODE) & (!LAE2 # (SM.FB==UNTILEMPTY))
       #  RDMASEL & RXEN & (RXSM.FB == RXDMAREQ);

EOP2 := !RDMASEL & RXEN & READY & LDAVIN & BLAST & (RXSM.FB == RXWAIT)
      # !RDMASEL & RXEN                          & (RXSM.FB == EOP_HOLD);

EOP3 :=  RDMASEL & RXEN & READY & LDAVIN & BLAST & (RXSM.FB == RXWAIT)
      #  RDMASEL & RXEN                          & (RXSM.FB == EOP_HOLD);

RDMASEL := !RDMASEL & (RXSM.FB == RXIDLE) &   RXEN &  RXSDMA
        #  RDMASEL & (RXSM.FB == RXIDLE) & (!RXEN # !RXSDMA)
        #  RDMASEL & (RXSM.FB != RXIDLE);

FIFO_WRA = !PBUS_CYCLE & FIFO & CWRITE  " in CPU cycle
         #  PBUS_CYCLE & TXEN & ENFIFO & (DACK0 # DACK1);   " in DMA cycle ENA    = !PBUS_CYCLE & FIFO & BLAST
       #  PBUS_CYCLE & TXEN & ENFIFO & READY  " in transmit
       #  PBUS_CYCLE & RXEN & ENFIFO & READY  " in receive
       #  FIRST_WORD_POP.FB;

" Note that when in Loopback test, ENA could have a problem with simultanous
```

```
" write and read to/from the FIFO. (This problem occurs when packets are
" greater than 64 Bytes.
"

OEA    = !PBUS_CYCLE &  FIFO & !CWRITE
       #  PBUS_CYCLE &  RXEN &  ENFIFO & (DACK2 # DACK3);      " in receive TCOUNT  := (TXSM.FB == WAIT_TXDONE)
        # !PBUS_CYCLE;            " force TCOUNT if in CPU mode
```

```
"*************************************************************
"         PBUS-FIFO-INTERFACE  STATE  MACHINE   U154    PAGE 6
"
"
state_diagram   TXSM;   " state machine diagram : 'PB_DMA1.SM' SEPT. 25, 1992 state  TXIDLE :
           if (TXEN & TXSDMA & !TDMARST) then TRANSMODE;

state  TRANSMODE:
           if TDMARST then TXIDLE;
           else if !LAF1 then TXDMAREQ;
             else TRANSMODE;

state  TXDMAREQ:
           if TDMARST then TXIDLE;
           else if (DACK0 # DACK1) then TXWAIT with ENFIFO := 1;
             else TXDMAREQ;

state  TXWAIT:
           ENFIFO := 1;
           if TDMARST then TXIDLE;
             else if (BLAST & READY & (TC0 # TC1))
                  then WAIT_TXDONE with DRQINT := 1;
               else if (BLAST & READY & !(TC0 # TC1)) then TRANSMODE
                 else TXWAIT;

state  WAIT_TXDONE:
           if TDMARST then TXIDLE;
           else if TXDONE then TXIDLE else WAIT_TXDONE;

state_diagram   RXSM;

state  RXIDLE :
           EODMA := 1;
           if (RXEN & RXSDMA & !RDMARST) then POP_FIRST "RCVMODE state  POP_FIRST :
           if RDMARST then RXIDLE;
             else if (!LEF2) then RCVMODE with FIRST_WORD_POP := 1;   " pop first word
               else POP_FIRST;

state  RCVMODE:
           if RDMARST then RXIDLE;
             else if ((SM.FB == UNTILEMPTY) & LEF2) then RXIDLE;
             else if (!LAE2 # (SM.FB == UNTILEMPTY)) then RXDMAREQ;
               else RCVMODE state  RXDMAREQ:
           if RDMARST then RXIDLE;
             else if (DACK2 # DACK3) then RXWAIT with ENFIFO := 1;
               else RXDMAREQ;
```

```
state RXWAIT :
        ENFIFO := 1;
        if RDMARST then RXIDLE;
        else if (BLAST & READY & !LDAVIN) then RCVMODE
            else if (BLAST & READY & LDAVIN) then EOP_HOLD;
            else RXWAIT;

state EOP_HOLD :
        goto RXIDLE;

"
" This state machine check for receive mode and LDAV form RX state
"
" machine to allow the FIFO to be read until empty.
"
"

state_diagram  SM;

state WAITFORLDAV :
            if (RXEN & LDAVRX & !RDMARST)
                then UNTILEMPTY else WAITFORLDAV;

state UNTILEMPTY :
            if RDMARST then WAITFORLDAV;
            else if (RXSM == RXIDLE) then WAITFORLDAV else UNTILEMPTY;

test_vectors    (

[ cp , TXEN , TXDMANO , !TC0 , !BLAST , LASTDATA , !DACK0 , !DACK1,
ATE_OE]->[LDAVOUT , DATAOUT_OE])
[  c,   0 ,   0 ,   1 ,   1 ,   0 ,   1 ,   1 ,   1 ]->[ Z  ,   0    ]; "1
[  c,   0 ,   0 ,   1 ,   1 ,   0 ,   1 ,   1 ,   1 ]->[ Z  ,   0    ]; "2 NO OUTPUT
[  c,   1 ,   0 ,   0 ,   0 ,   0 ,   0 ,   1 ,   1 ]->[ 1  ,   1    ]; "3 VALID OUTPUT
[  c,   1 ,   0 ,   1 ,   0 ,   0 ,   1 ,   1 ,   1 ]->[ Z  ,   0    ]; "4 NO DACK, NO
DATA end
```

```
module   PBUS                           " PAGE 1
" © 1993,1994  ascom Timeplex Trading AG. All rights reserved.
" 06-28-93
"
" This is a copy of pbus0615.abl.  Version 0625/0628 did not work properly "
" 07-23-93
" --------
"
"       Removing PRST from .AR terms
"
"08-19-93
"--------
"       When RSP values returned to their origional values and in loopback
"       test, RSP/SEQ bus must be disabled regardless of the state of RXEN;
"       otherwise, responses will not work under certain test conditions.
"
"08-24-93
"--------
"       TX SM can start when receive DMA machine and RX SM is not in idle .
"       This can cause problems. TXSM will not start until manager RXSM is IDLE.
"
"
"08-27-93
"--------
"       To ensure that only Tx or Rx state machine to active at any time,
"       RXIDLE logic is added to the TXSM.
"
"
"08-31-93
"--------
"       Adding ATE ouput enable to this version.  Also adding state machine
"       IDLE for testibility.
"
"       One more problem discovered.  When in transmit and a channel request
"       is in progress from a third board, EMPTY will be returned.  RSOEB logic
"       is modified for this problem.
"
"09-24-93
"--------
"       As soon as RXIDLE is asserted, FIFO WRITE state machine will go to
"       IDLE state.
"
"
"
"10-05-93
"--------
"       Find a problem with state racing (MTXSM and MRXSM) when both TXGO and
"       RXIDLE activate at a same time.

"03-01-94
"--------
```

```
"       Metastable condition may be the cause of a hang up on the receive side
"  PBus hardware at the RX MANAGER.  To fix this problem the number of states
"  are reduced to 2 and RXEDMA is synchronized usnig an internal node.
"
"
"03-07-94
"--------
"       A bug is found when the FIFO is Almost Full and WDTOV is asserted.
"  The above case will terminate WSM where B_LDAVOUT will never get
"  asserted.  RXILDE term is removed from states WAITAF and WAITFF.
"
"
"04-15-94 MB
"--------
"       Problem with FIFO output enable B side caused the FDDI boards to
"  timeout PINGs.  This problem effected LATCH_C logic which is the last
"  cycle of the transfer where FIFO OEB is disabled.  Hardware was working
"  sicne the output disable time of FIFO was long!  (FIx: added TXACTIVE = 1
"  to RD3 state.)
"
"
PBUS DEVICE      'MACH220A';

"****************************************************************************
"
"                    PBUS MANAGER STATE MACHINE
"
"  PBus manager controls the operation of TX and RX state machine and
"
"  communication to on board CPU and other state machines.  It also
"
"  controls which group of control buses are active.  In case of transmit,
"
"  the GO bit from control register invokes the transmite side of the
"
"  manager.  TX state machine is then enabled and monitored until TXDONE.
"
"  On the other hand, RX state machine, once enabled, will flag this machine
"
"  in event of packet reception.  At this time no TX activity will be
"
"  allowed and RX machine will be monitored until RX state machine becomes
"
"  idle , RXIDLE.  During no activity the bi-direction FIFO is held reset.
"
"  For state diagarm refer to PBUS MANAGER STATE MACHINE
"
"  (FILENAME : PB_MNGR.sm).  For detailed explanation of
"
"  PBus and this Machine refer to PAGASUS PACKET-BUS ARCHITECTURAL
"
"  SPECIFICATION.
"
"
```

```
"**************************************************************************
"                              PAGE 2
"          PBUS MANAGER
" INPUTS
ATE_OE            pin 39;   " output enable for A.T.E.

PBTEST            pin 2;    " loop-back test enable

RXADDR, TXADDR    pin 24,23; "RXADDR IS ASSERTED WHEN ADD&GEO MATCH
                             "TXADDR IS ASSERTED WHEN ARB&GEO MATCH RXEDMA            pin 29;   "END OF DMA TRANSFER TO AND FROM MEMORY RXIDLE            pin 49;   "RX STATE MACHINE IS NOT ACTIVE CHSUOK            pin 26;   "CHANNEL SETUP DONE IN TX STATE MACHINE ARBSEL            pin 17;   "ARBITRATION BOARD NUMBER. ZERO FOR SLOT 1
                            "AND ONE FOR SLOT 5

TXGO              pin 25;   "FROM COMMAND REGISTER INITIATING PACKET
                            "TRANSFER.
RXGO              pin 50;   "FROM COMMAND REGISTER INITIATING PACKET
                            "TRANSFER.

!PRST             pin 54;   "PBUS RESET LOGIC.

TXDONE            pin 51;   "END OF PACKET TRANSFER TX
RXDONE            pin 9;    "END OF PACKET RX !FF2              pin 10;   " FIFO full flag for FIFO # 2
LFF2              node      istype 'reg,buffer';

!AF2              pin 11;   " FIFO almost full flag for FIFO # 2
LAF2              node      istype 'reg,buffer';

!AE1              pin 7;    " FIFO almost flag for FIFO # 1
LAE1              node      istype 'reg, buffer';

FIFORD            pin 20;   " FIFO read command
FIFOWR            pin 12;   " FIFO write command LDAVRX            pin 30;   " last data in receive mode DPS1, DPS0        pin 6, 5; " Data Port Select for redundancy control !T_COUNT_A        pin 4;    " end of packet (Terminal Count)

T_COUNT           node      istype 'reg,buffer';

B_LDAVIN          pin 14;   " last data out in transmit mode

A_ICLK            pin 16;   " Asynchronous clock for clocking A,B,C LATCH
```

```
                              " PBus inverted clock
clk1         pin 15;    "PBus clock
```

```
" ***********************************************************************
" OUTPUTS                                                PAGE 3

TXEN            pin 48  istype     'reg,buffer';  " IN TRANSMIT MODE
RXEN            pin 36  istype     'reg,buffer';  " IN RECEIVE MODE TXSDMA          pin 37  istype     'reg,buffer';  " START DMA CYCLE RXSDMA          pin 3   istype     'reg,buffer';  " START DMA CYCLE ACOEAA, ACOEAB      pin 57,58 istype  'reg,buffer';  " Add-Cmd Ouput Enable
                                                    " Aside Aport
RSOEAA, RSOEAB      pin 46, 47 istype 'reg,buffer';  " Rsp-Seq Ouput Enable
                                                    " Aside Aport
!ACOEB, !RSOEB      pin 59, 45 istype 'reg,buffer';  " Add-Cmd Output Enable
                                                    " B-side A&B port.

RDB       pin 64    istype 'reg,buffer';  " FIFO B side Read Write
ENB       pin 13    istype 'reg,buffer';  " FIFO B side clock enable
!OEB      pin 65    istype 'reg,buffer';  " FIFO B side output enable TXLRDY     pin 66   istype 'reg,buffer';  " PBus latches are ready
RXLRDY     pin 56   istype 'reg,buffer';  " PBus latches are ready LDAVTX     pin 67   istype 'reg,buffer';  " Last data in transmit mode !ALATCH    pin 32   istype 'reg,buffer';  " A data port latch line
!BLATCH    pin 31   istype 'reg,buffer';  " B data prot latch line
!CLATCH    pin 33   istype 'reg,buffer';  " C data prot latch line OEAA       pin 21   istype 'reg,buffer';  " Output Enable Aside Aprot
OEAB       pin 22   istype 'reg,buffer';  " Output Enable Bside Bprot
OEAC       pin 55   istype 'reg,buffer';  " Output Enable Cside Cprot B_LDAVOUT     pin 60    istype 'reg,buffer';  " last data out in transmit mode TXACTIVE      node      istype 'reg,buffer';
RXACTIVE      node      istype 'reg,buffer';

LATCHA_OK     node      istype 'reg,buffer';
LATCHB_OK     node      istype 'reg,buffer';
LATCHC_OK     node      istype 'reg,buffer';

FIRST_TIME    node      istype 'reg,buffer';  " The first time Tx SM
                                              " leaves the IDLE state
                                              " for any transfer.

RXDONE_DUMMY      node          istype 'com,buffer';

" ***********************************************************************
" STATE MACHINE ASSIGNMENTS
WSM0, WSM1, WSM2      PIN 62, 44, 63    istype      'reg,buffer';  " FIFO write S.M.
```

```
RSM0, RSM1, RSM2          node  istype    'reg,buffer'; "FIFO read S.M.
LSM0              node  istype    'reg,buffer'; "last data S.M.
MTXSM0, MTXSM1, MTXSM2    node  istype    'reg,buffer';
MRXSM0, MRXSM1", MRXSM2 "  node  istype    'reg,buffer';

MTXSMIDLE      pin   41    istype  'com,buffer';
MRXSMIDLE      pin   40    istype  'com,buffer';
RSMSMIDLE      pin   28    istype  'com,buffer';
WSMSMIDLE      pin   43    istype  'com,buffer';
```

```
"*************************************************************
"               PBUS MANAGER STATE MACHINE          PAGE 3
" VARIABLE ASSIGNMENTS

EN = 1;
DISABLE = 0;
c = .c.;
cp = [clk1];
c2 = [c, c];

"*************************************************************
" STATE VALUES

MTXSM       = [MTXSM2, MTXSM1, MTXSM0];

MTXIDLE     = [ 0 , 0 , 0 ];
PACKETTX1   = [ 0 , 0 , 1 ]; " Packet tranmit mode start state.
PACKETTX2   = [ 1 , 0 , 1 ]; " Packet tranmit mode start state.
WAIT_CHSU   = [ 0 , 1 , 0 ]; " Wait for channel setup complete.
CHSUDONE    = [ 0 , 1 , 1 ]; " Channel setup done. Initiate DMA.
WAITDATATX  = [ 1 , 0 , 0 ]; " Wait for data transfer complete.
WAITTXGO    = [ 1 , 1 , 1 ]; " Wait for TXgo to deassert
MTX_DUMMY   = [ 1 , 1 , 0 ]; " Dummy unused state.

MRXSM       = ["MRXSM2," MRXSM1, MRXSM0];

MRXIDLE     = [" 0 ," 0 ,  0 ]; " RECECIVE IDLE
PACKETRX    = [" 1 ," 0 ,  1 ]; " Packet receive mode start state.
WAITDATARX  = [" 1 ," 1 ,  1 ]; " Wait for data transfer complete.
WAIT_EODMA  = [" 1 ," 1 ,  0 ]; " Wait for FIFO to be empty.

RSM         = [RSM2, RSM1, RSM0];   " FIFO read state machine

IDLE         = [ 0 , 0 , 0 ];
RD1          = [ 0 , 1 , 0 ];   " read fifo 2'nd word
RD2          = [ 0 , 1 , 1 ];   " read fifo 2'nd word
RD3          = [ 1 , 0 , 0 ];   " read fifl 3'rd word
R_LRDY_WAIT  = [ 1 , 0 , 1 ];   " wait for almost empty flag
LDATATX      = [ 1 , 1 , 0 ];   " last data Tx
WAIT_AE      = [ 0 , 0 , 1 ];   " waiting for FIFO ffilling up to AE
RSM_DUMMY    = [ 1 , 1 , 1 ];   " Dummy unused state.

WSM         = [WSM2, WSM1, WSM0];   " FIFO write state machine

WIDLE        = [ 0 , 0 , 0 ];
CHECKAF      = [ 1 , 1 , 1 ];   " check for almost full flag
WR2          = [ 0 , 1 , 0 ];   " write fifo 2'nd word
WR3          = [ 0 , 1 , 1 ];   " write fifo 3'rd word
WAITFF       = [ 1 , 0 , 0 ];   " wait for full flag
WAITAF       = [ 1 , 0 , 1 ];   " wait for almost full flag
W_LRDY_WAIT  = [ 1 , 1 , 0 ];   " wait for almost empty flag
WSM_DUMMY    = [ 0 , 0 , 1 ];   " Dummy unused state.
```

```
LSM         = [LSM0];       " last data detection state machine

WAITLDAVRX  = [0];          " wait for last data word in recive mode
LASTDAVRX   = [1];          " wait until last data is written into FIFo
```

A33

```
"**************************************************************
"                              PAGE 4
"                   PBUS MANAGER STATE MACHINE
"
"
" RSP-SEQ BUS
" The following T.T. describes the operation of BTL output enable at A side.
" Note that ARBSEL low indicates that the BTL is disabled and OE shall not be
" functional.
"
"
" ARBSEL    RXEN   RXADDR   OutputEnable A-side
"-----------------------------------------------
"   0        X       X        0     disable (bus not selected)
"
"   1        0       0        1     enable (monitoring ARB bus)
"
"   1        0       1        1     enable (monitoring ARB bus)
"
"   1        1       0        1     enable (monitoring ARB bus)
"
"   1        1       1        0     disable (responding to bus)
"                                           (receiving!)
"
"
" CMD-ADD BUS
" The following T.T. describes the operation of BTL output enable at A side.
" Note that ARBSEL low indicates that the BTL is disabled and OE shall not be
" functional.
"
"
" ARBSEL    TXEN   TXADDR   OutputEnable A-side
"-----------------------------------------------
"   0        X       X        0     disable (bus not selected)
"
"   1        0       X        1     enable (receive?)
"
"   1        1       X        0     disable (transmit)
"
"
"
"
"      REDUNDANCY CONTROL
"                     PORT---ENABLE    ---LATCH---
"                    /          \  /         \
"DPS1 DPS0 ALATCH BLATCH CLATCH  ENA ENB ENC A_OK B_OK C_OK
"-----------+-----------------------------------------------
"
" 0    0     0      1     1      0   1   1   0    1    1
"
" 0    1     1      0     1      1   0   1   1    0    1
"
```

```
"1  0  1  1  0  1  1  0  1  1  0
"
"1  1  1  1  1  1  1  1  1  1  1
"
"
```

PAGE 5 equations

```
ACOEAA.C      = clk1;
ACOEAB.C      = clk1;
RSOEAA.C      = clk1;
RSOEAB.C      = clk1;
ACOEB.C       = clk1;
RSOEB.C       = clk1;
TXEN.C        = clk1;
RXEN.C        = clk1;
TXSDMA.C      = clk1;
TXACTIVE.C    = clk1;
RXACTIVE.C    = clk1;
RXSDMA.C      = clk1;
RSM.C         = clk1;
WSM.C         = clk1;
LSM.C         = clk1;
ENB.C         = clk1;
RXLRDY.C      = clk1;
TXLRDY.C      = clk1;
LDAVTX.C      = clk1;
ALATCH.C      = A_ICLK;
BLATCH.C      = A_ICLK;
CLATCH.C      = A_ICLK;
OEAA.C        = clk1;
OEAB.C        = clk1;
OEAC.C        = clk1;
B_LDAVOUT.C   = clk1;
T_COUNT.C     = clk1;
FIRST_TIME.C  = clk1;
LAE1.C        = clk1;
LFF2.C        = clk1;
LAF2.C        = clk1;
LATCHA_OK.C   = clk1;
LATCHB_OK.C   = clk1;
LATCHC_OK.C   = clk1;
[MTXSM2, MTXSM1, MTXSM0].C    = clk1;
["MRXSM2," MRXSM1, MRXSM0].C  = clk1;

ACOEAA.OE     = ATE_OE;
ACOEAB.OE     = ATE_OE;
RSOEAA.OE     = ATE_OE;
RSOEAB.OE     = ATE_OE;
ACOEB.OE      = ATE_OE;
RSOEB.OE      = ATE_OE;
TXEN.OE       = ATE_OE;
RXEN.OE       = ATE_OE;
TXSDMA.OE     = ATE_OE;
RXSDMA.OE     = ATE_OE;
WSM.OE        = ATE_OE;
```

A36

```
ENB.OE          = ATE_OE;
RXLRDY.OE       = ATE_OE;
TXLRDY.OE       = ATE_OE;
LDAVTX.OE       = ATE_OE;

ALATCH.OE       = ATE_OE;
BLATCH.OE       = ATE_OE;
CLATCH.OE       = ATE_OE;

OEAA.OE         = ATE_OE;
OEAB.OE         = ATE_OE;
OEAC.OE         = ATE_OE;
MTXSMIDLE.OE    = ATE_OE;
MRXSMIDLE.OE    = ATE_OE;
RSMSMIDLE.OE    = ATE_OE;
WSMSMIDLE.OE    = ATE_OE;

RXDONE_DUMMY    = RXDONE;

T_COUNT := T_COUNT_A;

LATCHA_OK := !DPS1 &  DPS0   " Determining if PBus data port A is functional
          #  DPS1 & !DPS0
          #  DPS1 &  DPS0;

LATCHB_OK := !DPS1 & !DPS0   " Determining if PBus data port B is functional
          #  DPS1 & !DPS0
          #  DPS1 &  DPS0;

LATCHC_OK := !DPS1 & !DPS0   " Determining if PBus data port C is functional
          # !DPS1 &  DPS0
          #  DPS1 &  DPS0;

ACOEAA := ARBSEL & !TXEN            " ENABLE AT ALL TIMES EXCEPT
       #  ARBSEL &  TXEN & !TXADDR;  " WHEN COMMANDING

ACOEAB := !ARBSEL & !TXEN           " ENABLE AT ALL TIMES EXCEPT
       #  !ARBSEL &  TXEN & !TXADDR; " WHEN COMMANDING

"RSOEAA := ARBSEL & !RXEN & !RXADDR & !PBTEST   ENABLE AT ALL TIMES EXCEPT
"       #  ARBSEL & !RXEN &  RXADDR & !PBTEST   WHEN RECEIVING
"       #  ARBSEL &  RXEN & !RXADDR & !PBTEST
"       #  ARBSEL &          !RXADDR &  PBTEST;  If in test, only look at RXADDR
"
"RSOEAB := !ARBSEL & !RXEN & !RXADDR & !PBTEST   ENABLE AT ALL TIMES EXCEPT
"       #  !ARBSEL & !RXEN &  RXADDR & !PBTEST   WHEN RECEIVING
"       #  !ARBSEL &  RXEN & !RXADDR & !PBTEST
"       #  !ARBSEL &          !RXADDR &  PBTEST;  If in test, only look at RXADDR RSOEAA := ARBSEL & !RXADDR;    "ENABLE AT ALL TIMES EXCEPT when responding RSOEAB := !ARBSEL & !RXADDR;   "ENABLE AT ALL TIMES EXCEPT when responding
```

A37

```
"
ACOEB  := TXEN & TXADDR;        " WHEN IN TRANSMIT AND MY ADDRESS

"RSOEB  := RXEN & RXADDR;        WHEN IN RECEIVE AND MY ADDRESS
RSOEB  := RXADDR;              " any time MY ADDRESS (RXADDR) is asserted "
B_LDAVOUT.OE  = RXEN.FB & ATE_OE;
                        " OEB, RDB MAY BE A PROBLEM WITH SETUP TIME???

OEB = TXACTIVE;    " OE WHEN TRANSMIT.
    RDB = TXACTIVE;    " READING OUT OF FIFO IN TRANSMIT RX := 0;

LAE1    := AE1;
    LAF2    := AF2;
    LFF2    := FF2;

MTXSMIDLE      = (MTXSM.FB  == MTXIDLE);
MRXSMIDLE      = (MRXSM.FB  == MRXIDLE);
RSMSMIDLE      = (RSM.FB    ==  IDLE);
WSMSMIDLE      = (WSM.FB    ==  WIDLE);
```

A 38

```
"************************************************************************
"                              PAGE 6
"               PBUS MANAGER STATE MACHINE
state_diagram   MTXSM;

state  MTXIDLE :
               TXEN := DISABLE;
               if !PRST & PBTEST & TXGO then PACKETTX1;
                 else if !PRST & !PBTEST & TXGO & RXIDLE & (MRXSM.FB == MRXIDLE) then
PACKETTX1;
                 else MTXIDLE;

state  PACKETTX1:
               if !RXIDLE & !PBTEST then MTXIDLE; " receive machine active
                 else PACKETTX2;

state  PACKETTX2:
               if !RXIDLE & !PBTEST then MTXIDLE; " receive machine active
                 else WAIT_CHSU with TXEN := EN;

state  WAIT_CHSU :
               TXEN := EN;
               if PRST then MTXIDLE;
                 else if TXDONE then WAITTXGO with TXEN := DISABLE;
                   else if CHSUOK then CHSUDONE with TXSDMA := EN;
                     else WAIT_CHSU;
     state  CHSUDONE :
               TXEN := EN;
               TXSDMA := EN;
               if TXDONE then WAITTXGO with TXEN := DISABLE;
                 else WAITDATATX with TXEN := EN;

state  WAITDATATX :
               TXEN := EN;
               if PRST then WAITTXGO;
                 else if TXDONE then WAITTXGO with TXEN := DISABLE;
                   else WAITDATATX;

state  WAITTXGO :
               goto MTXIDLE;

state MTX_DUMMY :

goto MTXIDLE;

state_diagram   MRXSM;

state  MRXIDLE :
               RXEN := PBTEST & RXGO
                    # !PBTEST & (MTXSM.FB == MTXIDLE);

if !PRST & PBTEST & RXGO & !RXIDLE then PACKETRX with RXSDMA := 1;
```

```
                else if !PRST & !PBTEST & RXGO & !RXIDLE & (MTXSM.FB == MTXIDLE)
                    then PACKETRX WITH RXSDMA := 1;
                else MRXIDLE;

state PACKETRX :
            RXEN := EN;
            RXSDMA := EN;
            GOTO WAITDATARX;
state WAITDATARX :
            RXEN := EN;
            if !PRST & !RXIDLE then WAITDATARX;
            else WAIT_EODMA;
state WAIT_EODMA :
            RXEN := EN;
            if !PRST & !RXEDMA then WAIT_EODMA;
            else MRXIDLE;
```

```
state_diagram  RSM;

state IDLE :
        FIRST_TIME := 1; " problem with b_LDAVIN on the first try.

if (!PRST & FIFORD & TXEN & LAE1) then WAIT_AE;
        else
          if (!PRST & FIFORD & TXEN & !RXACTIVE & (!LAE1 # T_COUNT))
              then RD1 with ENB := LATCHA_OK;    " POP A
                        TXACTIVE := 1;
                    endwith;
              else IDLE;

state RD1 :
        FIRST_TIME := FIRST_TIME & !LATCHA_OK; " Propagate FIRSTTIME
                                " if ENB not happened
        ALATCH:= LATCHA_OK;
        TXACTIVE := 1;

if (B_LDAVIN & !FIRST_TIME) then LDATATX;
          else RD2 with  ENB := LATCHB_OK;      " POP B state RD2 :
        TXLRDY := 1;
        BLATCH := LATCHB_OK;
        TXACTIVE := 1;

if (B_LDAVIN & !FIRST_TIME) then LDATATX
          else RD3 with  ENB := LATCHC_OK;      " POP C state RD3 :
        TXLRDY := 1;
        CLATCH := LATCHC_OK;
        TXACTIVE := 1;

if B_LDAVIN then LDATATX;
          else R_LRDY_WAIT;

state LDATATX :
        TXLRDY := 1;
        LDAVTX := 1;

if TXDONE # PRST then IDLE;
          else LDATATX;

state R_LRDY_WAIT : "This state is necessary since LREADY needs to be asserted

TXLRDY := 1;
        if TXDONE # PRST then IDLE;
        else
          if ((FIFORD & LAE1) # (FIFORD & RXACTIVE)) then WAIT_AE;
            else if (FIFORD & !RXACTIVE & (!LAE1 # T_COUNT))    " TCOUNT creates too many
SOP
```

```
            then RD1 with ENB := LATCHA_OK;  " POP A
                    TXACTIVE := 1;
                endwith;
            else R_LRDY_WAIT;

state WAIT_AE :
        FIRST_TIME := FIRST_TIME;  " Keep updating
        if TXDONE # PRST then IDLE;
        else if (!RXACTIVE & (!LAE1 # T_COUNT)) then RD1
                                with
                                    ENB := LATCHA_OK;  " POP A
                                    TXACTIVE := 1;
                                endwith;
            else WAIT_AE;

state RSM_DUMMY :   goto IDLE;
```

```
"*****************************************************************
"                                        PAGE 6
"               PBUS-FIFO-INTERFACE STATE MACHINE U154
state_diagram  WSM;

state WIDLE :

RXLRDY := 1;
          if !PRST & ( (FIFOWR & LFF2 & RXEN )
                # (FIFOWR & FIFORD)
                # (FIFOWR & TXACTIVE) ) then WAITFF;
            else if (!PRST & FIFOWR & !LFF2 & RXEN & !TXACTIVE & !FIFORD)
                then CHECKAF with
                          OEAA := 1;     " PUSH A
                          ENB := LATCHA_OK;
                          RXACTIVE := 1;
                      endwith;
            else WIDLE;

state CHECKAF :
          RXACTIVE := 1;
          if LAF2 then WAITAF;
          else WR2 with
                    OEAB := 1;          " PUSH B
                    ENB := LATCHB_OK;

endwith;
  state WR2 :
          RXACTIVE := 1;      "PUIH C
          OEAC := 1;
          ENB := LATCHC_OK;
          GOTO WR3;

state WR3 :
          RXLRDY := 1;
          GOTO W_LRDY_WAIT;

state W_LRDY_WAIT:
          RXLRDY := 1;
          if PRST then WIDLE;
          else if (RXIDLE & !FIFOWR) then WIDLE;
            else if ((FIFOWR & LFF2)
                  # (FIFOWR & FIFORD)
                  # (FIFOWR & TXACTIVE))
                  then WAITFF;
              else if (FIFOWR & !FIFORD & !LFF2 & !TXACTIVE)
                  then CHECKAF with
                          OEAA := 1;     " PUSH B
                          ENB := LATCHA_OK;
                          RXACTIVE := 1;
                      endwith;
              else W_LRDY_WAIT;
```

```
state WAITFF :
        if "RXIDLE #" PRST then WIDLE;
        else if (!LFF2 & !FIFORD & !TXACTIVE) then CHECKAF
                        with
                                OEAA := 1;      " PUSH A
                                ENB := LATCHA_OK;
                                RXACTIVE := 1;
                        endwith;
        else WAITFF;

state WAITAF :
        RXACTIVE := 1;
        if "RXIDLE #" PRST then WIDLE;
        else if !LAF2 then WR2 with OEAB := 1;    " PUSH B
                ENB := LATCHB_OK;
                        endwith
        else WAITAF;

state WSM_DUMMY :

goto WIDLE;
"*********************************************************************
"
state_diagram  LSM;   " state machine diagram : 'PB_FIFO1.SM' SEPT. 25, 1992

" This state machine detects last data from receive state machine and
" sets 33rd data bit of the FIFO to 1 during state WR3 in order for
" DMA logic controller to detect end of packet.
"
" If LATCHC_OK is not asserted (using 64 out of 96 data bits), then force
" LDAV OUT on the second 32 bit of the data bus (PORT B). This logic only
" covers single point of failure.
"
"
  state WAITLDAVRX:
            if !PRST & LDAVRX then LASTDAVRX
            else WAITLDAVRX;

"   state LASTDAVRX:
"           if (WSM.FB == WR2) # PRST then WAITLDAVRX
"                   with B_LDAVOUT := 1;
"           else LASTDAVRX;
"
  state LASTDAVRX:
            if PRST then WAITLDAVRX;
            else
              if !LATCHC_OK & (WSM.FB == CHECKAF) & !LAF2
                then WAITLDAVRX with B_LDAVOUT := 1;
              else
                if !LATCHC_OK & (WSM.FB == WAITAF) & !LAF2
                  then WAITLDAVRX with B_LDAVOUT := 1;
                else
                  if (WSM.FB == WR2) then WAITLDAVRX with B_LDAVOUT := 1;
``` else LASTDAVRX;

```
"test_vectors (
"
" [cp, PRST, ARBSEL, RXADDR, RXIDLE, GO] -> [RSOEAB, RSOEAA, RXEN, MTXSM])
"
" [c2, 1 , 0 , 0 , 1 , 0] -> [ 1 , 0 , 1 , MTXIDLE];
" [c2, 1 , 0 , 0 , 1 , 0] -> [ 1 , 0 , 1 , MTXIDLE];
" [c2, 1 , 0 , 0 , 1 , 0] -> [ 1 , 0 , 1 , MTXIDLE];
" [c2, 0 , 0 , 0 , 1 , 0] -> [ 1 , 0 , 1 , MTXIDLE];
" [c2, 0 , 0 , 1 , 1 , 0] -> [ 0 , 0 , 1 , MTXIDLE];
" [c2, 0 , 0 , 0 , 1 , 0] -> [ 1 , 0 , 1 , MTXIDLE];
" [c2, 0 , 0 , 1 , 1 , 0] -> [ 0 , 0 , 1 , MTXIDLE];
" [c2, 0 , 1 , 0 , 1 , 0] -> [ 0 , 1 , 1 , MTXIDLE];
" [c2, 0 , 1 , 1 , 1 , 0] -> [ 0 , 0 , 1 , MTXIDLE];
" [c2, 0 , 1 , 0 , 1 , 0] -> [ 0 , 1 , 1 , MTXIDLE];
" [c2, 0 , 1 , 1 , 1 , 0] -> [ 0 , 0 , 1 , MTXIDLE];
" [c2, 0 , 0 , 1 , 1 , 1] -> [ 0 , 0 , 1 , PACKETTX1];
" [c2, 0 , 0 , 1 , 1 , 1] -> [ 0 , 0 , 0 , WAIT_CHSU];
" [c2, 0 , 0 , 1 , 1 , 1] -> [ 1 , 0 , 0 , WAIT_CHSU];
" [c2, 0 , 0 , 1 , 1 , 1] -> [ 1 , 0 , 0 , WAIT_CHSU];
" [c2, 0 , 1 , 1 , 1 , 1] -> [ 0 , 1 , 0 , WAIT_CHSU];
" [c2, 0 , 1 , 1 , 1 , 1] -> [ 0 , 1 , 0 , WAIT_CHSU];
" [c2, 0 , 1 , 1 , 1 , 1] -> [ 0 , 1 , 0 , WAIT_CHSU];
" [c2, 0 , 1 , 1 , 1 , 1] -> [ 0 , 1 , 0 , WAIT_CHSU];
```

END

```
module RED                                    " PAGE 1
"
"              Pegasus P-Bus redundancy
"
"There are total of 6 bits reserved for controlling the P-Bus arbitration
"and data ports.  By examining these bits software can determine which
"arbitration board is in control of the bus or which data ports are used
"to transfer data between boards. Redundancy can be achieved simply
"by toggling the proper bits.  The order of the redundancy register
"is as follow.
"
"
"D7    D6    D5      D4         D3         D2       D1      D0
"========================================================================
"0     0     RESVD   SELECT B   SELECT A   ARBSEL   DPS1    DPS0
"
"
"
"Notes:
"     SELECT A can be modified by master A only and SELECT B can be
"     modified by master B only.
"
"     ARBSEL is read only.
"
"     DPS0:1 are active low signals.  They are initialized to logic 1 during
"     reset.
"
"
"
"ARBITRATION CONTROL
"
"
"           P-BUS ARBITRATION REDUNDANCY LOGIC.
"
"SELECT A    SELECT B    ARBSEL      ARBITER IN CONTROL OF PBUS
"========================================================================
"  0          0           0          MASTER A
"  0          1           1          MASTER B
"  1          0           1          MASTER B
"  1          1           0          MASTER A
"
"
"From this table it can be seen that any master can switch the P-Bus
"arbitration from one source to another.  For example, if both
"SELECT A and B are set to logic 1, indicating PBus is controlled by
"MASTER A arbiter, MASTER B can change SELECT B to a logic 0 where
"PBus arbiter will become under control of MASTER B.
"
" © 1993, 1994 ascom Timeplex Trading AG. All rights reserved.
```

A46

```
"PBUS DATA PORT CONTROL                            PAGE 2
"
"Data Port Select (DPS) identifies which group of data ports are
"selected for data transfer. Valid combinations are as follow:
"
"
"    DPS1      DPS0       DATA PORT SELECTED
"==============================================================
"     0         0          B, C
"     0         1          A, C
"     1         0          A, B
"     1         1          A, B, C
"
"
"
"
"Normally DPS[0,1] is set to [1, 1] resulting in 96-bit PBus data
"transfers. In case of data port failure, depending on which data
"port is experiencing the problem, MASTER A or B can modify DPS[0,1]
"to bypass the failed port.
"
"
"PBUS REDUNDANCY REGISTER PROTECTION
"
"In order to protect the redundancy register from unwanted writes,
"this register has extra protection. For software to write to this
"register the following steps must be followed.
"
"    1- write constant ^b11010101 (0xD5) to address 0x30000100.
"
"    2- write the redundancy value with data bits D7 and D6 set to
"        0 (^b00XXXXXX) to address 0x30000180.
"
"Note that these two write shall be in sequence and the hardware
"will block any writes to this register that are out of sequence or
"not properly sequenced. Also the non Master boards can only read
"the redundancy register.
"
"
```

A47

```
"
RED DEVICE     'MACH120A';

"*****************************************************************
"
" INPUTS

GEO0, GEO1, GEO2, GEO3   pin 28, 29, 14, 13;  " GEOgraphical address of the board BPID            pin 12;    " BACKPLANE ID RED_IN0         pin 20;    " Redundancy from PBus
RED_IN1         pin 51;
RED_IN2         pin 54;
RED_IN3         pin 11;
RED_IN4         pin 10;
RED_IN5         pin 24;

A7              pin 16;    "CPU ADDRESS LINE

!CS             pin 49;    "REDUNDANCY CHIP SLELECT

!ADS            pin 25;

!BLAST          pin 26;

CWRITE          pin 50;

!PRST           pin 17;

clk             pin 15;    "ICLK

"*****************************************************************
" OUTPUTS

D0              pin 38 istype 'com,buffer';  " CPU DATA BUS
D1              pin 37 istype 'com,buffer';
D2              pin 40 istype 'com,buffer';
D3              pin 7  istype 'com,buffer';
D4              pin 6  istype 'com,buffer';
D5              pin 5  istype 'com,buffer';
D6              pin 41 istype 'com,buffer';
D7              pin 9  istype 'com,buffer';

RED_OUT0        pin 36 istype 'reg,buffer';  " Redundancy to PBus
RED_OUT1        pin 30 istype 'reg,buffer';
RED_OUT2        pin 39 istype 'reg,buffer';
RED_OUT3        pin 31 istype 'reg,buffer';
RED_OUT4        pin 32 istype 'reg,buffer';
RED_OUT5        pin 33 istype 'reg,buffer';
```

A-48

```
DPS1, DPS0      pin 62, 60 istype 'reg,buffer'; "data port select
ARBSEL          pin 63 istype 'reg,buffer'; " arbitration select MASTER_A        pin 65 istype 'com,buffer'; " master A detected
MASTER_B        pin 64 istype 'com,buffer'; " master B detected
MASTER          pin 67 istype 'com,buffer'; " master A or b detected RED_EN          pin 3 istype 'com,buffer'; " redundancy regiser
                                           " write enable
!LOCK           pin 66 istype 'reg,invert'; " lock any writes to RED reg SM0, SM1        pin 2, 4 istype 'reg,buffer'; " state machine
```

A49

```
"**********************************************************************
"                                    PAGE
"
" VARIABLE ASSIGNMENTS for

VCC = 1;

Z = .Z.;
X = .X.;
c = .c.;
cp = [clk];

GEO_ADDR    = [GEO3, GEO2, GEO1, GEO0];
P20_SLOT1   = [ 0 , 0 , 0 , 1 ];
P20_SLOT2   = [ 0 , 0 , 1 , 0 ];
P60_SLOT7   = [ 0 , 1 , 1 , 1 ];
P60_SLOT10  = [ 1 , 0 , 0 , 0 ]; " slot 10 corresponds to addr. 8

P20_CHASSIS = 0;
P60_CHASSIS = 1;

REDI        = [RED_IN5, RED_IN4, RED_IN3, RED_IN2, RED_IN1, RED_IN0];
REDO        = [RED_OUT5, RED_OUT4, RED_OUT3, RED_OUT2, RED_OUT1, RED_OUT0];

"**********************************************************************
" STATE VALUES

SM      = [SM1, SM0];    " last data-fifo-in detection
IDLE    = [ 0 , 0 ];
UNLOCK  = [ 0 , 1 ];
WAIT    = [ 1 , 0 ];

DATA = [D7, D6, D5, D4, D3, D2, D1, D0];

KEY  = [ 1, 1, 0, 1, 0, 1, 0, 1];

"**********************************************************************

DECLARATIONS

" 0xD5

UNLOCK_PATTERN = D7.PIN&D6.PIN&!D5.PIN&D4.PIN&!D3.PIN&D2.PIN&!D1.PIN&D0.PIN;
```

```
"*************************************************************
"                           PAGE
"           PBUS-FIFO-CPU STATE MACHINE  U152, PAGE 15
"
equations RED_OUT0.C      = clk;
RED_OUT1.C      = clk;
RED_OUT2.C      = clk;
RED_OUT3.C      = clk;
RED_OUT4.C      = clk;
RED_OUT5.C      = clk;

DPS1.C          = clk;
DPS0.C          = clk;
ARBSEL.C        = clk;

SM0.C           = clk;
SM1.C           = clk;

ARBSEL.C        = clk;
DPS0.C          = clk;
DPS1.C          = clk;

LOCK.C          = clk;

MASTER_A = (BPID == P20_CHASSIS) & (GEO_ADDR == P20_SLOT1)
       # (BPID == P60_CHASSIS) & (GEO_ADDR == P60_SLOT7);

MASTER_B = (BPID == P20_CHASSIS) & (GEO_ADDR == P20_SLOT2)
       # (BPID == P60_CHASSIS) & (GEO_ADDR == P60_SLOT10);

MASTER   = (BPID == P20_CHASSIS) & (GEO_ADDR == P20_SLOT1)
       # (BPID == P60_CHASSIS) & (GEO_ADDR == P60_SLOT7)
       # (BPID == P20_CHASSIS) & (GEO_ADDR == P20_SLOT2)
       # (BPID == P60_CHASSIS) & (GEO_ADDR == P60_SLOT10);

RED_EN  = !D7.PIN & !D6.PIN & A7 & CS & BLAST & CWRITE;

RED_OUT0 := !LOCK.FB  & RED_EN.FB    & D0.PIN & !PRST & MASTER
       # !RED_EN.FB & RED_OUT0.FB         & !PRST & MASTER
       # LOCK.FB   & RED_OUT0.FB         & !PRST & MASTER;

RED_OUT1 := !LOCK.FB  & RED_EN.FB    & D1.PIN & !PRST & MASTER
       # !RED_EN.FB & RED_OUT1.FB         & !PRST & MASTER
       # LOCK.FB   & RED_OUT1.FB         & !PRST & MASTER;
```

```
RED_OUT2  := MASTER & RED_IN3 & !RED_IN4 & !PRST
          #  MASTER & !RED_IN3 & RED_IN4 & !PRST;

RED_OUT3  := !LOCK.FB   & RED_EN.FB    & D3.PIN & !PRST & MASTER_A
          #  LOCK.FB    & RED_OUT3.FB  & !PRST & MASTER_A
          #  !RED_EN.FB & RED_OUT3.FB  & !PRST & MASTER_A;

RED_OUT4  := !LOCK.FB   & RED_EN.FB    & D4.PIN & !PRST & MASTER_B
          #  LOCK.FB    & RED_OUT4.FB  & !PRST & MASTER_B
          #  !RED_EN.FB & RED_OUT4.FB  & !PRST & MASTER_B;

"This bit (R5) is reserved for now and can be written by either Master A or B

RED_OUT5  := !LOCK.FB   & RED_EN.FB    & D5.PIN & !PRST & MASTER
          #  LOCK.FB    & RED_OUT5.FB  & !PRST & MASTER
          #  !RED_EN.FB & RED_OUT5.FB  & !PRST & MASTER;

DPS0      := !RED_IN0;
DPS1      := !RED_IN1;

ARBSEL    := !RED_IN2;

DATA.OE = CS & !CWRITE;

D0    = RED_IN0 & A7
      # RED_OUT0 & !A7;

D1    = RED_IN1 & A7
      # RED_OUT1 & !A7;

D2    = RED_IN2 & A7
      # RED_OUT2 & !A7;

D3    = RED_IN3 & A7
      # RED_OUT3 & !A7;

D4    = RED_IN4 & A7
      # RED_OUT4 & !A7;

D5    = RED_IN5 & A7
      # RED_OUT5 & !A7;

D6    = MASTER_A & A7
      # LOCK;

D7    = MASTER_B & A7
      # MASTER;
```

A52

" This state machine detects any writes to the redundancy register and will
" block writes that are out of sequence to protect unwanted writes to this
" register.
"
" Only master A or B can write to this register.

state_diagram   SM;

state   IDLE :

LOCK := 1;
        if !PRST & CWRITE & CS & !A7 & UNLOCK_PATTERN & (MASTER_A # MASTER_B)
          then UNLOCK
        else IDLE;

state   UNLOCK:

if ADS then WAIT;  " first ADS. unlock red. reg. and Wait for
        else UNLOCK;       " the next ADS for locking up writes to RED state   WAIT:

if BLAST  then IDLE; " as soon as seeing the end of cycle, jump
        else WAIT;            " to IDLE

A≤3

```
test_vectors    (

[!PRST,cp,GEO_ADDR,BPID,REDI,A7,!CS,!ADS,!BLAST,CWRITE,DATA]->[REDO,DPS1,DPS0,ARB
SEL,MASTER_A,MASTER_B,MASTER,RED_EN,!LOCK,SM])

" RESET CONDITION/ CHECKING DPSn, ARBSEL, MASTER A/B

[0 ,c,    1 ,0 ,0 ,0, 1, X, X ,  X , 0 ]->[ 0 , 1 , 1 , 1  ,  1  ,  0  ,  1 , 0 , 0
,IDLE];
[0 ,c,    1 ,0 ,1 ,0, 1, X, X ,  X , 0 ]->[ 0 , 1 , 0 , 1  ,  1  ,  0  ,  1 , 0 , 0
,IDLE];
[0 ,c,    1 ,0 ,2 ,0, 1, X, X ,  X , 0 ]->[ 0 , 0 , 1 , 1  ,  1  ,  0  ,  1 , 0 , 0
,IDLE];
[0 ,c,    1 ,0 ,3 ,0, 1, X, X ,  X , 0 ]->[ 0 , 0 , 0 , 1  ,  1  ,  0  ,  1 , 0 , 0
,IDLE];
[0 ,c,    1 ,0 ,7 ,0, 1, X, X ,  X , 0 ]->[ 0 , 0 , 0 , 0  ,  1  ,  0  ,  1 , 0 , 0
,IDLE];

" WRITING TO DPS0 WITH PROPER SEQUENCE

[1 ,c,   1 ,0 ,7 ,0, 0, 0, 1 ,  1 , KEY]->[ 0 , 0 , 0 , 0  ,  1  ,  0  ,  1 , 0 , 0
,UNLOCK];
[1 ,c,   1 ,0 ,7 ,0, 0, 1, 1 ,  1 , 0 ]->[ 0 , 0 , 0 , 0  ,  1  ,  0  ,  1 , 0 , 1
,UNLOCK];
[1 ,c,   1 ,0 ,7 ,1, 0, 0, 0 ,  1 , 1 ]->[ 1 , 0 , 0 , 0  ,  1  ,  0  ,  1 , 1 , 1
,WAIT];
[1 ,c,   1 ,0 ,7 ,1, 0, 1, 0 ,  1 , 1 ]->[ 1 , 0 , 0 , 0  ,  1  ,  0  ,  1 , 1 , 1
,IDLE];

" WRITING TO DPS0 WITH IMPROPER SEQUENCE

[1 ,c,   1 ,0 ,7 ,1, 0, 0, 1 ,  1 , 0 ]->[ 1 , 0 , 0 , 0  ,  1  ,  0  ,  1 , 0 , 0
,IDLE];
[1 ,c,   1 ,0 ,7 ,1, 0, 1, 1 ,  1 , 1 ]->[ 1 , 0 , 0 , 0  ,  1  ,  0  ,  1 , 0 , 0
,IDLE];

end
```

```
module TXRX                                 " PAGE 1

TXRX DEVICE      'mach220a';
" © 1993, 1994 ascom, Timeplex Trading A.G. All rights reserved.
" 06-03-93
"--------
"
"  This version affects RSP bus as follow.
"
"       ACKCH changed from 111 (7) to 110 (6)
"       NAK   changed from 110 (6) to 111 (7)
"
"  This way if a processor board is in reset, it will NAK any CHREQs.
"
"
"08-10-93
"--------
"
"  Changes made on 6.3.93 caused other problems. Going back to oriogional
"  setup for RSP bus.
"
"
"08-14-93
"--------
"       Adding RXWAIT for the transmit machine since there may be a packet
"       transfer in progress with the Tx machine when RXWAIT is asserted.
"       Note : RXWAIT should be renamed to TXRXWAIT !
"
"       Asserting LDAVRX when NOPOV or WDTOV is asserted to gurantee that FIFO
"       will get emptyed.
"
"
"08-19-93
"--------
"       After changing RSP bus back to its oriogional values, CHNNAK flag
"       did not get asserted in the loopback test since RXEN is not asserted and
"       RSP returns [1,1,1] which coresponds to ACkCHN. To fix this RSP.OE is
"       modified where it only responeds to LRXADDR.
"
"
"09-07-93
"--------
"       New problem with RXTERM. RXIDLE must be asserted when RXTERM is
"       is asserted since this could trigger RXSDMA.
"
"
"09-14-93
"--------
"       Taking vectors out for manufacturing.
"
```

```
"
"
"09-17-93
"--------
"       RSP is respoding EMPTY in RX_WAIT state. changing RSP response to
"       NAK in that state.
"
"
"10-07-93
"--------
"       Noticed a problem with multiple CMDs.  When one board is in receive
"       mode and other boards send CHREQ, there is a chance that garbage get
"       latched into the T/R since RXLDRDY and RXEN are asserted.  To avoid this,
"       the only time to latch data is when there is a DAV or LDAV command that
"       was issued.
"
"12-15-93
"--------
"       It is time to corrctly activate REMOTE RESET thrugh PIPE.
"
"       RESET- will get asserted for 2 clock cycles (currently = 100 nsec total)
"
"
"03-04-94
"--------
"   1)  Problem with racing on the RXSM and WDTOV.  Changing the state machine
"       assignments are changed.
"
"   2)  Problem with TXSM returning to IDLE when remote reset is issued.
"       After commanding remote reset the state machine should transition to
"       TRANSDONE state where an interrupt will be generated.
"
"04-18-94 MB
"--------
"       Problem with RXEDMA being asynch. to the RXSM machine casusing
"       RXIDLE logic to get asserted while the SM is in IDLE.
"       By latching the RXEDMA using PIPE clock this problem is avoided!?
"
"
"       WDTOV can cause the above problem when it is triggered.  To
"       sleep better at night, this signal is also latched!
"
"
"       The reset capability from the receive state machine is removed
"       since no body for the past 1.5 year has requested it or talked about it
"       (Mike H. even thought it is not a nessesary function to keep around)
"       The terms are removed just in case of problems.
"
"
"                       AMD-MACH VERSION
"
"***********************************************************************
"
"                       PBUS TRANSMIT STATE MACHINE
```

```
"
" PBus transmit state machine controls transfer of packets to other prcessor
"
" boards.  To activate this machine PBus MANAGER shall enable this machine,
"
" TXEN = 1.  TXADDR is monitored while the state machine is enabled.
"
" If TXADDR (GEO3:0 == ARB3:0) is true, then state machine first trys to
"
" establish a channel and then starts to command for data transfer, DAV.
"
" In both process, channel setup and data transfer, errors could occur which
"
" will be handled by the state machine.  For state diagarm refer to PBUS
"
" TRANSMIT STATE MACHINE (FILENAME : PB_TX2.sm, Sept. 22, 92).  For detailed
"
" explanation of PBus and this Machine refer to PAGASUS PACKET-BUS
"
" ARCHITECTURAL SPECIFICATION.
"
"
```

```
"*************************************************************************
"               PBUS TRANSMIT STATE MACHINE              PAGE 2
"
" INPUTS

!ATE_OD         pin 13;  "Automatic Test EQ. OUTPUT DISABLE

TXADDR          pin 36;  "TXADDR IS ASSERTED WHEN ARB&GEO MATCH

LTXADDR         pin 28;

LDAVTX          pin 39;  "LAST DATA FLAG FROM DMA CONTROLLER
                         "LDAVTX IS A BIT THAT IS SHIFTED THROUGH
                         "FIFO.

TXEN            pin 50;  "TX ENABLE FROM PBUS MANAGER.

!ARBSEL         pin 26;  "ARBITRATION BOARD NUMBER. ZERO FOR SLOT 1/7
                         "AND ONE FOR SLOT 2/10 ER5/15
!TXTERM         pin 54;  "PBUS RESET LOGIC. TX TXLRDY          pin 51;  "INDICATES NOT TO ISSUE DAV ON NEXT
                         "AVAILABLE SLOT.

RXLRDY          pin 10;  " READY TO WRITE TO FIFO (FROM PBUS PAL.
                         " FIFO CONTROLLER)

REMRST          pin 44;  "RESET COMMAND FROM COMMAND REGISTER.

!MNP            pin 20;  "Master Network Processor. (Arb. board present)

clk1            pin 15;

WDTOV_a         pin 3;       " watch dog timer overflow

WDTOV           node istype 'reg,BUFFER';

RXEN            pin 16;      " RX enable

RXADDR          pin 17;      " when GEO3:0 matches ADD3:0

LRXADDR         pin 30;      " when GEO3:0 matches ADD3:0

RXTERM          pin 49;      "TREMINATE RECEIVE STATE MACHINE

RXEDMA_a        pin 21;      " Receive DMA controller in IDLE state

RXEDMA          node istype 'reg,buffer';

RXGO            pin 5;       " Software control of the receive mach.

RXWAIT_a        pin 14;      " TWO PACKETS RECEIVED. DISABLE RECECIVE
```

RXWAIT    node istype 'reg,buffer';

" OUTPUTS

RSP0, RSP1, RSP2        pin 56, 55 , 2 istype        'reg_D,buffer';

RXSM0, RXSM1        pin 4, 24    istype        'reg_D,buffer';

"
" NOP-counter keeps track of number of NOPs received while in receive mode.
"
RXNCTR0, RXNCTR1, RXNCTR2, RXNCTR3, RXNCTR4  NODE    ISTYPE 'REG_T,BUFFER';
RXNCTR  = [RXNCTR4, RXNCTR3, RXNCTR2, RXNCTR1, RXNCTR0];

RXNCTRRST        node        istype 'reg_D,buffer';

RXNCTR_MAXED    node        istype 'com, buffer';

!WDTCLR     pin  37    istype  'reg_D,BUFFER';  " CLEARs WATCH DOG TIMER

FNOPOV      pin  7     istype  'reg_D,buffer';  " Flag NOP overflow

RXDONE      pin  25    istype  'reg_D,BUFFER';  " Receive done

!RSTCMD     pin  9     istype  'COM,invert';  " remote reset command
                                              " activates this line to reset the
                                              " entire CPU board.

LDAVRX      pin  57    istype  'reg_D,buffer';  " last data in receive

RXIDLE      pin  6     istype  'reg_D,invert';  " Receive in idle state

FIFOWR      pin  58    istype  'reg_D,buffer';  " FIFO write( push) command
                                                " to PBus-FIFO PAL.

TXDONE          pin 43  istype  'REG,BUFFER';  " TRANSMITE IS DONE

!ADDRE          pin 60  istype  'REG,invert';  " ENABLE ADDR. REG U165

FIFORD          pin 46  istype  'REG,BUFFER';  " COMMANDS PBUS-FIFO
                                               " CONTROLLER TO READ 3
                                               " WORDS OUT OF FIFO TO PBUS
                                               " DATA LATCHES CHSUOK          pin 29  istype  'REG,BUFFER';  "CHANNEL SETUP WAS SUCC.

FDISK           pin 31  istype  'REG,BUFFER';  "DISCOUNECT FLAG

FCHNNAK         pin 63  istype  'REG,BUFFER';  "CHANNEL SETUP NAKS MAX'ED

FDAVNAK         pin 62  istype  'REG,BUFFER';  "DATA TRANSFER NAKS MAX'ED

FEMPTY          pin 41  istype  'REG,BUFFER';  " PROCESSOR BPOARD NOT
                                               " PRESENT.

```
!OEBABC          pin 59 istype  'REG,invert';  " Output Enable Bside
                                               " A, B, C port CMD0, CMD1, CMD2     pin 23, 22, 45 istype 'REG,BUFFER';  " PBUS COMMAND BUS NCTR_CNT_E            node  istype 'com, buffer';

NCTR0, NCTR1, NCTR2, NCTR3, NCTR4  NODE  istype 'REG_T,BUFFER';
NCTR    = [NCTR4, NCTR3, NCTR2, NCTR1, NCTR0 ];
MAXNAK  = [ 1 , 1 , 1 , 1 , 1 ];  " MAX NOPS = 32

MAX_NOP =    [1, 1, 1, 1, 1];  " MAX NOPS = 32

NCTRRST         node  istype 'REG,BUFFER';

NCTR_MAXED         NODE    istype 'COM, buffer';  "if NCTR == MAX_NAKS

" Reseting NCTR:
          " Since one product term can be used for this function,
          " a macorcell is used to sum all products.

HOLD_STAT       pin 40  istype  'REG,BUFFER';

DAV_RIPPLE       NODE   istype 'reg,buffer';  " This bit is used to
                                              " propegate CMD == DAV
                                              " from wait_my_address to
                                              " chech response state
                                              " in order to do proper
                                              " FIFORD.

CMDDAV         pin 12   istype 'com,buffer';  " When command bus is DAV
                                              " or LDAV. This logic is
                                              " used to prevent incorrect
                                              " writes to T/R.

dummy_arbsel        node  istype 'com';       "to not allow Able to make
                                              "ARBSEL to be an output REMOTE_RESET       NODE  istype 'reg,buffer'; " This logic is used to
                                              " extend the reset line to
                                              " two clock cycles since
                                              " .OE can only have 1Pterm "*************************************************************************
" STATE MACHINE ASSIGNMENTS TXSM0, TXSM1     pin 33, 67    istype      'REG_T,BUFFER';

TXSM2         pin 48     istype     'REG_T,BUFFER';

"
" Last Data Avaiable detection SM
```

```
LDAVSMP    pin    66    istype    'REG,BUFFER';
```

```
"****************************************************************************
"              PBUS TRANSMIT STATE MACHINE              PAGE
"
" VARIABLE ASSIGNMENTS for

EN = 1;
DISABLE = 0;

Z = .Z.;
X = .X.;
c = .c.;
cp = [clk1];

"RXLRDY = TXLRDY;

" VARIABLE ASSIGNMENTS for response bus

RSP    = [RSP2, RSP1, RSP0];

ACKCH = [ 1 , 1 , 1]; " 7
"                        ACKCH  = [ 1 , 1 , 0];  6
ACK   = [ 0 , 1 , 1]; " 3
"                        NAK    = [ 1 , 1 , 1];  7
NAK   = [ 1 , 1 , 0]; " 6
DISC  = [ 1 , 0 , 1]; " 5
EMPTY = [ 0 , 0 , 0]; " 0

" VARIABLE ASSIGNMENTS for command bus

CMD   =    [CMD2, CMD1, CMD0];

CHREQ =    [ 0 , 1 , 1]; " 3
DAV   =    [ 1 , 1 , 0]; " 6
LDAV  =    [ 1 , 0 , 1]; " 5
NOP   =    [ 0 , 0 , 0]; " 0
BRST  =    [ 1 , 0 , 0]; " 4

"****************************************************************************
" STATE VALUES

TXSM      = [TXSM2, TXSM1, TXSM0];

IDLE      = [ 0 , 0 , 0 ];
REQCHNL   = [ 0 , 0 , 1 ];    " REQUEST CHANNEL
CHKRSPCHN = [ 1 , 1 , 0 ];    " CHECK RESPONSE in CHANNEL SETUP
WAITMYADDA= [ 0 , 1 , 1 ];    " WAIT FOR MY ADDRESS CHANNEL SETUP
WAITMYADDB= [ 1 , 0 , 0 ];    " WAIT FOR MY ADDRESS DATA TRANSFER
COMMAND   = [ 1 , 0 , 1 ];    " COMMANDING DAV TO PBUS
TRANSDONE = [ 0 , 1 , 0 ];
CHKRSP    = [ 1 , 1 , 1 ];    " CHECKING RSP to LDAV / DAV COMMAND

RX_SM     = [RXSM1 , RXSM0];        " Receive state machine
```

```
IDLERX     = [ 0 , 0 ];
WAIT_CMD   = [ 0 , 1 ];        " waiting for Command from PIPE
RX_WAIT    = [ 1 , 1 ];        " Allowing a cycle for all SM to settle
HOLD_RESET = [ 1 , 0 ];        " Remote Reset issues from masters to
                               " Non-Masters only!

LDAVSM     = [LDAVSMP];
WAITLDAV   = [ 0 ];  " waiting for LAST data from FIFO state machine
LDAVSTATE  = [ 1 ];  " LAST data detected and waiting for TX to be done

VCC = 1;
```

```
"**********************************************************************
"              PBUS TRANSMIT STATE MACHINE              PAGE 5
"
equations FIFORD.OE     = !ATE_OD;
TXDONE.OE     = !ATE_OD;
ADDRE.OE      = !ATE_OD;
CHSUOK.OE     = !ATE_OD;
FDISK.OE      = !ATE_OD;
FCHNNAK.OE    = !ATE_OD;
FDAVNAK.OE    = !ATE_OD;
FEMPTY.OE     = !ATE_OD;
OEBABC.OE     = !ATE_OD;
HOLD_STAT.OE  = !ATE_OD;
LDAVSM.OE     = !ATE_OD;
LDAVRX.OE     = !ATE_OD;
FIFOWR.OE     = !ATE_OD;
RXIDLE.OE     = !ATE_OD;
WDTCLR.OE     = !ATE_OD;
FNOPOV.OE     = !ATE_OD;
RXDONE.OE     = !ATE_OD;
TXSM.OE       = !ATE_OD;
RX_SM.OE      = !ATE_OD;
CMDDAV.OE     = !ATE_OD;

NCTR.C        = clk1;
FIFORD.C      = clk1;
TXDONE.C      = clk1;
ADDRE.C       = clk1;
CHSUOK.C      = clk1;
FDISK.C       = clk1;
FCHNNAK.C     = clk1;
FDAVNAK.C     = clk1;
FEMPTY.C      = clk1;
OEBABC.C      = clk1;
CMD.C         = clk1;
HOLD_STAT.C   = clk1;
NCTRRST.C     = clk1;
LDAVSM.C      = clk1;
DAV_RIPPLE.C  = clk1;
[TXSM2, TXSM1, TXSM0].C = clk1;
RX_SM.C       = clk1;
RSP.C         = clk1;
LDAVRX.C      = clk1;
FIFOWR.C      = clk1;
RXIDLE.C      = clk1;
WDTCLR.C      = clk1;
FNOPOV.C      = clk1;
RXDONE.C      = clk1;
RXNCTRRST.C   = clk1;
RXNCTR.C      = clk1;
REMOTE_RESET.C= clk1;
```

```
RXEDMA.C    = clk1;
RXWAIT.C    = clk1;
WDTOV.C     = clk1;

RXEDMA   :=   RXEDMA_a;
RXWAIT   :=   RXWAIT_a;
WDTOV    :=   WDTOV_a;

REMOTE_RESET := 0;  "DISABLE REMOTE RESET 4/18/94 dummy_arbsel = ARBSEL;  "ARBSEL can be removed from this PAL on the next rev.?
              "12-15-93

"------------------------------------------------------------
"
" CMDDAV : When command bus is DAV or LDAV.
"
" This logic is used to prevent incorrect writes to T/R.

CMDDAV  = (CMD.PIN == DAV) # (CMD.PIN == LDAV);
"------------------------------------------------------------
"
" The NAK COUNTER, NCTR, dose two functions.  They are described as follow:
" NCTR keeps track of number of times channel setup has failed within
" a same transfer cycle.
" NCTR keeps track of number of times data transfer has failed within a same
" transfer cycle.
"
  NCTR0.T = NCTR_CNT_E.Q
      #  NCTRRST.Q & NCTR0.Q;

NCTR1.T = NCTR0.Q & NCTR_CNT_E.Q
      #  NCTRRST.Q & NCTR1.Q;

NCTR2.T = NCTR0.Q & NCTR1.Q & NCTR_CNT_E.Q
      #  NCTRRST.Q & NCTR2.Q;

NCTR3.T = NCTR0.Q & NCTR1.Q & NCTR2.Q & NCTR_CNT_E.Q
      #  NCTRRST.Q & NCTR3.Q;

NCTR4.T = NCTR0.Q & NCTR1.Q & NCTR2.Q & NCTR3.Q& NCTR_CNT_E.Q
      #  NCTRRST.Q & NCTR4.Q;

NCTR_CNT_E = (TXSM.FB == CHKRSPCHN) & !( RSP.PIN == ACKCH) & !NCTRRST.Q
       # (TXSM.FB == CHKRSP)    & !( RSP.PIN == ACK)   & !NCTRRST.Q;

NCTR_MAXED = (NCTR.Q == MAXNAK);

CMD.OE      = LTXADDR & TXEN & !ATE_OD; " FOR PROTOTYPE VERSION

" TXEN & TXADDR;
                     " This bus is used between TX , RX
                     " state machine and the arbitration
                     " boards on MPBs.
```

A-66

```
    FDISK  := ((TXSM.FB == CHKRSP) & (RSP.PIN == DISC));

FEMPTY := ((TXSM.FB == CHKRSP) & (RSP.PIN == EMPTY));

ADDRE  := TXADDR & TXEN;

"*************************************************************
"                              PAGE
"               PBUS RECEIVE STATE MACHINE
"

RXNCTR0.T = ((RX_SM.FB == WAIT_CMD) & (CMD.PIN == NOP) & RXADDR &
!RXNCTRRST.Q)
          # RXNCTRRST.Q & RXNCTR0.FB;

RXNCTR1.T = RXNCTR0.FB &
          ((RX_SM.FB == WAIT_CMD) & (CMD.PIN == NOP) & RXADDR & !RXNCTRRST.Q)
          # RXNCTRRST.Q & RXNCTR1.FB;

RXNCTR2.T = RXNCTR0.FB & RXNCTR1.FB &
          ((RX_SM.FB == WAIT_CMD) & (CMD.PIN == NOP) & RXADDR & !RXNCTRRST.Q)
          # RXNCTRRST.Q & RXNCTR2.FB;

RXNCTR3.T = RXNCTR0.FB & RXNCTR1.FB & RXNCTR2.FB &
          ((RX_SM.FB == WAIT_CMD) & (CMD.PIN == NOP) & RXADDR & !RXNCTRRST.Q)
          # RXNCTRRST.Q & RXNCTR3.FB;

RXNCTR4.T = RXNCTR0.FB & RXNCTR1.FB & RXNCTR2.FB & RXNCTR3.FB &
          ((RX_SM.FB == WAIT_CMD) & (CMD.PIN == NOP) & RXADDR & !RXNCTRRST.Q)
          # RXNCTRRST.Q & RXNCTR4.FB;

RXNCTR_MAXED = (RXNCTR.FB == MAX_NOP);

RSTCMD    = 1; " RESET is active all the time. RESET.OE is
               " controlled inorder to force reset.

RSTCMD.OE = !ATE_OD & REMOTE_RESET;

RSP.OE    = LRXADDR "& RXEN" & !ATE_OD;  " change 8.19.93
```

```
"****************************************************************************
"              PBUS TRANSMIT STATE MACHINE                    PAGE
"
state_diagram  TXSM;  " state machine diagram : 'PB_TX2.SM' SEPT. 22, 1992

STATE IDLE :
         NCTRRST := 1;
         if (TXADDR & TXEN & !TXTERM "& !RXWAIT") then REQCHNL  with CMD := CHREQ;
                                    FIFORD := 1;
                                       endwith
             else IDLE
   STATE REQCHNL :
           GOTO CHKRSPCHN;

STATE CHKRSPCHN :
          if (RSP.PIN == EMPTY) then TRANSDONE with
                                 TXDONE := 1;
                                 FEMPTY := 1;
                              endwith;
          else if (RSP.PIN == ACKCH) then WAITMYADDB with
                                       NCTRRST:= 1;
                                       CHSUOK := 1;
                                    endwith;
              else WAITMYADDA;

STATE WAITMYADDA :
          if TXTERM then IDLE;
          else
           if (NCTR_MAXED.Q) then TRANSDONE with
                                 TXDONE := 1;
                                 FCHNNAK := 1;
                              endwith;
            else if TXADDR then REQCHNL with CMD := CHREQ;
              else WAITMYADDA;

STATE WAITMYADDB :
   if TXTERM then IDLE;
   else if (REMRST & TXADDR & MNP) then TRANSDONE with CMD := BRST;
                                  TXDONE := 1;
                                endwith
    else
     if (TXADDR & TXLRDY & !LDAVTX) then COMMAND with CMD := DAV;
                                    DAV_RIPPLE := 1;
                                 endwith;

else if (TXADDR & TXLRDY & LDAVTX) then COMMAND with CMD := LDAV;

else if (TXADDR & !TXLRDY) then COMMAND with CMD := NOP else WAITMYADDB

STATE COMMAND :
               DAV_RIPPLE := DAV_RIPPLE.FB; "propegate DAV command
```

```
                OEBABC := 1; " enable 96-bit data into P-Bus
                GOTO CHKRSP;
STATE CHKRSP :
    if (NCTR_MAXED.Q)  then TRANSDONE with
                            TXDONE := 1;
                            FDAVNAK:= 1;
                        endwith
    else if ((RSP.PIN == ACK) & (LDAVSM.FB == WAITLDAV) & (!NCTR_MAXED.Q))
        then WAITMYADDB
                        " if COManding NOP -> do not read FIFO
            with  FIFORD := DAV_RIPPLE.FB; "if command was DAV -> issue FIFORD
                NCTRRST:= 1;
            endwith;

else if ((RSP.PIN == ACK) & (LDAVSM.FB == LDAVSTATE)) then TRANSDONE
                            with TXDONE := 1;
                            endwith;

else if ((RSP.PIN == EMPTY) # (RSP.PIN == DISC)) then TRANSDONE
                            with TXDONE := 1;
                            endwith;
        else WAITMYADDB;
STATE TRANSDONE :
        TXDONE := 1;
        HOLD_STAT := 1;
        GOTO IDLE;
"
```

```
"*****************************************************************
"              PBUS TRANSMIT STATE MACHINE              PAGE
"
" In order to make sure LDAVTX is detected in MYADDRB state, a 1bit state
" machine keeps track of LDAVTX.  If Command LDAV is given, LDAV machine
" enters LDAVSTATE where it will be checked in CHKRSP state.  In other words,
" there is no way for CHKRSP state to determine which path is taken when
" branching from MYADDRB state and with LDAVSM  this will be possible.
"
"
state_diagram   LDAVSM;   " state machine diagram : 'PB_TX2.SM' state WAITLDAV :
          if TXADDR & TXLRDY & LDAVTX & TXEN then LDAVSTATE
          else WAITLDAV;

state LDAVSTATE:
          if ((TXSM.FB == TRANSDONE) # (TXSM.FB == IDLE)) then WAITLDAV
             else LDAVSTATE "*****************************************************************
"                                                      PAGE
"              PBUS RECEIVE STATE MACHINE
"
state_diagram   RX_SM;   "PB_RX1.SM state IDLERX :
          RXNCTRRST := 1;
          WDTCLR := 1;

if RXTERM then IDLERX with RSP := NAK;
                          RXIDLE := 1;
                    endwith;
           else
           if ((CMD.PIN == CHREQ) & RXADDR & RXEN & RXEDMA & RXGO & !RXWAIT)
             then WAIT_CMD with RSP := ACKCH;
                             " RXRXIDLE := 0;
                  endwith else IDLERX with RSP := NAK;
                       RXIDLE := 1;
                  endwith;
  state  WAIT_CMD :

if WDTOV then RX_WAIT with RXDONE := 1;
                       RXIDLE := 1;
                       FIFOWR := 1;  " forcing FIFO empty
                       LDAVRX := 1;  " forcing FIFO empty
                       RSP := NAK;
                   endwith;
        else
```

```
            if ((CMD.PIN == BRST) & RXADDR & !MNP) then HOLD_RESET
"                            with REMOTE_RESET := 1;   4-18-94
            else
             if RXTERM then IDLERX ;
               else if (!RXLRDY & RXADDR) then WAIT_CMD with
                                     RSP := NAK;
                                    endwith;
               else if ((CMD.PIN == LDAV) & RXADDR) then RX_WAIT with RXDONE := 1;
                                     RSP :=ACK;
                                     FIFOWR := 1;
                                     LDAVRX := 1;
                                     RXIDLE := 1;
                                    endwith;
               else if ((CMD.PIN == NOP) & RXADDR & (RXNCTR_MAXED))
                   then RX_WAIT with RXDONE := 1;
                           RSP :=ACK;
                           FNOPOV := 1;
                           RXIDLE := 1;
                           FIFOWR := 1;       " forcing FIFO empty
                           LDAVRX := 1;       " forcing FIFO empty
                        endwith;
               else if ((CMD.PIN == NOP) & RXADDR & (!RXNCTR_MAXED))
                   then WAIT_CMD with RSP :=ACK;
                            WDTCLR := 1;
                         endwith
               else if ((CMD.PIN == DAV) & RXLRDY & RXADDR)
                   then WAIT_CMD with RSP := ACK;
                            WDTCLR := 1;
                            FIFOWR := 1;
                            RXNCTRRST := 1;
                        endwith;

else WAIT_CMD with RSP :=NAK;
                        endwith;

state RX_WAIT :
            RSP := NAK;
            RXIDLE := 1;
            goto IDLERX;

state HOLD_RESET:

"          REMOTE_RESET := 1;   4-18-94
           goto IDLERX;
"
```

```
"********************************************************************
"              PBUS TRANSMIT STATE MACHINE              PAGE
"
"
"[ c ,X,  1 ,  0 ,  0 ,  0 ,  0 ,  0 ]->[ 0 ,  0 ,  0 , Z, 0, 1  , 0];
"
"
"test_vectors   (
"
"[cp,!TXTERM,TXADDR,LDAVTX,TXEN,TXLRDY,CMD,RSP]->[TXDONE,CMD,   RSP,TXSM,NCTR,
NCTRRST, NCTR_CNT_E])
"[c,  0,  0 ,  0  , 0 ,  0  , X, X ]->[ 0  , X ,  X , 0, 0,  1  ,   0  ]; 1
"[c,  0,  0 ,  0  , 0 ,  0  , X, X ]->[ 0  , X ,  X , 0, 0,  1  ,   0  ]; 2
"[c,  1,  1 ,  0  , 1 ,  0  , X, X ]->[ 0  , X ,  X , 1, 0,  1  ,   0  ]; 3
"[c,  1,  1 ,  0  , 1 ,  0  , X, X ]->[ 0  , X ,  X , 6, 0,  0  ,   1  ]; 4
"
"[c,  1,  1 ,  0  , 1 ,  0  , X, 6 ]->[ 0  , X ,  X , 3, 1,  0  ,   0  ]; 5
"
"[c,  1,  1 ,  0  , 1 ,  0  , X, 6 ]->[ 0  , X ,  X , 1, 1,  0  ,   0  ];
"[c,  1,  1 ,  0  , 1 , 0   , X, 6 ]->[ 0  , X ,  X , 6, 1,  0  ,   1  ];
"[c,  1,  1 ,  0  , 1 ,  0  , X, 6 ]->[ 0  , X ,  X , 3, 2,  0  ,   0  ];
"[c,  1,  1 ,  0  , 1 ,  0  , X, 6 ]->[ 0  , X ,  X , 1, 2,  0  ,   0  ];
"[c,  1,  1 ,  0  , 1 ,  0  , X, 6 ]->[ 0  , X ,  X , 6, 2,  0  ,   1  ];
"[c,  1,  1 ,  0  , 1 ,  0  , X, 6 ]->[ 0  , X ,  X , 3, 3,  0  ,   0  ];
"[c,  1,  1 ,  0  , 1 ,  0  , X, 6 ]->[ 0  , X ,  X , 1, 3,  0  ,   0  ];
"
end
``` module parb                              " PAGE 1

" © 1993, 1994 ascom Timeplex Trading AG. All rights reserved.
" 5-26-93 Note:
"           This version is done for final routing.
"           The prototype version is in .\bak directory.
"
"
" 09-21-93
" --------
"     Due to some time out problems, this version will allow a NOP cycle
" to all processor boards. (for test only)
"
"
" 10-19-93
" --------
"     Starting to test Dynamic arbitration.
"
"
" 12-15-93
"---------
"     It seems like the last hardware change to the Arbitration board
"  has increased the delay on the SEQ bus where wrong slot is placed on
"  the fast path. DAV4 was used for this reason and DAV3 will be used
"  now.
"

parb  DEVICE     'MACH220A';

"****************************************************************
"
"          PEGASUS DYNAMIC ARBITRATION CONTROLLER
"
"****************************************************************
"
"
"

"
" INPUTS

CLK                pin 15;   " ICLK

RESET_IN           PIN 50;

"TEST_RST          PIN 54;   for simulation only

CMD2, CMD1, CMD0   PIN 17, 20, 51;

RSP2, RSP1, RSP0   PIN;

```
SSEN                            PIN 2;
SSCP                            PIN 3;
!P20                            PIN 4;

"************************************************************
" OUTPUTS

REG1P, REG1A, REG1B, REG1C, REG1D       PIN 32, 23, 48, 36, 22  ISTYPE 'REG, BUFFER';
REG2P, REG2A, REG2B, REG2C, REG2D       NODE    ISTYPE 'REG, BUFFER';
REG3P, REG3A, REG3B, REG3C, REG3D       NODE    ISTYPE 'REG, BUFFER';
REG4P, REG4A, REG4B, REG4C, REG4D       NODE    ISTYPE 'REG, BUFFER';
REG5P, REG5A, REG5B, REG5C, REG5D       NODE    ISTYPE 'REG, BUFFER';
REG6P, REG6A, REG6B, REG6C, REG6D       NODE    ISTYPE 'REG, BUFFER';
REG7P, REG7A, REG7B, REG7C, REG7D       NODE    ISTYPE 'REG, BUFFER';
REG8P, REG8A, REG8B, REG8C, REG8D       NODE    ISTYPE 'REG, BUFFER';
REG9P, REG9A, REG9B, REG9C, REG9D       NODE    ISTYPE 'REG, BUFFER';
REG10P,REG10A, REG10B, REG10C, REG10D   NODE    ISTYPE 'REG, BUFFER';
REG11P,REG11A, REG11B, REG11C, REG11D   NODE    ISTYPE 'REG, BUFFER';
REG12P,REG12A, REG12B, REG12C, REG12D   NODE    ISTYPE 'REG, BUFFER';
REG13P,REG13A, REG13B, REG13C, REG13D   NODE    ISTYPE 'REG, BUFFER';
REG14P,REG14A, REG14B, REG14C, REG14D   NODE    ISTYPE 'REG, BUFFER';
REG15P,REG15A, REG15B, REG15C, REG15D   NODE    ISTYPE 'REG, BUFFER';
REG16P,REG16A, REG16B, REG16C, REG16D   NODE    ISTYPE 'REG_T, BUFFER';
```

```
SM1, SM0              PIN 12, 14    ISTYPE 'REG, BUFFER';

"
" Total of 2 registers are used to delay CMD bus results to the pipe line
" register.
"

DAV1              pin 56 istype 'reg,buffer';
DAV2              pin 67 istype 'reg,buffer';
DAV3              pin 26 istype 'reg,buffer';
DAV4              pin 11 istype 'reg,buffer';

PARITY_OK         pin    istype 'reg,buffer';

RESET             pin 13 istype 'reg,buffer';

SSEN_OUT          pin 60 istype 'reg,buffer';

PBUSCP            pin 59 istype 'reg,buffer';

dummy             node istype 'reg';

TFF               node istype 'reg_T,buffer';
```

```
"***********************************************************************
"           PEGASUS DYNAMIC ARBITRATION CONTROLLER        PAGE
"
" VARIABLE ASSIGNMENTS for

TEST_RST = 0;

VCC = 1;

"     REGnA is the MSB & REGnD is the LSB.  REGnP is the parity bit (ODD)

REG1  = [REG1P, REG1A,  REG1B,  REG1C,  REG1D ];
REG2  = [REG2P, REG2A,  REG2B,  REG2C,  REG2D ];
REG3  = [REG3P, REG3A,  REG3B,  REG3C,  REG3D ];
REG4  = [REG4P, REG4A,  REG4B,  REG4C,  REG4D ];
REG5  = [REG5P, REG5A,  REG5B,  REG5C,  REG5D ];
REG6  = [REG6P, REG6A,  REG6B,  REG6C,  REG6D ];
REG7  = [REG7P, REG7A,  REG7B,  REG7C,  REG7D ];
REG8  = [REG8P, REG8A,  REG8B,  REG8C,  REG8D ];
REG9  = [REG9P, REG9A,  REG9B,  REG9C,  REG9D ];
REG10 = [REG10P,REG10A, REG10B, REG10C, REG10D];
REG11 = [REG11P,REG11A, REG11B, REG11C, REG11D];
REG12 = [REG12P,REG12A, REG12B, REG12C, REG12D];
REG13 = [REG13P,REG13A, REG13B, REG13C, REG13D];
REG14 = [REG14P,REG14A, REG14B, REG14C, REG14D];
REG15 = [REG15P,REG15A, REG15B, REG15C, REG15D];
CTR   = [REG16P,REG16A, REG16B, REG16C, REG16D];
```

```
CMD     = [CMD2, CMD1, CMD0];
DAV_CMD = [ 1 , 1 , 0 ];

" HEXADECIMAL VALUES STARTIN FROM 0001. with parity P preset to ODD

"       P   A   B   C   D

B_1  = [ 1 , 0 , 0 , 0 , 1]; "1

B_2  = [ 1 , 0 , 0 , 1 , 0]; "2

B_3  = [ 0 , 0 , 0 , 1 , 1]; "3

B_4  = [ 1 , 0 , 1 , 0 , 0]; "4

B_5  = [ 0 , 0 , 1 , 0 , 1]; "5

B_6  = [ 0 , 0 , 1 , 1 , 0]; "6

B_7  = [ 1 , 0 , 1 , 1 , 1]; "7

B_8  = [ 1 , 1 , 0 , 0 , 0]; "8

B_9  = [ 0 , 1 , 0 , 0 , 1]; "9

B_A  = [ 0 , 1 , 0 , 1 , 0]; "A

B_B  = [ 1 , 1 , 0 , 1 , 1]; "B

B_C  = [ 0 , 1 , 1 , 0 , 0]; "C

B_D  = [ 1 , 1 , 1 , 0 , 1]; "D

B_E  = [ 1 , 1 , 1 , 1 , 0]; "E

B_F  = [ 0 , 1 , 1 , 1 , 1]; "F

"---------------------------------------------------------------
"
SM          = [ SM1, SM0];
IDLE        = [ 0 , 0 ];
WAIT_RESET  = [ 0 , 1 ];
WAIT_1      = [ 1 , 0 ];
WAIT_2      = [ 1 , 1 ];
"
c = .c.;
```

```
"           PEGASUS DYNAMIC ARBITRATION CONTROLLER        PAGE
equations

TFF.clk            = CLK;

CTR.clk            = CLK;

SM.clk             = CLK;
DAV1.clk           = CLK;
DAV2.clk           = CLK;
DAV3.clk           = CLK;
DAV4.clk           = CLK;

DAV1.AR            = TEST_RST;
DAV2.AR            = TEST_RST;
DAV3.AR            = TEST_RST;
DAV4.AR            = TEST_RST;
CTR.AR             = TEST_RST;
TFF.AR             = TEST_RST;

REG1.CLK           = CLK;
REG2.CLK           = CLK;
REG3.CLK           = CLK;
REG4.CLK           = CLK;
REG5.CLK           = CLK;
REG6.CLK           = CLK;
REG7.CLK           = CLK;
REG8.CLK           = CLK;
REG9.CLK           = CLK;
REG10.CLK          = CLK;
REG11.CLK          = CLK;
REG12.CLK          = CLK;
REG13.CLK          = CLK;
REG14.CLK          = CLK;
REG15.CLK          = CLK;

PARITY_OK.CLK      = CLK;
RESET.CLK          = CLK;

SSEN_OUT.CLK       = CLK;
PBUSCP.CLK         = CLK;

SM.AR              = TEST_RST;
REG1.AR            = TEST_RST;
REG2.AR            = TEST_RST;
REG3.AR            = TEST_RST;
REG4.AR            = TEST_RST;
REG5.AR            = TEST_RST;
REG6.AR            = TEST_RST;
REG7.AR            = TEST_RST;
REG8.AR            = TEST_RST;
```

```
REG9.AR         = TEST_RST;
REG10.AR        = TEST_RST;
REG11.AR        = TEST_RST;
REG12.AR        = TEST_RST;
REG13.AR        = TEST_RST;
REG14.AR        = TEST_RST;
REG15.AR        = TEST_RST;
PARITY_OK.AR    = TEST_RST;
RESET.AR        = TEST_RST;

SSEN_OUT.AR     = TEST_RST;
PBUSCP.AR       = TEST_RST;
``` dummy = P20 & SSEN & SSCP; " to make sure that mach fiiter do not assign these
" pins as output.

```
"SSEN_OUT  := !SSEN;
 SSEN_OUT  := 1;      " forcing this logic to 1 since no plan to use it. 12-15

PBUSCP    := !PBUSCP;
"PBUSCP.OE  = SSEN;
 PBUSCP.OE  = 0;      " forcing this logic to 0 since no plan to use it. 12-15

REG1    := REG2 & !DAV3.FB & "!P20 &" !RESET    " shift
         #  REG11&  DAV3.FB & "!P20 &" !RESET    " hold
         #  B_1  &           "!P20 &"  RESET;
 "       #  CTR & TFF; " " & P20;"

REG2    := REG3 & !DAV3.FB & !RESET    "shift
         #  REG2 &  DAV3.FB & !RESET    "hold
         #  B_2  &            RESET;

REG3    := REG4 & !DAV3.FB & !RESET    "shift
         #  REG3 &  DAV3.FB & !RESET    "hold
         #  B_3  &            RESET;

REG4    := REG5 & !DAV3.FB & !RESET    "shift
         #  REG4 &  DAV3.FB & !RESET    "hold
         #  B_4  &            RESET;

REG5    := REG6 & !DAV3.FB & !RESET    "shift
         #  REG5 &  DAV3.FB & !RESET    "hold
         #  B_5  &            RESET;

REG6    := REG7 & !DAV3.FB & !RESET    "shift
         #  REG6 &  DAV3.FB & !RESET    "hold
         #  B_6  &            RESET;

REG7    := REG8 & !DAV3.FB & !RESET    "shift
         #  REG7 &  DAV3.FB & !RESET    "hold
         #  B_7  &            RESET;

REG8    := REG9 & !DAV3.FB & !RESET    "shift
         #  REG8 &  DAV3.FB & !RESET    "hold
         #  B_8  &            RESET;

REG9    := REG10& !DAV3.FB & !RESET    "shift
         #  REG9 &  DAV3.FB & !RESET    "hold
         #  B_9  &            RESET;

REG10   := REG11& !DAV3.FB & !RESET    "shift
         #  REG10&  DAV3.FB & !RESET    "hold
         #  B_A  &            RESET;

REG11   := REG12 & !RESET
         #  B_B   &  RESET;
```

```
REG12  := REG13 & !RESET
       #  B_C   & RESET;

REG13  := REG14 & !RESET
       #  B_D   & RESET;

REG14  := REG15 & !RESET
       #  B_E   & RESET;

REG15  := REG1  & !RESET
       #  B_F   & RESET;
```

```
DAV1 := (CMD == DAV_CMD);
DAV2 := DAV1.FB;
DAV3 := DAV2.FB;
DAV4 := DAV3.FB;
```

"
"        COUTER EQ.
"

TFF.T   =   VCC;

REG16D.T =   TFF; " allowing a NOP cycle between every PBus access. (testing)

REG16C.T =   REG16D & TFF;

REG16B.T =   REG16D & REG16C & TFF;

REG16A.T =   REG16D & REG16C & REG16B & TFF; " SHOULD BE SET TO ZERO

REG16P.T =   VCC; " DONT CARE

"
"               PARITY CHECK
"
"  If a single bit changes in the following table, PARITY_OK will be
" deserted which causes a reset.

truth_table ([REG15A , REG15B , REG15C , REG15D , REG15P] :> PARITY_OK)

[ 0 , 0 , 0 , 0 , 0]  :>  0;

[ 1 , 0 , 0 , 0 , 1]  :>  1;

[ 1 , 0 , 0 , 1 , 0]  :>  1;

[ 0 , 0 , 0 , 1 , 1]  :>  1;

[ 1 , 0 , 1 , 0 , 0]  :>  1;

[ 0 , 0 , 1 , 0 , 1]  :>  1;

[ 0 , 0 , 1 , 1 , 0]  :>  1;

[ 1 , 0 , 1 , 1 , 1]  :>  1;

[ 1 , 1 , 0 , 0 , 0]  :>  1;

[ 0 , 1 , 0 , 0 , 1]  :>  1;

```
[ 0 , 1 , 0 , 1 , 0] :> 1;
[ 1 , 1 , 0 , 1 , 1] :> 1;
[ 0 , 1 , 1 , 0 , 0] :> 1;
[ 1 , 1 , 1 , 0 , 1] :> 1;
[ 1 , 1 , 1 , 1 , 0] :> 1;
[ 0 , 1 , 1 , 1 , 1] :> 1;
```

```
"       PEGASUS DYNAMIC ARBITRATION CONTROLLER        PAGE 4
"
state_diagram  SM;

state IDLE :

if RESET_IN then WAIT_RESET;
       else if !PARITY_OK then WAIT_RESET " it is OK to jump to WAIT_RESET
       else IDLE;

state WAIT_RESET :

if RESET_IN then WAIT_RESET;
       else WAIT_1;

state WAIT_1 :

goto WAIT_2;

state WAIT_2 :
            RESET := 1;

goto IDLE;

end
```

APPENDIX B

Aug 19 15:51 1994  pb_misc.s Page 1

```
# @(#)pb_misc.s 4.2 /home/u9/tl100/mps/os960/SCCS/s.pb_misc.s  94/01/20 os960
/*
------------------------------------------------------------------------------
| Copyright (C) 1993, 1994, ascom Timeplex Inc. All Rights Reserved
|
| File:      PB_MISC.S
|
| Contents:  P-Bus driver low-level (assembly language) functions:
|            void DMA_setup(U32 control, U32 channel, void *address,
|                           U32 count)
|            void DMA_init(void)
|            DMAC_TYPE DMAC_get(void)
|            void DMAC_set(DMAC_TYPE value)
|            void DMAC_set_bit(U32 bit_pos)
|            void DMA_stop(U32 channel)
|            void DMA_start(U32 channel)
|            void DMA_status(void)
|
| History:
|
|    Date       Person     Comments
|    ----       ------     --------
|    4/21/93    Abe L.     Creation.
|
------------------------------------------------------------------------------
*/

/* Symbols used in this file.                                               */

.set    THROTTLE_BIT, 0x00200000 # Throttle bit in DMAC register.

/*************************************************************************
*
* Function: void DMA_setup(U32 control, U32 channel, void *address, U32 count);
*
* Description: Configures a DMA channel.
*
* Parameters:
*           control    DMACW_TX or DMACW_RX (see pbus.h).
*           channel    DMA channel number (0 through 3, inclusive).
*           address    Location of transmit/receive data/buffer.
*           count      Number of bytes to transmit/receive.
*
* Returns: Nothing.
*
*************************************************************************/
        .text
        .align    4
        .globl    _DMA_setup, DMA_setup.lf
        .leafproc _DMA_setup, DMA_setup.lf _DMA_setup:
        .space    8                       # This is mandatory!
DMA_setup.lf:                             # Gets converted to DMA_setup_lf.
```

B1

Aug 19 15:51 1994  pb_misc.s Page 2

```
        mov     g3, g4              # Must be quad-aligned register.
        mov     g2, g5              # Must be in following register.
        sdma    g1, g0, g4          # Configure the DMA channel.
        bx      (g14)               # Leafproc return.

/******************************************************************
*
* Function: void DMA_init(void);
*
* Description: Initializes DMA command register (DMAC).
*              This stops any DMA action in progress, sets the DMA priority
*              mode to "fixed" and the throttle mode to a maximum of one DMA
*              clock to one user clock.
*
* Parameters: None.
*
* Returns: Nothing.
*
******************************************************************/

.text
        .align   4
        .globl   _DMA_init, DMA_init.lf
        .leafproc _DMA_init, DMA_init.lf _DMA_init:
        .space   8                  # This is mandatory!
DMA_init.lf:                        # Gets converted to DMA_init_lf.
        ldconst  THROTTLE_BIT, g0   # Throttle bit.
        mov      g0, sf2            # The DMAC register is "sf2".
        bx       (g14)              # Leafproc return.

/******************************************************************
*
* Function: DMAC_TYPE DMAC_get(void);
*
* Description: Returns the CPU's DMA command (DMAC) register.
*
* Parameters: None.
*
* Returns: The CPU's DMAC register.
*
******************************************************************/

.text
        .align   4
        .globl   _DMAC_get, DMAC_get.lf
        .leafproc _DMAC_get, DMAC_get.lf _DMAC_get:
        .space   8                  # This is mandatory!
DMAC_get.lf:                        # Gets converted to DMAC_get_lf.
        mov      sf2, g0            # The DMAC register is "sf2".
        bx       (g14)              # Leafproc return.

/******************************************************************
```

Aug 19 15:51 1994  pb_misc.s Page 3

```
/*******************************************************************
*
* Function: void DMAC_set(DMAC_TYPE value);
*
* Description: Sets the CPU's DMA command (DMAC) register.
*
* Parameters:
*           value      New value for the DMAC register.
*
* Returns: Nothing.
*
*******************************************************************/
        .text
        .align    4
        .globl    _DMAC_set, DMAC_set.lf
        .leafproc _DMAC_set, DMAC_set.lf _DMAC_set:
        .space    8                    # This is mandatory!
DMAC_set.lf:                           # Gets converted to DMAC_set_lf.
        mov       g0, sf2              # The DMAC register is "sf2".
        bx        (g14)                # Leafproc return.

/*******************************************************************
*
* Function: void DMAC_set_bit (U32 bit_pos);
*
* Description: Sets a bit in the CPU's DMA command (DMAC) register.
*
* Parameters:
*           bit_pos    Bit position (0 through 31) to set to "1".
*
* Returns: Nothing.
*
*******************************************************************/
        .text
        .align    4
        .globl    _DMAC_set_bit, DMAC_set_bit.lf
        .leafproc _DMAC_set_bit, DMAC_set_bit.lf _DMAC_set_bit:
        .space    8                    # This is mandatory!
DMAC_set_bit.lf:                       # Gets converted to DMAC_set_bit_lf.
        setbit    g0, sf2, sf2         # The DMAC register is "sf2".
        bx        (g14)                # Leafproc return.

/*******************************************************************
*
* Function: void DMA_stop(U32 channel);
*
* Description: Suspend DMA on one channel.
*              This function is in assembly language for two reasons:
*              1) It can be done with one machine instruction, obviating
*                 the need to have interrupts disabled when it's called.
*              2) It's much faster than compiled C code.
```

B3

Aug 19 15:51 1994 pb_misc.s Page 4

```
*
* Parameters:
*           channel    DMA channel number (0 through 3, inclusive).
*
* Returns: Nothing.
*
**********************************************************************/

.text
        .align   4
        .globl   _DMAC_stop, DMAC_stop.lf
        .leafproc _DMAC_stop, DMAC_stop.lf _DMAC_stop:
        .space   8                       # This is mandatory!
DMAC_stop.lf:                            # Gets converted to DMAC_stop_lf.
        clrbit   g0, sf2, sf2            # Clear channel enable bit in DMAC reg.
                                         # (Bit 0 is channel 0's enable bit.)
        bx       (g14)                   # Leafproc return.

/**********************************************************************
*
* Function: void DMA_start(U32 channel);
*
* Description: Enable DMA on one channel.
*              This function is in assembly language for two reasons:
*              1) It can be done with one machine instruction, obviating
*                 the need to have interrupts disabled when it's called.
*              2) It's much faster than compiled C code.
*
* Parameters:
*           channel    DMA channel number (0 through 3, inclusive).
*
* Returns: Nothing.
*
**********************************************************************/

.text
        .align   4
        .globl   _DMAC_start, DMAC_start.lf
        .leafproc _DMAC_start, DMAC_start.lf _DMAC_start:
        .space   8                       # This is mandatory!
DMAC_start.lf:                           # Gets converted to DMAC_start_lf.
        setbit   g0, sf2, sf2            # Set channel enable bit in DMAC reg.
                                         # (Bit 0 is channel 0's enable bit.)
        bx       (g14)                   # Leafproc return.

/*----------------------- End of PB_MISC.S ---------------------------*/
```

B4

Aug 19 15:51 1994  pb_lib.c Page 1

```c
/** @(#)pb_lib   4.8 /home/u9/t1100/mps/os960/SCCS/s.pb_lib.c  94/05/16 os960 **/
#ifdef EPRISE
/*
-----------------------------------------------------------------------------
| Copyright (C) 1993, 1994, ascom Timeplex Inc. All Rights Reserved
|
| File:      PB_LIB.C
|
| Contents:  System call entry point PB_lib,
|            and the P-Bus driver library utility functions:
|              PB_slots
|              PB_this_slot
|              PB_master_slots
|              PB_is_master
|              PB_power
|              PB_fans
|              PB_set_tx_retries
|              PB_reset_slot_state
|              PB_get_slot_state
|              PB_set_status
|              PB_check_master
|              PB_be_master
|              PB_switch_master
|              PB_check_bus
|              PB_select_bus
|              PB_set_bcast
|              PB_add_mcast_addr
|              PB_delete_mcast_addr
|              PB_flash_FAIL_LED
|              PB_check_arbitration
|              PB_check_clock
|              PB_MAC_table
|              PB_PIPE_reset
|
| History:
|  12/03/93   Abe L.     Changes for non slot based PIP MAC addresses
|
|  Date       Person     Comments
|  ----       ------     --------
|  4/22/93    Abe L.     Creation.
|  7/21/93    Larry L.   Renamed local routines.  Eliminated PB_FUNCTION
|  8/09/93    Larry L.   Added check_arbitration
|  9/20/93    Larry L.   Added check_clock
|  10/15/93   Larry L.   Add parameter to flash_FAIL_LED()
|  12/01/93   Abe L.     Removed PB_go_down().  Added PB_set_status().
|                        Added PB_MAC_table().
|  5/16/94    Abe L.     Added PB_PIPE_reset().
|
-----------------------------------------------------------------------------
*/ include "includes.h"
include "pb_lib.h"
#include "pbus.h"

/* OS variables, structures, etc.                                            */
```

Aug 19 15:51 1994 pb_lib.c Page 2

```c
extern struct os386cmos   cmos;          /* OS config parameters.        */
extern struct interfaces  *intfstats[];  /* SNMP variables.              */
extern unsigned           drv_numulp[];  /* Number of ulps for each intf.*/
extern unsigned           drv_ulp[NUM_INTF][MAX_DRV_ULPS];
                                         /* Pids of upper protocols.     */
extern trapvarlist        varlist;       /* SNMP trap structure.         */
extern U32                pc_time;       /* System time.                 */ extern process_table      *drv_pptr[NUM_INTF]; /* Process table pointers. */
extern process_table      *cpptr;        /* Ptr to current process table. */

/* Global variables defined in pb_init.c.                                 */
/* !!!!!!!!!!!!!!!!!!!!!!!!!!!!!!!!!!!!!!!!!!!!!!!!!!!!!!!!!!!!!!!!!!!! */
extern U32 PB_just_reset;
/* !!!!!!!!!!!!!!!!!!!!!!!!!!!!!!!!!!!!!!!!!!!!!!!!!!!!!!!!!!!!!!!!!!!! */
extern U32 nSlots;                       /* P-Bus slots in this chassis. */ extern U32 our_slot;                     /* This RNP's slot number.      */ extern U32 max_tx_retries;               /* Maximum number of tx retries.*/ extern U32 PB_driver_state;              /* P-Bus driver software state. */ extern U32 PB_slot_state[MAX_SLOTS];     /* Current state of all slots.  */ extern hw_addrTYPE PB_MAC_to_slot[MAX_SLOTS + 1]; /*MAC addresses for slots*/
                                         /* (one-based slots).           */ extern U32 bc_table[NUM_PIDS][MAX_SLOTS]; /* Slots that get BC packets for */
                                         /* each protocol.               */ extern PB_MC_TABLE_TYPE pb_mc_table[MAX_MC_ADDRESSES];/*The multicast table.*/ extern U32 nMCaddrs;                     /* Number of active MC addresses.*/

/* Prototypes of the P-Bus library functions in this file.                */ static U32  PB_slots(void);
static U32  PB_this_slot(void);
static void PB_master_slots(U32 *a, U32 *b);
static U32  PB_is_master(void);
static U32  PB_power(void);
static U32  PB_fans(void);
static void PB_set_tx_retries(U32 retries);
static void PB_reset_slot_state(void);
static S32  PB_get_slot_state(U32 slot);
static void PB_set_status(U32 status);
static U32  PB_check_master(void);
static void PB_be_master(void);
static void PB_switch_master(void);
static void PB_check_bus(U32 *a, U32 *b, U32 *c);
static void PB_select_bus(U32 a, U32 b, U32 c);
static void PB_set_bcast(U32 slot, U32 nProtos, U32 protoIDs[]);
static U32  PB_add_mcast_addr(U32 addr, U32 slot);
```

Aug 19 15:51 1994 pb_lib.c Page 3

```c
static void PB_delete_mcast_addr(U32 addr, U32 slot);
static void PB_flash_FAIL_LED(U32 clear_ind);
static U32  PB_check_arbitration(void);
static U32  PB_check_clock(void);
static void PB_MAC_table(hw_addrTYPE table[]);
static void PB_PIPE_reset(U32 reset_type);

/***********************************************************************
*
* Function:     PB_lib
*
* Description:  System call entry point for all P-Bus library functions.
*
* Called by:    The Chassis Manager, PCP, and P-Bus driver initialization.
*
* Parameters:   The first parameter must be one of the enumerated constants
*               specified in COM960\PB_LIB.H. This parameter determines which
*               library function is invoked.
*
*               There must be three parameters following the enumerated
*               constant.  All three must be U32s.  If the target function
*               requires other than U32 parameter(s), the corresponding
*               parameter(s) must be cast to U32(s).  (PB_lib() recasts
*               parameters for the target function if necessary.)  If the
*               target function requires less than three parameters, all three
*               must still be present; the unused parameters may be 0, NULL,
*               etc.
*
* Returns:      A U32 from target functions that return a value, and
*               NULL from those that don't.
*
* Note:         The function prototype for PB_lib is in COM960\OS386.H.
*
***********************************************************************/

U32 PB_lib(U32 function, U32 param_1, U32 param_2, U32 param_3)
{
    switch (function)
    {
        case SLOTS:
            return PB_slots();

case THIS_SLOT:
            return PB_this_slot();

case MASTER_SLOTS:
            PB_master_slots((U32 *)param_1, (U32 *)param_2);
            return (U32)NULL;

case IS_MASTER:
            return PB_is_master();

case POWER:
            return PB_power();

case FANS:
```

B7

Aug 19 15:51 1994 pb_lib.c Page 4

```
        return PB_fans();

case SET_TX_RETRIES:
        PB_set_tx_retries(param_1);
        return (U32)NULL;

case RESET_SLOT_STATE:
        PB_reset_slot_state();
        return (U32)NULL;

case GET_SLOT_STATE:
        return (U32)PB_get_slot_state(param_1);

case SET_STATUS:
        PB_set_status(param_1);
        return (U32)NULL;

case CHECK_MASTER:
        return PB_check_master();

case BE_MASTER:
        PB_be_master();
        return (U32)NULL;

case SWITCH_MASTER:
        PB_switch_master();
        return (U32)NULL;

case CHECK_BUS:
        PB_check_bus((U32 *)param_1, (U32 *)param_2, (U32 *)param_3);
        return (U32)NULL;

case SELECT_BUS:
        PB_select_bus(param_1, param_2, param_3);
        return (U32)NULL;

case SET_BCAST:
        PB_set_bcast(param_1, param_2, (U32 *)param_3);
        return (U32)NULL;

case ADD_MCAST_ADDR:
        return PB_add_mcast_addr(param_1, param_2);

case DELETE_MCAST_ADDR:
        PB_delete_mcast_addr(param_1, param_2);
        return (U32)NULL;

case FLASH_FAIL_LED:
        PB_flash_FAIL_LED(param_1);
        return (U32)NULL;

case CHECK_ARBITRATION:
        return(PB_check_arbitration());

case CHECK_CLOCK:
        return(PB_check_clock());
```

B8

Aug 19 15:51 1994 pb_lib.c Page 5

```c
        case MAC_TABLE:
            PB_MAC_table((hw_addrTYPE *)param_1);
            return (U32)NULL;

case PIPE_RESET:
            PB_PIPE_reset(param_1);
            return (U32)NULL;

default:
            screech(PB_LIB_BAD_CALL);
            return -1;
        }
} /* PB_lib() */

/***********************************************************************
*
* Function:     PB_slots
*
* Description:  Returns the number of P-Bus slots in this chassis.
*
* Called by:    The Chassis Manager.
*
* Parameters:   None.
*
* Returns:      Number of P-Bus slots: 5 for an ER-5; 15 for an ER-15.
*
***********************************************************************/

U32 PB_slots(void)
{
    return nSlots;                          /* Number of slots in chassis.*/
} /* PB_slots() */

/***********************************************************************
*
* Function:     PB_this_slot
*
* Description:  Returns this Network Processor's P-Bus slot number
*               (one-based).
*
* Called by:    The Chassis Manager.
*
* Parameters:   None.
*
* Returns:      Chassis slot number, 1 through MAX_SLOTS.
*
* Note:         The P-Bus driver uses zero-based slot numbers.
*
***********************************************************************/

U32 PB_this_slot(void)
{
    return (our_slot + 1);          /* Return our slot number (one-based). */
```

Aug 19 15:51 1994  pb_lib.c  Page 6

```c
} /* PB_this_slot() */

/***********************************************************************
 *
 * Function:     PB_master_slots
 *
 * Description:  Provides the two Master Network Processor slot numbers
 *               (one-based) for this chassis.
 *
 * Called by:    The Chassis Manager.
 *
 * Parameters:   Pointers to two U32s that will receive these slot numbers.
 *
 * Returns:      No return value, but stores two slot numbers at the locations
 *               specified in the two parameters.
 *
 ***********************************************************************/ void PB_master_slots(U32 *a, U32 *b)
{
   if (PB_STATUS & PB_CHASSIS)           /* If this is an ER-15...       */
   {
      *a = ER15_MPB_A;                   /* Return the two slot numbers.*/
      *b = ER15_MPB_B;
   }
   else
   {                                     /* This is an ER-5.             */
      *a = ER5_MPB_A;                    /* Return the two slot numbers.*/
      *b = ER5_MPB_B;
   }
   return;
} /* PB_master_slots() */

/***********************************************************************
 *
 * Function:     PB_is_master
 *
 * Description:  Returns TRUE if the execution Network Processor is a
 *               Master Network Processor (i.e., has P-Bus arbitration
 *               logic and is in a master slot), and FALSE if not.
 *
 * Called by:    The Chassis Manager.
 *
 * Parameters:   None.
 *
 * Returns:      TRUE if this is executing on a Master Network Processor;
 *               FALSE otherwise.
 *
 ***********************************************************************/

U32 PB_is_master(void)
{
   U32 status = PB_STATUS;               /* P-Bus hardware status.       */
   U32 retval = FALSE;                   /* Assume this NP is not a master. */
```

Aug 19 15:51 1994  pb_lib.c Page 7

```c
   if ((status & PB_MNP) == 0)       /* If arbitration logic present... */
      if (status & PB_CHASSIS)       /* If ER-15...                     */
      {
         if (((our_slot + 1) == ER15_MPB_A) || ((our_slot + 1) == ER15_MPB_B))
            retval = TRUE;
      }
      else
      {                              /* This is an ER-5.                */
         if (((our_slot + 1) == ER5_MPB_A) || ((our_slot + 1) == ER5_MPB_B))
            retval = TRUE;
      }
   return retval;
} /* PB_is_master() */

/****************************************************************************
 *
 * Function:     PB_power
 *
 * Description:  Returns TRUE if the power supply is within acceptable
 *               limits.
 *
 * Called by:    The Chassis Manager.
 *
 * Parameters:   None.
 *
 * Returns:      TRUE if the power supply is within acceptable limits;
 *               FALSE otherwise.
 *
 ****************************************************************************/

U32 PB_power(void)
{
   if ((PB_STATUS & PB_PS_OK) != 0)  /* Power supply is OK if bit is 1. */
      return TRUE;
   return FALSE;
} /* PB_power() */

/****************************************************************************
 *
 * Function:     PB_fans
 *
 * Description:  Returns TRUE if the cooling fans are operational.
 *
 * Called by:    The Chassis Manager.
 *
 * Parameters:   None.
 *
 * Returns:      TRUE if the cooling fans are operational; FALSE otherwise.
 *
 ****************************************************************************/

U32 PB_fans(void)
{
```

Aug 19 15:51 1994  pb_lib.c  Page 8

```c
    if ((PB_STATUS & PB_FAN_OK) != 0)      /* Fans are OK if bit is 1.   */
        return TRUE;
    return FALSE;
} /* PB_fans() */

/****************************************************************************
 *
 * Function:      PB_set_tx_retries
 *
 * Description:   Set the maximum number of consecutive times a packet's
 *                transmission will be attempted after transmission
 *                failure before the packet will be discarded.
 *
 * Called by:     ???
 *
 * Parameters:
 *                retries    New maximum number of transmission retries.
 *
 * Returns:       Nothing.
 *
 ****************************************************************************/ void PB_set_tx_retries(U32 retries)
{
    if (retries <= MAX_RETRY_COUNT)        /* If within reasonable bound... */
        max_tx_retries = retries;          /* Set to what was requested.    */
    else                                    /* If unreasonable request...    */
        max_tx_retries = MAX_RETRY_COUNT;  /* Set to maximum allowed.       */ return;
} /* PB_set_tx_retries() */

/****************************************************************************
 *
 * Function:      PB_reset_slot_state
 *
 * Description:   Reset the state of all slots to SLOT_UNKNOWN.
 *
 * Called by:     Chassis manager.
 *
 * Parameters:    None.
 *
 * Returns:       Nothing.
 *
 ****************************************************************************/ void PB_reset_slot_state(void)
{
    memset(PB_slot_state, SLOT_UNKNOWN, sizeof(PB_slot_state));/*Reset them.*/
    return;
} /* PB_reset_slot_state() */

/****************************************************************************
```

Aug 19 15:51 1994 pb_lib.c Page 9

```
*
* Function:      PB_get_slot_state
*
* Description:   Return the current state of the requested slot.
*
* Called by:     Chassis manager.
*
* Parameters:
*                slot     Slot number (one-based).
*
* Returns:
*                Current state of the requested slot or -1 if invalid slot.
*
***********************************************************************/

S32 PB_get_slot_state(U32 slot)
{
   if (slot <= MAX_SLOTS)
      return((S32)PB_slot_state[slot - 1]);   /* (Index is zero-based.)  */
   else
      return(-1);
} /* PB_get_slot_state() */

/***********************************************************************
*
* Function:      PB_set_status
*
* Description:   Tell everyone that the PIPE is or is not operational.
*
* Called by:     Chassis manager.
*
* Parameters:
*                status    PB_DOWN if PIPE is not operational;
*                          PB_UP if PIPE is operational.
*
* Returns:       Nothing.
*
***********************************************************************/ void PB_set_status(U32 status)
{
   process_table *save_cpptr;              /* For saving caller's pptr.*/ intdis();                               /* Disable interrupts.      */
   save_cpptr = cpptr;                     /* Save caller's pptr.      */
   cpptr = drv_pptr[PB_INTERFACE];         /* Change it to ours.       */ net_status_change(PB_INTERFACE,         /* Let drv_util.c's routine*/
           (status == PB_UP) ? NETUP : NETDN); /* do most of the work.  */ if (cmos.intf[PB_INTERFACE].hostadrs[0].inet != 0)
      arpinit(PB_INTERFACE, DOD);          /* Reinitialize ARP.        */ cpptr = save_cpptr;                     /* Restore caller's pptr.   */
```

B13

Aug 19 15:51 1994  pb_lib.c Page 10

```c
    PB_driver_state = status ? PB_UP : PB_DOWN;

/* Tell the PIPE driver to send a message to the Chassis Manager on   */
    /* receipt of the next packet.                                         */
    if (status == PB_DOWN)
       PB_just_reset = TRUE;

intena();                                  /* Enable interrupts.       */
    return;
} /* PB_set_status() */

/*************************************************************************
 *
 * Function:       PB_check_master
 *
 * Description:    Returns P-Bus master status of this RNP.
 *
 * Called by:      Chassis manager.
 *
 * Parameters: None.
 *
 * Returns:
 *         TRUE if this RNP is the P-Bus active master.
 *         FALSE if this RNP is not the P-Bus active master.
 *
 *************************************************************************/

U32 PB_check_master(void)
{
    U32 status = PB_STATUS;          /* P-Bus hardware status register.   */
    U32 arbsel = PB_REDUND & ARBSEL; /* Which master slot has the active  */
                                     /* master (AM).                      */
    U32 retval = FALSE;              /* Assume this RNP is not the AM.    */ if ((status & PB_MNP) == 0)      /* If arbitration logic present...   */
       if (status & PB_CHASSIS)      /* If ER-15...                       */
       {
          if (arbsel == A_SELECTED)  /* If the AM is in slot A...         */
          {
             if ((our_slot + 1) == ER15_MPB_A) /* (our_slot is zero based.) */
                retval = TRUE;
          }
          else
          {                          /* The active master is in slot B.   */
             if ((our_slot + 1) == ER15_MPB_B)
                retval = TRUE;
          }
       }
       else
       {                             /* This is an ER-5.                  */
          if (arbsel == A_SELECTED)  /* If the AM is in slot A...         */
          {
             if ((our_slot + 1) == ER5_MPB_A)  /* (our_slot is zero based.) */
                retval = TRUE;
          }
```

Aug 19 15:51 1994  pb_lib.c Page 11

```c
        else
        {                                   /* The active master is in slot B.  */
           if ((our_slot + 1) == ER5_MPB_B)
              retval = TRUE;
        }
     }
     return retval;
}  /* PB_check_master() */

/***************************************************************************
 *
 * Function:      PB_be_master
 *
 * Description:   Attempts to make this RNP the P-Bus Master RNP.
 *
 * Called by:     Chassis manager.
 *
 * Parameters:    None.
 *
 * Returns:       Nothing.
 *
 ***************************************************************************/ void PB_be_master(void)
{
   U32 slot_A, slot_B;              /* To hold master slot numbers.   */
   U32 pbr;                         /* To hold PB_REDUND value.       */
   U32 i;                           /* Index variable.                */ if ((PB_check_master() == FALSE) && (PB_is_master() == TRUE))
   {                    /* This RNP is a master, but it's not the active master. */

PB_master_slots(&slot_A, &slot_B);  /* Get the master slot numbers.  */ intdis();                           /* Turn off interrupts.          */ pbr = PB_REDUND & REDUND_MASK;      /* Current register value (from  */
                                          /* the bus).                     */
      if ((our_slot + 1) == slot_A)       /* If this is slot A...          */
         pbr ^= SELECT_A;
      else
         pbr ^= SELECT_B;

for (i = 0; i < 2; i++)             /* Try twice at most.            */
      {
         PB_PROTECT = PROTECT_VALUE;      /* Unlock arb. redundancy logic. */
         PB_REDUND = pbr;                 /* Select active master.         */
         if ((PB_PROTECT & REDUND_MASK) == pbr) /*If reg. written properly...*/
            break;                        /* Exit for loop.                */
      } intena();                           /* Turn on interrupts.           */
   }
   return;
}  /* PB_be_master() */
```

B15

Aug 19 15:51 1994 pb_lib.c Page 12

```c
/***************************************************************************
 *
 * Function:      PB_switch_master
 *
 * Description:   Attempts to switch P-Bus mastership, keeping the data
 *                bus redundancy control value.
 *
 * Called by:     Chassis manager.
 *
 * Parameters:  None.
 *
 * Returns:     Nothing.
 *
 ***************************************************************************/ void PB_switch_master(void)
{
   U32 slot_A, slot_B;                  /* For master slot numbers.      */
   U32 pbr;                             /* For PB_REDUND value.          */
   U32 i;                               /* Index variable.               */

PB_master_slots(&slot_A, &slot_B);   /* Get master slot numbers.      */ intdis();                            /* Disable interrupts.           */ pbr = PB_REDUND & REDUND_MASK;       /* Redundancy register from the bus.*/ if ((our_slot + 1) == slot_A)        /* If this is slot A...          */
      pbr ^= SELECT_A;
   else                                 /* If this is slot B...          */
      pbr ^= SELECT_B;

for (i = 0; i < 2; i++)              /* Try twice at most.            */
   {
      PB_PROTECT = PROTECT_VALUE;       /* Unlock arb. redundancy logic. */
      PB_REDUND = pbr;                  /* Switch active mastership.     */
      if ((PB_PROTECT & REDUND_MASK) == pbr) /* If reg. written properly...*/
         break;                         /* Exit for loop.                */
   } intena();                            /* Enable interrupts.            */
   return;
} /* PB_switch_master() */

/***************************************************************************
 *
 * Function:      PB_check_bus
 *
 * Description:   Returns P-Bus data bus status.
 *
 * Called by:     Chassis manager.
 *
 * Parameters:
```

Aug 19 15:51 1994 pb_lib.c Page 13

```c
*               Three pointers to U32s.
*
* Returns:
*           No function return value, but sets the three U32s pointed to by
*           the three parameters to values that indicate which data buses
*           are active.
*
***********************************************************************/ void PB_check_bus(U32 *a, U32 *b, U32 *c)
{
   *a = *b = *c = TRUE;                  /* Assume all buses are in use. */ switch ((PB_REDUND & DPS_MASK) >> DPS_SHIFT) /* Data bus status.      */
   {
      case DPS_BC:                       /* Data ports B and C in use. */
         *a = FALSE;
         break;

case DPS_AC:                       /* Data ports A and C in use. */
         *b = FALSE;
         break;

case DPS_AB:                       /* Data ports A and B in use. */
         *c = FALSE;
         break;
   }
   return;
} /* PB_check_bus() */

/***********************************************************************
*
* Function:     PB_select_bus
*
* Description:  Attempts to select P-Bus data ports.
*
* Called by:    Chassis manager.
*
* Parameters:
*           a   Is TRUE if data port A should be selected.
*           b   Is TRUE if data port B should be selected.
*           c   Is TRUE if data port C should be selected.
*
* Returns:   Nothing.
*
***********************************************************************/ void PB_select_bus(U32 a, U32 b, U32 c)
{
   U32 pbr;                              /* For P-Bus redundancy register. */
   U32 i;                                /* Index variable.                */ intdis();                             /* Disable interrupts.            */ pbr = PB_REDUND & REDUND_MASK         /* P-Bus redundancy register value */
```

B 17

Aug 19 15:51 1994 pb_lib.c Page 14

```c
            & ~DPS_MASK;                /* (from the bus)                 */
                                        /* (without the DPS bits).        */ if (PB_check_master())              /* If we're the active master...  */
    {                                   /* We're in control.              */
        if (a && b && c)                /* If all three buses desired...  */
            pbr |= DPS_ABC;
        else if (a && b)                /* If A and B and not C desired... */
            pbr |= DPS_AB;
        else if (a && c)                /* If A and C and not B desired... */
            pbr |= DPS_AC;
        else if (b && c)                /* If B and C and not A desired... */
            pbr |= DPS_BC;

for (i = 0; i < 2; i++)         /* Try twice at most.             */
        {
            PB_PROTECT = PROTECT_VALUE; /* Unlock arb. redundancy logic.  */
            PB_REDUND = pbr;            /* Select requested buses.        */
            if ((PB_PROTECT & REDUND_MASK) == pbr) /*If reg. written properly...*/
                break;                  /* Exit for loop.                 */
        }
    }                                   /* Else, do nothing.              */
    intena();                           /* Enable interrupts.             */
    return;
} /* PB_select_bus() */

/***********************************************************************
 *
 * Function:      PB_set_bcast
 *
 * Description:   Provides a list of protocols enabled on an RNP.
 *
 * Called by:     Chassis manager
 *
 * Parameters:
 *        slot     P-Bus slot number (one-based).
 *        nProtos  Number of protocol identifiers being provided.
 *        protoIDs Identifiers of protocols enabled on the RNP in the
 *                 P-Bus slot.
 *
 * Returns:  Nothing.
 *
 * Note:     The P-Bus driver uses zero-based slot numbers.
 *
 ***********************************************************************/ void PB_set_bcast(U32 slot, U32 nProtos, U32 protoIDs[])
{
    U32 p;                              /* Protocol index variable.       */

--slot;                             /* Convert to driver style.       */ for (p = 0; p < NUM_PIDS; p++)      /* For all possible protocols...  */
        bc_table[p][slot] = FALSE;      /* Assume protocol not enabled on slot. */
```

B 18

Aug 19 15:51 1994 pb_lib.c Page 15

```c
        for (p = 0; p < nProtos; p++)  /* For all protocols in parameter list... */
            bc_table[protoIDs[p]][slot] = TRUE;  /* Enable that protocol on slot. */ return;
    } /* PB_set_bcast() */

/***************************************************************************
 *
 * Function:      PB_add_mcast_addr
 *
 * Description:   Attempts to add a multicast address - slot pair to the
 *                multicast table.
 *
 * Called by:     BRE
 *
 * Parameters:
 *                addr   Low-order 32 bits of the mulitcast address.
 *                slot   Corresponding slot number (one-based).
 *
 * Returns:
 *                TRUE if done ok.
 *                FALSE if no more room for multicast addresses or slots for
 *                      this address or invalid slot number.
 *
 * Note:    The P-Bus driver uses zero-based slot numbers.
 *
 ***************************************************************************/

U32 PB_add_mcast_addr(U32 addr, U32 slot)
{
    U32 i, j;                                   /* Index variables.     */
    U32 found = FALSE;                          /* Table search flag.   */

--slot;                                     /* Convert to driver style.*/ if ((slot >= MAX_SLOTS) || (slot == our_slot))  /* If invalid slot... */
        return FALSE;

for (i = 0; i < MAX_MC_ADDRESSES; i++)      /* Search MC table for addr.*/
        if ((pb_mc_table[i].nSlots != 0) && (pb_mc_table[i].mc_address == addr))
        {                                       /* Found matching table entry.*/
            found = TRUE;
            break;
        } if (found)
    {                                               /* Found MC address.       */
        for (j = 0; j < MAX_MC_SLOTS; j++)          /* Check if slot there.    */
            if (pb_mc_table[i].slot[j] == slot)     /* If already present...   */
                return TRUE;                        /* Pretend it's been added.*/ if (pb_mc_table[i].nSlots >= MAX_MC_SLOTS)  /* If table entry full...  */
            return FALSE;                           /* Can't add another slot. */ for (j = 0; j < MAX_MC_SLOTS; j++)          /* Find first empty slot.  */
```

Aug 19 15:51 1994  pb_lib.c Page 16

```c
            if (pb_mc_table[i].slot[j] == -1)
            {
                pb_mc_table[i].slot[j] = slot;      /* Add slot number.        */
                pb_mc_table[i].nSlots++;            /* Increment slots for addr.*/
                break;
            }
        }
        else                                        /* New multicast address.  */
        {
            if (nMCaddrs == MAX_MC_ADDRESSES)       /* If no more room...      */
                return FALSE;

for (i = 0; i < MAX_MC_ADDRESSES; i++)  /* Find first empty entry. */
                if (pb_mc_table[i].nSlots == 0)
                {
                    pb_mc_table[i].mc_address = addr;  /* Add a new table entry. */
                    pb_mc_table[i].slot[0] = slot;     /* It has one slot now.   */
                    pb_mc_table[i].nSlots = 1;
                    nMCaddrs++;                        /* Another MC address.    */
                    break;
                }
        }
    return TRUE;
} /* PB_add_mcast_addr() */

/**********************************************************************
 *
 * Function:     PB_delete_mcast_addr
 *
 * Description:  Attempts to delete a multicast address - slot pair in the
 *               multicast table.
 *
 * Called by:    BRE
 *
 * Parameters:
 *               addr   Low-order 32 bits of the mulitcast address.
 *               slot   Corresponding slot number (one-based).
 *
 * Returns: Nothing.
 *
 * Note:    The P-Bus driver uses zero-based slot numbers.
 *
 **********************************************************************/ void PB_delete_mcast_addr(U32 addr, U32 slot)
{
    U32 i, j;                                       /* Index variables.        */

--slot;                                         /* Convert to driver style.*/ for (i = 0; i < MAX_MC_ADDRESSES; i++)           /* Find the multicast addr.*/
        if (pb_mc_table[i].mc_address == addr)       /* If found...             */
            for (j = 0; j < MAX_MC_SLOTS; j++)        /* Find the slot number.   */
                if (pb_mc_table[i].slot[j] == slot)  /* If found...             */
                {
```

Aug 19 15:51 1994 pb_lib.c Page 17

```
                pb_mc_table[i].slot[j] = -1;      /* Delete the slot number. */
                if (--pb_mc_table[i].nSlots == 0)/* If no more slots...      */
                {                                 /* Delete the MC address.  */
                   pb_mc_table[i].mc_address = 0;/* Clear multicast address.*/
                   nMCaddrs--;                    /* One less MC address.    */
                }
                return;
         }
} /* PB_delete_mcast_addr() */

/***********************************************************************
 *
 * Function:     PB_flash_FAIL_LED
 *
 * Description:  Changes the state of the FAIL LED.
 *
 * Called by:    Chassis manager periodically calls this function when the
 *               P-Bus data bus is operating at reduced capacity (64-bits)
 *               due to a faulty 32-bit segment.
 *
 * Parameters:
 *               clear_ind  Clear LED indicator
 *
 * Returns: Nothing.
 *
 ***********************************************************************/ void PB_flash_FAIL_LED(U32 clear_ind)
{
   if (clear_ind  &&  !FAIL_LED)
      return;                                     /* LED already off.  */

FAIL_LED ^= 1;                                 /* Flip LED's state. */
   return;
} /* PB_flash_FAIL_LED() */

/***********************************************************************
 *
 * Function:     PB_check_arbitration
 *
 * Description:  Checks if arbitration logic is present.
 *
 * Called by:    Chassis manager.
 *
 * Parameters:   None
 *
 * Returns:
 *               TRUE if arbitration logic present.
 *               FALSE otherwise.
 *
 ***********************************************************************/
U32 PB_check_arbitration(void)
{
   if ((PB_STATUS & PB_MNP) == 0)                 /* If arbitration logic is */
```

Aug 19 15:51 1994 pb_lib.c Page 18

```c
      return TRUE;                          /* installed, this is an MNP.*/
   else
      return FALSE;
} /* PB_check_arbitration() */

/***********************************************************************
*
* Function:     PB_check_clock
*
* Description:  Checks if clock is present.
*
* Called by:    Chassis manager.
*
* Parameters:   None
*
* Returns:
*               TRUE if clock present.
*               FALSE otherwise.
*
***********************************************************************/
U32 PB_check_clock(void)
{
   if (PB_STATUS & PB_PLLLOCK)
      return TRUE;
   else
      return FALSE;
} /* PB_check_clock() */

/***********************************************************************
*
* Function:     PB_MAC_table
*
* Description:  Get the destination MAC address to slot translation table.
*
* Called by:    Chassis manager.
*
* Parameters:
*               table   Address of the translation table.
*                       N.B: This table is is one-based -- the first table
*                            entry must be ignored.  (The second entry ([1])
*                            is the MAC address corresponding to the first
*                            slot.)
*
* Returns: Nothing
*
***********************************************************************/
void PB_MAC_table(hw_addrTYPE table[])
{
   U32 i;

intdis();

for (i = 1; i <= MAX_SLOTS; i++)
      PB_MAC_to_slot[i] = table[i]; /* PB_MAC_table[] is one-based, too.   */
```

Aug 19 15:51 1994  pb_lib.c Page 19

```
   .intena();
   return;
} /* PB_MAC_table() */

/**********************************************************************
*
* Function:     PB_PIPE_reset
*
* Description:  Reset the PIPE to be in one of two states:
*               1. Put PIPE hardware into its RESET state.
*               2. Reinitialize PIPE hardware and driver software.
*
* Called by:    Chassis manager.
*
* Parameters:
*               reset_type  == PB_RESET_DOWN to put PIPE hardware into its
*                              RESET state;
*                           == PB_RESET_UP to reinitialize PIPE hardware and
*                              driver software.
*
* Returns: Nothing
*
**********************************************************************/
void PB_PIPE_reset(U32 reset_type)
{
   switch (reset_type)
   {
      case PB_RESET_DOWN:
         PB_disable_hw();
         break;

case PB_RESET_UP:
         PB_reinitialize();
         break;
   }
} /* PB_PIPE_reset() */

/*------------------------- End of PB_LIB.C ---------------------------*/
#endif
```

Aug 19 15:50 1994  pb_bcmc.c Page 1

```c
/** @(#)pb_bcmc 4.9 /home/u9/tl100/mps/os960/SCCS/s.pb_bcmc.c  94/05/12 os960 **/
#ifdef EPRISE
/*
-------------------------------------------------------------------------------
| Copyright (C) 1993, 1994, ascom Timeplex Inc. All Rights Reserved
|
| File:      PB_BCMC.C
|
| Contents:  to_PBus()'s broadcast and multicast processing function
|            PB_bcmc().
|
| History:
|
|    Date       Person      Comments
|    ----       ------      --------
| 10/19/93     Abe L.       Creation (i.e., removal from to_PBus()).
|
-------------------------------------------------------------------------------
*/

/* #define POLLED */                    /* Defined for clint() polling. */ define DEBUG                           /* !!!!!!!!!!!!!!!!!!!!!!!!!!!! */ include "includes.h"
include "pbus.h"

extern TX_SLOT_INFO_TYPE tx_slot_info[MAX_SLOTS];/* Info. about tx buffers.*/ extern U32 PB_tx_counts[MAX_SLOTS];    /* Data cache shadow of all     */
                                       /* tx_slot_info[slots].count.   */ extern U32 tx_total_count;             /* Total number of queued buffers
                                          (inc. BC/MCs not yet sent).  */ if 0
extern U32 tx_total_discards;          /* Total number of TX discards. */
endif extern U32 nSlots;                     /* P-Bus slots in this chassis. */ extern U32 our_slot;                   /* This RNP's slot number.      */ ifdef DEBUG
extern PB_STATS_TYPE PB_stats[MAX_SLOTS]; /* Statistics structure.     */
endif extern struct interfaces *intfstats[]; /* SNMP variables.              */ extern U8  tx_buffers[MAX_SLOTS][TX_BUFFERS_PER_SLOT][TX_BUFFER_SIZE];
                                       /* Output buffers.              */ extern U32 PB_total_length;            /* Total TX buffer length.      */
                                       /* (In the data cache.)         */ extern PB_MC_TABLE_TYPE pb_mc_table[MAX_MC_ADDRESSES];/*The multicast table.*/
```

Aug 19 15:50 1994  pb_bcmc.c  Page 2

```c
extern U32 bcmc_count[TX_BUFFERS_PER_SLOT]; /* Number of times each BC/MC */
                                            /* has yet to be transmitted. */ extern U32 bc_table[NUM_PIDS][MAX_SLOTS]; /* Slots that get BC packets for */
                                          /* each protocol.               */ ifndef POLLED
extern U32 sys_time;                /* Current system millisecond */
                                    /* clock.                     */ extern U32 PB_tx_delay;             /* TX delay in milliseconds.  */
endif

/* Local function prototypes.                                             */ static U32 add_bcmc_PDU(U32 slot, U32 len, BUF_HEADER_TYPE *pHeader,
                        U32 bcmc_buff_index);

/*************************************************************************
*
*   Function:       PB_bcmc
*
*   Description:    Broadcast/multicast processing for to_PBus().
*
*   Called by:      to_PBus() after it determines that the PDU to be
*                   transmitted is a broadcast or multicast type.
*
*   Parameters:
*
*     Name          Type                    Description
*     ----          ----                    -----------
*     pdu           (commonheader_TYPE *)   Address of PDU.
*     len           U32                     PDU length (in bytes).
*     sending_pid   U32                     pid of sending process.
*     bc_only       U32                     TRUE if only broadcasting should
*                                           be considered.
*
*   Returns:        If a BC/MC buffer is available for this PDU and at least
*                   one recipient has this PDU queued, a pointer to the PDU's
*                   header in its transmit buffer;
*                   Otherwise, 0.
*
*   Warning:        Must be called with interrupts disabled!
*
*************************************************************************/

PDU_HEADER_TYPE *PB_bcmc(commonheader_TYPE *pdu, U32 len,
                         U32 sending_pid, U32 bc_only)
{
    BUF_HEADER_TYPE  *pHeader;      /* Pointer to P-Bus header.    */
    PDU_HEADER_TYPE  *pPDUh;        /* Points to a PDU header.     */
    U32 recipients;                 /* BC/MC recipient(s) found.   */
    U32 mc_addr;                    /* Multicast address.          */
    U32 found;                      /* MC table entry found flag.  */
    U32 i, j;                       /* General index variables.    */
```

Aug 19 15:50 1994  pb_bcmc.c Page 3

```c
   U32 bcmc_buff_index;                     /* BC/MC buffer number.            */
   U32 slot;                                /* Temporary index variable.       */

/* Use our_slot for the buffer.    */
   if (tx_slot_info[our_slot].buffers_in_use >= TX_BUFFERS_PER_SLOT - 1)
   {                                        /* No buffer is available.         */
#if 0                                       /* !!! Don't use OS queuing        */
      if (tx_total_discards * MAX_TX_DISCARD_RATE > tx_total_count)
      {                                     /* If discard rate too high...     */
         QDrvPkt(pdu, len, dest_intf, 0, 0); /* Use OS packet queuing.         */
         /*    Remember what and where this packet is.                         */
      }
      else                                  /* Discard rate is not too high. */
#endif
      {
#if 0
         tx_total_discards++;               /* Discard this PDU.               */
         PB_stats[our_slot].tx_discards++;  /* Update statistics.              */
#endif
#ifdef DEBUG
         PB_stats[our_slot].tx_oflow_errs++;
#endif
         intfstats[PB_INTERFACE]->ifOutDiscards++; /* OS statistics.           */
      }
      return 0;                             /* Exit.                           */
   } pHeader = (BUF_HEADER_TYPE *)            /* Address of buffer with room.    */
            &tx_buffers[our_slot]
                [tx_slot_info[our_slot].next_in_buff_index][0];
   pPDUh = (PDU_HEADER_TYPE *)((U8 *)pHeader + sizeof(BUF_HEADER_TYPE));

recipients = 0;                          /* Assume no recipients.           */
   bcmc_buff_index = tx_slot_info[our_slot].next_in_buff_index;

found = FALSE;
   if (bc_only == FALSE)
   {
      mc_addr = (U32)((pdu->cdsthwaddr.hw2 << 16) | pdu->cdsthwaddr.hw3);
      for (i = 0; i < MAX_MC_ADDRESSES; i++) /* Try to find matching entry.*/
         if (pb_mc_table[i].mc_address == mc_addr) /* MC address.          */
         {
            found = TRUE;
            break;
         }
   }
   if (found)                               /* If MC table entry found...      */
   {
      for (j = 0; j < MAX_MC_SLOTS; j++)    /* For MC table slots...           */
         if ((slot = pb_mc_table[i].slot[j]) != -1) /* If valid slot...        */
         {                                  /* Add this PDU for tx.            */
            recipients += add_bcmc_PDU(slot, len, pHeader, bcmc_buff_index);
         }
   }
   else                                     /* Not multicast; must be broadcast.*/
   {
```

Aug 19 15:50 1994  pb_bcmc.c  Page 4

```c
      j = sending_pid;                         /* Originator's process ID.    */ for (slot = 0; slot < nSlots; slot++)    /* For all slots...            */
         if (bc_table[j][slot] == TRUE)        /* that get this protocol...   */
         {                                     /* Add this PDU for tx.        */
            recipients += add_bcmc_PDU(slot, len, pHeader, bcmc_buff_index);
         }
   } if (recipients)                             /* If at least one recipient...*/
   {
      tx_slot_info[our_slot].buffers_in_use++;
      if (++tx_slot_info[our_slot].next_in_buff_index   /* For next BC/MC.    */
          >= TX_BUFFERS_PER_SLOT)               /* Take care of wraparound.   */
         tx_slot_info[our_slot].next_in_buff_index = 0;

intfstats[PB_INTERFACE]->ifOutNUcastPkts++; /* OS statistics.           */
   }
   else                                        /* No recipient found...       */
   {                                           /* Delete the BC/MC PDU.       */
#if 0
      tx_total_discards++;                     /* Discard this PDU.           */
      PB_stats[our_slot].tx_discards++;        /* Update statistics.          */
#endif
      intfstats[PB_INTERFACE]->ifOutDiscards++; /* OS statistics.             */
      /* ??? Does anything else have to be done here??? */
      return 0;
   }
   return pPDUh;                               /* Exit.                       */
}                                              /* End of BC/MC processing.    */

/***********************************************************************
 *
 * Function:     add_bcmc_PDU
 *
 * Description:  Prepare to send a broadcast or multicast pdu to a
 *               destination slot.
 *
 * Called by:    PB_bcmc()
 *
 * Parameters:
 *
 *    Name              Type              Description
 *    ----              ----              -----------
 *    slot              U32               Destination slot.
 *    len               U32               PDU length (in bytes).
 *    pHeader           (BUF_HEADER_TYPE *) Address of an our_slot buffer.
 *    bcmc_buff_index   U32               Index of our_slot buffer.
 *
 * Returns:      1 if the PDU is queued to be sent;
 *               0 if the PDU could not be queued.
 *
 ***********************************************************************/

U32 add_bcmc_PDU(U32 slot, U32 len, BUF_HEADER_TYPE *pHeader,
```

Aug 19 15:50 1994 pb_bcmc.c Page 5

```c
                  U32 bcmc_buff_index)
{
   U32 ptr_index;                       /* Temporary pointer index.      */
   U32 buff_index;                      /* Temporary buffer index.       */ ptr_index = tx_slot_info[slot].next_in_ptr_index;

if (tx_slot_info[slot].buff_info[ptr_index].nPDUs != 0)
      {                                 /* Need another set of buffer info. */
      if (tx_slot_info[slot].buffers_in_use >= TX_BUFFERS_PER_SLOT)
         return 0;                      /* No more buffers.              */ if (++ptr_index >= (TX_BUFFERS_PER_SLOT * 2)) /* Next in index.    */
         ptr_index = 0;                 /* Take care of wraparound.      */
      tx_slot_info[slot].next_in_ptr_index = ptr_index;
      /* Stop adding PDUs to the current input buffer.                   */
      buff_index = tx_slot_info[slot].next_in_buff_index;
      if (++buff_index >= TX_BUFFERS_PER_SLOT)
         buff_index = 0;                /* Wraparound.                   */
      tx_slot_info[slot].next_in_buff_index = buff_index;
   } tx_slot_info[slot].buff_info[ptr_index].pBuffer = pHeader;
   tx_slot_info[slot].buff_info[ptr_index].fBCMC = TRUE;
   tx_slot_info[slot].buff_info[ptr_index].iBCMC
      = bcmc_buff_index;
   tx_slot_info[slot].buff_info[ptr_index].nPDUs = 1;
   tx_slot_info[slot].buff_info[ptr_index].total_length
      = PB_total_length                 /* (Shadow in the data cache.)   */
      = sizeof(BUF_HEADER_TYPE)
        + sizeof(PDU_HEADER_TYPE)       /* PDU header length.            */
        + ((len + 3) & ~3);             /* Round up to word boundary.    */
   tx_slot_info[slot].count++;          /* Another buffer to transmit.   */
   PB_tx_counts[slot]++;                /* (Shadow in data cache.)       */
#ifndef POLLED
   /* Do not delay sending it; no more PDUs can be added to it.          */
   tx_slot_info[slot].init_time = sys_time - PB_tx_delay;
#endif
   tx_total_count++;                    /* One more buffer to tx.        */
   bcmc_count[bcmc_buff_index]++;

if (PB_tx_counts[slot] < (TX_BUFFERS_PER_SLOT * 2)) /* If at least one */
      {                                 /* .buff_info left...            */
      if (++ptr_index >= (TX_BUFFERS_PER_SLOT * 2)) /* Next in index.    */
         ptr_index = 0;                 /* Take care of wraparound.      */
      tx_slot_info[slot].next_in_ptr_index = ptr_index;

tx_slot_info[slot].buff_info[ptr_index].nPDUs = 0;
      tx_slot_info[slot].buff_info[ptr_index].total_length
         = sizeof(BUF_HEADER_TYPE);     /* Prepare next in information.  */
      }
   /* Else, do the above during the next TX dequeue (in PB_dq()).        */ return 1;
} /* add_bcmc_PDU() */
```

B28

Aug 19 15:50 1994 pb_bcmc.c Page 6

```
/* ---------------------- End of PB_BCMC.C ------------------------------ */
#endif
```

Aug 19 15:50 1994  pb_init.c Page 1

```c
/** @(#)pb_init 4.15 /home/u9/tl100/mps/os960/SCCS/s.pb_init.c  94/05/16 os960 **/
#ifdef EPRISE
/*
-----------------------------------------------------------------------------
| Copyright (C) 1993, 1994, ascom Timeplex Inc. All Rights Reserved
|
| File:       PB_INIT.C
|
| Contents:   P-Bus driver initialization and reinitialization functions,
|             and statistics printing function (for keypres ^d^N).
|
| History:
|
|    Date       Person    Comments
|    ----       ------    --------
|  4/23/93     Abe L.     Creation.
|  12/03/93    Abe L.     Changes for non slot based PIP MAC addresses
|  1/18/94     ase        mr908, modify ifDescr's to fit KP screen
|  5/16/94     Abe L.     Added PB_disable_hw().
|
-----------------------------------------------------------------------------
*/

/* #define POLLED */                    /* Defined for clint() polling.  */ define DEBUG include "includes.h"
include "pbus.h"
#include <pb_lib.h>

/* !!!!!!!!!!!!!!!!!!!!!!!!!!!!!!!!!!!!!!!!!!!!!!!!!!!!!!!!!!!!!!!!!!!!!!! */
U32 PB_just_reset;
/* !!!!!!!!!!!!!!!!!!!!!!!!!!!!!!!!!!!!!!!!!!!!!!!!!!!!!!!!!!!!!!!!!!!!!!! */
/* External variables.                                                     */ extern struct os386cmos    cmos;            /* OS config parameters.       */
extern struct pbcmos       pb_cmos;         /* P-Bus config. parameters.   */
extern struct interfaces   *intfstats[];    /* SNMP variables.             */
extern unsigned            drv_numulp[];    /* Number of ulps for each intf. */
extern unsigned            drv_ulp[NUM_INTF][MAX_DRV_ULPS];
                                            /* Pids of upper protocols.    */

/* Input buffers, configured for double buffering on each DMA channel.     */
/* For DMA performance, each buffer should be aligned on a 16-byte bound-  */
/* ary. RX_BUFFER_SIZE is defined to be a multiple of 16. To align the     */
/* first buffer, the assembler directive ".align 4" is used.               */ pragma asm
        .align   4                          /* Align to 16-byte boundary.  */
pragma endasm U8  rx_buffers[DMA_RX_CHANNELS][RX_BUFFERS_PER_CHANNEL][RX_BUFFER_SIZE];
                                            /* P-Bus input buffers.        */

U32 rx_buffer_index[DMA_RX_CHANNELS];       /* Where received buffer is.   */
```

B30

Aug 19 15:50 1994 pb_init.c Page 2

```c
#if 0
U32 rx_total_discards;                     /* Total RX buffer discards.    */
endif /* Output buffers, maintained as MAX_SLOTS circular lists.                  */
/* The output buffers corresponding to the transmitter's slot are used for  */
/* broadcast/multicast (BC/MC) packets.                                     */
/* For DMA performance, each buffer should be aligned on a 16-byte bound-   */
/* ary. TX_BUFFER_SIZE is defined to be a multiple of 16. To align the      */
/* first buffer, the assembler directive ".align 4" is used.                */ pragma asm
    .align   4                             /* Align to 16-byte boundary.   */
pragma endasm U8   tx_buffers[MAX_SLOTS][TX_BUFFERS_PER_SLOT][TX_BUFFER_SIZE];
                                           /* Output buffers.              */

TX_SLOT_INFO_TYPE tx_slot_info[MAX_SLOTS];/* Info. about output buffers.   */ extern U32 PB_tx_counts[MAX_SLOTS];        /* Data cache shadow of all     */
                                           /* tx_slot_info[slots].count.   */ extern TX_STATE_TYPE PB_tx_state;          /* Transmission state.          */
                                           /* (In the data cache.)         */ extern U32 tx_total_count;                 /* Total number of queued packets
                                              (inc. BC/MCs not yet sent).  */
                                           /* (In the data cache.)         */
extern U32 tx_slot;                        /* Current destination slot.    */
                                           /* (In the data cache.)         */
#if 0
U32 tx_total_discards;                     /* Total number of tx discards. */
#endif
U32 tx_bad_dest_slots;                     /* Total number of invalid      */
                                           /* destination addresses.       */
extern U32 max_tx_retries;                 /* Maximum number of tx retries.*/
                                           /* (In the data cache.)         */ extern U32 tx_DMA_channel;                 /* Current transmit DMA channel.*/
                                           /* (In the data cache.)         */ extern U32 PB_tx_batch;                    /* Maximum number of transmit   */
                                           /* pdus per buffer.             */
                                           /* (In the data cache.)         */
define DEFAULT_TX_BATCH 10                /* Default transmit threshold.  */ extern U32 PB_tx_flow;                     /* <= this number of buffers will*/
                                           /* be transmitted at one per ms.*/
#define DEFAULT_TX_FLOW    3               /* Default transmit flow count. */

/* Broadcast and multicast tables, variables, etc.                          */

U32 bcmc_count[TX_BUFFERS_PER_SLOT];       /* Number of times each BC/MC   */
                                           /* has yet to be transmitted.   */
```

Aug 19 15:50 1994  pb_init.c Page 3

```c
U32 bc_table[NUM_PIDS][MAX_SLOTS];      /* Slots that get BC packets for */
                                        /* each protocol.               */

PB_MC_TABLE_TYPE pb_mc_table[MAX_MC_ADDRESSES]; /* The P-BUS multicast table.*/

U32 nMCaddrs;                           /* Number of active MC addresses.*/

/* Other global variables, data, etc.                                   */ if_net_TYPE pb_ipc;                     /* Interprocess comm info.      */ extern U32 nSlots;                      /* Number of RNP slots in chassis.*/
                                        /* (In the data cache.)         */ extern U32 our_slot;                    /* This RNP's slot number.      */
                                        /* (In the data cache.)         */

U32 intf_state;                         /* NETUP or NETDN.              */ extern DRIVER_STATE_TYPE PB_driver_state; /* Software state.            */
                                        /* (In the data cache.)         */ extern hw_addrTYPE PB_MAC_to_slot[MAX_SLOTS + 1]; /* MAC addresses for slots*/
                                        /* (one-based slots).           */
                                        /* (In the data cache.)         */ ifdef DEBUG
PB_STATS_TYPE PB_stats[MAX_SLOTS];      /* Statistics structure.        */
endif U32 PB_slot_state[MAX_SLOTS];           /* Current state of all slots.  */

U32 internal_err[INTERNAL_ERROR_TYPES]; /* Internal error counters.     */ extern U32 rx_DMA_channel;              /* Current receive DMA channel. */
                                        /* (In the data cache.)         */ extern U32 PB_from_slot;                /* Slot from which pdu received. */
                        /* (Received-from slot indicator for bridging.) */
                                        /* (In the data cache.)         */ extern U32 PB_tx_delay;                 /* TX delay (in milliseconds).  */
                                        /* (In the data cache.)         */ ifdef POLLED
U32 PIPE_initialized;                   /* TRUE after initialization.   */
endif /* Flag to enable/disable resetting receive logic after timeout.        */
/* (Remove this flag when the associated logic is removed!!!)           */

U32 fPB_rx_watchdog;                    /* TRUE if RX resetting enabled. */ void PB_reinitialize_hw(void);          /* Temporary function!!!!!      */
```

Aug 19 15:50 1994 pb_init.c Page 4

```c
/***********************************************************************
*
* Function:    void pb_main(void);
*              (All letters in this function name must be lower case for the
*              builder (bld960.exe) to produce the proper information in
*              the .b file(s) so that the iparms structure gets initialized
*              properly.)
*
* Description: P-Bus driver initialization function.
*
* Called from: The OS's driver initialization function.
*
* Parameters:  None.
*
* Returns:     Nothing.
*
***********************************************************************/ void pb_main(void)
{

/* Local variables, data, etc.                                          */

U32 slot;                       /* Slot index.                      */
    U32 buf;                        /* Transmit buffer index.           */
    U32 h;                          /* Header index variable.           */
    U32 i,j;                        /* General index variables.         */

/* Initialize the driver's state.                                       */

PB_driver_state = UNINITIALIZED;    /* Initial software state.      */
/* !!!!!!!!!!!!!!!!!!!!!!!!!!!!!!!!!!!!!!!!!!!!!!!!!!!!!!!!!!!!!!!!!!! */
    PB_just_reset = FALSE;
/* !!!!!!!!!!!!!!!!!!!!!!!!!!!!!!!!!!!!!!!!!!!!!!!!!!!!!!!!!!!!!!!!!!! */

/* Initialize P-Bus hardware memory regions' configurations.            */
/* !!! This will be done by NINDY. !!!!!!!!!!!!!!!!!!!!!!!!!!!!!!!!!!!! */ modify_memory_region(0x3, 0x00102A18); /* Control and status registers. */
    modify_memory_region(0x7, 0x00102A18); /* FIFO registers.           */
#ifdef PERF
    modify_memory_region(0x8, 0x00100000); /* PERFORMANCE TESTING!!!    */
endif /* Stop any P-Bus activity by resetting the P-Bus hardware and          */
/* stop any DMA activity by resetting the CPU's DMA controller.         */

PB_CTRL = PB_RESET;             /* Reset the P-Bus hardware.        */
    DMA_init();                     /* Reset CPU's DMA controller.      */
                                    /* (Stops any DMA in progress.)     */
#ifdef POLLED
/* Mask all P-Bus interrupts; P-Bus ISRs will be polled from clint().   */ write_IMSK(read_IMSK() & ~((1 << IREG_PB_TX_BITPOS)
                    | (1 << IREG_DMA_2_BITPOS) | (1 << IREG_DMA_3_BITPOS)));
```

Aug 19 15:50 1994  pb_init.c Page 5

```c
else
/* Interrupt vector initialization.                                      */ drv_vec_put(TX_INTF,   PB_tx_isr);       /* P-Bus interrupt vector. */
    drv_vec_put(DMA_INTF2, PB_rx_isr_A);     /* DMA interrupt vector.   */
    drv_vec_put(DMA_INTF3, PB_rx_isr_B);     /* DMA interrupt vector.   */
endif /* Initialize the P-Bus hardware.                                        */

PB_CTRL = PB_ENABLE;                     /* Enable P-Bus hardware.  */
    PB_RX_STOP = 1;                          /* Terminate reception.    */
    PB_RX_STOP = 0;
    PB_MGR_RESET = 1;                        /* Reset P-Bus management  */
                                             /* logic.                  */
    PB_CMD_RESET = 0;                        /* Reset the P-Bus command */
    PB_CMD_RESET = 1;                        /* register.               */
    PB_WDT = PB_WDT_ENABLE;                  /* Enable watchdog timer.  */
    PB_FIFO_RESET = 0;                       /* Reset the FIFO by       */
    PB_FIFO_RESET = 1;                       /* toggling this bit.      */
    PB_TX_RESET = 0;                         /* Reset TX logic by       */
    PB_TX_RESET = 1;                         /* toggling this bit.      */
    PB_TX_DMA_RESET = 0;                     /* Reset DMA controllers by*/
    PB_TX_DMA_RESET = 1;                     /* toggling these bits.    */
    PB_RX_DMA_RESET = 0;
    PB_RX_DMA_RESET = 1;
    i = PB_RX_STATUS_A;                      /* Clear receive logic.    */
    i = PB_RX_STATUS_B;
    PB_ERROR_RST = 1;                        /* Clear error latches.    */
    PB_FIFO_ACCESS = DMA_FIFO_ACCESS;        /* Transmit using DMA.     */

/* If this is a Master Network Processor, set up P-Bus redundancy h/w. */ if (check_arbitration())                 /* If arbitration logic is */
    {                                        /* installed, this is an MNP.*/
       PB_ARB_RESET = 0;                     /* Reset the arbitration   */
       PB_ARB_RESET = 1;                     /* logic with this         */
       PB_ARB_RESET = 0;                     /* sequence.               */
    }

/* Find out how many RNP slots there are in this chassis.                */ nSlots = (PB_STATUS & PB_CHASSIS) ? CHASSIS_1_SLOTS : CHASSIS_0_SLOTS;

/* Get our slot address (and convert it to zero-based numbering).        */ our_slot = ((PB_STATUS & PB_GEO_MASK) >> PB_GEO_SHIFT) - 1;

/* If this is a Master Processor and no P-Bus clock is present, switch */
    /* bus mastership.                                                    */ if (is_master()                          /* If Master Processor...  */
        && ((PB_STATUS & PB_PLLLOCK) == 0))  /* and no clock present... */
       switch_master();                      /* Switch mastership.      */

/* General driver software initialization.                               */
```

B34

Aug 19 15:50 1994 pb_init.c Page 6

```c
    intf_state = NETDN;                    /* Initial interface state.       */
    PB_tx_state = TX_IDLE;                 /* Initial transmission state.    */
    tx_slot = 0;                           /* Initial tx slot number.        */
    tx_DMA_channel = DMA_TX_BASE;          /* Initial tx DMA channel.        */
    rx_DMA_channel = (U32)-1;              /* Initial rx DMA channel set to  */
                                           /* an invalid value.              */
#if 0
    tx_total_discards = 0;                 /* No tx discards yet.            */
    rx_total_discards = 0;                 /* No rx discards yet.            */
#endif
    tx_total_count = 0;                    /* Nothing to transmit yet.       */ tx_bad_dest_slots = 0;                 /* No bad slot numbers yet.       */

PB_tx_delay = 0;                       /* No TX timer set.               */

PB_tx_batch = DEFAULT_TX_BATCH;        /* Maximum TX pdus per buffer.    */

PB_tx_flow = DEFAULT_TX_FLOW;          /* Number of TX buffers for TX    */
                                           /* flow control.                  */ if ((max_tx_retries = pb_cmos.max_tx_retries) > DEFAULT_MAX_RETRY_COUNT)
        max_tx_retries = DEFAULT_MAX_RETRY_COUNT; /* Max. no. of TX retries. */ memset(PB_slot_state, SLOT_UNKNOWN, sizeof(PB_slot_state));/*No info. yet.*/ memset(internal_err, 0, sizeof(internal_err)); /* No internal errs yet. */ memset(PB_MAC_to_slot, 0, sizeof(PB_MAC_to_slot)); /* No MACs for slots.*/ memset(bcmc_count, 0, sizeof(bcmc_count));   /* No BC/MCs yet.          */ ifdef DEBUG
/* P-Bus statistics initialization.                                          */ memset(PB_stats, 0, sizeof(PB_stats));
endif

/* Initialize the interface statistics.                                      */ memset((U8 *)intfstats[PB_INTERFACE], 0, sizeof(struct interfaces));
    memcpy(intfstats[PB_INTERFACE]->ifDescr,"PIPE IF",7);
    intfstats[PB_INTERFACE]->ifIndex = PB_INTERFACE + 1;
    intfstats[PB_INTERFACE]->ifType  = PB_IFTYPE_OTHER; /* For SNMP.         */
    intfstats[PB_INTERFACE]->ifMtu   = cmos.intf[PB_INTERFACE].net_max_sz;
    intfstats[PB_INTERFACE]->ifSpeed = 1920000000; /* Whole bus operational.*/
    intfstats[PB_INTERFACE]->ifAdminStatus = NETUP;
    intfstats[PB_INTERFACE]->ifOperStatus  = NETDN;
    intfstats[PB_INTERFACE]->ifSpecific.num_subids = PB_NUM_SUBIDS;/*For SNMP.*/

/* Define the upper layer protocols (service users) and the number of SUs   */
/* for this interface.                                                       */ drv_numulp[PB_INTERFACE] = above(&drv_ulp[PB_INTERFACE][0],
                                    sizeof(U32) * MAX_DRV_ULPS);
```

B 35

Aug 19 15:50 1994 pb_init.c Page 7

```c
        if (drv_numulp[PB_INTERFACE] > MAX_DRV_ULPS)        /* (Zero is valid.)        */
            Muscreech(PB_TOO_MANY_ULPS);

/* Set up the interface statistics structure.                                         */ intfstats[PB_INTERFACE]->ifAdminStatus = NETUP;  /* We want i/f UP.            */
        intfstats[PB_INTERFACE]->ifPhysAddress.hw1
                                    = cmos.intf[PB_INTERFACE].MAC_addr.hw1;
        intfstats[PB_INTERFACE]->ifPhysAddress.hw2
                                    = cmos.intf[PB_INTERFACE].MAC_addr.hw2;
        intfstats[PB_INTERFACE]->ifPhysAddress.hw3
                                    = cmos.intf[PB_INTERFACE].MAC_addr.hw3;

/* Initialize the transmit and receive lists and buffers.                             */ for (i = 0; i < DMA_RX_CHANNELS; i++)           /* Start with first           */
            rx_buffer_index[i] = 0;                     /* buffer.                    */ memset(tx_slot_info, 0, sizeof(tx_slot_info));  /* Nothing to transmit. */ memset(PB_tx_counts, 0, sizeof(PB_tx_counts));

/* Initialize the source slot positions in the P-Bus header locations  */
        /* in all transmit buffers to be our slot number.                      */
        /* The P-Bus driver will never again touch these positions.            */ for (slot = 0; slot < MAX_SLOTS; slot++)
            for (buf = 0; buf < TX_BUFFERS_PER_SLOT; buf++)
                for (h = 0; h < REDUNDANCY; h++)
                    ((BUF_HEADER_TYPE *)&tx_buffers[slot][buf][0])
                                    ->header[h].header_fields.source_slot = our_slot;

/* Initialize the broadcast and multicast tables, variables, etc.                     */ for (j = 0; j < NUM_PIDS; j++)                  /* For all protocols...       */
            for (i = 0; i < nSlots; i++)                /* and all slots...           */
                bc_table[j][i] = (i == our_slot) ? FALSE : TRUE; /* (except ours) */
                                                        /* send a BC pdu there.       */ memset(pb_mc_table, 0, sizeof(pb_mc_table));  /* No multicasts yet.           */
        nMCaddrs = 0;

for (i = 0; i < MAX_MC_ADDRESSES; i++)           /* Initialize slot numbers */
            for (slot = 0; slot < MAX_MC_SLOTS; slot++)
                pb_mc_table[i].slot[slot] = -1;          /* Invalid value.           */ mc_init(PB_INTERFACE);       /* Initialize the system multicast table. */

/* Start P-Bus reception.                                                             */
/* Set up and enable both RX channels because the hardware might start                */
/* using either one.  Actually, there is never a guarantee as to which DMA            */
/* channel will be used next.  That's why a single receive queue would be             */
/* difficult to implement -- queue elements could be filled out of order.             */
/* This is the main reason a simple double-buffering scheme for each DMA              */
/* channel has been implemented.                                                      */
```

B 36

Aug 19 15:50 1994 pb_init.c Page 8

```c
    DMA_setup(DMACW_RX, DMA_RX_BASE,        /* Set up DMA for RX.           */
            &rx_buffers[0][rx_buffer_index[0]][SRC_RTE_SPACE],
            TX_BUFFER_SIZE);
    DMAC_set_bit(DMA_RX_BASE);              /* Enable the DMA channel.      */

DMA_setup(DMACW_RX, DMA_RX_BASE + 1,    /* Set up DMA for RX.           */
            &rx_buffers[1][rx_buffer_index[1]][SRC_RTE_SPACE],
            TX_BUFFER_SIZE);
    DMAC_set_bit(DMA_RX_BASE + 1);          /* Enable the DMA channel.      */

PB_RX_GO = 1;                           /* Enable P-Bus reception.      */ fPB_rx_watchdog = TRUE;                 /* Temporary!!!!!!!             */

/* Driver software and hardware initialization complete.                    */

PB_driver_state = INITIALIZED;          /* Driver may process PDUs.     */
#ifdef POLLED
    PIPE_initialized = TRUE;                /* (For clint() polling.)       */
#endif
    return;
} /* pb_main() */

/***************************************************************************
 *
 * Function:     PB_reinitialize
 *
 * Description:  Reinitializes P-Bus hardware and driver.
 *
 * Called by:    keypres() for ^d^N.
 *
 * Parameters:   None.
 *
 * Returns:      Nothing.
 *
 ***************************************************************************/ void PB_reinitialize(void)
{

/* Local variables, data, etc.                                              */

U32 slot;                               /* Slot index.                  */
    U32 buf;                                /* Transmit buffer index.       */
    U32 h;                                  /* Header index variable.       */
    U32 i;                                  /* General index variable.      */ intdis();                               /* Disable all interrupts.      */

/* Initialize the driver's state.                                           */

PB_driver_state = UNINITIALIZED;        /* Initial software state.      */

/* Initialize the P-Bus hardware.                                           */
```

Aug 19 15:50 1994 pb_init.c Page 9

```c
   PB_reinitialize_hw();

/* General driver software initialization.                             */

PB_tx_state = TX_IDLE;            /* Initial transmission state.   */
   tx_slot = 0;                      /* Initial tx slot number.       */
   tx_DMA_channel = DMA_TX_BASE;     /* Initial tx DMA channel.       */ if 0
   tx_total_discards = 0;            /* No tx discards yet.           */
   rx_total_discards = 0;            /* No rx discards yet.           */
#endif
   tx_total_count = 0;               /* Nothing to transmit yet.      */ tx_bad_dest_slots = 0;            /* No bad slot numbers yet.      */

PB_tx_delay = 0;                  /* No TX timer set.              */ if ((max_tx_retries = pb_cmos.max_tx_retries) > DEFAULT_MAX_RETRY_COUNT)
      max_tx_retries = DEFAULT_MAX_RETRY_COUNT; /* Max. no. of TX retries. */ memset(PB_slot_state, SLOT_UNKNOWN, sizeof(PB_slot_state));/*No info. yet.*/ memset(bcmc_count, 0, sizeof(bcmc_count));   /* No BC/MCs yet.     */ ifdef DEBUG
/* P-Bus statistics initialization.                                    */ memset(PB_stats, 0, sizeof(PB_stats));
endif

/* Initialize the transmit and receive lists and buffers.              */ for (i = 0; i < DMA_RX_CHANNELS; i++)       /* Start with first    */
      rx_buffer_index[i] = 0;                  /* buffer.             */ memset(tx_slot_info, 0, sizeof(tx_slot_info));  /* Nothing to transmit. */ memset(PB_tx_counts, 0, sizeof(PB_tx_counts));

/* Initialize the source slot positions in the P-Bus header locations */
   /* in all transmit buffers to be our slot number.                     */
   /* The P-Bus driver will never again touch these positions.           */ for (slot = 0; slot < MAX_SLOTS; slot++)
      for (buf = 0; buf < TX_BUFFERS_PER_SLOT; buf++)
         for (h = 0; h < REDUNDANCY; h++)
            ((BUF_HEADER_TYPE *)&tx_buffers[slot][buf][0])
                       ->header[h].header_fields.source_slot = our_slot;

/* Driver software and hardware reinitialization complete.             */

PB_driver_state = INITIALIZED;    /* Driver may process PDUs.      */ intena();                         /* Enable interrupts.            */
   return;
```

B 38

Aug 19 15:50 1994 pb_init.c Page 10

```c
} /* PB_reinitialize() */

/*****************************************************************************
 *
 * Function:      PB_reinitialize_hw
 *
 * Description:   Reinitializes P-Bus hardware.
 *
 * Called by:     to_PBus() and PB_tx_isr() for unknown TX errors.
 *
 * Parameters: None.
 *
 * Returns: Nothing.
 *
 * Environment: Must be called with interrupts disabled!
 *
 *****************************************************************************/ void PB_reinitialize_hw(void)
{

/* Local variables, data, etc.                                             */

U32 i, j;

/* Stop any P-Bus activity by resetting the P-Bus hardware and             */
/* stop any DMA activity by resetting the CPU's DMA controller.            */ if 0
    PB_CTRL = PB_RESET;                 /* Reset the P-Bus hardware.       */
                                        /* (Resets registers to zeros.)    */
#endif
    DMA_init();                         /* Reset CPU's DMA controller.     */
                                        /* (Stops any DMA in progress.)    */
/* Initialize the P-Bus hardware.                                          */

PB_CTRL = PB_ENABLE;                        /* Enable P-Bus hardware.  */
    PB_RX_STOP = 1;                             /* Terminate reception.    */
    PB_RX_STOP = 0;
    PB_MGR_RESET = 0;                           /* Reset P-Bus management  */
    PB_MGR_RESET = 1;                           /* logic.                  */
    PB_CMD_RESET = 0;                           /* Reset the P-Bus command */
    PB_CMD_RESET = 1;                           /* register.               */
    PB_WDT = PB_WDT_ENABLE;                     /* Enable watchdog timer.  */
    PB_FIFO_RESET = 0;                          /* Reset the FIFO.         */
    PB_FIFO_RESET = 1;
    PB_TX_RESET = 0;                            /* Reset TX logic.         */
    PB_TX_RESET = 1;
    PB_TX_DMA_RESET = 0;                        /* Reset DMA controllers.  */
    PB_TX_DMA_RESET = 1;
    PB_RX_DMA_RESET = 0;
    PB_RX_DMA_RESET = 1;
    i = PB_RX_STATUS_A;                         /* Clear receive logic.    */
    i = PB_RX_STATUS_B;
    PB_ERROR_RST = 1;                           /* Clear error latches.    */
```

Aug 19 15:50 1994  pb_init.c Page 11

```c
   PB_FIFO_ACCESS = DMA_FIFO_ACCESS;           /* Transmit using DMA.        */

/* If this is a Master Network Processor, set up P-Bus redundancy h/w.    */ if ((PB_STATUS & PB_MNP) == 0)              /* If arbitration logic is    */
   {                                           /* installed, this is an MNP. */
      PB_ARB_RESET = 0;                        /* Reset the arbitration      */
      PB_ARB_RESET = 1;                        /* logic with this            */
      PB_ARB_RESET = 0;                        /* sequence.                  */
   }

/* SOFTWARE INITIALIZATION                                                */
   /* Reset the transmit retry counters.                                     */ for (i = 0; i < nSlots; i++)
      for (j = 0; j < TX_BUFFERS_PER_SLOT; j++)
         tx_slot_info[i].buff_info[j].tx_retries = 0;

/* Start P-Bus reception.                                                    */
/* Set up and enable both RX channels because the hardware might start       */
/* using either one.  Actually, there is never a guarantee as to which DMA   */
/* channel will be used next.  That's why a single receive queue would be    */
/* difficult to implement -- queue elements could be filled out of order.    */
/* This is the main reason a simple double-buffering scheme for each DMA     */
/* channel has been implemented.                                             */

DMA_setup(DMACW_RX, DMA_RX_BASE,            /* Set up DMA for RX.         */
             &rx_buffers[0][rx_buffer_index[0]][SRC_RTE_SPACE],
             TX_BUFFER_SIZE);
   DMAC_set_bit(DMA_RX_BASE);                  /* Enable the DMA channel.    */

DMA_setup(DMACW_RX, DMA_RX_BASE + 1,        /* Set up DMA for RX.         */
             &rx_buffers[1][rx_buffer_index[1]][SRC_RTE_SPACE],
             TX_BUFFER_SIZE);
   DMAC_set_bit(DMA_RX_BASE + 1);              /* Enable the DMA channel.    */

PB_RX_GO = 1;                               /* Enable P-Bus reception.    */ return;
} /* PB_reinitialize_hw() */

/****************************************************************************
*
* Function:       PB_disable_hw
*
* Description:    Disables P-Bus hardware.
*
* Called by:      Chassis Manager via library function PB_PIPE_reset().
*
* Parameters:  None.
*
* Returns:  Nothing.
*
****************************************************************************/
```

Aug 19 15:50 1994 pb_init.c Page 12

```c
void PB_disable_hw(void)
{
/* Local variables, data, etc.                                              */

U32 i;

intdis();

/* Stop any P-Bus activity by resetting the P-Bus hardware and              */
/* stop any DMA activity by resetting the CPU's DMA controller.             */

PB_CTRL = PB_RESET;                  /* Reset the P-Bus hardware.       */
                                        /* (Resets registers to zeros.)    */
   PB_CTRL = PB_ENABLE;                 /* Enable P-Bus hardware.          */

DMA_init();                          /* Reset CPU's DMA controller.     */
                                        /* (Stops any DMA in progress.)    */
/* Disable the P-Bus hardware.                                              */

PB_RX_STOP = 1;                            /* Terminate reception.      */
   PB_MGR_RESET = 0;                          /* Reset P-Bus management.   */
   PB_CMD_RESET = 0;                          /* Reset P-Bus command reg.  */
   PB_WDT = PB_WDT_ENABLE;                    /* Enable watchdog timer.    */
   PB_FIFO_RESET = 0;                         /* Reset the FIFO.           */
   PB_TX_RESET = 0;                           /* Reset TX logic.           */
   PB_TX_DMA_RESET = 0;                       /* Reset DMA controllers.    */
   PB_RX_DMA_RESET = 0;
   i = PB_RX_STATUS_A;                        /* Clear receive logic.      */
   i = PB_RX_STATUS_B;
   PB_ERROR_RST = 1;                          /* Clear error latches.      */
   PB_FIFO_ACCESS = DMA_FIFO_ACCESS;          /* Transmit using DMA.       */ intena();

return;
} /* PB_disable_hw() */

/****************************************************************************
 *
 * Function:      PB_print_stats
 *
 * Description:   Print P-Bus driver statistics.
 *
 * Called by:     keypres() for ^d^n.
 *
 * Parameters:    None.
 *
 * Returns:   Nothing.
 *
 ****************************************************************************/ void PB_print_stats(void)
{
```

Aug 19 15:50 1994  pb_init.c Page 13

```c
/* Local variables, data, etc.                                              */

U32 slot;                           /* Slot index.                      */
#ifdef DEBUG
    U32 sum, sum2, sum3, sum4;          /* Accumulators.                    */
    U32 i;                              /* General index variable.          */
    U32 first_retries, retries;         /* For averaging.                   */ printf("P-Bus driver statistics for this slot:\n");

printf("  %10d transmitted frames.   %10d received frames.\n",
            PB_stats[our_slot].tx_frames, PB_stats[our_slot].rx_frames);
    printf("  %10d transmit interrupts.  %10d receive interrupts.\n",
            PB_stats[our_slot].tx_intrpts, PB_stats[our_slot].rx_intrpts);
    printf("  %10d transmit discards.    %10d receive discards.\n",
            PB_stats[our_slot].tx_discards, PB_stats[our_slot].rx_discards);
    printf("  %10d transmit errors.      %10d receive NOP errors.\n",
            PB_stats[our_slot].tx_bad_ints[0]+PB_stats[our_slot].tx_bad_ints[1],
            PB_stats[our_slot].rx_nop_errs[0]+PB_stats[our_slot].rx_nop_errs[1]);
    printf("  %10d receive WDT errors.   %10d unknown receive errors.\n",
            PB_stats[our_slot].rx_wdt_errs[0]
            + PB_stats[our_slot].rx_wdt_errs[1],
            PB_stats[our_slot].rx_unknown_errs[0]
            + PB_stats[our_slot].rx_unknown_errs[1]);
    printf("  %10d receive hardware reinitializations.\n",
            PB_stats[our_slot].rx_hw_reinits);

printf("P-Bus driver statistics for other slots:\n");

sum = sum2 = 0;
    for (slot = 0; slot < nSlots; slot++)
        if (slot != our_slot)
        {
            sum  += PB_stats[slot].tx_frames;
            sum2 += PB_stats[slot].rx_frames;
        }
    printf("  %10d transmitted frames.   %10d received frames.\n",
            sum, sum2);

sum = sum2 = 0;
    for (slot = 0; slot < nSlots; slot++)
        if (slot != our_slot)
        {
            sum  += PB_stats[slot].tx_intrpts;
            sum2 += PB_stats[slot].rx_intrpts;
        }
    printf("  %10d transmit interrupts.  %10d receive interrupts.\n",
            sum, sum2);

sum = sum2 = 0;
    for (slot = 0; slot < nSlots; slot++)
        if (slot != our_slot)
        {
            sum  += PB_stats[slot].tx_max_PDUs;
            sum2 += PB_stats[slot].rx_max_PDUs;
        }
```

B42

Aug 19 15:50 1994 pb_init.c Page 14

```c
   printf("  %10d TX max. PDUs/buffer.  %10d RX max. PDUs/buffer.\n",
          sum, sum2);

sum = sum2 = 0;
   for (slot = 0; slot < nSlots; slot++)
      if (slot != our_slot)
      {
         sum  += PB_stats[slot].tx_discards;
         sum2 += PB_stats[slot].rx_discards;
      }
   printf("  %10d transmit discards.   %10d receive discards.\n",
          sum, sum2);

sum = sum2 = sum3 = sum4 = 0;
   for (slot = 0; slot < nSlots; slot++)
      if (slot != our_slot)
      {
         sum  += PB_stats[slot].tx_ok;
         sum2 += PB_stats[slot].tx_first_retries;
         sum3 += PB_stats[slot].tx_oflow_errs;
         sum4 += PB_stats[slot].tx_max_retries;
      }
   printf("  %10d successful TXs.      %10d first time TX retries.\n",
          sum, sum2);
   printf("  %10d TX buffer overflows. %10d maximum TX retries.\n",
          sum3, sum4);
   first_retries = sum2;

if (sum)
   {
      sum2 = 0;
      for (slot = 0; slot < nSlots; slot++)
         if (slot != our_slot)
            sum2 += PB_stats[slot].tx_pdus;

printf("  %10d successful TX PDUs.  %10d average PDUs per TX.\n",
             sum2, sum2/sum);
   } sum = sum2 = 0;
   for (slot = 0; slot < nSlots; slot++)
      if (slot != our_slot)
      {
         for (i = 0; i < DMA_TX_CHANNELS; i++)
         {
            sum  += PB_stats[slot].tx_disc_errs[i];
            sum2 += PB_stats[slot].tx_datanak_errs[i];
         }
      }
   printf("  %10d transmit disconnects. %10d transmit data NAKs.\n",
          sum, sum2);

sum = sum2 = sum3 = sum4 = 0;
   for (slot = 0; slot < nSlots; slot++)
      if (slot != our_slot)
      {
```

Aug 19 15:50 1994 pb_init.c Page 15

```c
        for (i = 0; i < DMA_TX_CHANNELS; i++)
        {
            sum += PB_stats[slot].tx_retries[i];
            sum2 += PB_stats[slot].tx_timeout_errs[i];
            sum3 += PB_stats[slot].tx_channak_errs[i];
            sum4 += PB_stats[slot].tx_empty_errs[i];
        }
   }
   printf("   %10d transmit retries.     %10d transmit timeouts.\n",
          sum, sum2);
   printf("   %10d TX channel NAK errors.%10d transmit empty errors.\n",
          sum3, sum4);
   retries = sum;

sum = sum2 = 0;
   for (slot = 0; slot < nSlots; slot++)
      if (slot != our_slot)
      {
         for (i = 0; i < DMA_TX_CHANNELS; i++)
         {
            sum += PB_stats[slot].tx_unknown_errs[i];
            sum += PB_stats[slot].tx_bad_ints[i];
            sum2 += PB_stats[slot].rx_data_errs[i];
            sum2 += PB_stats[slot].rx_unknown_errs[i];
         }
      }
   printf("   %10d other TX errors.     %10d other RX errors.\n",
          sum, sum2);

if (first_retries)                              /* Don't divide by zero!  */
      printf("Average number of TX retries (transmit retries/first time TX retries) = 
             retries/first_retries);
endif printf("P-Bus transmit buffers in use:");
   for (slot = 0; slot < nSlots; slot++)
      printf("%2d", tx_slot_info[slot].buffers_in_use);
   printf("\n");

return;
} /* PB_print_stats() */

/************************************************************************
*
* Function:      PB_print_regs
*
* Description:   Print P-Bus hardware registers.
*
* Called by:     keypres() for ^d^m.
*
* Parameters: None.
*
* Returns: Nothing.
*
************************************************************************/
```

B44

Aug 19 15:50 1994  pb_init.c Page 16

```c
void PB_print_regs(void)
{
   printf("\nCPU register values:\n\n");

printf("      IPND : 0x%08X    DMAC : 0x%08X.\n\n",
          asm(U32, " mov sf0, g0"), asm(U32, " mov sf2, g0"));

printf("P-Bus hardware register values:\n\n");

printf("      Status     : 0x%08X   Command    : 0x%02X    TX status : 0x%02:
          PB_STATUS, (PB_COMMAND & 0xFF), (PB_TX_STATUS & 0xFF));

printf("      Red. Bus/Loc : 0x%02X  0x%02X    Pkt status : 0x%02X\n",
          (PB_REDUND & REDUND_MASK), (PB_PROTECT & REDUND_MASK),
          (PB_RX_PKT_STAT & 0xFF));

printf("      RX status A/B : 0x%02X  0x%02X\n",
          (PB_RX_STATUS_A & 0xFF), (PB_RX_STATUS_B & 0xFF));

return;
}
/*------------------------- End of PB_INIT.C ------------------------------*/
#endif
```

B45

Aug 19 15:49 1994   pb_dsr.s  Page 1

```
# @(#)pb_dsr.s  4.17  /home/u9/tl100/mps/os960/SCCS/s.pb_dsr.s  94/05/14 os960
# Copyright (C) 1993, 1994, ascom Timeplex Inc. All Rights Reserved
        .ifdef    EPRISE .set      TX_DELAY,1           # Transmit delay in milliseconds.
        .set      BACKOFF,12           # Channel NAK retransmit delay
                                       # loop counter.

#       .set      FLOW,1               # Defined if TX flow control enabled.
#       .set      POLLED,1             # Defined if polled from clint().

.set      DEBUG,1

.set      TRUE,1
        .set      FALSE,0

.set      PERF,FALSE           # Performance instrumentation.

.if       PERF
        .set      REGION,0x80000000    # Memory region base address.
        .set      SHIFT,20             # For diagnostic data.
        .endif .macro    perf1,value,reg
        .if       PERF
        ldconst   REGION|(value<<SHIFT),reg
        .endif
        .endm .macro    perf2,reg
        .if       PERF
        st        reg,(reg)
        .endif
        .endm ._cpu     CA
        .ident    "pb_dsr"

.include  "gen.sh"
        .include  "pids.sh"
        .include  "bld_os.sh"
        .include  "cmos.sh"
        .include  "addrtype.sh"
        .include  "drvintf.sh"
        .include  "stat.sh"
        .include  "pb_state.sh"

.ifdef    RX_LOOP
        .sect     zerovars,data,align 4
check_IPND:                            # Receive processing: If not zero,
        .org      .+4                  # check IPND register before exiting.
        .endif .sect     vars,data,align 4

!!!!!!!!!!!!!!!!!!!!!!!!!!!!!!!!!!!!!!!!!!!!!!!!!!!!!!!!!!!!!!!!!!!!!!!!!!!
```

Aug 19 15:49 1994 pb_dsr.s Page 2

```
        .globl      _PB_just_reset
# !!!!!!!!!!!!!!!!!!!!!!!!!!!!!!!!!!!!!!!!!!!!!!!!!!!!!!!!!!!!!!!!!!!!!!!
        .globl      _PB_last_tx_time    # In the data cache.
        .globl      _PB_tx_octets       # In the data cache.
        .globl      _PB_real_pdu        # In the data cache.
                                        # Not 0 if packet to transmit has
                                        # a common header; 0 otherwise.

.globl      _PB_tx_state        # In the data cache.
        .globl      _tx_total_count     # In the data cache.
        .globl      _tx_slot            # In the data cache.
        .globl      _max_tx_retries     # In the data cache.
        .globl      _tx_DMA_channel     # In the data cache.
        .globl      _nSlots             # In the data cache.
        .globl      _our_slot           # In the data cache.
        .globl      _rx_DMA_channel     # In the data cache.
        .globl      _PB_from_slot       # In the data cache.
        .globl      _PB_MAC_to_slot     # In the data cache.
        .globl      _PB_tx_counts       # In the data cache.
        .globl      _PB_tx_batch        # In the data cache.
        .ifdef      FLOW
        .globl      _PB_tx_flow         # In the data cache.
        .endif
        .globl      _PB_total_length    # In the data cache.
        .ifndef     POLLED
        .globl      _PB_tx_delay        # In the data cache.
        .endif .globl      _tx_slot_info
        .globl      _intfstats
        .globl      _tx_buffers
        .globl      _pb_mc_table
        .globl      _bcmc_count
        .globl      _cpptr
        .globl      _bc_table
        .globl      _intfptrs
        .globl      _sys_time
        .globl      _PB_slot_state
        .globl      _internal_err
        .globl      _rx_buffers
        .globl      _rx_buffer_index
        .globl      _drv_pptr
        .globl      _PB_send_pid
        .globl      _ptable
        .globl      _sched_q
        .globl      _fr_ptr
        .globl      _fr_wakeup
        .globl      _mc_table
        .globl      _cmos
        .globl      _PB_stats

.sect       code,text,align 4

.globl      _memcpy
        .globl      _DMA_setup
        .globl      _DMAC_set_bit
```

Aug 19 15:49 1994  pb_dsr.s Page 3

```
        .globl    _PB_reinitialize_hw
        .globl    _chkmc
        .globl    _parse_common_HDR

Constants that should be in pbus.sh

.set      SRC_RTE_SPACE,        ((40 + 15) & 0xfff0)
        .set      PB_INTERFACE,         4
        .set      TX_SLOT_INFO_SIZE,    540
        .set      PDU_HEADER_SIZE,      8
        .set      TX_BUFFERS_PER_SLOT,  8
        .set      PB_STATS_SIZE,        164
        .set      MAX_TX_TIME,          3
        .set      BUF_HEADER_SIZE,      12
        .set      TX_BUFFER_SIZE,((4500+BUF_HEADER_SIZE+PDU_HEADER_SIZE+15)&0xfff0)
        .set      RX_BUFFER_SIZE,(TX_BUFFER_SIZE + SRC_RTE_SPACE)
        .set      DMACW_TX,             474
        .set      DMACW_RX,             154
        .set      PB_COMMAND,           0x30000000
        .set      PB_GO,                0x10
        .set      TX_IDLE,              0
        .set      TX_ACTIVE,            1
        .set      TX_DONE,              2
        .set      TX_ERROR,             3
        .set      TX_EMPTY_SLOT,        4
        .set      DMA_RX_BASE,          2
        .set      RX_OK,                0
        .set      REDUNDANCY,           3

# /*
# ---------------------------------------------------------------------------
# |
# | File:      PB_DSR.C
# |
# | Contents:  P-Bus driver/device support functions available externally:
# |            to_PBus_slot
# |            to_PBus
# |            PB_tx_isr
# |            PB_rx_isr_A
# |            PB_rx_isr_B
# |
| History:
|
# |   Date       Person      Comments
# |   ----       ------      --------
# |  4/26/93     Abe L.      Creation.
# |  9/17/93     Abe L.      Reworked for multiple PDUs per buffer.
# | 10/18/93     Abe L.      Converted to assembly language.
# | 11/24/93     Art B.      Added support for FR over PBUS.
# | 12/04/93     Larry L.    Added function to_PBus_slot().
# | 12/11/93     Larry L.    Modified to_PBus_slot() to support bridging.
# |  1/10/94     Abe L.      Made transmission timer driven.
# |
# ---------------------------------------------------------------------------
# */

```

Aug 19 15:49 1994  pb_dsr.s Page 4

```
# #include "includes.h"
# #include "pbus.h"

# #if 0
# #define DEBUG                         /* !!!!!!!!!!!!!!!!!!!!!!!!!!!! */
# #endif

# /* Flag to enable/disable resetting receive logic after timeout.      */
# /* (Remove this flag when the associated logic is removed!!!)         */

# extern U32 fPB_rx_watchdog;           /* TRUE if RX resetting enabled. */

# /* OS data.                                                           */

# extern U32 sys_time;                  /* The system millisecond clock. */

# extern struct interfaces  *intfstats[];   /* SNMP variables.          */
# extern struct intfs       *intfptrs[NUM_INTF]; /* Ptrs to os i/f structs. */

# extern process_table      *drv_pptr[NUM_INTF]; /* Process table pointers. */
# extern process_table      *cpptr;     /* Ptr to current process table. */

# extern struct os386cmos   cmos;       /* OS config parameters.        */

# /* Variables defined in pb_init.c.                                    */

# extern DRIVER_STATE_TYPE PB_driver_state; /* Software state.          */

# extern U32 nSlots;                    /* P-Bus slots in this chassis. */

# extern U32 our_slot;                  /* This RNP's slot number.      */

# extern hw_addrTYPE PB_MAC_to_slot[MAX_SLOTS + 1]; /*MAC addresses for slots*/
/* (one-based slots).           */

# extern PB_STATS_TYPE PB_stats[MAX_SLOTS]; /* Statistics structure.    */

# extern U8  rx_buffers[DMA_RX_CHANNELS][RX_BUFFERS_PER_CHANNEL][RX_BUFFER_SIZE];
#                                       /* P-Bus input buffers.         */

# extern U32 rx_buffer_index[DMA_RX_CHANNELS]; /* Where received buffer is. */

# #if 0
# extern U32 rx_total_discards;         /* Total rx buffer discards.    */
# #endif

# extern U8  tx_buffers[MAX_SLOTS][TX_BUFFERS_PER_SLOT][TX_BUFFER_SIZE];
/* Output buffers.              */

# extern TX_SLOT_INFO_TYPE tx_slot_info[MAX_SLOTS];/* Info. about tx buffers.*/

# extern TX_STATE_TYPE PB_tx_state;     /* Transmission state.          */

# extern U32 tx_total_count;            /* Total number of queued buffers
#                                          (inc. BC/MCs not yet sent).  */

```

Aug 19 15:49 1994  pb_dsr.s Page 5

```
# extern PB_total_length;                    /* Total TX buffer length.     */
#                                            /* (In the data cache.)        */

# extern U32 bcmc_count[TX_BUFFERS_PER_SLOT]; /* Number of times each BC/MC  */
#                                            /* has yet to be transmitted.  */

# extern U32 tx_slot;                        /* Current destination slot.   */

# extern U32 tx_DMA_channel;                 /* Current transmit DMA channel. */

# #if 0
# extern U32 tx_total_discards;              /* Total number of TX discards. */
# #endif
# extern U32 tx_bad_dest_slots;              /* Total number of invalid     */
#                                            /* destination addresses.      */

# extern U32 max_tx_retries;                 /* Maximum number of TX retries. */

# extern U32 PB_slot_state[MAX_SLOTS];       /* Current state of all slots. */

# extern U32 internal_err[INTERNAL_ERROR_TYPES]; /* Internal error counters. */

# extern U32 rx_DMA_channel;                 /* Current receive DMA channel. */

# extern U32 PB_from_slot;                   /* Slot from which pdu received. */
#                         /* (Received-from slot indicator for bridging.) */

# extern U32 PB_tx_delay;                    /* TX delay in milliseconds.   */

# /* Local global ("external static") variables.                           */

# static U32 last_tx_time;                   /* Time of last TX initiation. */
# static U32 last_rx_time;                   /* Time of last good receive.  */
#                                            /* (Should not be needed!!!!!) */
# static U32 tx_octets;                      /* Current TX buffer data length.*/

# /* Function prototypes.                                                  */

# static void PB_tx_dsr(void);
# static void PB_dq(void);
# static void PB_tx(void);
# static void PB_rx_isr(void);
# static void PB_rx_dsr(void);
# static U32  DMA_byte_count(U32);

# /* The following are declared in os960.h.                                */
# /*
# void to_PBus (commonheader_TYPE *pdu, U32 len, U32 dest_intf, U32 priority);
# void PB_tx_isr(void);
# void PB_tx_next(void);
# void PB_rx_isr_A(void);
# void PB_rx_isr_B(void);
# */

# /***********************************************************************
```

Aug 19 15:49 1994  pb_dsr.s Page 6

```
*
# *     Function:       to_PBus_slot
# *
# *     Description:    P-Bus transmit function.
# *                     Receive protocol data units (PDUs) from a service user (SU)
# *                     and buffer them for transmission onto the P-Bus.
# *
# *     Called by:      The OS directly.
# *
# *     Parameters:
# *
# *       Name          Type                    Description
# *       ----          ----                    -----------
# *       pdu           (U8 *)                  Pointer to PDU data to be sent.
# *       len           U32                     Length of data in bytes.
# *       dest_slot     U32                     Destination slot number (one-based)
# *                                             (0 == broadcast).
# *       dest_pid      U32                     Destination process id.
# *       real_pdu      U32                     TRUE if pdu points to a common
# *                                             header; FALSE otherwise.
# *
# *     Returns:        Nothing.
# *
# *     Warning:        Must be called with interrupts disabled!
# *
# ********************************************************************/

# void to_PBus_slot (U8 *pdu, U32 len, U32 dest_slot, U32 dest_pid,
#                    U32 real_pdu)
# {
        ..sect    code1,text,align 4

.globl    _to_PBus_slot

_to_PBus_slot:
#       BUF_HEADER_TYPE *pHeader;               /* Pointer to P-Bus header.     */
#       PDU_HEADER_TYPE *pPDUh;                 /* Points to a PDU header.      */
#       U32 bcmc_buff_index;                    /* BC/MC buffer number.         */
#       U32 j;                                  /* General index variable.      */
#       U32 slot;                               /* Temporary index variable.    */
#       U32 ptr_index;                          /* Temporary pointer index.     */
#       U32 sending_pid;                        /* Process ID of originator.    */
#       U8 *pPDU;                               /* Points to a PDU.             */

# #ifdef DEBUG
#       if (PB_driver_state != INITIALIZED)     /* If entered before initiali-  */
#           return;                             /* zation has completed.        */

#       /*************************** to be removed later ******** dt 8/15 ******/
#       if (fPB_rx_watchdog && ((sys_time - last_rx_time) > MAX_RX_TIME))
#       /* If there's a possibility that the P-Bus receiver h/w has locked up...*/
#       {
#           PB_reinitialize_hw();               /* (Should not be needed!!!!!)  */
#           PB_stats[our_slot].rx_hw_reinits++; /* TEMPORARY COUNTER!!!!!       */
#           last_rx_time = sys_time;
}
```

Aug 19 15:49 1994 pb_dsr.s Page 7

```
#       /****************************************************************/
# #endif

        perf1   13,r3
        mov     g2,r4                   # dest_slot (one-based)
        perf2   r3
        lda     0,g13                   # Assume normal unicast pdu.
        subo    1,r4,r4                 # dest_slot (zero_based)
        lda     TX_SLOT_INFO_SIZE,r14   # sizeof(TX_SLOT_INFO_TYPE)
#       sending_pid = dest_pid;                 /* Originator's process ID.    */
#       PB_send_pid = 0;

        mov     g3,r12                  # r12 = sending_pid
        st      g13,_PB_send_pid(g12)
        cmpo    0,g2                    # Test one-based destination slot.
        mov     PB_INTERFACE,r13        # dest_intf = PB_INTERFACE
        st      g4,_PB_real_pdu(g12)    # Remember if pdu has a common header.

# #ifdef DEBUG
#       if ((dest_slot >= nSlots) || (dest_slot == our_slot))
#         {                                     /* Invalid destination slot numb.*/
#           tx_bad_dest_slots++;                /* Don't screech.              */
# #if 0
#           tx_total_discards++;                /* Discard the PDU.            */
# #endif
#           PB_stats[our_slot].tx_discards++;   /* Use our slot for this stat. */
#           intfstats[PB_INTERFACE]->ifOutDiscards++; /* OS statistics.        */
#           return;                             /* Exit.                       */
#         }
# #endif

#       if (dest_slot == 0)                     /* Broadcast processing.       */
#         {
#           ...
#         }
else
#         {                                     /* Unicast processing.         */
#           ...
#         }
        bne.t   Unicast                 # Unicast if one-based dest_slot != 0.
        mov     3,g13                   # bcmc_flag = TRUE; bc_only = TRUE
        b       L1                      # Broadcast.

# /*****************************************************************************
*
# *     Function:       to_PBus
# *
# *     Description:    P-Bus transmit function.
# *                     Receive protocol data units (PDUs) from a service user (SU)
# *                     and prepare them for transmission onto the P-Bus. An SU may
# *                     be an upper layer protocol or another driver interface.
# *                     PDUs include MAC layer DA, SA, and LLC header.
# *
# *     Called by:      The OS (from to_DRV() directly).
# *
# *     Parameters:
```

B52

Aug 19 15:49 1994  pb_dsr.s Page 8

```
*
# *     Name            Type                    Description
# *     ----            ----                    -----------
# *     pdu             (commonheader_TYPE *)   Address of PDU.
# *     len             U32                     PDU length (in bytes).
# *     dest_intf       U32                     Destination interface number.
# *                                             (Not relevant to P-Bus).
# *     priority        U32                     PDU priority.
# *                                             (Not currently supported by P-Bus
# *                                             driver.)
# *
# *     Returns:        Nothing.
# *
# *     Warning:        Must be called with interrupts disabled!
# *
************************************************************************/

# void to_PBus (commonheader_TYPE *pdu, U32 len, U32 dest_intf, U32 priority)
# {
        .sect   code3,text,align 4

.globl  _to_PBus

_to_PBus:
# *** allocation of local variables ***
   #       pdu = g0
   #       len = g1
   #       dest_intf = r13
   #       priority = g3
   #       dest_slot = r4
   #       pHeader = r11
   #       pPDUh = r15
   #       pPDU = r11
   #       ptr_index = r3
   #       sending_pid = r12
   #       bc_only = g13
   #    U32 dest_slot;                          /* PDU's destination slot number.*/
   #    BUF_HEADER_TYPE *pHeader;               /* Pointer to P-Bus header.      */
   #    PDU_HEADER_TYPE *pPDUh;                 /* Points to a PDU header.       */
   #    commonheader_TYPE *pPDU;                /* Points to a PDU.              */
   #    U32 ptr_index;                          /* Temporary pointer index.      */
   #    U32 sending_pid;                        /* Process ID of originator.     */
   #    U32 bcmc_flag = TRUE;                   /* TRUE if BC or MC pdu.         */
   #    U32 bc_only = FALSE;                    /* TRUE if pdu must be broadcast.*/
        mov     2,g13                   # bcmc_flag = TRUE; bc_only = FALSE

# #ifdef DEBUG
   #    if (PB_driver_state == UNINITIALIZED)   /* If entered before initiali-   */
   #       return;                              /* zation has completed.         */
   #
   #    /*************************** to be removed later ******** dt 8/15 *******/
   #    if (fPB_rx_watchdog && ((sys_time - last_rx_time) > MAX_RX_TIME))
   #    /* If there's a possibility that the P-Bus receiver h/w has locked up...*/
   #    {
   #       PB_reinitialize_hw();                /* (Should not be needed!!!!!)   */
   #       PB_stats[our_slot].rx_hw_reinits++;  /* TEMPORARY COUNTER!!!!!        */
```

Aug 19 15:49 1994 pb_dsr.s Page 9

```
#       last_rx_time = sys_time;
}
#     /****************************************************************/
# #endif

#     sending_pid = PB_send_pid;              /* Originator's process ID.    */
#     PB_send_pid = 0;
        ldl      (g0),g6                # g6 = pdu->cdsthwaddr.hw1 & .hw2
                                        # g7 = pdu->cdsthwaddr.hw3
        mov      g2,r13                 # dest_intf
        lda      TX_SLOT_INFO_SIZE,r14  # sizeof(TX_SLOT_INFO_TYPE)
        mov      0,r5
        ld       _PB_send_pid(g12),r12  # r12 = sending_pid
        st       g13,_PB_real_pdu(g12)  # pdu points to a common header.
#.    if ((pdu->cdsthwaddr.hw1 == 0x00AA)      /* DECnet Phase IV MAC addresses.*/
#        || (pdu->cdsthwaddr.hw1 == 0x00AB))
        ldconst  0xFFFF,r7              # Mask for isolating .hw1 and .hw3.
        mov      g6,g4                  # g4 = .hw1 and .hw2
        ldconst  0x00AA,r3
        and      r7,g4,r4               # Isolate .hw1.
        ldconst  0x00AB,r6
        cmpo     r4,r3
        st       r5,_PB_send_pid(g12)
        be.f     DECnet
        cmpobne.t r4,r6,Chk_mc
#    {
#      bcmc_flag = TRUE;
#      bc_only = TRUE;                   /* Broadcast DECnet PDUs.       */
#    }
DECnet:
        mov      3,g13                  # bcmc_flag = TRUE; bc_only = TRUE
        b        L1                     # Broadcast the DECnet pdu.

#    else if ((pdu->cdsthwaddr.hw1 & MCBIT) == 0) /* If it's a unicast PDU...*/
Chk_mc:
#        bbs.f    0,g6,L1               # (Split.)
        chkbit   0,g6
        bo.f     L1
#    {
#      bcmc_flag = FALSE;
        mov      0,g13                  # bcmc_flag = FALSE; bc_only = FALSE

#      /* For FRELAY, destination slot (one-based) is the low-order nybble  */
#      /* of the destination MAC address.                                   */
#      /* For all other protocols, the destination slot is the (zero-based) */
#      /* index of the PB_MAC_to_slot table entry containing the            */
#      /* destination MAC address.  If the destination MAC address is not   */
#      /* in the table and bridging is enabled, broadcast the pdu.          */

#      if (sending_pid == FRELAY)
        cmpobne.t 22,r12,L44            # FRELAY's pid.
#        dest_slot = ((pdu->cdsthwaddr.hw3 >> 8) & 0x0F) - 1; /*Zero-based.*/
        lda      (g7),r4                # r4 = .hw3
        shro     8,r4,r4
        and      15,r4,r4
        subo     1,r4,r4
```

Aug 19 15:49 1994 pb_dsr.s Page 10

```
              b         L33
#       else
{
#           /* Search table for destination MAC address.            */

#           dest_slot = nSlots;         /* Invalid value for dest_slot. */
L44:
        ld      _nSlots(g12),r4     # r4 has dest_slot
#           for (i = 1; i <= nSlots; i++)
        mov     0,r6                # r6 = i - 1 (zero-based slot number)
        lda     _PB_MAC_to_slot+6(g12),r8 # r8 = table[1] address
        and     r7,g7,g5            # Isolate cdsthwaddr.hw3
        lda     (r4),r3             # r3 = nSlots (temporarily)
        b       L66
L10:
        addo    1,r6,r6             # i++
        lda     6(r8),r8            # Address of PB_MAC_to_slot[i]
        cmpobge.f r6,r4,L9
#           {
#               if ((pdu->cdsthwaddr.hw1 == PB_MAC_to_slot[i].hw1)
#                && (pdu->cdsthwaddr.hw2 == PB_MAC_to_slot[i].hw2)
#                && (pdu->cdsthwaddr.hw3 == PB_MAC_to_slot[i].hw3))
L66:
        ldl     (r8),g6             # g6 = PB_MAC_to_slot[i].hw1 and .hw2
        and     r7,g7,g7            # g7 = PB_MAC_to_slot[i].hw3
        cmpobne.t g5,g7,L10
        cmpobne.t g4,g6,L10
#               {                               /* Found a match.       */
#                   dest_slot = i - 1;          /* Zero-based slot number. */
        mov     r6,r4               # (r6 is already zero-based.)
#                   break;
}
}
#           /* If not in table and bridging enabled, broadcast the pdu. */

#           if ((dest_slot == nSlots)
#            && (cmos.intf[PB_INTERFACE].bridge_ena != NONE))
L9:
        cmpobne.t r4,r3,L33         # Branch if found slot in table.
        ldob    _cmos+intf+(Intf*PB_INTERFACE)+bridge_ena,g6
        lda     255,g7              # Code for NONE.
        cmpobe.t g6,g7,Discard      # Branch if .bridge_ena == NONE.
#               bc_only = TRUE;
        mov     1,g13               # bcmc_flag = FALSE; bc_only = TRUE
        b       L1
# No destination slot(s) for this destination MAC address.
Discard:
        ld      _intfstats+(PB_INTERFACE*4)(g12),g4 # intfstats[PB_INTERFACE]
        ld      ifOutDiscards(g4),g6 #  ->ifOutDiscards
        addo    1,g6,g6
        st      g6,ifOutDiscards(g4)
        ret
#       }
}
#   if ((bcmc_flag == FALSE) && (bc_only == FALSE))
#   {                                       /* Normal unicast pdu.      */
```

Aug 19 15:49 1994  pb_dsr.s Page 11

```
L33:
        cmpobne.f 0,g13,L1           # (Split.)
#       cmpo      0,g13
#       bne.f     L1
        b         Unicast
        .sect     code1,text,align 4
.globl Unicast
Unicast:

# #ifdef DEBUG
#       if ((dest_slot >= nSlots) || (dest_slot == our_slot))
#       {                                  /* Invalid destination slot numb.*/
#           tx_bad_dest_slots++;           /* Don't screech.                */
# #if 0
#           tx_total_discards++;           /* Discard the PDU.              */
# #endif
#           PB_stats[our_slot].tx_discards++; /* Use our slot for this stat. */
#           intfstats[PB_INTERFACE]->ifOutDiscards++; /* OS statistics.     */
#           return;                        /* Exit.                         */
#       }
# #endif

#       ptr_index = tx_slot_info[dest_slot].next_in_ptr_index;

#       /* Check if a buffer is available for the destination slot.         */
#       if (tx_slot_info[dest_slot].buffers_in_use >= TX_BUFFERS_PER_SLOT)
#       {                                  /* No buffer is available.       */
# #if 0
#                                          /* !!! Don't use OS queuing yet!!!*/
#           if (tx_total_discards * MAX_TX_DISCARD_RATE > tx_total_count)
#           {                              /* If discard rate too high...   */
#               QDrvPkt(pdu, len, dest_intf, 0, 0); /* Use OS packet queuing.*/
/* Remember what and where this packet is.                  */
#           }
#           else                           /* Discard rate is not too high. */
# #endif
#           {
# #if 0
#               tx_total_discards++;       /* Discard this PDU.             */
# #endif
# #ifdef DEBUG
PB_stats[dest_slot].tx_discards++; /* Update statistics.    */
PB_stats[dest_slot].tx_oflow_errs++;
# #endif
intfstats[PB_INTERFACE]->ifOutDiscards++; /* OS statistics. */
#           }
#           PB_tx_dsr();                   /* Check transmit status.        */
#           return;                        /* Exit.                         */

#       /* Check if the destination slot's current output buffer already has */
#       /* enough PDUs in it, or if this PDU will fit.                      */

#       if ((tx_slot_info[dest_slot].buff_info[ptr_index].nPDUs
#               >= PB_tx_threshold)        /* TRUE if buffer is "full."     */
#           || (tx_slot_info[dest_slot].buff_info[ptr_index].total_length
#               + len                      /* PDU length.                   */
#               + sizeof(PDU_HEADER_TYPE)  /* PDU header length.            */
```

Aug 19 15:49 1994 pb_dsr.s Page 12

```
#                 + 3                    /* Worst-case alignment overhead.*/
#                 > TX_BUFFER_SIZE))     /* TRUE if too big to fit.       */
#       { /* Check if another buffer is available.                        */
        mulo    r14,r4,g7              # tx_slot_info[dest_slot] offset
        lda     TX_BUFFER_SIZE,g3
        lda     _tx_slot_info(g12)[g7*1],g7 # tx_slot_info[dest_slot] addr.
        ld      _PB_tx_batch(g12),r5   # Max. TX PDUs per buffer.
        ld      4(g7),r9               # .buffers_in_use
        ld      16(g7),r3              # ptr_index = .next_in_ptr_index
        cmpo    TX_BUFFERS_PER_SLOT-1,r9 # Is a TX buffer available?
        shlo    5,r3,g6                # buff_info[ptr_index] offset
        ble.f   PB_no_buffer           # No TX buffer is available.
        lda     28(g7)[g6*1],g5        # buff_info[ptr_index] address
        ld      12(g5),g6              # .nPDUs
        ld      20(g5),r7              # .total_length
        cmpo    g6,r5                  # Check if buffer is "full."
        ld      8(g7),g6               # .next_in_buff_index
        bge.f   PB_new_buffer          # Branch if buffer is "full."
        lda     PDU_HEADER_SIZE+3(g1)[r7*1],r5
                                       # + len + sizeof(PDU_HEADER_TYPE) + 3
        cmpoble.t r5,g3,L2
        b       PB_new_buffer

#       { /* Check if another buffer is available.                        */
#         if (tx_slot_info[dest_slot].buffers_in_use >= TX_BUFFERS_PER_SLOT)
#         {                            /* No buffer is available.         */
# #if 0                                /* !!! Don't use OS queuing yet!!!*/
#           if (tx_total_discards * MAX_TX_DISCARD_RATE > tx_total_count)
#           {                          /* If discard rate too high...     */
#             QDrvPkt(pdu, len, dest_intf, 0, 0); /* Use OS packet queuing.*/
/* Remember what and where this packet is.                  */
#           }
#           else                       /* Discard rate is not too high.   */
# #endif
#           {
# #if 0
#             tx_total_discards++;     /* Discard this PDU.               */
# #endif
# #ifdef DEBUG
PB_stats[dest_slot].tx_discards++; /* Update statistics.    */
PB_stats[dest_slot].tx_oflow_errs++;
# #endif
intfstats[PB_INTERFACE]->ifOutDiscards++; /* OS statistics. */
        .sect   code3,text,align 4
.globl PB_no_buffer
PB_no_buffer:
        .ifdef  DEBUG
        lda     PB_STATS_SIZE,g0       # sizeof(PB_STATS_TYPE)
        .endif
        ld      _intfstats+(PB_INTERFACE*4)(g12),g4
        .ifdef  DEBUG
        mulo    g0,r4,g0               # PB_stats[dest_slot]
        .endif
        ld      ifOutDiscards(g4),g6   # ifOutDiscards
        .ifdef  DEBUG
```

Aug 19 15:49 1994 pb_dsr.s Page 13

```
                lda     _PB_stats+32(g12)[g0*1],g1  # .tx_oflow_errs
                .endif
                addo    1,g6,g6
                .ifdef  DEBUG
                ld      (g1),g2
                .endif
                st      g6,120(g4)
                .ifdef  DEBUG
                addo    1,g2,g2
                st      g2,(g1)
                .endif
#           }
#           PB_tx_dsr();                /* Check transmit status.    */
#           return;                     /* Exit.                     */
                b       _PB_tx_dsr
#       }

#       /* Use the next available buffer for the destination slot.   */

#       if (++tx_slot_info[dest_slot].next_in_buff_index /* Next buffer. */
#            >= TX_BUFFERS_PER_SLOT)    /* Take care of wraparound.  */
#           tx_slot_info[dest_slot].next_in_buff_index = 0;
L333:
                mov     0,g6
                b       L4
L555:
                mov     0,r3
                b       L5

.globl PB_new_buffer
PB_new_buffer:
                cmpinco (TX_BUFFERS_PER_SLOT-1),g6,g6  # Compare before incrementing.
                lda     1(r3),r3                # (++ptr_index)
                ble.f   L333                    # Branch if g6 is now > 8.
L4:
                st      g6,8(g7)                # .next_in_buff_index

#       if (++ptr_index >= (TX_BUFFERS_PER_SLOT * 2)) /* Next in index. */
#           ptr_index = 0;              /* Take care of wraparound.  */
                cmpoble.f TX_BUFFERS_PER_SLOT*2,r3,L555
L5:
#       tx_slot_info[dest_slot].next_in_ptr_index = ptr_index;

#       pHeader = (BUF_HEADER_TYPE *)   /* Addr. of next avail. buffer. */
#                 &tx_buffers[dest_slot]
[tx_slot_info[dest_slot].next_in_buff_index][0];
                shlo    3,g3,r10                # 8 * TX_BUFFER_SIZE
                st      r3,16(g7)               # .next_in_ptr_index
                mulo    r10,r4,r10
                ld      (g7),r5                 # (.count)
                mulo    g3,g6,r11
                lda     _tx_total_count(g12),r6
                addo    r10,r11,r11
                ld      (r6),r15                # (tx_total_count)
                addo    1,r5,r5                 # (.count++)
                lda     _tx_buffers(g12)[r11*1],r11  # pHeader
```

B58

Aug 19 15:49 1994 pb_dsr.s Page 14

```

#              tx_slot_info[dest_slot].count++;  /* Another buffer to transmit.   */

#              tx_total_count++;                 /* One more buffer to transmit.  */

#              /* Initialize buffer information.                                  */

#              tx_slot_info[dest_slot].buff_info[ptr_index].pBuffer = pHeader;
        shlo    5,r3,g6                 # buff_info[ptr_index] offset
        st      r5,(g7)                 # .count
        st      r5,_PB_tx_counts[r4*4]  # Shadow count in data cache.
        addo    1,r15,r15               # tx_total_count++
        lda     0,r14
        mov     BUF_HEADER_SIZE,r7
        lda     28(g7)[g6*1],g5         # buff_info[ptr_index] address
        st      r15,(r6)                # (tx_total_count++)
        st      r11,(g5)                # .pBuffer
#          tx_slot_info[dest_slot].buff_info[ptr_index].fBCMC = FALSE;
#          tx_slot_info[dest_slot].buff_info[ptr_index].nPDUs = 0;
        st      r14,4(g5)               # .fBCMC
        st      r14,12(g5)              # .nPDUs
#          tx_slot_info[dest_slot].buff_info[ptr_index].pNext =
#              pPDUh = (PDU_HEADER_TYPE *)
#                  ((U8 *)pHeader + sizeof(BUF_HEADER_TYPE));
        addo    BUF_HEADER_SIZE,r11,r15 # pPDUh
        ld      4(g7),r10               # (.buffers_in_use)
        .ifndef POLLED
        ld      _sys_time(g12),r3       # (Current system millisecond clock.)
        .endif
        st      r15,16(g5)              # .pNext
#          tx_slot_info[dest_slot].buff_info[ptr_index].total_length =
#              sizeof(BUF_HEADER_TYPE);
#          tx_slot_info[dest_slot].buffers_in_use++;
        addo    1,r10,r10               # .buffers_in_use++
        st      r7,20(g5)               # .total_length
        st      r10,4(g7)               # (.buffers_in_use++)
#          tx_slot_info[dest_slot].init_time = sys_time; /* Current time.   */
        .ifndef POLLED
        st      r3,24(g7)               # .init_time = sys_time
        .endif
        b       L6
#      }
#      else                             /* Current buffer has room.        */
#      {
#          pHeader = (BUF_HEADER_TYPE *)  /* Address of buffer with room.  */
#              &tx_buffers[dest_slot]
[tx_slot_info[dest_slot].next_in_buff_index][0];
        .sect   code1,text,align 4
        .globl  L2
L2:
        shlo    3,g3,r10                # 8 * TX_BUFFER_SIZE
        lda     0,r14
        mulo    r10,r4,r10
        ld      12(g5),r3               # (.nPDUs)
        mulo    g3,g6,r11
        cmpo    0,r3
```

Aug 19 15:49 1994  pb_dsr.s Page 15

```
                addo        r10,r11,r11
                lda         _tx_buffers(g12)[r11*1],r11  # pHeader

#           if (tx_slot_info[dest_slot].buff_info[ptr_index].nPDUs == 0)
                bne.t       L7
#               be.f        Temp                    # (In case a breakpoint here is
#               b           L7                      #  needed.)
#Temp:
#           {                                       /* Needs initialization.        */
                ldl         (g7),r6                 # r6 = .count; r7 = .buffers_in_use
#               tx_slot_info[dest_slot].buff_info[ptr_index].pBuffer = pHeader;
                st          r11,(g5)
#               tx_slot_info[dest_slot].buff_info[ptr_index].fBCMC = FALSE;
                mov         BUF_HEADER_SIZE,r3      # (sizeof(BUF_HEADER_TYPE)
                st          r14,4(g5)               # .fBCMC
#               tx_slot_info[dest_slot].buff_info[ptr_index].total_length
#                   = sizeof(BUF_HEADER_TYPE);
                ld          _tx_total_count(g12),r8
                addo        r3,r11,r15              # [pPDUh]
                st          r3,20(g5)               # .total_length
#               tx_slot_info[dest_slot].buff_info[ptr_index].pNext
#                   = (PDU_HEADER_TYPE *)((U8 *)pHeader + sizeof(BUF_HEADER_TYPE));
                .ifndef     POLLED
                ld          _sys_time(g12),r3       # (Current system millisecond clock.)
                .endif
                st          r15,16(g5)              # .pNext

#               tx_slot_info[dest_slot].count++; /* Another buffer to transmit.*/
#               tx_slot_info[dest_slot].buffers_in_use++;
#               tx_slot_info[dest_slot].init_time = sys_time; /* Current time. */
#               tx_total_count++;                   /* One more buffer to transmit.*/
                addo        1,r6,r6                 # .count++
                lda         1(r7),r7                # .buffers_in_use++
                addo        1,r8,r8                 # tx_total_count++
                stl         r6,(g7)
                st          r6,_PB_tx_counts[r4*4]  # Shadow count in data cache.
                st          r8,_tx_total_count(g12)
                .ifndef     POLLED
                st          r3,24(g7)               # .init_time = sys_time
                .endif
#           }
#           pPDUh = tx_slot_info[dest_slot].buff_info[ptr_index].pNext;
L7:
                ld          16(g5),r15              # .pNext
#           }

#           tx_slot_info[dest_slot].buff_info[ptr_index].nPDUs++; /* One more PDU.*/
L6:
                ld          12(g5),r3               # .nPDUs
                ld          _intfstats+(PB_INTERFACE*4)(g12),g4

# #ifdef DEBUG
#           if (tx_slot_info[dest_slot].buff_info[ptr_index].nPDUs
#               > PB_stats[dest_slot].tx_max_PDUs)
#               PB_stats[dest_slot].tx_max_PDUs
#                   = tx_slot_info[dest_slot].buff_info[ptr_index].nPDUs;
```

Aug 19 15:49 1994 pb_dsr.s Page 16

```
# #endif

# #ifdef DEBUG2
#         if (tx_slot_info[dest_slot].buff_info[ptr_index].nPDUs > 2)
#             asm(" fmark");
# #endif

#         PB_total_length =                       /* (Shadow in the data cache.)  */
#         tx_slot_info[dest_slot].buff_info[ptr_index].total_length
#             += sizeof(PDU_HEADER_TYPE)          /* PDU header length.           */
#             + ((len + 3) & ~3);                 /* Round up to word boundary.   */
          addo    3,g1,r10
          ld      20(g5),r7               # .total_length
          addo    1,r3,r3                 # .nPDUs++
          ld      16(g5),r9               # (.pNext)
          andnot  3,r10,r10               # r10 = ((len + 3) & ~3)
          st      r3,12(g5)               # (.nPDUs++)
          addo    PDU_HEADER_SIZE,r10,r10 #       + sizeof(PDU_HEADER_TYPE)
          ld      ifOutUcastPkts(g4),r3   # (ifOutUcastPkts)
          addo    r10,r7,r7               # .total_length += ...

#         (U8 *)tx_slot_info[dest_slot].buff_info[ptr_index].pNext
#             += sizeof(PDU_HEADER_TYPE)          /* PDU header length.           */
#             + ((len + 3) & ~3);                 /* Next available buffer word.  */

#         intfstats[PB_INTERFACE]->ifOutUcastPkts++; /* OS statistics.            */
          addo    r10,r9,r9
          st      r7,20(g5)               # (.total_length)
          st      r7,_PB_total_length(g12) # (Data cache shadow.)
          addo    1,r3,r3                 # ifOutUcastPkts++
          st      r9,16(g5)               # (.pNext)
          st      r3,ifOutUcastPkts(g4)   # (ifOutUcastPkts)
          b       L8
#     }                                           /* End of unicast processing.   */
#     else                                        /* Broadcast or multicast PDU.  */
#     {
EXIT:
          ret
L1:
          clrbit  0,g13,g13               # Eliminate bcmc_flag.
          movl    g0,r8                   # Save pdu and len.
          mov     r12,g2                  # sending_pid is third parameter.
          lda     (g13),g3                # bc_only is fourth parameter.
          callj   _PB_bcmc
          cmpo    0,g0                    # Check return code.
          mov     g0,r15                  # pPDUh is returned.
          be.f    _PB_tx_dsr              # Branch if no BC/MC buffer available
                                          # or no BC/MC recipients.
          movl    r8,g0                   # Restore pdu and len.
#     }                                           /* End of BC/MC processing.     */
L8:

# #ifdef DEBUG
#     PB_stats[our_slot].to_PBus_calls++; /* Remember being here.                 */
# #endif

```

Aug 19 15:49 1994 pb_dsr.s Page 17

```
#       /* Fill in the PDU header.                                              */

#       pPDUh->length = len;            /* PDU's length in bytes.               */
#       pPDUh->protocol = sending_pid;  /* Originator's process ID.             */
        shlo        16,g1,r10           # len<<16
        lda         PDU_HEADER_SIZE(r15),r14 # (pPDU=pPDUh+sizeof(PDU_HEADER_TYPE))
        or          r12,r10,r10         # || sending_pid
        ld          _PB_real_pdu(g12),g13 # (For source MAC test, below.)

#       /* Copy PDU into output buffer.                                         */

#       pPDU = (commonheader_TYPE *)((U8 *)pPDUh + sizeof(PDU_HEADER_TYPE));
        mov         g1,g2               # len
        st          r10,(r15)           # (pPDUh->((len<<16) || protocol))

#       memcpy(pPDU, pdu, len);         /* Copy PDU into output buffer.         */
        ld          _PB_total_length(g12),r3 # Includes current PDU.
        ldconst     TX_BUFFER_SIZE,r4
        mov         g0,g1               # pdu
        subo        r3,r4,r4            # Space left in the current buffer.
        lda         (r14),g0            # pPDU
        cmpobg.f    16,r4,Call_memcpy   # Branch if can't do a fast copy.
# Fast memcpy(). Used if >= 16 free bytes at end of current transmit buffer.
        addo        15,g2,r3            # Round up length to quadword.
        shro        4,r3,r3             # Number of quadwords to copy.
Copy_loop:
        ldq         (g1),r4             # r4-r7 <- source data.
        addo        16,g1,g1            # Increment source pointer.
        cmpdeco     1,r3,r3             # Decrement number of quadwords left.
        stq         r4,(g0)             # 16 bytes.
        addo        16,g0,g0            # Increment destination pointer.
        bl.t        Copy_loop           # Branch if more to copy.
        b           Chk_hdr
Call_memcpy:
        callj       _memcpy

#       /* If source MAC address is zero, use our MAC address there.            */
#       /* !!!!! This is needed ONLY if parse_common_HDR(...) is called by      */
#       /* PB_rx_isr()!!!                                                       */

Chk_hdr:
        cmpo        0,g13               # Check if common header.
        ld          _PB_tx_state(g12),g0
        be.f        L36                 # Branch if no common header.

#       if ((pPDU->csrchwaddr.hw1 == 0)
#           && (pPDU->csrchwaddr.hw2 == 0)
#           && (pPDU->csrchwaddr.hw3 == 0))
        ldl         6(r14),r6
        ldconst     0xFFFF,r8
        cmpobne.t   0,r6,L36
        and         r8,r7,r7
        cmpobne.f   0,r7,L36
#       {
#           pPDU->csrchwaddr = intfptrs[dest_intf]->MAC_addr;
        ld          _intfptrs(g12)[r13*4],r10
```

Aug 19 15:49 1994 pb_dsr.s Page 18

```
        ldl     MAC_addr(r10),r6
        st      r6,6(r14)
        stos    r7,10(r14)
#   }

#       /* Call the transmit DSR.                                       */

#       PB_tx_dsr();                    /* Call the transmit DSR.       */
L36:
        cmpobe.t TX_IDLE,g0,Tx_next_idle # Branch if case TX_IDLE.
        b       Tx_dsr_switch

# /* Done.          .                                                   */

#       return;                         /* Done.                        */
# } /* to_PBus() */

# /**********************************************************************
*
# *     Function:       PB_tx_dsr
# *
# *     Description:    P-Bus transmission device/driver support function.
# *                     Responsible for the bulk of P-Bus transmission processing.
# *                     If P-Bus transmission is not in progress and there are
# *                     buffers to be transmitted, choose one and initiate trans-
# *                     mission.
# *
# *     Called by:      to_PBus() and PB_tx_isr()
# *
# *     Parameters: None.
# *
# *     Returns:        Nothing.
# *
# *     Precautions:    Must be invoked with interrupts disabled!
# *
**********************************************************************/

# void PB_tx_dsr(void)
# {
#       U32 ptr_index;                  /* Index into buff_info.        */

_PB_tx_dsr:
#       switch (PB_tx_state)
        ld      _PB_tx_state(g12),g0
Tx_dsr_switch:
        ld      M98[g0*4],g1
        bx      (g1)
M98:
        .word   Tx_next_idle            # case TX_IDLE
        .word   M79                     # case TX_ACTIVE
        .word   M80                     # case TX_DONE
        .word   M81                     # case TX_ERROR
        .word   M82                     # case TX_EMPTY_SLOT
#   {
#       case TX_IDLE:                                   /* From to_PBus() and   */
```

Aug 19 15:49 1994 pb_dsr.s Page 19

```
#                                                       /* no tx is in progress.   */
#            PB_tx_next();                               /* Send next in line.      */
#            break;

#       case TX_ACTIVE:                                  /* From to_PBus() and       */
#                                                       /* transmission in progress.*/
#            if ((sys_time - last_tx_time) > MAX_TX_TIME) /* If TX taking too       */
#            {                                            /* long to complete...     */
M79:
        ld      _sys_time(g12),r9
        ld      _PB_last_tx_time(g12),r10
        subo    r10,r9,r9
#       cmpobl.f MAX_TX_TIME,r9,M791    # (Split.)
        cmpo    MAX_TX_TIME,r9
        bl.f    M791
        ret .sect   code2,text,align 4
.globl M791
M791:
#            PB_RX_DMA_RESET = 0;                        /* Reset RX DMA.           */
        lda     0x30000360,r15
        mov     0,r12
        lda     1,r14
#            PB_RX_DMA_RESET = 1;
#            PB_FIFO_RESET = 0;                          /* Reset the FIFO by       */
        lda     0x30000340,r11
        st      r12,(r15)
        st      r14,(r15)
#            PB_FIFO_RESET = 1;                          /* toggling this bit.       */
        mov     SLOT_BAD,r7
        st      r12,(r11)
        lda     0x30000630,r15
        st      r14,(r11)
#            PB_TX_RESET = 0;                            /* Reset transmission.     */
        st      r12,(r15)
#            PB_TX_RESET = 1;
        lda     0x30000350,g3
        st      r14,(r15)
#            PB_TX_DMA_RESET = 0;                        /* Stop TX DMA by toggling */
        st      r12,(g3)
#            PB_TX_DMA_RESET = 1;                        /* this bit.                */
        st      r14,(g3)
#            PB_tx_state = TX_IDLE;                      /* No transmission.         */
#            PB_slot_state[tx_slot] = SLOT_BAD;          /* Slot seems to be bad.    */
#            ptr_index = tx_slot_info[tx_slot].next_out_ptr_index;
tx_slot_info[tx_slot].buff_info[ptr_index].tx_retries = 0;
# #if 0
tx_total_discards
+= tx_slot_info[tx_slot].buff_info[ptr_index].nPDUs;
# #endif
# #ifdef DEBUG
#            PB_stats[tx_slot].tx_discards
+= tx_slot_info[tx_slot].buff_info[ptr_index].nPDUs;
#            PB_stats[tx_slot].tx_timeout_errs[tx_DMA_channel^DMA_TX_TOGGLE]++;
# #endif
```

B64

Aug 19 15:49 1994 pb_dsr.s Page 20

```
#               PB_tx_next();                           /* Send next in line.   */
#-          }                                           /* (Else, keep waiting.) */
#       break;

        ld      _tx_slot(g12),r8
        st      r12,_PB_tx_state(g12)   # TX_IDLE is 0.
        lda     TX_SLOT_INFO_SIZE,r9
        mov     r8,r6
        mulo    r9,r8,r8                # tx_slot_info[tx_slot] offset.
        .ifdef  DEBUG
        lda     PB_STATS_SIZE,g0        # sizeof(PB_STATS_TYPE)
        .endif
        st      r7,_PB_slot_state(g12)[r6*4]
        lda     _tx_slot_info(g12)[r8*1],g2 # tx_slot_info[tx_slot] address.
        .ifdef  DEBUG
        mulo    g0,r6,g0
        .endif
        ld      20(g2),g3               # ptr_index = .next_out_ptr_index
        .ifdef  DEBUG
        lda     _PB_stats+96(g12)[g0*1],g1 # .tx_timeout_errs
        ld      (g1),g4
        .endif
        shlo    5,g3,g3
        st      r12,24+28(g2)[g3*1]     # buff_info[ptr_index].tx_retries = 0
        .ifdef  DEBUG
        addo    1,g4,g4                 # .tx_timeout_errs++
        st      g4,(g1)
        .endif b       _PB_tx_next case TX_DONE:                                   /* Transmission done ok. */
PB_tx_state = TX_IDLE;                      /* No transmission.      */
        .sect   code1,text,align 4
.globl M80
M80:
        mov     TX_IDLE,g4
#           PB_slot_state[tx_slot] = SLOT_OK;           /* Slot seems to be ok.  */
#           ptr_index = tx_slot_info[tx_slot].next_out_ptr_index;
tx_slot_info[tx_slot].buff_info[ptr_index].tx_retries = 0;
        ld      _tx_slot(g12),g7
        mov     SLOT_OK,g6
        lda     TX_SLOT_INFO_SIZE,r6
        mov     g7,g5
        st      g4,_PB_tx_state(g12)
        mulo    r6,g7,g7                # tx_slot_info[tx_slot] offset.
        ld      _intfstats+(PB_INTERFACE*4)(g12),r9
        st      g6,_PB_slot_state(g12)[g5*4]
        .ifdef  DEBUG
        lda     PB_STATS_SIZE,g0        # sizeof(PB_STATS_TYPE)
        .endif
        lda     _tx_slot_info(g12)[g7*1],g2 # tx_slot_info[tx_slot] address.
#           intfstats[PB_INTERFACE]->ifOutOctets += tx_octets; /* Statistics. */
# #ifdef DEBUG
#           PB_stats[tx_slot].tx_ok++;
#           PB_stats[tx_slot].tx_pdus
```

Aug 19 15:49 1994 pb_dsr.s Page 21

```
#                               += tx_slot_info[tx_slot].buff_info[ptr_index].nPDUs;
# #endif
        .ifdef  DEBUG
        mulo    g0,g5,g0
        .endif
        ld      20(g2),g3               # ptr_index = .next_out_ptr_index
        ld      ifOutOctets(r9),r10
        ld      _PB_tx_octets(g12),r8
        .ifdef  DEBUG
        ld      _PB_stats+20(g12)[g0*1],r4 # .tx_pdus
        .endif
        shlo    5,g3,g3                 # Offset of buff_info[ptr_index]
        .ifdef  DEBUG
        lda     _PB_stats+16(g12)[g0*1],r3 # .tx_ok
        ld      (r3),r6
        .endif
        addo    r8,r10,r8
        st      g4,24+28(g2)[g3*1]      # buff_info[ptr_index].tx_retries=0
        st      r8,ifOutOctets(r9)
        .ifdef  DEBUG
        addo    1,r6,r6                 # .tx_ok++
        ld      12+28(g2)[g3*1],r5      # buff_info[ptr_index].nPDUs
        st      r6,(r3)
        addo    r5,r4,r4
        st      r4,_PB_stats+20(g12)[g0*1] # .tx_pdus
        .endif
#       PB_dq();                                /* Dequeue the buffer.   */
        callj   _PB_dq
#       PB_tx_next();                           /* Send next in line.    */
        b       _PB_tx_next
        .sect   code3,text,align 4
.globl M81
M81:
        mov     TX_IDLE,r11
        lda     TX_SLOT_INFO_SIZE,r14
#       break;

#       case TX_ERROR:                          /* Transmission error.   */
#           PB_tx_state = TX_IDLE;              /* No transmission.      */
#           ptr_index = tx_slot_info[tx_slot].next_out_ptr_index;
#           if (++tx_slot_info[tx_slot].buff_info[ptr_index].tx_retries)
        ld      _tx_slot(g12),r3
        ld      _max_tx_retries(g12),r15
        mov     r3,r4
        st      r11,_PB_tx_state(g12)
        mulo    r14,r3,r3               # tx_slot_info[tx_slot] offset.
        lda     _tx_slot_info(g12)[r3*1],g2 # tx_slot_info[tx_slot] address.
        ld      20(g2),g3               # ptr_index = .next_out_ptr_index
        shlo    5,g3,g3                 # Offset of buff_info[ptr_index]
        ld      24+28(g2)[g3*1],r12     # buff_info[ptr_index].tx_retries
        addo    1,r12,r12
        st      r12,24+28(g2)[g3*1]
#       {                                       /* Retry count not exceeded.*/
# #ifdef DEBUG
#           PB_stats[tx_slot].tx_retries[tx_DMA_channel^DMA_TX_TOGGLE]++;
#           if (tx_slot_info[tx_slot].buff_info[ptr_index].tx_retries == 1)
```

B66

Aug 19 15:49 1994  pb_dsr.s Page 22

```
#               PB_stats[tx_slot].tx_first_retries++; /* First retry.      */
# #endif
#           PB_tx_next();                       /* Send next in line.      */
#       cmpoble.t r12,r15,_PB_tx_next  # (Split.)
        cmpo       r12,r15
        ble.t      _PB_tx_next
#       }
#       else                                    /* Retry count exceeded.   */
#       {
#           PB_slot_state[tx_slot] = SLOT_BAD;  /* Slot seems to be bad.   */
# #ifdef DEBUG
#           PB_stats[tx_slot].tx_max_retries++;
#           PB_stats[tx_slot].tx_discards
+= tx_slot_info[tx_slot].buff_info[ptr_index].nPDUs;
# #endif
# #if 0
tx_total_discards
+= tx_slot_info[tx_slot].buff_info[ptr_index].nPDUs;
# #endif
        mov        SLOT_BAD,g0
        .ifdef     DEBUG
        lda        PB_STATS_SIZE,g1     # sizeof(PB_STATS_TYPE)
        .endif
        st         g0,_PB_slot_state(g12)[r4*4]
        .ifdef     DEBUG
        mulo       g1,r4,g1
        .endif
#           tx_slot_info[tx_slot].buff_info[ptr_index].tx_retries = 0;
/* Zero the retry counter. */
        st         r11,24+28(g2)[g3*1]
        .ifdef     DEBUG
        lda        _PB_stats+40(g12)[g1*1],g0
        ld         (g0),g4
        addo       1,g4,g4                      # .tx_max_retries++
        st         g4,(g0)
        .endif
#           intfstats[PB_INTERFACE]->ifOutDiscards /* OS statistics.        */
#                   += tx_slot_info[tx_slot].buff_info[ptr_index].nPDUs;
        ld         _intfstats+(PB_INTERFACE*4)(g12),g4
        ld         12+28(g2)[g3*1],g5
        ld         ifOutDiscards(g4),g6
        addo       g5,g6,g6                     # ifOutDiscards += ...
        st         g6,ifOutDiscards(g4)
#           PB_dq();                            /* Dequeue the buffer.     */
        callj      _PB_dq
#           PB_tx_next();                       /* Send next in line.      */
        b          _PB_tx_next
#       }
#       break;

#       case TX_EMPTY_SLOT:                     /* Empty target slot.      */
#           PB_tx_state = TX_IDLE;              /* No transmission.        */
M82:
        mov        TX_IDLE,g4
#           PB_slot_state[tx_slot] = SLOT_EMPTY; /* Slot seems to be empty. */
        ld         _tx_slot(g12),g7
```

Aug 19 15:49 1994 pb_dsr.s Page 23

```
            mov         SLOT_EMPTY,g6
            lda         TX_SLOT_INFO_SIZE,r6
            mov         g7,g5
            st          g4,_PB_tx_state(g12)
            mulo        r6,g7,g7
            st          g6,_PB_slot_state(g12)[g5*4]
#              while (tx_slot_info[tx_slot].count)      /* Dequeue all of this  */
#              {                                        /* slot's buffers.      */
#                ptr_index = tx_slot_info[tx_slot].next_out_ptr_index;
tx_slot_info[tx_slot].buff_info[ptr_index].tx_retries = 0;
/* Zero the retry counter. */
#                /* If the last buffer to dequeue is the current input unicast  */
#                /* buffer, "close" it before dequeueing it.                    */
#                if ((tx_slot_info[tx_slot].count == 1)
#                    && (tx_slot_info[tx_slot].buffers_in_use == 1)
#                    && (tx_slot_info[tx_slot].next_in_buff_index
#                        == tx_slot_info[tx_slot].next_out_buff_index))
#                {
#                    ptr_index = tx_slot_info[tx_slot].next_in_ptr_index;
#                    if (++ptr_index >= (TX_BUFFERS_PER_SLOT * 2))
#                        ptr_index = 0;
#                    tx_slot_info[tx_slot].next_in_ptr_index = ptr_index;
#                    if (++tx_slot_info[tx_slot].next_in_buff_index
#                        >= TX_BUFFERS_PER_SLOT)
#                        tx_slot_info[tx_slot].next_in_buff_index = 0;
#                    tx_slot_info[tx_slot].buff_info[ptr_index].nPDUs = 0;
#                    tx_slot_info[tx_slot].buff_info[ptr_index].total_length
#                        = sizeof(BUF_HEADER_TYPE);
#                }
#                PB_dq();                                /* Dequeue a buffer.    */
L41:
            lda         _tx_slot_info(g12)[g7*1],g2  # tx_slot_info[tx_slot] address.
            mov         0,r3
            ldl         16(g2),g4               # g4 = .next_in_ptr_index
                                                # g5 = ptr_index = .next_out_ptr_index;
            ldq         (g2),r4                 # r4 = .count; r5 = .buffers_in_use;
                                                # r6 = .next_in_buff_index;
                                                # r7 = .next_out_buff_index
            shlo        5,g5,g5                 # Offset of buff_info[ptr_index]
            cmpo        1,r4
            st          r3,24+28(g2)[g5*1]      # buff_info[ptr_index].tx_retries=0
            bl.f        Emp_dq                  # Branch if .count > 1.
            cmpobne.t   r4,r5,Emp_dq            # Branch if .count != .buffers_in_use.
            cmpo        r6,r7
            addo        1,g4,g4                 # .next_in_ptr_index++
            lda         1(r6),r6                # .next_in_buff_index++
            bne.f       Emp_dq                  # Branch if buffer indices not equal.
            and         (TX_BUFFERS_PER_SLOT*2)-1,g4,g4 # Take care of wraparound
            and         TX_BUFFERS_PER_SLOT-1,r6,r6 # by using modulo arithmetic.
            st          g4,16(g2)
            shlo        5,g4,r8
            st          r6,8(g2)
            mov         BUF_HEADER_SIZE,r4
            st          r3,12+28(g2)[r8*1]      # .nPDUs = 0
            st          r4,20+28(g2)[r8*1]      # .total_length = BUF_HEADER_SIZE
Emp_dq:
```

Aug 19 15:49 1994 pb_dsr.s Page 24

```
        callj     _PB_dq                      # g7 must not be altered!
        ld        _tx_slot_info(g12)[g7*1],r8 # .count (tx_slot is invariant.)
# #ifdef DEBUG
#            PB_stats[tx_slot].tx_discards
+= tx_slot_info[tx_slot].buff_info[ptr_index].nPDUs;
# #endif
# #if 0
tx_total_discards
+= tx_slot_info[tx_slot].buff_info[ptr_index].nPDUs;
# #endif
}
# #ifdef DEBUG
#          PB_stats[tx_slot].tx_empty_errs[tx_DMA_channel^DMA_TX_TOGGLE]++;
# #endif
        .ifdef    DEBUG
        ld        _tx_slot(g12),g5
        lda       PB_STATS_SIZE,g0          # sizeof(PB_STATS_TYPE)
        mulo      g0,g5,g0
        .endif
        cmpo      0,r8
        .ifdef    DEBUG
        lda       _PB_stats+64(g12)[g0*1],g1 # .tx_empty_errs
        ld        (g1),g2
        addo      1,g2,g2
        st        g2,(g1)
        .endif
#       bne.t     L41                         # Loop doesn't work!
#           PB_tx_next();                                 /* Send next in line.    */
        b         _PB_tx_next
#       break;
}
return;
# } /* PB_tx_dsr() */

# /*******************************************************************
*
# * Function:      PB_tx_next
# *
# * Description:   Transmit the "next" queued buffer.
# *                Increment the destination slot and check for buffers to
# *                transmit to that (next) slot, rather than sending all
# *                buffers destined for the current slot before incrementing
# *                the destination slot. This algorithm is better at emulating
# *                a broadcast/multicast mechanism and should be better at
# *                reducing average maximum latency.  (It is also necessary
# *                for the transmission error retry logic.)
# *
# * Called by:     PB_tx_dsr() and clint()
# *
# * Parameters: None, but uses tx_slot.
# *
* Returns:       Nothing.
*
# * Precautions: Must be invoked with interrupts disabled!
# *
```

Aug 19 15:49 1994  pb_dsr.s Page 25

```
# ********************************************************************/

# void PB_tx_next(void)
# {
        .sect      code1,text,align 4
        .globl     _PB_tx_next
_PB_tx_next:
#       U32 i;                                          /* Index variable.        */
#       U32 slot;                                       /* Slot variable.         */
#       U32 wait;                                       /* TRUE if timer should be */
#                                                       /* set.                   */

#       if (PB_tx_state == TX_ACTIVE)                   /* If TX in progress...   */
#           return;                                     /* Don't try to transmit. */

        ld         _PB_tx_state(g12),g0

#       if (tx_total_count != 0)                        /* If more PDUs to tx...  */
Tx_next_idle:
        perf1      14,r3
        ld         _tx_total_count(g12),g1
        perf2      r3
        cmpobne.f  TX_IDLE,g0,Next_ret    # Branch if not TX_IDLE
        cmpobe.f   0,g1,Next_ret
#       {
#           wait = FALSE;                               /* Assume timer should not */
#                                                       /* be set.                */
#           slot = tx_slot;                             /* Last slot transmitted to.*/
        ld         _tx_slot(g12),g0       # g0 = slot
#           for (i = 0; i <= nSlots; i++)               /* Find slot with PDU to tx.*/
#                                                       /* (One extra iteration for*/
#           {                                           /* loop wraparound checking.)*/
        lda        TX_SLOT_INFO_SIZE,g6   # g6 = sizeof(TX_SLOT_INFO_TYPE)
        .ifndef    POLLED
        mov        0,g7                   # g7 = wait = FALSE
        .endif
        lda        _tx_slot_info(g12),r5  # r5 = tx_slot_info address
        mulo       g6,g0,g5               # g5 = tx_slot_info[slot] offset
        ld         _nSlots(g12),g2        # g2 = nSlots
        mov        0,r3                   # r3 = i
        .ifndef    POLLED
        ld         _sys_time(g12),r7      # r7 = current system ms. clock
        ld         _PB_tx_delay(g12),r9   # r9 = Not zero if timer already set
        .endif
        b          Next_loop Wrap_slot:
        mov        0,g0
        lda        0,g5
        b          Get_count .align     4

Inc_i:
        cmpinco    g2,r3,r3               # i++ after comparing.
        ble.f      Wrapped                # Branch if i is now > nSlots.
```

Aug 19 15:49 1994 pb_dsr.s Page 26

```
#           if (++slot >= nSlots )                /* Take care of slot      */
Next_loop:
            addo      1,g0,g0
            lda       (g5)[g6*1],g5
            cmpobge.f g0,g2,Wrap_slot
#               slot = 0;                         /* wraparound.            */
#           (See Wrap_slot, above.)
Get_count:
#           ld        (r5)[g5*1],r6          # r6 = tx_slot_info[slot].count
            ld        _PB_tx_counts(g12)[g0*4],r6 # r6 = data cache shadow value
                                                  # of tx_slot_info[slot].count
#           if (tx_slot_info[slot].count == 0)
#               continue;                         /* No PDUs for this slot. */
            .ifdef    POLLED
            cmpobe.t  0,r6,Inc_i             # Branch if .count == 0.
            b         Tx_now                 # .count != 0.
            .else
            cmpobg.t  1,r6,Inc_i             # Branch if .count == 0.
#           else if (tx_slot_info[slot].count == 1)
#           {                                     /* One buffer to tx.      */
            .ifdef    FLOW
            bne.f     Tx_flow                # Branch if .count > 1.
            .else
            bne.f     Tx_now                 # Branch if .count > 1.
            .endif
#               if ((sys_time - tx_slot_info[slot].init_time) >= TX_DELAY)
#               {                                 /* Buffer timed out.      */
#                   wait = FALSE;                 /* Don't set another timer.*/
#                   break;                        /* Transmit this buffer.  */
#               }
            ld        24(r5)[g5*1],r8        # .init_time
            subo      r8,r7,r8
            cmpoble.f TX_DELAY,r8,Tx_now
#           else
#           {                                     /* Not timed out yet.     */
#               wait = TRUE;                      /* Perhaps set a timer.   */
#               continue;
#           }
}
            mov       1,g7
            b         Inc_i
            .endif
Wrapped:                                     # Wrapped around.
                                             # (Don't alter tx_slot.)
            .ifdef    POLLED
            ret
            .else
            cmpobe.f  0,g7,Next_ret          # Should not wrap around unless
                                             # timer needs to be set!
#           else
#           {                                     /* >1 buffer to transmit. */
#               wait = FALSE;                     /* Transmit one of them.  */
#               break;
}
```

Aug 19 15:49 1994 pb_dsr.s Page 27

```
#       }
#       if (i != nSlots)                        /* If didn't wrap around...*/
#       {
#           if (wait)
#           {
#               if (PB_tx_delay == 0)           /* If timer not set...      */
#                   PB_tx_delay = TX_DELAY;     /* Timer value for clint().*/
#               return;                         /* Exit; don't transmit.    */
#           }
else
{
#               tx_slot = slot;
#               PB_tx();                        /* Send next in line.       */
#           }
}

        cmpo    0,r9
        mov     TX_DELAY,g0
        be.f    Set_timer               # Branch if timer is not already set.
        ret Set_timer:
        st      g0,_PB_tx_delay(g12)
        .endif
return;
Next_ret:
        perf1   9,r3
        perf2   r3
        ret .ifdef  FLOW
Transmission flow control if more than one buffer is destined for this slot.
# If this destination slot is the same as the one last transmitted to
#      and the number of buffers to transmit is less than or equal to a
#         threshold value
#      and the current time is the same as the last transmit time,
#    don't transmit.
Tx_flow:
        ld      _PB_tx_flow(g12),r4     # Threshold value.
        ld      _tx_slot,r8             # Last slot transmitted to.
        cmpobg.t r6,r4,Tx_now           # Branch if buffer count > threshold.
        cmpo    g0,r8                   # Check the slot.
        ld      _PB_last_tx_time,r8     # Time of last transmit.
        bne.f   Tx_now                  # Branch if this slot not the last.
        cmpo    r7,r8                   # Check the times.
        mov     1,g7                    # wait = TRUE in case same time.
        be.t    Inc_i                   # Branch if same time as last TX.
#       b       Tx_now
# End of transmission flow control.
        .endif Tx_now:
        st      g0,_tx_slot(g12)
        b       _PB_tx
# } /* PB_tx_next() */

```

Aug 19 15:49 1994 pb_dsr.s Page 28

```

# /*****************************************************************************
*
# * Function:     PB_tx
# *
# * Description:  Transmit the next queued buffer in the current slot
# *               (tx_slot).
# *
# * Called by:    PB_tx_dsr(), PB_tx_next()
# *
# * Parameters:   None, but uses tx_slot.
# *
* Returns:      Nothing.
*
# * Precautions:  Must be invoked with interrupts disabled!
# *
*****************************************************************************/

# static void PB_tx(void)
# {
        .sect    code3,text,align 4
.globl _PB_tx
_PB_tx:
# *** allocation of local variables ***
#       out_ptr_index = r10
#       in_ptr_index = r7
#       pBuff = r9
#       h = r4
#       U32 out_ptr_index;                  /* Buffer's output pointer index.*/
#       U32 in_ptr_index;                   /* Current unicast input index.  */
#       BUF_HEADER_TYPE *pBuff;             /* Address of buffer to tx.      */
#       U32 h;                              /* Redundant header index.       */

#       out_ptr_index = tx_slot_info[tx_slot].next_out_ptr_index; /* Index into */
        ld       _tx_slot(g12),r8
        lda      TX_SLOT_INFO_SIZE,g0     # sizeof(TX_SLOT_INFO_TYPE)
        mulo     g0,r8,r3
        lda      _tx_slot_info(g12)[r3*1],r11
#                                          r11 = address of tx_slot_info[tx_slot]
        ld       20(r11),r10              # r10 = out_ptr_index
#                                          /* output buffer information.    */
#       pBuff = tx_slot_info[tx_slot].buff_info[out_ptr_index].pBuffer;
        shlo     5,r10,r9                 # r9 = offset of buff_info[out_ptr_index]
        lda      28(r11)[r9*1],r12        # r12 = address of "
        ld       (r12),r13                # r13 = pBuff

#       tx_octets = tx_slot_info[tx_slot].buff_info[out_ptr_index].total_length;
        ld       20(r12),g4               # g4 = tx_octets = .total_length
        st       g4,_PB_tx_octets(g12)

#       for (h = 0; h < REDUNDANCY; h++)    /* Fill in length and no. of PDUs*/
#       {                                   /* in the redundant header(s).   */
#           pBuff->header[h].header_fields.length
#               = tx_octets - sizeof(BUF_HEADER_TYPE);
L54:
#           pBuff->header[h].header_fields.nPDUs
```

Aug 19 15:49 1994 pb_dsr.s Page 29

```
#              = tx_slot_info[tx_slot].buff_info[out_ptr_index].nPDUs;
        ld      12(r12),g2              # g2 = .nPDUs
        ld      _our_slot(g12),g3       # g3 = our_slot
        subo    BUF_HEADER_SIZE,g4,r4   # r4=tx_octets-sizeof(BUF_HEADER_TYPE)
        shlo    16,g2,g2
        shlo    24,g3,g3
        or      g2,r4,r4
        or      g3,r4,r4
        mov     r4,r5
        lda     (r4),r6                 # r4, r5, and r6 have header
        stt     r4,(r13)                # header[0], [1], [2] = header
#     }

# #if 0
#. /* Flush the TX FIFO before PDU transmission.  THIS IS A TEMPORARY FIX!!! */

#     PB_FIFO_ACCESS = CPU_FIFO_ACCESS;       /* Flush with a DMA write.      */
#     PB_FIFO_RESET = 0;                      /* Reset the FIFO.              */
#     FIFO_DATA = 0xAB;                       /* Write dummy data into FIFO.  */
#     PB_FIFO_RESET = 1;                      /* Unreset the FIFO.            */
# #endif

        mov     0,r3
        lda     1,r4
# /* Transmit ONLY using DMA (for now).                                       */

        .if     0                       # Mike H. says the following are
                                        # not needed.
#     PB_TX_DMA_RESET = 0;                    /* Reset PB's TX DMA controller. */
        lda     0x30000350,r5
        st      r3,(r5)
#     PB_TX_DMA_RESET = 1;                    /* (Must be toggled.)           */
        st      r4,(r5)
#     PB_FIFO_ACCESS = DMA_FIFO_ACCESS;       /* Transmit using DMA.          */
        lda     0x30000370,r5
        st      r4,(r5)
        .endif

#     DMA_setup(DMACW_TX, tx_DMA_channel, pBuff, tx_octets);/* Set up DMA.    */
        mov     r13,g5                  # pBuff
                                        # g4 already has tx_octets.
        lda     DMACW_TX,g0
        .if     0                       # ALWAYS USE CHANNEL 0!
        ld      _tx_DMA_channel(g12),g1
        sdma    g1,g0,g4
        .endif
        sdma    0,g0,g4                 # Configure the DMA channel.

#     DMAC_set_bit(tx_DMA_channel);           /* Enable the current DMA channel.*/
        .if     0
        setbit  g1,sf2,sf2              # The DMAC register is "sf2".
        .endif
        setbit  0,sf2,sf2               # ALWAYS USE CHANNEL 0!

#     PB_COMMAND = PB_GO                      /* Initiate packet transmission. */
#              | (tx_slot + 1)                /* Convert to be one-based.     */
```

B74

Aug 19 15:49 1994 pb_dsr.s Page 30

```
#               | (tx_DMA_channel == DMA_TX_BASE ? PB_TX_DMA_A : PB_TX_DMA_B);
        .if     0                       # ALWAYS USE PB_TX_DMA_A!
        cmpo    0,g1
        ldconst 0,r15                   # Assume PB_TX_DMA_A
        be.t    M154
        lda     32,r15
M154:
        .endif
        ldconst PB_COMMAND,g1           # g1 = 0x30000000 (PB_COMMAND)
#       lda     1+PB_GO(r8)[r15*1],g0   # g0 = tx_slot+1+PB_GO+PB_TX_DMA_A/B
        lda     1+PB_GO(r8),g0          # g0 = tx_slot + 1 + PB_GO
        ld      4(r12),g4               # (.fBCMC)
        perf1   15,r9
        perf2   r9
        st      g0,(g1)

#       last_tx_time = sys_time;                /* Remember the time.           */
        ld      _sys_time(g12),g2

#       PB_tx_state = TX_ACTIVE;                /*Transmission is now in progress.*/
        st      r4,_PB_tx_state(g12)    # TX_ACTIVE is 1.
        cmpo    0,g4                    # (.fBCMC)

        st      g2,_PB_last_tx_time(g12)

# #ifdef DEBUG
#       PB_stats[tx_slot].tx_frames++;          /* Update statistics.           */
# #endif

#       if ((tx_slot_info[tx_slot].buff_info[out_ptr_index].fBCMC == FALSE)
#          && (tx_slot_info[tx_slot].next_in_buff_index
#                  == tx_slot_info[tx_slot].next_out_buff_index)
#          && (tx_slot_info[tx_slot].buffers_in_use >= TX_BUFFERS_PER_SLOT))
        ldt     4(r11),r4               # r4 = .buffers_in_use;
                                        # r5 = .next_in_buff_index;
                                        # r6 = .next_out_buff_index
        bne.f   L58                     # Branch if .fBCMC is TRUE.
        cmpobne.t r5,r6,L58
        cmpo    TX_BUFFERS_PER_SLOT,r4  # Just in case. (Needed???)
#       {       /* Just started to transmit the current unicast input buffer.  */
#           in_ptr_index = tx_slot_info[tx_slot].next_in_ptr_index
        ld      16(r11),r9              # in_ptr_index = .next_in_ptr_index
        ble.f   L58                     # (Branch if in_buff_index wrapped.)
#           if (++in_ptr_index >= (TX_BUFFERS_PER_SLOT * 2))    /* Inc. index.  */
        cmpinco (TX_BUFFERS_PER_SLOT*2)-1,r9,r9
                                        # ++in_ptr_index after comparing.
        bg.t    L59
#               in_ptr_index = 0;               /* Take care of wraparound.     */
        mov     0,r9
L59:
#       tx_slot_info[tx_slot].next_in_ptr_index = in_ptr_index;

#       if (++tx_slot_info[tx_slot].next_in_buff_index >= TX_BUFFERS_PER_SLOT)
        ld      8(r11),r15
        st      r9,16(r11)
        cmpinco (TX_BUFFERS_PER_SLOT-1),r15,r15 # Compare before incrementing.
```

B75

Aug 19 15:49 1994 pb_dsr.s Page 31

```
        bg.t        L60
#           tx_slot_info[tx_slot].next_in_buff_index = 0; /* Wraparound.      */
        mov         0,r15
L60:
        st          r15,8(r11)

#       tx_slot_info[tx_slot].buff_info[in_ptr_index].total_length
#           = sizeof(BUF_HEADER_TYPE);        /* Initialize input buffer info. */
#       tx_slot_info[tx_slot].buff_info[in_ptr_index].nPDUs = 0;
        shlo        5,r9,r10                # offset of buff_info[in_ptr_index]
        ldconst     BUF_HEADER_SIZE,r4      # sizeof(BUF_HEADER_TYPE)
        lda         28(r11)[r10*1],r12      # addr. of buff_info[in_ptr_index]
        st          r4,20(r12)              # .total_length
        st          r3,12(r12)              # .nPDUs = 0
#   }

return;
# } /* PB_tx () */
L58:
        perf1       0,r3
        perf2       r3
        ret

# /**********************************************************************
*
# * Function:     PB_dq
# *
# * Description:  Dequeue a transmitted or discarded buffer.
# *
# * Called by:    PB_tx_dsr()
# *
* Parameters:   None.
*
* Returns:      Nothing.
*
# * Precautions:  Must be invoked with interrupts disabled!
# *               g7 must not be altered.
# *
**********************************************************************/

# static void PB_dq(void)
# {
        .sect       code1,text,align 4
.globl _PB_dq
_PB_dq:
# *** allocation of local variables ***
#       out_ptr_index = g6
#       bcmc_buff_index = g5
        lda         M174-.-8(ip),g14
        .leafproc   _PB_dq,PB_dq.lf
PB_dq.lf:
#   U32 out_ptr_index;                      /* PDU's output pointer index.    */
#   U32 bcmc_buff_index;                    /* BC/MC buffer index.            */

#   out_ptr_index = tx_slot_info[tx_slot].next_out_ptr_index; /* Index into */
```

Aug 19 15:49 1994 pb_dsr.s Page 32

```
            ld       _tx_slot(g12),g4
            lda      TX_SLOT_INFO_SIZE,g0
            mov      g4,r3                    # r3 = tx_slot
            mulo     g0,g4,g4
            lda      _tx_slot_info(g12)[g4*1],g3  # g3 = address of
#                                                       tx_slot_info[tx_slot]
            ld       20(g3),g6                # g6 = out_ptr_index
#                                             /* output buffer information.  */

#    if (tx_slot_info[tx_slot].buff_info[out_ptr_index].fBCMC == TRUE)
            shlo     5,g6,g1
            lda      28(g3)[g1*1],g1          # g1 = address of
#                                       tx_slot_info[tx_slot].buff_info[out_ptr_index]
            ld       4(g1),g2
            cmpo     0,g2
            lda      0,r4                     # (For resetting .nPDUs - see below.)
            be.t     L61                      # Branch if unicast.
            b        Bcmc
            .sect    code3,text,align 4
.globl Bcmc
Bcmc:       -
#    {                                        /* Broadcast/multicast PDU.   */
#        bcmc_buff_index = tx_slot_info[tx_slot].buff_info[out_ptr_index].iBCMC;
            ld       8(g1),g5
#        if (--bcmc_count[bcmc_buff_index] == 0)  /* One less BC/MC reference.*/
            ld       _bcmc_count(g12)[g5*4],g4
            cmpo     0,g4                     # Is it zero to begin with?
            subo     1,g4,g4
            be.f     L64                      # Don't decrement if already zero.
            st       g4,_bcmc_count(g12)[g5*4]
            cmpobne.t 0,g4,L64
#        {                                    /* Last reference to BC/MC PDU...*/
#            if (++tx_slot_info[our_slot].next_out_buff_index /* Delete BC/MC PDU.*/
#                >= TX_BUFFERS_PER_SLOT)      /* Take care of index wraparound.*/
            ld       _our_slot(g12),g4
            mulo     g0,g4,g4
            lda      _tx_slot_info(g12)[g4*1],g4  # g4 = address of
#                                                       tx_slot_info[our_slot]
            ld       12(g4),g2
            cmpinco  (TX_BUFFERS_PER_SLOT-1),g2,g2 # Compare before incrementing.
            bg.t     L63
#                tx_slot_info[our_slot].next_out_buff_index = 0;
            mov      0,g2
L63:
            ld       4(g4),g0                 # tx_slot_info[our_slot].buffers_in_use
            cmpobe.f 0,g0,L64                 # Don't decrement if already zero.
            st       g2,12(g4)
            subo     1,g0,g0
            st       g0,4(g4)
            b        L64

#            tx_slot_info[our_slot].buffers_in_use--; /* One less BC/MC PDU.    */
#        }
}
#    else                                     /* Unicast buffer.            */
#    {
```

Aug 19 15:49 1994 pb_dsr.s Page 33

```
#       if (++tx_slot_info[tx_slot].next_out_buff_index >= TX_BUFFERS_PER_SLOT)
        .sect      code1,text,align 4
.globl L61
L61:
        ld         12(g3),r5              # .next_out_buff_index
        ld         4(g3),r6               # .buffers_in_use
        cmpinco    (TX_BUFFERS_PER_SLOT-1),r5,r5 # Compare before incrementing.
        bg.t       L65
#           tx_slot_info[tx_slot].next_out_buff_index = 0;  /* Wraparound.    */
        mov        0,r5
L65:
        cmpobe.f   0,r6,L64               # Branch if .buffers_in_use already 0.
        st         r5,12(g3)
        subo       1,r6,r6
        st         r6,4(g3)

#       tx_slot_info[tx_slot].buffers_in_use--; /* Buffer is now free.        */
#     }

#     tx_slot_info[tx_slot].count--;           /* One less buffer to transmit to*/
L64:
#                                              /* this slot.                   */

#     tx_slot_info[tx_slot].buff_info[out_ptr_index].nPDUs = 0;
#     tx_slot_info[tx_slot].buff_info[out_ptr_index].total_length = BUF_HEADER_SIZE;
        mov        BUF_HEADER_SIZE,r5
#     if (++out_ptr_index >= (TX_BUFFERS_PER_SLOT * 2)) /* Inc. output index. */
#       ld         (g3),g0                # g0 = .count
        ld         _PB_tx_counts(g12)[r3*4],g0 # Cached shadow .count
        cmpobe.f   0,g0,M174              # Branch if .count already zero.
        cmpinco    (TX_BUFFERS_PER_SLOT*2)-1,g6,g6 # Compare before incrementing.
        st         r4,12(g1)              # .nPDUs = 0
        subo       1,g0,g0
        st         r5,20(g1)              # .total_length
        bg.t       L661
#       out_ptr_index = 0;                     /* Take care of wraparound.    */
        mov        0,g6
L661:
#     tx_slot_info[tx_slot].next_out_ptr_index = out_ptr_index; /* New index. */

#     tx_total_count--;                        /* One less buffer to transmit. */
        ld         _tx_total_count(g12),g1
        cmpobe.f   0,g1,M174              # Branch if tx_total_count already 0.
        st         g6,20(g3)
        subo       1,g1,g1
        st         g0,(g3)                # (.count)
        st         g0,_PB_tx_counts(g12)[r3*4] # (.count's shadow in cache.)
        st         g1,_tx_total_count(g12)

#     return;
# } /* PB_dq () */
        bx         (g14)
M174:
        ret

```

B78

Aug 19 15:49 1994 pb_dsr.s Page 34

```
# /********************************************************************
# *
# * Function:     PB_tx_isr
# *
# * Description:  P-Bus transmit interrupt service routine.
# *
# * Called by:    OS on completion of a P-Bus transmission.
# *
* Parameters:
# *               intf    Transmit "interface number".
# *
* Returns:      Nothing.
*
# * Note:         Don't declare this entry as an "interrupt" type, because it
# *               is called from int_handler() which saves all global
# *               registers.
# *
# ********************************************************************/

# void PB_tx_isr(U32 intf)
# {
        .globl    _PB_tx_isr
        .align    4
_PB_tx_isr:
# *** allocation of local variables ***
#       intf = g0
# #ifdef DEBUG
#    if (PB_driver_state == UNINITIALIZED)  /* If entered before initiali- */
#       return;                              /* zation has completed.       */
# #endif

#    if (PB_tx_state == TX_IDLE)             /* If spurious TX interrupt    */
#    {                                       /* or reset from console...    */
#       PB_stats[our_slot].tx_bad_ints[tx_DMA_channel]++; /* Update stats.  */
#       return;                              /* Don't process interrupt.    */
#    }
        perfl     1,g0
        ld        _PB_tx_state(g12),g1
        perf2     g0

#    switch (PB_TX_STATUS & TX_STATUS_MASK)   /* Check P-Bus transmit status.*/
        lda       0x30000400,g0
        cmpo      TX_IDLE,g1
        ld        (g0),g0
        be.f      Bad_int                    # Branch if TX_IDLE
        and       15,g0,g0
        cmpobl.f  8,g0,M191
        ld        M196[g0*4],g1
        mov       TX_DONE,g2                 # TX_DONE (For case TX_OK.)
        bx        (g1)
        .sect     vars,data,align 4
M196:
        .word     M186                       # TX_OK
        .word     M187                       # TX_DISC
        .word     M188                       # TX_EMPTY
        .word     M191                       # Invalid.
```

Aug 19 15:49 1994  pb_dsr.s Page 35

```
                .word     M189                    # TX_DAVNAK
                .word     M191                    # Invalid.
                .word     M191                    # Invalid.
                .word     M191                    # Invalid.
                .word     M190                    # TX_CHNNAK .sect     code3,text,align 4
.globl Bad_int
Bad_int:
                ld        _our_slot(g12),g1
                lda       PB_STATS_SIZE,g0        # sizeof(PB_STATS_TYPE)
                mulo      g1,g0,g0
                lda       _PB_stats+112(g12)[g0*1],g1 # .tx_bad_ints
                ld        (g1),r3
                addo      1,r3,r3                 # .tx_bad_ints++
                st        r3,(g1)
                ret                               # Return from interrupt.

#       {
#               case TX_OK:                       /* Tx done with no error.    */
#                       PB_tx_state = TX_DONE;    /* Remember that fact.       */
                .sect     code1,text,align 4
.globl M186
M186:
                mov       g2,g0
                st        g2,_PB_tx_state(g12)
                b         Tx_dsr_switch
#                       break;

#               case TX_DISC:                     /* Disconnect during data xfer*/
#                                                 /* (tx too slow; rx timed out).*/
#                       PB_tx_state = TX_ERROR;   /* Remember error.           */
                .sect     code3,text,align 4
.globl M187
M187:
                mov       0,g5
# #ifdef DEBUG
#               PB_stats[tx_slot].tx_disc_errs[tx_DMA_channel]++; /* Update stats.*/
# #endif
#                       PB_FIFO_RESET = 0;        /* Reset the FIFO by         */
#                       PB_FIFO_RESET = 1;        /* toggling this bit.        */
                ld        _tx_slot(g12),g1
                mov       1,g7
                .ifdef    DEBUG
                lda       PB_STATS_SIZE,g0        # sizeof(PB_STATS_TYPE)
                .endif
                mov       TX_ERROR,g3
                .ifdef    DEBUG
                mulo      g0,g1,g0
                .endif
                st        g3,_PB_tx_state(g12)
                lda       0x30000340,g4
                st        g5,(g4)
                st        g7,(g4)
                .ifdef    DEBUG
                lda       _PB_stats+56(g12)[g0*1],g1 # .tx_disc_errs
```

Aug 19 15:49 1994 pb_dsr.s Page 36

```
                ld          (g1),r4
                .endif
#                   PB_TX_DMA_RESET = 0;            /* Reset TX DMA controller by */
                lda         0x30000350,r3
                st          g5,(r3)
#                   PB_TX_DMA_RESET = 1;            /* toggling this bit.         */
                .ifdef      DEBUG
                addo        1,r4,r4                 # .tx_disc_errs++
                .endif
                st          g7,(r3)
                .ifdef      DEBUG
                st          r4,(g1)
                .endif
                b           _PB_tx_dsr
#           break;

#           case TX_EMPTY:                          /* Empty desination slot.     */
#               PB_tx_state = TX_EMPTY_SLOT;        /* Remember error.            */
M188:
                mov         TX_EMPTY_SLOT,r7
                st          r7,_PB_tx_state(g12)
                b           _PB_tx_dsr
#           break;                                  /* (DMA has not started.)     */

#           case TX_DAVNAK:                         /* Maximum NAKs during tx.    */
#                                                   /* (Receiver too slow.)       */
#               PB_tx_state = TX_ERROR;             /* Remember error.            */
M189:
                mov         0,r10
# #ifdef DEBUG
#               PB_stats[tx_slot].tx_datanak_errs[tx_DMA_channel]++;/*Update stats.*/
# #endif
#                   PB_FIFO_RESET = 0;              /* Reset the FIFO by          */
#                   PB_FIFO_RESET = 1;              /* toggling this bit.         */
                lda         1,r12
                mov         TX_ERROR,r8
                ld          _tx_slot(g12),g1
                .ifdef      DEBUG
                lda         PB_STATS_SIZE,g0        # sizeof(PB_STATS_TYPE)
                .endif
                st          r8,_PB_tx_state(g12)
                lda         0x30000340,r9
                .ifdef      DEBUG
                mulo        g0,g1,g0
                .endif
                st          r10,(r9)
                st          r12,(r9)
#                   PB_TX_DMA_RESET = 0;            /* Reset TX DMA controller by */
                lda         0x30000350,r13
                st          r10,(r13)
                .ifdef      DEBUG
                lda         _PB_stats+72(g12)[g0*1],g1 # .tx_datanak_errs
                ld          (g1),r3
                .endif
#                   PB_TX_DMA_RESET = 1;            /* toggling this bit.         */
                st          r12,(r13)
```

Aug 19 15:49 1994 pb_dsr.s Page 37

```
#          PB_ERROR_RST = 1;                       /* Reset error condition.    */
        lda     0x30000200,g2
        .ifdef  DEBUG
        addo    1,r3,r3                 # .tx_datanak_errs++
        .endif
        st      r12,(g2)
        .ifdef  DEBUG
        st      r3,(g1)
        .endif
        b       _PB_tx_dsr
#       break;

#       case TX_CHNNAK:                             /* Maximum NAKs during tx setup.*/
#                                                   /* (Receiver busy.)          */
#          PB_tx_state = TX_ERROR;                  /* Remember error.           */
# #ifdef DEBUG
#          PB_stats[tx_slot].tx_channak_errs[tx_DMA_channel]++;/*Update stats.*/
# #endif
M190:
        ld      _tx_slot(g12),g1
        .ifdef  DEBUG
        lda     PB_STATS_SIZE,g0        # sizeof(PB_STATS_TYPE)
        mulo    g1,g0,g1
        .endif
        mov     TX_ERROR,g3
        ld      _our_slot(g12),g2
        st      g3,_PB_tx_state(g12)
        .ifdef  DEBUG
        lda     _PB_stats+80(g12)[g1*1],g0 # .tx_channak_errs
        ld      (g0),r3
        addo    1,r3,r3                 # .tx_channak_errs++
        st      r3,(g0)
        .endif
#       /* Because a TX attempt disables RX, two IRPs simultaneously  */
#       /* attempting to TX to each other will get channel NAKs.      */
#       /* Assuming no other pending TX to other slot(s), TX retries will */
#       /* also be synchronous and fail, resulting in TX discards.    */
#       /* The following will delay retransmission for the IRP in the */
#       /* higher-numbered slot.                                      */
#       {
#          U32 cnt;                                 /* Delay loop counter.       */
# #define BACKOFF 2                                 /* This seems to work.       */

#          if (our_slot > tx_slot)
#             for (cnt = 0; cnt < BACKOFF; cnt++)
#                ;                                  /* NULL STATEMENT.           */
#       }
        cmpobl  g2,g1,_PB_tx_dsr ldconst BACKOFF,r3
Backoff:
        cmpdeco 0,r3,r3                 # (Compare before decrementing.)
        bne.t   Backoff
#       break;                                      /* (DMA has not started.)    */

        b       _PB_tx_dsr
```

B82

Aug 19 15:49 1994 pb_dsr.s Page 38

```
#       default:                                /* Unknown error.           */
#                                               /* (Should never get here.) */
#           PB_tx_state = TX_ERROR;             /* Remember error.          */
M191:
        mov     TX_ERROR,g4
        st      g4,_PB_tx_state(g12)
        callj   _PB_reinitialize_hw
# #ifdef DEBUG
#           PB_stats[tx_slot].tx_unknown_errs[tx_DMA_channel]++;/*Update stats.*/
# #endif
#           PB_reinitialize_hw();               /* Reset TX and RX hardware. */
#           break;
}

# #ifdef DEBUG
#       PB_stats[tx_slot].tx_intrpts++;         /* Common stats.            */
# #endif

# /* !!!!! HARDWARE BUG!!!  ALWAYS USE CHANNEL 0!!!!!!!!!!!!!!!!!!!!!!!!!!!!!*/
# #if 0
#       tx_DMA_channel ^= DMA_TX_TOGGLE;        /* Switch tx DMA channels.  */
# #endif

#       PB_tx_dsr();                            /* Call the transmit DSR.   */
L67:
        b       _PB_tx_dsr
#       return;
# } /* PB_tx_isr() */

# /****************************************************************************
*
# * Functions:    PB_rx_isr_A and PB_rx_isr_B
# *
# * Description:  P-Bus (DMA) receive interrupt service routines.
# *
# * Called by:    OS on completion of a P-Bus reception.
# *
* Parameters:
# *               intf    DMA channel "interface number".
# *
* Returns:      Nothing.
*
# * Notes:        Don't declare these entry as an "interrupt" type, because
# *               they are called from int_handler() which saves all global
# *               registers.
# *
# *               Two receive interrupt routines are used to ensure that the
# *               DMA channel causing an interrupt is properly determined.
# *               If both receive interrupts are pending before one isr is
# *               invoked, determining the channel from the PB_RX_DMA_SEL bit
# *               in the PB_STATUS register might not be "safe."
# *
****************************************************************************/

# void PB_rx_isr_A(U32 intf)
```

Aug 19 15:49 1994  pb_dsr.s Page 39

```
# {
        .globl    _PB_rx_isr_A
        .align    4
_PB_rx_isr_A:
# *** allocation of local variables ***
#       intf = g0
# #ifdef DEBUG
#     if (PB_driver_state == UNINITIALIZED)   /* If entered before initiali-  */
#         return;                             /* zation has completed.        */
# #endif

#     rx_DMA_channel = DMA_RX_BASE;           /* The DMA channel causing the  */
        perf1     12,r3
        mov       DMA_RX_BASE,g0
        perf2     r3
        st        g0,_rx_DMA_channel(g12)
        .ifdef    RX_LOOP
        st        g0,check_IPND(g12)
        .endif
        b         _PB_rx_isr
#                                             /* interrupt.                   */
#     PB_rx_isr();                            /* Process the interrupt.       */
#     return;
}

# void PB_rx_isr_B(U32 intf)
# {
        .globl    _PB_rx_isr_B
        .align    4
_PB_rx_isr_B:
# *** allocation of local variables ***
#       intf = g0
# #ifdef DEBUG
#     if (PB_driver_state == UNINITIALIZED)   /* If entered before initiali-  */
#         return;                             /* zation has completed.        */
# #endif

# /*
#  * Interface B (DMA channel 3) has higher interrupt priority than interface A
#  * (DMA channel 2).  P-Bus hardware toggles between using channels 2 and 3.
#  * To ensure processing P-Bus frames in the proper order, check for an
#  * interrupt pending on channel 2 if two sequential channel 3 interrupts are
#  * taken, and, if so, process channel 2 data before channel 3 data.
#  */

#     if ((rx_DMA_channel == DMA_RX_BASE + 1) /* If last was channel 3, too...*/
#         && (asm(" mov sf0, g0")             /* (The IPND register is sf0.)  */
#            & (1 << IPND_DMA_A_BITPOS)))     /* and channel 2 int. pending...*/
        perf1     12,r3
        perf2     r3
        .ifndef   POLLED
        ld        _rx_DMA_channel(g12),g0
        cmpobne.t DMA_RX_BASE+1,g0,L68
        bbc.f     8+DMA_RX_BASE,sf0,L68
#     {                                       /* Clear channel 2 pending int. */
```

Aug 19 15:49 1994 pb_dsr.s Page 40

```
#       U32 bitpos = IPND_DMA_A_BITPOS;
#-
#       asm(" clrbit `bitpos', sf0, sf0");
        clrbit    8+DMA_RX_BASE,sf0,sf0
#       rx_DMA_channel = DMA_RX_BASE;       /* Process channel 2 data first. */
        mov       DMA_RX_BASE,g0
        .ifdef    RX_LOOP
        mov       0,g1
        .endif
        st        g0,_rx_DMA_channel(g12)
        .ifdef    RX_LOOP
        st        g1,check_IPND(g12)     # Don't check IPND reg. at Chk_IPND
        .endif
        callj     _PB_rx_isr
#       PB_rx_isr();
#   }                                       /* Now process channel 3 data.  */

#       rx_DMA_channel = DMA_RX_BASE + 1;   /* The DMA channel causing the  */
L68:
        .endif
        mov       DMA_RX_BASE+1,g0
        st        g0,_rx_DMA_channel(g12)
        .ifdef    RX_LOOP
        st        g0,check_IPND(g12)
        .endif
#                                           /* interrupt.                   */
#       PB_rx_isr();                        /* Process the interrupt.       */
#       return;
}
# _PB_rx_isr_B

# /* Common receive interrupt service routine processing.                   */

# void PB_rx_isr(void)
# {
_PB_rx_isr:
# !T!!T!!!!!!!!!!!!!!!!!!!!!!!!!!!!!!!!!!!!!!!!!!!!!!!!!!!!!!!!!!!!!!!!!!!!!
        ld        _PB_just_reset(g12),r3
        cmpobe.t  0,r3,JR_done
        mov       g0,r3
        movl      0,g2
        lda       CMAN,g0
        mov       2,g1                    # Assuming intfrestart == 2!!!
        st        g2,_PB_just_reset(g12)
        ldconst   PBUS,g4
        callj     _send_command
        mov       r3,g0
JR_done:
# !!!!!!!!!!!!!!!!!!!!!!!!!!!!!!!!!!!!!!!!!!!!!!!!!!!!!!!!!!!!!!!!!!!!!!!!!!
# *** allocation of local variables ***
#       rx_ok = r7
#       rx_status = r3
#       rx_length = g0
#       rx_DMA_index = r3
#       pHeader = r6
```

Aug 19 15:49 1994  pb_dsr.s Page 41

```
#        pPDUh = r3
#        pPDU = r3
#        h = r4
#        src_slot = g0
#        data_length = g0
#        adr_flag = r6
#        tpptr = r7
#        nPDUs = r8
#        PDU_id = g0
#        PDU_length = r5
#        PB_if structure is on the stack
#    U32 rx_ok = FALSE;                    /* Assume an error will be found.*/
#    U32 rx_status;                        /* Current channel's RX status.   */
#    U32 rx_length;                        /* Current channel's RX byte count.*/
#    U32 rx_DMA_index;                     /* Relative DMA channel number.   */
#    BUF_HEADER_TYPE *pHeader;             /* Pointer to first buffer header.*/
#    PDU_HEADER_TYPE *pPDUh;               /* Points to a PDU header.        */
#    commonheader_TYPE *pPDU;              /* Points to a PDU.               */
#    U32 head[REDUNDANCY];                 /* Redundant header fields.       */
#    U32 h;                                /* Header index variable.         */
#    U32 src_slot;                         /* 1st header's source slot field.*/
#    U32 data_length;                      /* Size of buffer's data (exclud-*/
#                                          /* ing buffer header) in bytes.  */
#    U32 adr_flag;                         /* Returned from chkmc().         */
#    process_table *tpptr;                 /* For saving cpptr.              */
#    U32 nPDUs;                            /* Number of PDUs in the buffer.  */
#    U32 PDU_id;                           /* PDU's protocol ID.             */
#    U32 PDU_length;                       /* PDU's length (in bytes).       */
#    idTYPE *msg_id;                       /* For sending PDUs to CMAN & PCP.*/
#    PBUS_INTF PB_if;                      /* Parameters for CMAN and PCP.   */
#    event *evnt;                          /* Event for sending "wake" data  */
#                                          /* to Frame Relay.                */

#    /* Read information from current channel's hardware registers before   */
#    /* setting up DMA for the channel again.  DMA_setup() resets the       */
#    /* registers, but it should be done as soon as possible after the RX   */
#    /* interrupt.                                                          */

# #ifdef LEN_CHECK
#    rx_length = DMA_byte_count(rx_DMA_channel); /* Only needed if length.  */
#                                                /* comparison is done later. */
# #endif

#    rx_DMA_index = rx_DMA_channel - DMA_RX_BASE; /* Zero-based index.      */
         mov      g0,r8              # r8 = rx_DMA_channel
         lda      RX_BUFFER_SIZE,g0  # g0 = size of each receive buffer
         subo     DMA_RX_BASE,r8,r3  # r3 = rx_DMA_index

#    pHeader = (BUF_HEADER_TYPE *)&rx_buffers[rx_DMA_index]
#                                    [rx_buffer_index[rx_DMA_index]]
#                                    [SRC_RTE_SPACE];

#    /* Set up DMA for the same channel and the other RX buffer for that    */
#    /* channel.  The following statement assumes two buffers per channel.  */

#    rx_buffer_index[rx_DMA_index] ^= 1;   /* Next RX buffer index.         */
```

B 86

Aug 19 15:49 1994 pb_dsr.s Page 42

```

#       DMA_setup(DMACW_RX, rx_DMA_channel,     /* Set up DMA for same channel.  */
#                 &rx_buffers[rx_DMA_index]
#                            [rx_buffer_index[rx_DMA_index]] /* Other buffer.    */
#                            [SRC_RTE_SPACE],
#                 RX_SIZE);
            cmpo    DMA_RX_BASE,r8          # Check rx_DMA_channel.
            mov     0,g2                    # Assume RX channel 2 (DMA_RX_BASE).
            ld      _rx_buffer_index(g12)[r3*4],r4
#                                             r4 = rx_buffer_index[rx_DMA_index]
            be      Buff_index              # Branch if assumption was correct.
            addo    g0,g0,g2                # g2 = rx_buffers[rx_DMA_index] offset.
Buff_index:
            lda     _rx_buffers(g12),r5     # r5 = address of rx_buffers
            cmpo    0,r4                    # Check rx_buffer_index[rx_DMA_index]
            mov     0,g4                    # Assume its offset (g4) is zero.
            lda     (g0),r7                 # Assume next RX buffer index is one.
            be      Buff_addr               # Branch if correct assumption.
            mov     g0,g4                   # g4 = rx_buffer_index[..] offset = 1.
            lda     0,r7                    # r7 = next RX buffer offset.
Buff_addr:
            addo    g2,r5,r5                # r5 = rx_buffers[..] address
            xor     1,r4,r4                 # Next RX buffer index.
            lda     SRC_RTE_SPACE(r5)[g4*1],r6 # r6 = pHeader
            mov     r7,g4                   # Next rx_buffer_index[..] offset.
            st      r4,_rx_buffer_index(g12)[r3*4] # Next RX buffer index.
            ldconst DMACW_RX,r9             # r9 = DMACW_RX
            ldconst TX_BUFFER_SIZE,r12      # r12 (quad-word sized) = max. RX size
            lda     SRC_RTE_SPACE(r5)[g4*1],r13 # r13 = data address
            sdma    r8,r9,r12               # Set up DMA for same channel.

#       /* Is the following line necessary??? (Majid will find out from Intel.) */
#       DMAC_set_bit(rx_DMA_channel);       /* Enable the same DMA channel.    */
            setbit  r8, sf2, sf2            # The DMAC register is "sf2".

#       /* Reading PB_RX_STATUS_x reenables P-Bus reception.                    */

#       rx_status = ((rx_DMA_channel == DMA_RX_BASE) ?
#                     PB_RX_STATUS_A : PB_RX_STATUS_B) & RX_STATUS_MASK;
            cmpobne DMA_RX_BASE,r8,M228     # DMA_RX_BASE == 2
            lda     0x30000300,r3           # PB_RX_STATUS_A address
            b       M229
M228:
            lda     0x30000600,r3           # PB_RX_STATUS_B address
M229:
            ld      (r3),r3
            ldt     (r6),g0                 # g0,g1,g2 = header[0],[1],[2]
            and     3,r3,r3                 # RX_STATUS_MASK

#       switch (rx_status)                  /* Check P-Bus receive status.     */
            cmpobne.f RX_OK,r3,L83
#       {
#           case RX_OK:                     /* Rx done with no error.          */
#               /* Vote on the headers.
#               src_slot = pHeader->header[0].header_fields.source_slot;

```

Aug 19 15:49 1994 pb_dsr.s Page 43

```
#              for (h = 0; h < REDUNDANCY; h++) /* Get all replicated headers.  */
#                head[h] = pHeader->header[h].header_word;

#              if ((head[0] == head[1]) && (head[0] == head[2])
#                  && (head[1] == head[2]))   /* If all agree...                */
        cmpobne.f  g0,g1,L74
        cmpobne.f  g0,g2,L74
        cmpobe.t   g1,g2,L82
#              h = 0;                          /* Use the first one.            */
#              else if ((PB_REDUND & DPS_MASK) != DPS_ABC)
L74:
        ld         _our_slot(g12),r7
        lda        0x30000180,g3        # PB_REDUND
        .ifdef     DEBUG
        lda        PB_STATS_SIZE,r8     # sizeof(PB_STATS_TYPE)
        .endif
        ld         (g3),g3
        .ifdef     DEBUG
        mulo       r8,r7,r8
        .endif
        and        3,g3,g3              # DPS_MASK
        .ifdef     DEBUG
        ld         _PB_stats+136(g12)[r8*1],r7 # rx_data_errs
        .endif
        cmpo       0,g3                 # DPS_ABC : 0
        .ifdef     DEBUG
        addo       1,r7,r7
        st         r7,_PB_stats+136(g12)[r8*1]
        .endif
        be         L76                  # DPS_ABC == 0
#              {   /* There is disagreement and only two data buses are working. */
#                  /* All headers must be the same with the reduced bus width.   */
# #ifdef DEBUG
#                PB_stats[our_slot].rx_intrpts++;  /* Use our slot number.       */
#                PB_stats[our_slot].rx_discards++; /* Discard this rx buffer.    */
# #if 0
rx_total_discards++;
# #endif
# #endif
#                intfstats[PB_INTERFACE]->ifInDiscards++; /* OS Statistics.      */
        ld         _intfstats+(PB_INTERFACE*4)(g12),g4
        ld         ifInDiscards(g4),g3
        addo       1,g3,g3
        st         g3,ifInDiscards(g4)
        b          Chk_IPND
#                break;                         /* EXIT SWITCH.                  */
#              }
else
#              {   /* There is disagreement and all three data buses are working. */
#                  h = REDUNDANCY;              /* Assume none agree.            */
L76:
        mov        REDUNDANCY,r4        # r4 = h
#              if ((head[0] == head[1]) || (head[0] == head[2]))
        cmpobe     g0,g1,M222
        cmpobne    g0,g2,L78
#                  h = 0;                       /* [0] agrees with [1] or [2].   */
```

Aug 19 15:49 1994 pb_dsr.s Page 44

```
M222:
        mov        0,r4
        b          L79
#                  else if (head[1] == head[2])    /* If these agree...        */
L78:
        cmpobne    g1,g2,L79
#                  {
#                          h = 1;                  /* Use this one.            */
        mov        1,r4
#                          /* Set header[0] to the agreed value.                */
#                          pHeader->header[0].header_word = head[h];
        mov        g1,g0
#                  }
#                  if (h < REDUNDANCY)             /* If two agree...          */
L79:
#·                 {
#                          src_slot = pHeader->header[0].header_fields.source_slot;
# #ifdef DEBUG
#                          PB_stats[src_slot].rx_data_errs[rx_DMA_index]++; /*Remember.*/
# #endif
}
# #ifdef DEBUG
#                  else                            /* None agree.              */
#                          PB_stats[our_slot].rx_data_errs[rx_DMA_index]++; /*Remember.*/
# #endif
}
#                  if (h >= REDUNDANCY)            /* If none agree...         */
L75:
        cmpobg     REDUNDANCY,r4,L82
#                  {
# #ifdef DEBUG
#                          PB_stats[our_slot].rx_intrpts++; /* Use our slot number.     */
#                          PB_stats[our_slot].rx_discards++; /* Discard this rx buffer. */
# #if 0
rx_total_discards++;
# #endif
# #endif
intfstats[PB_INTERFACE]->ifInDiscards++; /* OS Statistics.    */
        ld         _intfstats+(PB_INTERFACE*4)(g12),r13
        ld         ifInDiscards(r13),r14
        addo       1,r14,r14
        st         r14,ifInDiscards(r13)
#                          break;                  /* EXIT SWITCH.             */
        b          Chk_IPND
#                  }
# #ifdef DEBUG
#                  else                            /* At least two agree...    */
#                          PB_stats[src_slot].rx_intrpts++; /* Tally the interrupt here. */
# #endif
#                  /* End of redundancy processing.                            */

# #ifdef LEN_CHECK
#                  /* Check if the number of received bytes as reported by the DMA  */
#                  /* controller is the same as the length field in the received    */
#                  /* (and voted) P-Bus header plus the header length.              */
#                  /* (DMA always transfers 16 bytes at a time, so compare with that */
```

Aug 19 15:49 1994  pb_dsr.s Page 45

```
#              /* granularity.)                                          */
#              /* DMA_byte_count() for the receive channel must be called before */
#-             /* setting up DMA for it at the beginning of this isr.    */

#              data_length = pHeader->header[0].header_fields.length;
#              if ((((data_length + sizeof(BUF_HEADER_TYPE)
#                                                        + 15) / 16) /* Round up.*/
#                  != ((TX_BUFFER_SIZE - rx_length - 16) / 16)) /* Why -16???   */
#              {                                           /* RX lengths don't agree. */
#                  PB_stats[src_slot].rx_length_errs[rx_DMA_index]++;
# #ifdef LEN_ERRS
#                  PB_stats[src_slot].rx_discards++; /* Discard this received PDU.*/
# #if 0
rx_total_discards++;
# #endif
intfstats[PB_INTERFACE]->ifInDiscards++; /* OS Statistics.    */
#                  break;                                   /* EXIT SWITCH.      */
# #endif
}
# #else
#              data_length = pHeader->header[0].header_fields.length;
# #endif

#              /* PDU received without error.                             */
#              rx_ok = TRUE;
# #ifdef DEBUG
#              PB_stats[src_slot].rx_frames++;    /* Update statistics.   */
# #endif
#              break;

# #ifdef DEBUG
#          /* Use our_slot if PDU header's source_slot can't be trusted.  */

#          case RX_NOPOV:                           /* Maximum NOPs received.   */
#              PB_stats[our_slot].rx_nop_errs[rx_DMA_index]++;
#              break;
#          case RX_WDTOV:                           /* Watchdog timer expired.  */
#              PB_stats[our_slot].rx_wdt_errs[rx_DMA_index]++;
#              break;
#          default:                                 /* Unknown reception error. */
#              PB_stats[our_slot].rx_unknown_errs[rx_DMA_index]++;
#              break;
# #endif
}

L83:
        ld         _our_slot(g12),g0
        .ifdef     DEBUG
        lda        PB_STATS_SIZE,g1      # sizeof(PB_STATS_TYPE)
        .endif
        cmpo       1,r3
        .ifdef     DEBUG
        mulo       g0,g1,g0
        .endif
        bne        Chk_wdt
        .ifdef     DEBUG
```

Aug 19 15:49 1994  pb_dsr.s Page 46

```
                lda         _PB_stats+120(g12)[g0*1],g1  # .rx_nop_errs
                ld          (g1),r3
                addo        1,r3,r3
                st          r3,(g1)
                .endif
                b           Chk_IPND
Chk_wdt:
                cmpobne     2,r3,Unk_err
                .ifdef      DEBUG
                lda         _PB_stats+128(g12)[g0*1],g1  # .rx_wdt_errs
                ld          (g1),r3
                addo        1,r3,r3
                st          r3,(g1)
                .endif
                b           Chk_IPND
Unk_err:
                .ifdef      DEBUG
                lda         _PB_stats+152(g12)[g0*1],g1  # .rx_unknown_errs
                ld          (g1),r3
                addo        1,r3,r3
                st          r3,(g1)
                .endif
                b           Chk_IPND
# #ifdef DEBUG
#      if (rx_status != RX_OK)                       /* If rx error...              */
#      {
#          PB_stats[our_slot].rx_intrpts++;          /* Common stats.               */
#          PB_stats[our_slot].rx_discards++;         /* Discard this received PDU.  */
# #if 0
rx_total_discards++;
# #endif
}
# #endif

#      if (rx_ok)                                    /* If no error...              */
#      {
# #ifdef DEBUG
#          last_rx_time = sys_time;                  /* Remember time of good RX.   */
#                                                    /* (This should not be needed!!!)*/
# #endif

#          pPDUh = (PDU_HEADER_TYPE *)((U8 *)pHeader + sizeof(BUF_HEADER_TYPE));
L82:
                addo        BUF_HEADER_SIZE,r6,r3  # r3 = pPDUh
#                                                    /* Pointer to first PDU's      */
#                                                    /* header.                     */

#          /* (The following line is necessary because the buffer header might */
#          /*  be overwritten by source routing processing.)                    */
#          nPDUs = pHeader->header[0].header_fields.nPDUs;  /* Number of PDUs.  */
                ldconst     0xFF,r10
                shro        16,g0,r8
                shro        24,g0,r6           # r6 = src_slot (zero_based)
                and         r10,r8,r8          # r8 = nPDUs
                lda         1(r6),r6           # r6 = src_slot (one-based)

```

Aug 19 15:49 1994  pb_dsr.s Page 47

```
# #ifdef DEBUG
#       if (nPDUs > PB_stats[src_slot].rx_max_PDUs)
#           PB_stats[src_slot].rx_max_PDUs = nPDUs;
# #endif

# #ifdef DEBUG2
#       if (nPDUs > 2)
#           asm(" fmark");
# #endif

#       tpptr = cpptr;                          /* Save process table pointer.*/
#       cpptr = drv_pptr[PB_INTERFACE];         /* Change it to ours.         */
        ld      _drv_pptr+(PB_INTERFACE*4)(g12),r9 # r9 = our process table pointe
        ld      _cpptr(g12),r7          # r7 = current process table pointer
        st      r9,_cpptr(g12)

#       for (h = 0; h < nPDUs; h++)
        ldconst 0xFFFF,r14                      # r14 = protocol mask
        subo    4,0,r13                         # r13 = ~3
        mov     1,r4                            # r4 = h+1 (+1 for cmpinco, below)
#       {
#           PDU_id = pPDUh->protocol;           /* PDU's protocol ID.         */
#           PDU_length = pPDUh->length;         /* PDU's length.              */
L84:
        ld      (r3),r9                 # Length and protocol ID.
        ldconst CMAN,g0                 # CMAN's pid.
        ldconst PCP,g1                  # PCP's pid.
        shro    16,r9,r5                # r5 = PDU_length = pPDUh->length
        and     r14,r9,r9               # r9 = PDU_id = pPDUh->protocol
#           pPDU = (commonheader_TYPE *)((U8 *)pPDUh + sizeof(PDU_HEADER_TYPE));
        addo    8,r3,r15                # r15 = pPDU

#           if ((PDU_id == CMAN) || (PDU_id == PCP))
#           {                           /* Destination is Chassis Manager or PCP. */
        cmpobe.f g0,r9,A01
        cmpobne.t g1,r9,A02
#               /* Update OS statistics.                                      */
#               intfstats[PB_INTERFACE]->ifInOctets += PDU_length;
intfstats[PB_INTERFACE]->ifInUcastPkts++;
A01:
        ld      _intfstats+(PB_INTERFACE*4)(g12),r12
        addo    16,sp,sp                # Room for PB_if structure on stack.
        ldl     ifInOctets(r12),r10     # r10 = ifInOctets; r11 = ifInUcastPkts
        addo    r5,r10,r10
        lda     1(r11),r11
        stl     r10,ifInOctets(r12)

#               /* Put PDU into a message.                                    */
#               msg_id = create((U8 *)pPDU, PDU_length);
        mov     r5,g1
        lda     (r15),g0
        callj   _create                 # g0 = msg_id on return

#               /* Set up interface parameters.                               */
#               PB_if.length = PDU_length;
#               PB_if.type = PDU_id;
```

Aug 19 15:49 1994 pb_dsr.s Page 48

```
#                   PB_if.slot_num = src_slot + 1;

#           /* Send message to destination process.                  */
#           msend(PDU_id, msg_id, (void *)&PB_if, sizeof(PB_if), 0, 0, 0);
        mov     r5,g4              # g4 = PDU_length
        mov     g0,g1              # g1 = msg_id
        lda     64(fp),g2          # g2 = &PB_if
        mov     r9,g0              # g0 = PDU_id
        st      g4,(g2)            # PB_if.length
        ldconst 12,g3              # g3 = 12 == sizeof(PB_if)
        st      r9,4(g2)           # PB_if.type = PDU_id
        movt    0,g4               # g4 = g5 = g6 = 0
        st      r6,8(g2)           # PB_if.slot_num = src_slot + 1
        callj   _msend
        subo    16,sp,sp
        b       A06
#       }
#       else if ((PDU_id == FRELAY) || (PDU_id == FR_DRV))
#       {
A02:
        cmpobe.f  FRELAY,r9,A03    # FRELAY's pid.
        cmpobne.t FR_DRV,r9,A04    # FR_DRV's pid.
#           /* Update OS statistics.                                 */
#           intfstats[PB_INTERFACE]->ifInOctets += PDU_length;
intfstats[PB_INTERFACE]->ifInUcastPkts++;
A03:
        ld      _intfstats+(PB_INTERFACE*4)(g12),r12
        ldl     ifInOctets(r12),r10         # r10 = ifInOctets; r11 = ifInUcastl
        addo    r5,r10,r10
        lda     1(r11),r11
        stl     r10,ifInOctets(r12)

#           if (ptable[FRELAY] != NULL_PPTR) /* If Frame Relay is running...*/
#           {  /* Frame Relay doesn't use the common header.         */
        ld      _ptable+(FRELAY*4)(g12),g0  # g0 parameter to getid().
        subo    1,0,g7                      # g7 = -1
        cmpibe.f g0,g7,FR_discard
#               msg_id = getid(ptable[FRELAY], PDU_length, (U8 *)pPDU);
        mov     r5,g1              # r5 = PDU_length
        mov     r15,g2             # r15 = *pPDU
        callj   _getid
        mov     g0,r12             # r12 = msg_id
#               if (msg_id)
        cmpobe.f 0,g0,FR_discard
#               {
#                   evnt = crevt(sched_q);
        ld      _sched_q(g12),g0
        callj   _crevt             # g0 = evnt
        mov     PB_INTERFACE,g1    # PB_INTERFACE
        ld      _intfptrs+(PB_INTERFACE*4)(g12),g2
#                   evnt->cb_ptr = (lkb *)PB_INTERFACE;
        st      g1,28(g0)
#                   evnt->cb_len = intfptrs[PB_INTERFACE]->hostadrs[0].inet;
#                   evnt->id = msg_id;
        ld      _fr_ptr(g12),g3
        ld      hostadrs+inet(g2),g2
```

Aug 19 15:49 1994  pb_dsr.s Page 49

```
            ld          _fr_wakeup(g12),g4
            st          r12,16(g0)
            ldconst     PBUS,g5                 # PBUS
            st          g2,36(g0)
#                           evnt->frompid = PBUS;
            st          g5,44(g0)
#                           evnt->sr_proc = fr_ptr;
            st          g3,8(g0)
#                           evnt->cmplt_r = fr_wakeup;
            st          g4,20(g0)
            b           A06
}
else
#               intfstats[PB_INTERFACE]->ifInDiscards++; /* OS Statistics.*/
#       }
#·      else                                    /* SHOULD NEVER GET HERE!  */
#           intfstats[PB_INTERFACE]->ifInDiscards++; /* OS Statistics.  */
FR_discard:
            ld          _intfstats+(PB_INTERFACE*4)(g12),g0
            ld          ifInDiscards(g0),g1
            addo        1,g1,g1
            st          g1,ifInDiscards(g0)
            b           A06
}
else
{
#       /* Get source slot.                                              */
#       PB_from_slot = src_slot + 1;

#       /* Get BC/MC flag.                                               */
#       adr_flag = chkmc(pPDU, PB_INTERFACE);

A04:
            lda         _mc_table+(mcadr_TYPE*PB_INTERFACE)(g12),g1
                                                # Address of mc_table[PB_INTERFACE]
            ld          num_mc(g1),g2           # mc_table[PB_INTERFACE].num_mc
            mov         0,g3                    # Assume no mc_table entries, and
                                                # therefore no match (adr_flag=FALSE).
            st          r6,_PB_from_slot(g12)   # src_slot + 1
            cmpobe.t    0,g2,A05                # Branch if no mc_table entries.

ldl         (r15),g4                # g4 = .hw1 and .hw2; g5 = .hw3
            ldconst     0xFFFF,g0               # hw3 mask.
            lda         mc_adrs(g1),g1          # Addr. of first mc_table MAC address.
            and         g0,g5,g5                # Isolate .hw3.
            b           chkmc_loop chkmc_match:                                    # Table match found.
            mov         1,g3                    # adr_flag = TRUE
            b           A05 chkmc_loop:
            ldl         (g1),g6                 # g6 = hw1 and hw2; g7 = hw3
            subo        1,g2,g2                 # g2 = number of entries left.
            lda         hw_addrTYPE(g1),g1      # Get ready for next mc_table entry.
            and         g0,g7,g7                # Isolate hw3.
```

B94

Aug 19 15:49 1994  pb_dsr.s Page 50

```
        cmpobne.t   g5,g7,chkmc_lpb         # Branch if hw3s don't match.
        cmpobe.f    g4,g6,chkmc_match       # Branch if hw1s and hw2s match.
chkmc_lpb:
        cmpobne.t   0,g2,chkmc_loop         # Branch if more table entries.

#           /* Pass PDU to proper recipient.                              */
#           parse_common_HDR(pPDU, PDU_length, PB_INTERFACE, adr_flag);
A05:
        lda         (r15),g0
        mov         r5,g1
        lda         PB_INTERFACE,g2
        callj       _parse_common_HDR
#       }
#       pPDUh = (PDU_HEADER_TYPE *)((U8 *)pPDU + ((PDU_length + 3) & ~3));
A06:
        lda         3(r5),g1
        cmpinco     r8,r4,r4                # h++ after comparing.
        and         r13,g1,g1
        lda         (r15)[g1*1],r3
        bg.t        L84
#       ble.f       Temp2                   # (In case a breakpoint here is
#       b           L84                     # needed.)
#Temp2:
#                                           /* Point to next PDU header.  */
#       }
        .ifdef      RX_LOOP
        ld          check_IPND(g12),g0
        .endif
#       cpptr = tpptr;                      /* Restore proc. table pointer.*/
        st          r7,_cpptr(g12)
#   }
# #ifdef RX_LOOP
Chk_IPND:
        .ifdef      RX_LOOP
        cmpobe.f    0,g0,Exit               # Branch if called from PB_rx_isr_B.
#   /* Check if another receive interrupt is pending.  If so, clear the   */
#   /* pending interrupt and call the appropriate receive interrupt routine.*/
#   if (read_IMSK() & (1 << IPND_DMA_2_BITPOS))
        bbc         8+DMA_RX_BASE,sf0,Chk_3 # sf0 is the IPND register.
                                            # Branch if DMA channel 2 not pending.
#   {
#       write_IMSK(read_IMSK() & ~(1 << IPND_DMA_2_BITPOS));
        clrbit      8+DMA_RX_BASE,sf0,sf0   # "Unpend" the interrupt.
#       PB_rx_isr_A(PB_INTERFACE);
        mov         DMA_RX_BASE,g0
        st          g0,_rx_DMA_channel(g12)
        b           _PB_rx_isr
#   }
#   if (read_IMSK() & (1 << IPND_DMA_3_BITPOS))
Chk_3:
        bbc         8+DMA_RX_BASE+1,sf0,Exit
#   {
#       write_IMSK(read_IMSK() & ~(1 << IPND_DMA_3_BITPOS));
        clrbit      8+DMA_RX_BASE+1,sf0,sf0 # "Unpend" the interrupt.
#       PB_rx_isr_B(PB_INTERFACE);
        mov         DMA_RX_BASE+1,g0
```

Aug 19 15:49 1994  pb_dsr.s Page 51

```
        st      g0,_rx_DMA_channel(g12)
        b       _PB_rx_isr
#   }
# #endif
        .endif
return;
Exit:
#       perf1   0,r3
#       perf2   r3
        ret

# } /* PB_rx_isr() */
        .endif  #EPRISE
        .end

# ---------------------------- End of PB_DSR.S ----------------------------
```

B96

It is claimed:

1. A bus for routing data between a plurality of channels using time division multiplexing, each channel comprising a data source device and a data destination device, the bus comprising:

a clock for defining a plurality of sequential clock cycles;

an arbitration processor for selecting data sources in a calculated order and providing an enable signal for one selected data source during each clock cycle;

a command bus for transmitting during a first clock cycle a command from a first enabled data source, during a second clock cycle a command from a second enabled data source, and during a third clock cycle a command from a third enabled data source, the command bus further for carrying channel control commands;

an address bus for transmitting during the first clock cycle the address of a first data destination by the first data source, during the second clock cycle the address of a second data destination by the second data source, and during the third clock cycle the address of a third data destination by the third data source;

a response bus for transmitting during the second clock cycle a response by the first data destination to the command from the first data source, during the third clock cycle a response by the second data destination to the command from the second data source, and during a fourth clock cycle a response by the third data destination to the command from the third data source;

a data bus for transmitting during the third clock cycle data from the first data source to the first data destination, during the fourth clock cycle data from the second data source to the second data destination, and during a fifth third clock cycle data from the third data source to the third data destination, whereby set up and delivery of data for plural channels may overlap in each clock cycle.

2. A bus for routing data between a plurality of channels using time division multiplexing as set forth in claim 1 wherein each of the data source devices comprises a processor for processing commands transmitted on the command bus, addresses transmitted on the address bus, responses transmitted on the response bus and data transmitted on the data bus, and a buffer for buffering data transmitted on the data bus.

3. A bus for routing data between a plurality of channels using time division multiplexing as set forth in claim 1 wherein each of the data destination devices comprises a processor for processing commands transmitted on the command bus, addresses transmitted on the address bus, responses transmitted on the response bus and data transmitted on the data bus, and a buffer for buffering data transmitted on the data bus.

4. A bus for routing data between a plurality of channels using time division multiplexing as set forth in claim 1 wherein the data destination devices are also data source devices and the data source devices are also data destination devices.

5. A bus for routing data between a plurality of channels using time division multiplexing as set forth in claim 1 wherein data transfers are carried out exclusively on said data bus.

6. A bus for routing data between a plurality of channels using time division multiplexing as set forth in claim 1, wherein the calculation order of the arbitration processor comprises sequential selection of the data sources.

7. A bus for routing data between a plurality of channels using time division multiplexing as set forth in claim 6, wherein the calculation order is modified such that data sources with lower previous data bus usage are selected less often than data sources with higher previous data bus usage.

8. A bus for routing data between a plurality of channels using time division multiplexing as set forth in claim 1 wherein the data source devices require at least three clock cycles to set up for a data transfer.

9. A bus for routing data between a plurality of channels using time division multiplexing as set forth in claim 1 wherein the command bus is for transmitting commands for requesting establishment of a new channel, for indicating that a given data source has data to send.

* * * * *